(12) United States Patent
Takahashi

(10) Patent No.: US 11,962,194 B2
(45) Date of Patent: Apr. 16, 2024

(54) ROTATING ELECTRIC MACHINE

(71) Applicant: DENSO CORPORATION, Kariya (JP)

(72) Inventor: Yuki Takahashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 191 days.

(21) Appl. No.: 16/915,566

(22) Filed: Jun. 29, 2020

(65) Prior Publication Data

US 2020/0336033 A1 Oct. 22, 2020

Related U.S. Application Data

(63) Continuation of application No. PCT/JP2018/048246, filed on Dec. 27, 2018.

(30) Foreign Application Priority Data

| Dec. 28, 2017 | (JP) | 2017-255054 |
| Dec. 28, 2017 | (JP) | 2017-255055 |
| Dec. 28, 2017 | (JP) | 2017-255059 |
| Dec. 28, 2017 | (JP) | 2017-255082 |
| Sep. 5, 2018 | (JP) | 2018-166439 |

(Continued)

(51) Int. Cl.
*H02K 1/02* (2006.01)
*H02K 1/2786* (2022.01)
*H02K 11/33* (2016.01)

(52) U.S. Cl.
CPC ......... *H02K 1/2786* (2013.01); *H02K 11/33* (2016.01); *H02K 1/02* (2013.01)

(58) Field of Classification Search
CPC .... H02K 1/2786; H02K 1/2792; H02K 11/33; H02K 1/02; H02K 1/278; H02K 1/2753;
(Continued)

(56) References Cited

U.S. PATENT DOCUMENTS 4,463,276 A 7/1984 Nakamura
5,128,574 A 7/1992 Koizumi et al.
(Continued)

FOREIGN PATENT DOCUMENTS

CA 2659088 A1 1/2008
CN 85103498 A 11/1986
(Continued)

OTHER PUBLICATIONS

Kloepzig et al., machine translation of jp2005304292, Oct. 2005 (Year: 2005).*
(Continued)

*Primary Examiner* — Eric Johnson
(74) *Attorney, Agent, or Firm* — Oliff PLC

(57) ABSTRACT

A rotating electric machine includes a field system and an armature. The field system includes a magnet section having a plurality of magnetic poles whose polarities alternate in a circumferential direction. The armature includes a multi-phase armature coil. Either of the field system and the armature is configured as a rotor. The magnet section is configured to have an easy axis of magnetization oriented such that the closer the position to a d-axis in the circumferential direction, the more the direction of the easy axis of magnetization becomes parallel to the d-axis.

12 Claims, 59 Drawing Sheets

(30) Foreign Application Priority Data

| Sep. 5, 2018 | (JP) | 2018-166440 |
| --- | --- | --- |
| Sep. 5, 2018 | (JP) | 2018-166442 |
| Sep. 5, 2018 | (JP) | 2018-166443 |

(58) Field of Classification Search
CPC ........ H02K 1/2791; H02K 3/34; H02K 3/345; H02K 3/28; H02K 1/27; H02K 1/2706; H02K 1/272; H02K 1/274; H02K 1/2787; H02K 1/2789; H02K 3/47
See application file for complete search history.

(56) References Cited

U.S. PATENT DOCUMENTS

| 5,478,222 | A | 12/1995 | Heidelberg et al. |
| --- | --- | --- | --- |
| 5,637,048 | A | 6/1997 | Maeda et al. |
| 5,723,933 | A | 3/1998 | Grundl et al. |
| 5,759,128 | A | 6/1998 | Mizutani et al. |
| 5,767,601 | A | 6/1998 | Uchiyama |
| 5,787,567 | A | 8/1998 | Miyazaki |
| 5,821,653 | A | 10/1998 | Kinto et al. |
| 5,880,544 | A | 3/1999 | Ikeda et al. |
| 6,501,205 | B1 | 12/2002 | Asao et al. |
| 6,700,236 | B2 | 3/2004 | Umeda et al. |
| 6,717,315 | B1 | 4/2004 | Tajima et al. |
| 6,770,999 | B2 | 8/2004 | Sakurai |
| 6,812,615 | B1 | 11/2004 | Ettridge |
| 6,882,077 | B2 | 4/2005 | Neet |
| 6,914,356 | B2 | 7/2005 | Yamamura et al. |
| 7,402,934 | B1 | 7/2008 | Gabrys |
| 7,902,707 | B2 * | 3/2011 | Kawamura ............ H02K 1/278 310/156.43 |
| 8,004,141 | B2 | 8/2011 | Jeung |
| 8,446,060 | B1 | 5/2013 | Lugg |
| 8,552,678 | B2 | 10/2013 | Yuuki et al. |
| 8,766,468 | B1 | 7/2014 | Rilla et al. |
| 8,823,238 | B2 | 9/2014 | Greaves et al. |
| 9,172,280 | B2 | 10/2015 | Koga |
| 9,255,633 | B2 | 2/2016 | Markl |
| 9,595,851 | B2 | 3/2017 | Hazeyama et al. |
| 10,404,120 | B2 | 9/2019 | Ishizuka et al. |
| 11,110,793 | B2 | 9/2021 | Takahashi et al. |
| 2002/0050395 | A1 | 5/2002 | Kusumoto et al. |
| 2002/0180294 | A1 | 12/2002 | Kaneda et al. |
| 2004/0090130 | A1 | 5/2004 | Kaneko et al. |
| 2004/0095035 | A1 | 5/2004 | Sogabe et al. |
| 2004/0119362 | A1 | 6/2004 | Neet |
| 2004/0263016 | A1 | 12/2004 | Neet |
| 2005/0134134 | A1 | 6/2005 | Mori et al. |
| 2006/0017345 | A1 | 1/2006 | Uchida et al. |
| 2006/0103253 | A1 | 5/2006 | Shiga et al. |
| 2006/0113857 | A1 | 6/2006 | Honkura et al. |
| 2006/0138879 | A1 | 6/2006 | Kusase |
| 2006/0186753 | A1 | 8/2006 | Yang et al. |
| 2006/0197397 | A1 | 9/2006 | Stiesdal |
| 2008/0073992 | A1 | 3/2008 | Kusama |
| 2008/0093944 | A1 | 4/2008 | Takahashi et al. |
| 2008/0218007 | A1 | 9/2008 | Masuzawa et al. |
| 2008/0315691 | A1 | 12/2008 | Jeung |
| 2009/0066183 | A1 | 3/2009 | Aramaki et al. |
| 2009/0079277 | A1 | 3/2009 | Nakamura et al. |
| 2009/0127938 | A1 * | 5/2009 | Sahin Nomaler .... H02K 41/031 310/12.21 |
| 2009/0230353 | A1 | 9/2009 | Shimazu et al. |
| 2009/0251023 | A1 | 10/2009 | Nakano et al. |
| 2009/0267441 | A1 | 10/2009 | Hiramatsu et al. |
| 2010/0007230 | A1 | 1/2010 | Suzuki et al. |
| 2010/0117481 | A1 | 5/2010 | Greaves et al. |
| 2010/0123426 | A1 | 5/2010 | Nashiki et al. |
| 2010/0181858 | A1 | 7/2010 | Hibbs |
| 2010/0194231 | A1 | 8/2010 | Rippel et al. |
| 2011/0012440 | A1 | 1/2011 | Toyota et al. |
| 2011/0057533 | A1 | 3/2011 | Murakami et al. |
| 2011/0210558 | A1 | 9/2011 | Stiesdal |
| 2011/0285243 | A1 | 11/2011 | Taniguchi |
| 2011/0304236 | A1 | 12/2011 | Nishiyama et al. |
| 2012/0001521 | A1 | 1/2012 | Shiraki et al. |
| 2012/0038168 | A1 | 2/2012 | Morishita et al. |
| 2012/0181891 | A1 | 7/2012 | Yamada et al. |
| 2012/0293035 | A1 | 11/2012 | Nakamura et al. |
| 2012/0306310 | A1 | 12/2012 | Takeuchi et al. |
| 2012/0319507 | A1 | 12/2012 | Ueno et al. |
| 2013/0082560 | A1 | 4/2013 | Takeuchi et al. |
| 2013/0106238 | A1 | 5/2013 | Saiki et al. |
| 2013/0113328 | A1 | 5/2013 | Kogure et al. |
| 2013/0127289 | A1 | 5/2013 | Koga |
| 2013/0249339 | A1 | 9/2013 | Makino et al. |
| 2013/0300241 | A1 | 11/2013 | Wedman et al. |
| 2013/0334991 | A1 | 12/2013 | Yuuki et al. |
| 2014/0084731 | A1 | 3/2014 | Iwami et al. |
| 2014/0125182 | A1 | 5/2014 | Takahashi |
| 2014/0174856 | A1 | 6/2014 | Takagi et al. |
| 2014/0197709 | A1 | 7/2014 | Hasegawa |
| 2014/0300242 | A1 | 10/2014 | Honda |
| 2014/0312718 | A1 | 10/2014 | Li et al. |
| 2015/0028708 | A1 | 1/2015 | Matsuoka |
| 2015/0089794 | A1 | 4/2015 | Dokonal et al. |
| 2015/0097453 | A1 | 4/2015 | Nishikawa et al. |
| 2015/0129711 | A1 | 5/2015 | Caubel |
| 2015/0171682 | A1 | 6/2015 | Fujisawa et al. |
| 2015/0171683 | A1 | 6/2015 | Kim et al. |
| 2015/0236556 | A1 | 8/2015 | Suwazono et al. |
| 2015/0340915 | A1 | 11/2015 | Kato et al. |
| 2016/0049835 | A1 | 2/2016 | Fukumoto et al. |
| 2016/0102705 | A1 | 4/2016 | Mei |
| 2016/0126871 | A1 | 5/2016 | Uematsu |
| 2016/0149454 | A1 | 5/2016 | Haga et al. |
| 2016/0204728 | A1 | 7/2016 | Notohara et al. |
| 2016/0211707 | A1 | 7/2016 | Yamada et al. |
| 2016/0277397 | A1 | 9/2016 | Watanabe |
| 2016/0315508 | A1 * | 10/2016 | Li ........................ H02K 29/03 |
| 2017/0085143 | A1 | 3/2017 | Tanaka et al. |
| 2017/0093257 | A1 | 3/2017 | Hirata et al. |
| 2017/0098969 | A1 | 4/2017 | Fukumoto et al. |
| 2017/0162311 | A1 | 6/2017 | Shimbo et al. |
| 2017/0187258 | A1 | 6/2017 | Fujikawa et al. |
| 2017/0222583 | A1 | 8/2017 | Akimatsu et al. |
| 2017/0237310 | A1 | 8/2017 | Nakamura et al. |
| 2017/0271941 | A1 | 9/2017 | Kaneko et al. |
| 2017/0271945 | A1 | 9/2017 | Germann et al. |
| 2017/0288489 | A1 | 10/2017 | Shiraki et al. |
| 2017/0353071 | A1 * | 12/2017 | Saito ........................ H02K 3/28 |
| 2017/0353131 | A1 * | 12/2017 | Usagawa ................ H02P 27/08 |
| 2018/0056329 | A1 | 3/2018 | Akanuma et al. |
| 2018/0062471 | A1 | 3/2018 | Shiraki et al. |
| 2018/0108464 | A1 | 4/2018 | Fujikawa et al. |
| 2018/0262091 | A1 | 9/2018 | Gieras et al. |
| 2018/0269733 | A1 | 9/2018 | Mikami et al. |
| 2018/0287445 | A1 | 10/2018 | Ishizuka et al. |
| 2018/0323673 | A1 | 11/2018 | Shiraki et al. |
| 2018/0336981 | A1 | 11/2018 | Fujihara et al. |
| 2018/0358846 | A1 | 12/2018 | Baba et al. |
| 2019/0097509 | A1 | 3/2019 | Oguchi et al. |
| 2019/0157954 | A1 | 5/2019 | Takahashi et al. |
| 2019/0341828 | A1 | 11/2019 | Calverley et al. |
| 2019/0379252 | A1 | 12/2019 | Taniguchi et al. |
| 2020/0021222 | A1 * | 1/2020 | Nigo ........................ F25B 13/00 |
| 2020/0161939 | A1 | 5/2020 | Takahashi et al. |
| 2020/0162003 | A1 | 5/2020 | Takahashi et al. |
| 2020/0244119 | A1 * | 7/2020 | Morishita ............ H02K 1/2786 |
| 2020/0336027 | A1 | 10/2020 | Takahashi |

FOREIGN PATENT DOCUMENTS

| CN | 1761130 | A | 4/2006 |
| --- | --- | --- | --- |
| CN | 102684326 | A | 9/2012 |
| CN | 105305756 | A | 2/2016 |
| CN | 104578462 | B | 7/2017 |
| CN | 107104623 | A | 8/2017 |
| EP | 0668651 | A1 | 8/1995 |
| EP | 2136467 | A1 | 12/2009 |
| FR | 2036866 | A1 | 12/1970 |
| FR | 2933544 | A1 | 1/2010 |
| JP | S51-125503 | U | 10/1976 |

(56) References Cited

FOREIGN PATENT DOCUMENTS

| | | |
|---|---|---|
| JP | S55-173264 U | 12/1980 |
| JP | S61-14865 U | 1/1986 |
| JP | S61-180567 U | 11/1986 |
| JP | S61-258643 A | 11/1986 |
| JP | S62-095954 A | 5/1987 |
| JP | S62-115761 U | 7/1987 |
| JP | S62-196053 A | 8/1987 |
| JP | H02-303348 A | 12/1990 |
| JP | H03-048373 U | 5/1991 |
| JP | H04-372544 A | 12/1992 |
| JP | 3001939 U | 9/1994 |
| JP | H07-059314 A | 3/1995 |
| JP | H07-212915 A | 8/1995 |
| JP | H08-242564 A | 9/1996 |
| JP | H08-265995 A | 10/1996 |
| JP | H08-275419 A | 10/1996 |
| JP | H09-308145 A | 11/1997 |
| JP | H10-271733 A | 10/1998 |
| JP | H11-018496 A | 1/1999 |
| JP | H11-206091 A | 7/1999 |
| JP | H11-215749 A | 8/1999 |
| JP | H11-308793 A | 11/1999 |
| JP | 2000-41367 A | 2/2000 |
| JP | 2000-245089 A | 9/2000 |
| JP | 2000-270502 A | 9/2000 |
| JP | 2001-112197 A | 4/2001 |
| JP | 2001-333555 A | 11/2001 |
| JP | 2002-010602 A | 1/2002 |
| JP | 2002-64028 A | 2/2002 |
| JP | 2002-171735 A | 6/2002 |
| JP | 2002-272066 A | 9/2002 |
| JP | 2002-359953 A | 12/2002 |
| JP | 2003-070197 A | 3/2003 |
| JP | 2003-104076 A | 4/2003 |
| JP | 2003-324866 A | 11/2003 |
| JP | 2004-15906 A | 1/2004 |
| JP | 2004-092715 A | 3/2004 |
| JP | 2004-120892 A | 4/2004 |
| JP | 2004-147451 A | 5/2004 |
| JP | 2004-159453 A | 6/2004 |
| JP | 2004-187344 A | 7/2004 |
| JP | 2005-065385 A | 3/2005 |
| JP | 2005-117751 A | 4/2005 |
| JP | 2005-151667 A | 6/2005 |
| JP | 2005-253146 A | 9/2005 |
| JP | 2005304292 A * | 10/2005 ........... H02K 1/2733 |
| JP | 2005-312214 A | 11/2005 |
| JP | 2006-288187 A | 10/2006 |
| JP | 2006-320109 A | 11/2006 |
| JP | 2006-325338 A | 11/2006 |
| JP | 2007-202324 A | 8/2007 |
| JP | 2007-267565 A | 10/2007 |
| JP | 2007-274869 A | 10/2007 |
| JP | 2007-295716 A | 11/2007 |
| JP | 2008-148375 A | 6/2008 |
| JP | 2008-237021 A | 10/2008 |
| JP | 2008-245475 A | 10/2008 |
| JP | 2008-278648 A | 11/2008 |
| JP | 2009-017712 A | 1/2009 |
| JP | 2009-071939 A | 4/2009 |
| JP | 2009-084551 A | 4/2009 |
| JP | 2009-273304 A | 11/2009 |
| JP | 2009-291040 A | 12/2009 |
| JP | 2010-022192 A | 1/2010 |
| JP | 2010-041753 A | 2/2010 |
| JP | 2010-130819 A | 6/2010 |
| JP | 2010-130871 A | 6/2010 |
| JP | 2011-024324 A | 2/2011 |
| JP | 2011-244627 A | 12/2011 |
| JP | 2012-005232 A | 1/2012 |
| JP | 2012-010565 A | 1/2012 |
| JP | 2012-125088 A | 6/2012 |
| JP | 2012-165614 A | 8/2012 |
| JP | 2012-175755 A | 9/2012 |
| JP | 2012-228072 A | 11/2012 |
| JP | 2013-031336 A | 2/2013 |
| JP | 2013-051765 A | 3/2013 |
| JP | 2013-108986 A | 6/2013 |
| JP | 2013-122849 B1 | 6/2013 |
| JP | 2013-162668 A | 8/2013 |
| JP | 2013-207858 A | 10/2013 |
| JP | 2014-068443 A | 4/2014 |
| JP | 2014-068479 A | 4/2014 |
| JP | 2014-093835 A | 5/2014 |
| JP | 2014-213622 A | 11/2014 |
| JP | 2014-239586 A | 12/2014 |
| JP | 2015-015906 A | 1/2015 |
| JP | 2015-018633 A | 1/2015 |
| JP | 2015-033173 A | 2/2015 |
| JP | 2015-092792 A | 5/2015 |
| JP | 2015-122834 A | 7/2015 |
| JP | 2015-128355 A | 7/2015 |
| JP | 2015-142484 A | 8/2015 |
| JP | 2015-177725 A | 10/2015 |
| JP | 2015-211492 A | 11/2015 |
| JP | 5805336 B1 | 11/2015 |
| JP | 2015-216714 A | 12/2015 |
| JP | 2016-026465 A | 2/2016 |
| JP | 2016-052210 A | 4/2016 |
| JP | 2016-072457 A | 5/2016 |
| JP | 2016-092995 A | 5/2016 |
| JP | 2016-126992 A | 7/2016 |
| JP | 2016-129439 A | 7/2016 |
| JP | 2016-129483 A | 7/2016 |
| JP | 2016-178814 A | 10/2016 |
| JP | 2016-226226 A | 12/2016 |
| JP | 2017-022914 A | 1/2017 |
| JP | 2017-060321 A | 3/2017 |
| JP | 2017-070140 A | 4/2017 |
| JP | 2017-071235 A | 4/2017 |
| JP | 2017-131046 A | 7/2017 |
| JP | 2017-132378 A | 8/2017 |
| JP | 2017-169316 A | 9/2017 |
| JP | 2018-074767 A | 5/2018 |
| JP | 2018-201018 A | 12/2018 |
| JP | 2019-122223 A | 7/2019 |
| JP | 2019-122235 A | 7/2019 |
| JP | 2019-122236 A | 7/2019 |
| JP | 2019-122242 A | 7/2019 |
| JP | 2019-140368 A | 8/2019 |
| JP | 2020-108280 A | 7/2020 |
| JP | 2013-201853 A | 10/2020 |
| WO | 2002/015229 A1 | 2/2002 |
| WO | 2013/179476 A1 | 12/2013 |
| WO | 2015/097767 A1 | 7/2015 |
| WO | 2016/058870 A1 | 4/2016 |
| WO | 2016/072481 A1 | 5/2016 |
| WO | 2016/084204 A1 | 6/2016 |
| WO | 2017/163383 A1 | 9/2017 |

OTHER PUBLICATIONS

May 2, 2022 Office Action issued in U.S. Appl. No. 16/915,238.
Jan. 7, 2021 Office Action issued in U.S. Appl. No. 16/915,348.
Apr. 2, 2019 International Search Report issued in International Patent Application No. PCT/JP2018/048254.
Apr. 9, 2019 International Search Report issued in International Patent Application No. PCT/JP2018/048248.
Apr. 9, 2019 International Search Report issued in International Patent Application No. PCT/JP2018/048246.
Apr. 16, 2019 Search Report issued in International Patent Application No. PCT/JP2018/048247.
Oct. 23, 2018 International Search Report issued in Application No. PCT/JP2018/027409.
Oct. 16, 2018 International Search Report issued in Application No. PCT/JP2018/027408.
U.S. Appl. No. 16/914,605, filed Jun. 29, 2020 in the name of Takahashi.
U.S. Appl. No. 16/914,570, filed Jun. 29, 2020 in the name of Takahashi.
U.S. Appl. No. 16/915,027, filed Jun. 29, 2020 in the name of Takahashi.

(56) References Cited

OTHER PUBLICATIONS

U.S. Appl. No. 16/915,238, filed Jun. 29, 2020 in the name of Takahashi.
U.S. Appl. No. 16/915,116, filed Jun. 29, 2020 in the name of Takahashi et al.
U.S. Appl. No. 16/914,532, filed Jun. 29, 2020 in the name of Takahashi.
U.S. Appl. No. 16/748,535, filed Jan. 21, 2020 in the name of Takahashi et al.
U.S. Appl. No. 16/748,195, filed Jan. 21, 2020 in the name of Takahashi et al.
U.S. Appl. No. 16/915,348, filed Jun. 29, 2020 in the name of Takahashi et al.

\* cited by examiner

COMPARATIVE EXAMPLES

FIG. 41(a)  FIG. 41(b)  FIG. 41(c)
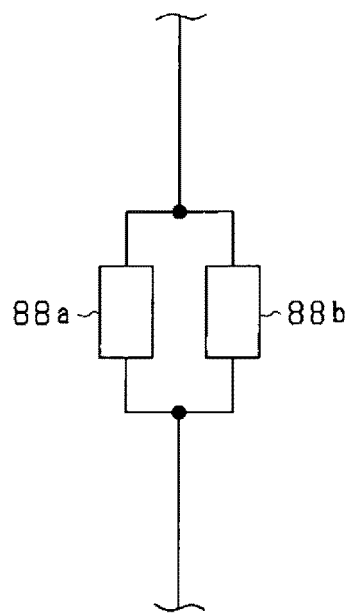
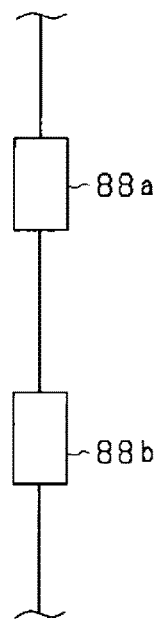
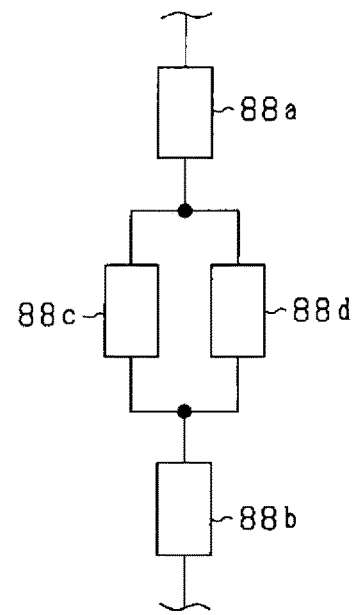
FIG.42
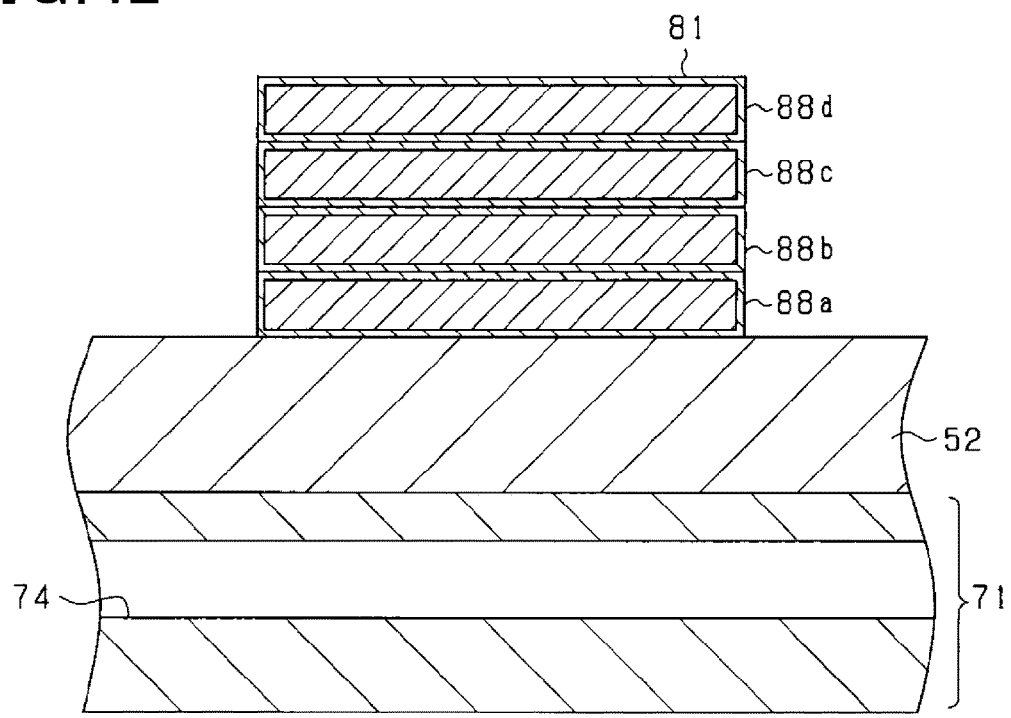

FIG. 61(a)
CONDITION E
FIG. 61(b)
3RD HARMONIC
FIG. 61(c)
5TH HARMONIC
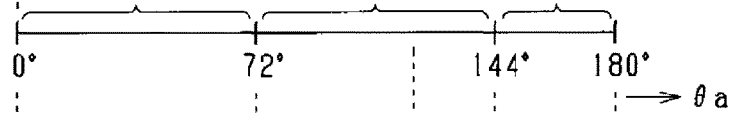
FIG. 61(d)
1ST CONFIGURATION
(B∧E)
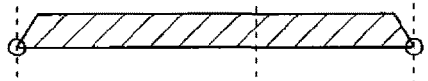
FIG. 61(e)
2ND CONFIGURATION
(B∧D)
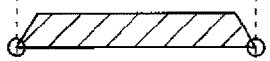
FIG. 61(f)
3RD CONFIGURATION
(B∧D∧E)
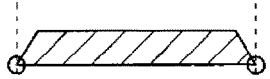
FIG. 61(g)
4TH CONFIGURATION
(B∧C∧E)
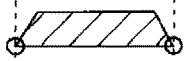
FIG. 61(h)
5TH CONFIGURATION
×
FIG. 61(i)
6TH CONFIGURATION
(A∧C)
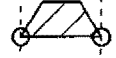
FIG. 61(j)
7TH CONFIGURATION
×
FIG. 61(k)
8TH CONFIGURATION
×
FIG. 61(l)
9TH CONFIGURATION
(A∧D)
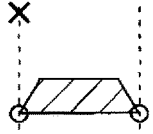

FIG. 82(a)
CONDITION E
FIG. 82(b)
3RD HARMONIC
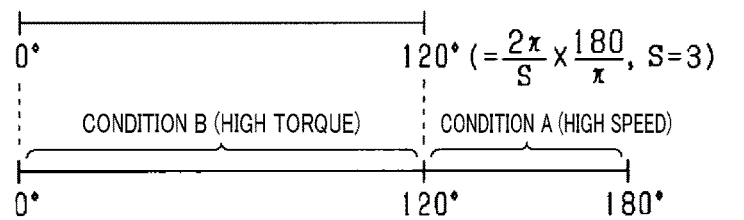
FIG. 82(c)
5TH HARMONIC
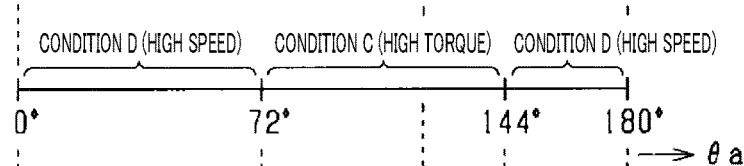
FIG. 82(d)
1ST CONFIGURATION
(B∧E)
FIG. 82(e)
2ND CONFIGURATION
(B∧D)
FIG. 82(f)
3RD CONFIGURATION
(B∧D∧E)
FIG. 82(g)
4TH CONFIGURATION
(B∧C∧E)
FIG. 82(h)
5TH CONFIGURATION
FIG. 82(i)
6TH CONFIGURATION
(A∧C)
FIG. 82(j)
7TH CONFIGURATION
FIG. 82(k)
8TH CONFIGURATION
FIG. 82(l)
9TH CONFIGURATION
(A∧D)
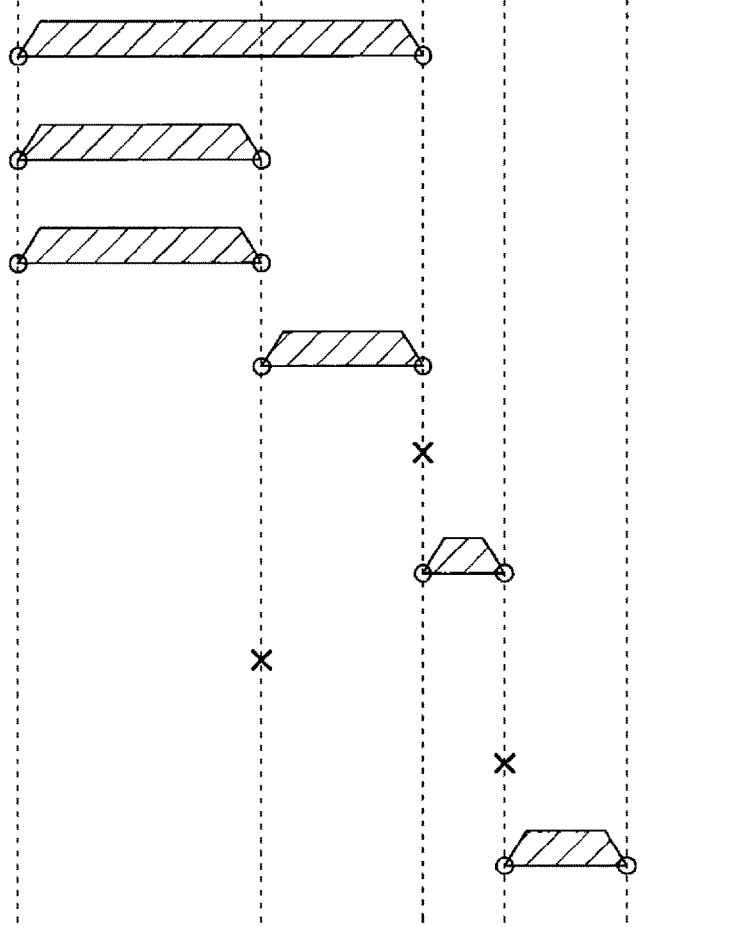

U-PHASE VOLTAGE

V-PHASE VOLTAGE

W-PHASE VOLTAGE

ROTATING ELECTRIC MACHINE

CROSS-REFERENCE TO RELATED APPLICATIONS

The present application is a continuation application of International Application No. PCT/JP2018/048246 filed on Dec. 27, 2018, which is based on and claims priority from: Japanese Patent Application No. 2017-255054 filed on Dec. 28, 2017; Japanese Patent Application No. 2017-255055 filed on Dec. 28, 2017; Japanese Patent Application No. 2017-255059 filed on Dec. 28, 2017; Japanese Patent Application No. 2017-255082 filed on Dec. 28, 2017; Japanese Patent Application No. 2018-166439 filed on Sep. 5, 2018; Japanese Patent Application No. 2018-166440 filed on Sep. 5, 2018; Japanese Patent Application No. 2018-166442 filed on Sep. 5, 2018; and Japanese Patent Application No. 2018-166443 filed on Sep. 5, 2018. The contents of these applications are hereby incorporated by reference in their entirety into the present application.

BACKGROUND

1 Technical Field

The disclosure in this specification relates to rotating electric machines.

2 Description of Related Art

Conventionally, there are known rotating electric machines which include a field system and an armature. The field system includes a magnet section having a plurality of magnetic poles whose polarities alternate in a circumferential direction. The armature includes a multi-phase armature coil.

SUMMARY

In the rotating electric machines known in the art (see, for example, Patent Document 1: Japanese Patent Application Publication No. JP 2014-093859 A), with increase in the magnetic reluctance of a magnetic circuit, the amount of magnetic flux flowing in the magnetic circuit decreases. As a result, the torque constant or the counterelectromotive-force constant of the rotating electric machine is lowered, making it impossible to achieve high torque of the rotating electric machine.

The present disclosure has been made in view of the above problems. It is, therefore, an object of the present disclosure to provide a rotating electric machine capable of increasing the torque thereof.

According to an A1-th solution, there is provided a rotating electric machine comprising:
  a field system including a magnet section having a plurality of magnetic poles whose polarities alternate in a circumferential direction; and
  an armature including a multi-phase armature coil,
  wherein
  either of the field system and the armature is configured as a rotor, and
  the magnet section is configured to have an easy axis of magnetization oriented such that the closer the position to a d-axis in the circumferential direction, the more the direction of the easy axis of magnetization becomes parallel to the d-axis.

According to the A1-th solution, the easy axis of magnetization is oriented such that the closer the position to the d-axis in the circumferential direction, the more the direction of the easy axis of magnetization becomes parallel to the d-axis. Consequently, it becomes possible to make the waveform of the surface magnetic flux density of the magnet section approximate to a sine wave, thereby intensifying the magnet magnetic flux on the d-axis. As a result, it becomes possible to increase the torque of the rotating electric machine.

Moreover, with the easy axis of magnetization oriented such that the closer the position to the d-axis in the circumferential direction, the more the direction of the easy axis of magnetization becomes parallel to the d-axis, the surface magnetic flux change from the q-axis to the d-axis becomes gentle in each magnetic pole. Consequently, it becomes possible to reduce eddy current loss caused by the magnet magnetic flux crossing the armature coil.

The A1-th solution may be further implemented, for example, as an A2-th solution. According to the A2-th solution, the magnet section includes first magnets each corresponding to one of the magnetic poles of the magnet section and second magnets each corresponding to one of the magnetic poles of the magnet section,
  the first magnets are arranged at predetermined intervals in the circumferential direction,
  each of the second magnets is arranged between one circumferentially-adjacent pair of the first magnets,
  the magnetic poles corresponding to the first magnets are different from the magnetic poles corresponding to the second magnets, and
  each of the first and second magnets is configured to have an easy axis of magnetization oriented such that the closer the position to the d-axis in the circumferential direction, the more the direction of the easy axis of magnetization becomes parallel to the d-axis.

Otherwise, the A1-th solution may be further implemented, for example, as an A3-th solution. According to the A3-th solution, the magnet section includes first magnets each corresponding to one of the magnetic poles of the magnet section and second magnet pairs each corresponding to one of the magnetic poles of the magnet section,
  the first magnets are arranged at predetermined intervals in the circumferential direction,
  each of the second magnet pairs consists of two second magnets arranged respectively adjacent to opposite ends of one of the first magnets in the circumferential direction,
  each of the first magnets is configured to have an easy axis of magnetization oriented such that the direction of the easy axis of magnetization is parallel to the d-axis, and
  each of the second magnets is configured to have an easy axis of magnetization oriented such that the closer the position to the d-axis in the circumferential direction, the more the direction of the easy axis of magnetization becomes parallel to the d-axis.

According to an A4-th solution, in any one of the A1-th to the A3-th solutions, the armature coil has electrical conductor sections opposed to the field system and arranged at predetermined intervals in the circumferential direction,
  in the armature, there are provided inter-conductor members between the electrical conductor sections in the circumferential direction or no inter-conductor members are provided between the electrical conductor sections in the circumferential direction, and the inter-conductor members are formed of a magnetic material satisfying the following relationship or formed of a non-magnetic material, $$Wt \times Bs \leq Wm \times Br$$

where Wt is the circumferential width of the inter-conductor members in each magnetic pole, Bs is the saturation flux density of the inter-conductor members, Wm is the circumferential width of the magnet section in each magnetic pole and Br is the residual flux density of the magnet section.

Conventionally, armatures have been known which have: teeth radially extending from a yoke portion at predetermined intervals; slots each being formed between one circumferentially-adjacent pair of the teeth; and an armature coil received in the slots. In these armatures, most of the magnet magnetic flux of the magnet section flows to the yoke portion via the teeth. Consequently, the waveform of the magnet magnetic flux actually crossing the armature coil may be considerably distorted with respect to the waveform of the magnet magnetic flux of the magnet section for achieving high torque. As a result, the effect of increasing the torque of the rotating electric machine may be lowered.

In contrast, according to the A4-th solution, the armature includes neither teeth nor configuration corresponding to teeth. Consequently, it becomes possible to make the waveform of the magnet magnetic flux actually crossing the armature coil approximate to the waveform of the magnet magnetic flux of the magnet section for achieving high torque. As a result, it becomes possible to improve the effect of increasing the torque of the rotating electric machine.

According to an A5-th solution, in the A4-th solution, the radial thickness of the electrical conductor sections is smaller than the circumferential width of the electrical conductor sections per phase in each magnetic pole.

According to the A5-th solution, it becomes possible to reduce eddy current loss in the electrical conductor sections while improving the effect of increasing the torque of the rotating electric machine.

According to an A6-th solution, in any one of the A1-th to the A5-th solutions, the rotating electric machine further comprises:
an electric power converter electrically connected with the armature coil; and
a controller configured to control the electric power converter for energization of the armature coil,
wherein
the number of phases of the armature coil is equal to 3, and
the controller is configured to control the electric power converter for energization of the armature coil by 120° rectangular-wave energization control.

With the easy axis of magnetization oriented such that the closer the position to the d-axis in the circumferential direction, the more the direction of the easy axis of magnetization becomes parallel to the d-axis, it becomes possible to have the waveform of the magnetic flux density of the magnet section in an electrical angular range corresponding to one magnetic pole concentrated within an electrical angular range of 120°. On the basis of this configuration, by applying the rectangular-wave energization control using a rectangular wave whose electrical angular range is 120°, it becomes possible to further increase the torque of the rotating electric machine.

According to an A7-th solution, in any one of the A1-th to the A5-th solutions, the rotating electric machine further comprises:
an electric power converter electrically connected with the armature coil; and
a controller configured to control the electric power converter for energization of the armature coil,
wherein
the controller is configured to control the electric power converter to supply the armature coil with electric current which includes fundamental current in phase with a fundamental component included in magnet magnetic flux of the magnet section.

According to the A7-th solution, the armature coil is supplied with the electric current which includes the fundamental current in phase with the fundamental component included in the magnet magnetic flux. Consequently, it becomes possible to further improve the torque-increasing effect realized by the magnet magnetic flux in the rotating electric machine.

There are also known rotating electric machines which will be described below. For example, as disclosed in Patent Document 2 (i.e., Japanese Patent Application Publication No. JP 2016-072457 A), there is known a technique of controlling, by a polar anisotropic orientation, the surface magnetic flux waveform of magnets that constitute a field system of a rotating electric machine. Moreover, there is also known a technique of controlling, by a polar anisotropic orientation, the surface magnetic flux waveform of magnets to be a sine waveform.

In an electrical angular range corresponding to one magnetic pole, there may be provided only one of the magnets constituting the field system. In this case, a special orientation technique is needed to control the surface magnetic flux waveform of each magnet to be a sine waveform. Moreover, it tends to be difficult to improve the residual flux density and coercive force of the magnets to be higher than those of magnets commercially available today (e.g., neodymium magnets). As a result, it may become impossible to increase the torque of the rotating electric machine.

The present disclosure has been made in view of the above problems. It is, therefore, an object of the present disclosure to provide a rotating electric machine capable of increasing the torque thereof without using, as far as possible, any special orientation technique.

According to a B1-th solution, there is provided a rotating electric machine comprising:
a field system including a magnet section having a plurality of magnetic poles whose polarities alternate in a circumferential direction; and
an armature including a multi-phase armature coil,
wherein
either of the field system and the armature is configured as a rotor, and
the magnet section includes first magnets that each correspond to one of the magnetic poles of the magnet section and are arranged at predetermined intervals in the circumferential direction, and second magnets each of which is arranged between one circumferentially-adjacent pair of the first magnets to extend across a q-axis,
each of the first magnets is oriented to form a magnet magnetic path parallel to a d-axis,
surfaces of the second magnets facing the first magnets constitute magnetic flux acting surfaces through which magnetic flux flows into or out of the second magnets, and
each of the second magnets is oriented to form a magnet magnetic path deviated from a direction perpendicular to the q-axis.

According to the B1-th solution, the magnets provided in an electrical angular range corresponding to one magnetic pole are configured with the first and second magnets. With this configuration, it becomes possible to make, without using any special orientation technique as far as possible, the waveform of the surface magnetic flux of the magnets approximate to a sine wave in comparison with a configuration where only one magnet is provided in an electrical angular range corresponding to one magnetic pole. Consequently, according to the B1-th solution, it becomes possible to increase the torque of the rotating electric machine without using any special orientation technique, as far as possible.

Moreover, according to the B1-th solution, each of the second magnets is oriented to form a magnet magnetic path deviated from a direction perpendicular to the q-axis. With this configuration, it becomes possible to lengthen the magnet magnetic paths in the magnets in comparison with a configuration where each of the first magnets is oriented to form a magnet magnetic path parallel to the d-axis and each of the second magnets is oriented to form a magnet magnetic path perpendicular to the q-axis. As a result, it becomes possible to increase the amount of magnetic flux of the magnet section, thereby intensifying the magnet magnetic flux on the d-axis. Consequently, it becomes possible to further improve the effect of increasing the torque of the rotating electric machine; it also becomes possible to make it difficult for the magnets to become demagnetized.

According to a B2-th solution, in the B1-th solution, each of the second magnets is oriented to form the magnet magnetic path that is convex toward the opposite side to the armature.

According to the B2-th solution, it becomes possible to further lengthen the magnet magnetic paths in the magnets. Consequently, it becomes possible to further improve the effect of increasing the torque of the rotating electric machine; it also becomes possible to make it more difficult for the magnets to become demagnetized.

According to a B3-th solution, there is provided a rotating electric machine comprising:
- a field system including a magnet section having a plurality of magnetic poles whose polarities alternate in a circumferential direction; and
- an armature including a multi-phase armature coil, wherein
- either of the field system and the armature is configured as a rotor, and
- the magnet section includes first magnets that each correspond to one of the magnetic poles of the magnet section and are arranged at predetermined intervals in the circumferential direction, and second magnets each of which is arranged between one circumferentially-adjacent pair of the first magnets to extend across a q-axis,
- each of the first magnets is oriented to form a magnet magnetic path such that the direction of an easy axis of magnetization is parallel to or near parallel to a d-axis on the d-axis side and perpendicular to or near perpendicular to the q-axis on the q-axis side, and
- each of the second magnets is oriented to form a magnet magnetic path perpendicular to the q-axis.

According to the B3-th solution, the magnets provided in an electrical angular range corresponding to one magnetic pole are configured with the first and second magnets. With this configuration, it becomes possible to make, without using any special orientation technique as far as possible, the waveform of the surface magnetic flux of the magnets approximate to a sine wave in comparison with a configuration where only one magnet is provided in an electrical angular range corresponding to one magnetic pole. Consequently, according to the B3-th solution, it becomes possible to increase the torque of the rotating electric machine without using any special orientation technique, as far as possible.

Moreover, with the configuration of the first magnets according to the B3-th solution, it becomes possible to lengthen the magnet magnetic paths, thereby increasing the amount of magnetic flux of the magnet section. Consequently, it becomes possible to further improve the effect of increasing the torque of the rotating electric machine; it also becomes possible to make it difficult for the magnets to become demagnetized.

According to a B4-th solution, in any one of the B1-th to the B3-th solutions, the following conditions are further satisfied: $0<\theta a \leq 2\pi/S$; and $0<\theta a \leq 2\pi/3$, where S is the number of phases of the armature coil and $\theta a$ is a main magnetic pole angle which is defined, for each of the first magnets, as an angle between a straight line extending through one of two q-axis-side ends of the first magnet in the circumferential direction and an axis of the rotor and a straight line extending through the other of the two q-axis-side ends of the first magnet in the circumferential direction and the axis of the rotor.

If the main magnetic pole angle $\theta a$ was larger than $2\pi/S$, each of the first magnets would face circumferentially-adjacent armature coil sections of the same phase at the same time. The polarities of magnetic fluxes generated with energization of the armature coil are different between the circumferentially-adjacent armature coil sections of the same phase. Therefore, with each of the first magnets facing the circumferentially-adjacent armature coil sections of the same phase at the same time, part of the magnetic flux of each of the first magnets would be canceled, thereby lowering the amount of the magnetic flux of each of the first magnets. As a result, the effect of increasing the torque of the rotating electric machine would be lowered. To solve this problem, according to the B4-th solution, the main magnetic pole angle $\theta a$ is set to satisfy the condition of $(0<\theta a \leq 2\pi/S)$, thereby having the waveform of the surface magnetic flux of the magnet section in an electrical angular range corresponding to one magnetic pole concentrated within an electrical angular range of $2\pi/S$ into a convex shape. Consequently, it becomes possible to suppress decrease in the amount of magnetic flux of the magnet section. Therefore, the condition of $(0<\theta a \leq 2\pi/S)$ contributes to the effect of increasing the torque of the rotating electric machine.

On the other hand, the waveform of the surface magnetic flux of the magnet section includes a fundamental component (or first-order component) and harmonic components. Moreover, the main harmonic components are a third-order harmonic component and a fifth-order harmonic component. When $0<\theta a<2\pi/3$, in an electrical angular range of 0°-180° where the polarity of the fundamental component is a first polarity (e.g., N), the total value of the third-order harmonic component of the first polarity is larger than the total value of the third-order harmonic component of a second polarity (e.g., S) different from the first polarity. As a result, the effective value of the amount of magnetic flux of the magnet section in the electrical angular range of 0°-180° is increased. Moreover, when $0<\theta a<2\pi/3$, in an electrical angular range of 180°-360° where the polarity of the fundamental component is the second polarity, the total value of the third-order harmonic component of the second polarity is larger than the total value of the third-order harmonic component of the first polarity. As a result, the effective value of the amount of magnetic flux of the magnet section in the electrical angular range of 180°-360° is also increased.

By increasing the effective value of the amount of magnetic flux in one electrical angular cycle of 0°-360° as above, it becomes possible to increase the torque of the rotating electric machine. Therefore, the condition of $(0<\theta a<2\pi/3)$ contributes to the effect of increasing the torque of the rotating electric machine. According to the above-described B4-th solution, satisfying both the condition of $(0<\theta a \leq 2\pi/S)$ and the condition of $(0<\theta a \leq 2\pi/3)$, it becomes possible to improve the effect of increasing the torque of the rotating electric machine.

According to a B5-th solution, in any one of the B1-th to the B3-th solutions, the following condition is further satisfied: $0<\theta a<2\pi/5$.

When $0<\theta a<2\pi/5$, in an electrical angular range of 0°-180° where the polarity of the fundamental component is a first polarity, the total value of the fifth-order harmonic component of a second polarity different from the first polarity is larger than the total value of the fifth-order harmonic component of the first polarity. As a result, the effective value of the amount of magnetic flux of the magnet section in the electrical angular range of 0°-180° is lowered. Moreover, when $0<\theta a<2\pi/5$, in an electrical angular range of 180°-360° where the polarity of the fundamental component is the second polarity, the total value of the fifth-order harmonic component of the first polarity different from the second polarity is larger than the total value of the fifth-order harmonic component of the second polarity. As a result, the effective value of the amount of magnetic flux of the magnet section in the electrical angular range of 180°-360° is also lowered.

By lowering the effective value of the amount of magnetic flux in one electrical angular cycle of 0°-360° as above, it becomes possible to achieve the field-weakening effect, thereby lowering the counterelectromotive force generated in the armature coil with rotation of the rotor. As a result, it becomes possible to increase the maximum rotational speed of the rotor. Therefore, the condition of $(0<\theta a<2\pi/5)$ contributes to high-speed rotation of the rotating electric machine.

Moreover, according to the B5-th solution, of the condition of $(0<\theta a<2\pi/3)$ under which the third-order harmonic component contributes to the torque-increasing effect, the condition of $(0<\theta a<2\pi/5)$ is satisfied. Consequently, it becomes possible to achieve the effect of increasing the torque of the rotating electric machine as well.

According to the above-described B5-th solution, it becomes possible to achieve high torque of the rotating electric machine while realizing high-speed rotation of the same.

According to a B6-th solution, in the B5-th solution, the following conditions are further satisfied: $0<\theta a \leq 2\pi/S$; and $0<\theta a<2\pi/5$.

According to the B6-th solution, the condition of $(0<\theta a<2\pi/m)$ contributing to the torque-increasing effect is satisfied. Therefore, it becomes possible to further increase the torque of the rotating electric machine.

According to a B7-th solution, in any one of the B1-th to the B3-th solutions, the following conditions are further satisfied: $0<\theta a \leq 2\pi/S$; and $2\pi/5<\theta a<2\pi/3$.

When $2\pi/5<\theta a<4\pi/5$, in an electrical angular range of 0°-180° where the polarity of the fundamental component is a first polarity, the total value of the fifth-order harmonic component of the first polarity is larger than the total value of the fifth-order harmonic component of a second polarity different from the first polarity. As a result, the effective value of the amount of magnetic flux of the magnet section in the electrical angular range of 0°-180° is increased. Moreover, when $2\pi/5<\theta a<4\pi/5$, in an electrical angular range of 180°-360° where the polarity of the fundamental component is the second polarity, the total value of the fifth-order harmonic component of the second polarity is larger than the total value of the fifth-order harmonic component of the first polarity. As a result, the effective value of the amount of magnetic flux of the magnet section in the electrical angular range of 180°-360° is also increased. Therefore, the condition of $(2\pi/5<\theta a<4\pi/5)$ contributes to the effect of increasing the torque of the rotating electric machine.

According to the B7-th solution, the condition of $(2\pi/5<\theta a<2\pi/3)$ is satisfied so as to satisfy both the condition of $(0<\theta a<2\pi/3)$ under which the third-order harmonic component contributes to the torque-increasing effect and the condition of $(2\pi/5<\theta a<4\pi/5)$ under which the fifth-order harmonic component contributes to the torque-increasing effect. Therefore, it becomes possible to further increase the torque of the rotating electric machine.

According to a B8-th solution, in any one of the B1-th to the B3-th solutions, the following conditions are further satisfied: $0<\theta a \leq 2\pi/S$; and $\theta a=2\pi/3$.

When $2\pi/5<\theta a<4\pi/5$, the fifth-order harmonic component contributes to the torque-increasing effect. Therefore, according to the B8-th solution, with the main magnetic pole angle $\theta a$ being equal to $2\pi/3$ in this range and satisfying the condition of $(0<\theta a \leq 2\pi/S)$ contributing to the torque-increasing effect, it becomes possible to further increase the torque of the rotating electric machine.

According to a B9-th solution, in any one of the B1-th to the B3-th solutions, the following condition is further satisfied: $2\pi/3<\theta a<4\pi/5$.

When $2\pi/5<\theta a<4\pi/5$, the fifth-order harmonic component contributes to the torque-increasing effect. On the other hand, when $2\pi/3<\theta a<\pi$, the third-order harmonic component contributes to high-speed rotation. Therefore, according to the B9-th solution, with the main magnetic pole angle $\theta a$ set to satisfy both the conditions, it becomes possible to increase the torque of the rotating electric machine while realizing high-speed rotation of the same.

According to a B10-th solution, in any one of the B1-th to the B3-th solutions, the following conditions are further satisfied: $0<\theta a \leq 2\pi/S$; and $\theta a=2\pi/5$.

When $0<\theta a<2\pi/3$, the third-order harmonic component contributes to the torque-increasing effect. Therefore, according to the B10-th solution, with the main magnetic pole angle $\theta a$ being equal to $2\pi/5$ in this range and satisfying the condition of $(0<\theta a \leq 2\pi/S)$ contributing to the torque-increasing effect, it becomes possible to further increase the torque of the rotating electric machine.

According to a B11-th solution, in any one of the B1-th to the B3-th solutions, the following condition is further satisfied: $\theta a=4\pi/5$.

According to the B11-th solution, the main magnetic pole angle $\theta a$ is set to $4\pi/5$ in the range of $(2\pi/3<\theta a<7c)$ where the third-order harmonic component contributes to high-speed rotation. Therefore, it becomes possible to realize high-speed rotation of the rotating electric machine.

According to a B12-th solution, in any one of the B1-th to the B3-th solutions, the following condition is further satisfied: $4\pi/5<\theta a<\pi$.

According to the B12-th solution, the condition of $(4\pi/5<\theta a<7c)$ is satisfied so as to satisfy both the condition of $(2\pi/3<\theta a<\pi)$ under which the third-order harmonic component contributes to high-speed rotation and the condition of ($4\pi/5<\theta a<\pi$) under which the fifth-order harmonic component contributes to high-speed rotation. Therefore, it becomes possible to more reliably realize high-speed rotation.

According to a B13-th solution, in any one of the B4-th to the B12-th solutions, the armature coil has electrical conductor sections opposed to the field system and arranged at predetermined intervals in the circumferential direction,
- in the armature, there are provided inter-conductor members between the electrical conductor sections in the circumferential direction or no inter-conductor members are provided between the electrical conductor sections in the circumferential direction, and
- the inter-conductor members are formed of a magnetic material satisfying the following relationship or formed of a non-magnetic material, $$Wt \times Bs \leq Wm \times Br$$

where Wt is a circumferential width of the inter-conductor members in each magnetic pole, Bs is a saturation flux density of the inter-conductor members, Wm is a circumferential width of the magnet section in each magnetic pole and Br is a residual flux density of the magnet section.

Conventionally, armatures have been known which have: teeth radially extending from a yoke portion at predetermined intervals; slots each being formed between one circumferentially-adjacent pair of the teeth; and an armature coil received in the slots. In these armatures, most of the magnet magnetic flux of the magnet section flows to the yoke portion via the teeth. Consequently, the waveform of the magnet magnetic flux actually crossing the armature coil may be considerably distorted with respect to the waveform of the magnet magnetic flux of the magnet section for achieving high torque and/or realizing high-speed rotation. As a result, the effect of increasing the torque of the rotating electric machine and/or the effect of realizing high-speed rotation may be lowered.

In contrast, according to the B13-th solution, the armature includes neither teeth nor configuration corresponding to teeth. Consequently, it becomes possible to make the waveform of the magnet magnetic flux actually crossing the armature coil approximate to the waveform of the magnet magnetic flux of the magnet section for achieving high torque and/or realizing high-speed rotation. As a result, it becomes possible to improve the effect of increasing the torque of the rotating electric machine and/or the effect of realizing high-speed rotation; these effects are achieved by the harmonic components of the magnet magnetic flux.

According to a B14-th solution, in the B13-th solution, each of the inter-conductor members is constituted of an arc-shaped portion that radially extends from a core of the armature. The arc-shaped portion has its distal end radially protruding from the electrical conductor sections toward the field system side and arc-shaped so as to be convex on the field system side.

With the arc-shaped portions according to the B14-th solution, it becomes possible to make change in the magnet magnetic flux, which the electrical conductor sections receive from the magnet section, gentle. Consequently, it becomes possible to suppress eddy current loss in the electrical conductor sections.

According to a B15-th solution, in any one of the B1-th to the B14-th solutions, the armature coil has electrical conductor sections opposed to the field system and arranged at predetermined intervals in the circumferential direction, and the radial thickness of the electrical conductor sections is smaller than the circumferential width of the electrical conductor sections per phase in each magnetic pole.

According to the B15-th solution, it becomes possible to suppress eddy current loss in the electrical conductor sections while improving the effect of increasing the torque of the rotating electric machine.

According to a B16-th solution, in any one of the B1-th to the B15-th solutions, the first and second magnets have an intrinsic coercive force higher than or equal to 400 [kA/m] and a residual flux density higher than or equal to 1.0 [T].

According to the B16-th solution, it becomes possible to further improve the effect of increasing the torque of the rotating electric machine.

There are also known rotating electric machines which will be described below. For example, as disclosed in Patent Document 3 (i.e., Japanese Patent Application Publication No. JP 2017-099071 A), there is known a technique of controlling, by a polar anisotropic orientation, the surface magnetic flux waveform of magnets to be a sine waveform; the magnets constitute a field system of a rotating electric machine.

In an electrical angular range corresponding to one magnetic pole, there may be provided only one of the magnets constituting the field system. In this case, a special orientation technique is needed to control the surface magnetic flux waveform of each magnet to be a sine waveform. Moreover, it tends to be difficult to improve the residual flux density and coercive force of the magnets to be higher than those of magnets commercially available today (e.g., neodymium magnets). As a result, it may become impossible to increase the torque of the rotating electric machine.

The present disclosure has been made in view of the above problems. It is, therefore, an object of the present disclosure to provide a rotating electric machine capable of increasing the torque thereof without using, as far as possible, any special orientation technique.

According to a C1-th solution, there is provided a rotating electric machine comprising:
- a field system including a magnet section having a plurality of magnetic poles whose polarities alternate in a circumferential direction; and
- an armature including a multi-phase armature coil, wherein
- either of the field system and the armature is configured as a rotor,
- the magnet section includes first magnets that each correspond to one of the magnetic poles of the magnet section and are arranged at predetermined intervals in the circumferential direction, and second magnets each of which is arranged between one circumferentially-adjacent pair of the first magnets to extend across a q-axis,
- each of the first magnets is oriented to form a magnet magnetic path such that the direction of an easy axis of magnetization is parallel to or near parallel to a d-axis on the d-axis side and perpendicular to or near perpendicular to the q-axis on the q-axis side,
- surfaces of the second magnets facing the first magnets constitute magnetic flux acting surfaces through which magnetic flux flows into or out of the second magnets,
- each of the second magnets is oriented to form a magnet magnetic path that is convex toward an opposite side to the armature,
- $0<\theta a \leq 2\pi/S$ and $2\pi/5<\theta a<2\pi/3$, where S is the number of phases of the armature coil and $\theta a$ is a main magnetic pole angle which is defined, for each of the first magnets, as an angle between a straight line extending through one of two q-axis-side ends of the first magnet in the circumferential direction and an axis of the rotor and a straight line extending through the other of the two q-axis-side ends of the first magnet in the circumferential direction and the axis of the rotor, the armature coil has electrical conductor sections opposed to the field system and arranged at predetermined intervals in the circumferential direction, in the armature, there are provided inter-conductor members between the electrical conductor sections in the circumferential direction or no inter-conductor members are provided between the electrical conductor sections in the circumferential direction, and the inter-conductor members are formed of a magnetic material satisfying the following relationship or formed of a non-magnetic material, $$Wt \times Bs \leq Wm \times Br$$

where Wt is a circumferential width of the inter-conductor members in each magnetic pole, Bs is a saturation flux density of the inter-conductor members, Wm is a circumferential width of the magnet section in each magnetic pole and Br is a residual flux density of the magnet section.

According to the C1-th solution, the magnets provided in an electrical angular range corresponding to one magnetic pole are configured with the first and second magnets. With this configuration, it becomes possible to make, without using any special orientation technique as far as possible, the waveform of the surface magnetic flux of the magnets approximate to a sine wave in comparison with a configuration where only one magnet is provided in an electrical angular range corresponding to one magnetic pole. Consequently, according to the C1-th solution, it becomes possible to increase the torque of the rotating electric machine without using any special orientation technique, as far as possible.

Moreover, according to the C1-th solution, it becomes possible to lengthen the magnet magnetic paths in the magnets in comparison with a configuration where each of the first magnets is oriented to form a magnet magnetic path parallel to the d-axis and each of the second magnets is oriented to form a magnet magnetic path perpendicular to the q-axis. As a result, it becomes possible to increase the amount of magnetic flux of the magnet section, thereby intensifying the magnet magnetic flux on the d-axis. Consequently, it becomes possible to further improve the effect of increasing the torque of the rotating electric machine; it also becomes possible to make it difficult for the magnets to become demagnetized.

Moreover, the C1-th solution is characterized by a method of setting the main magnetic pole angle θa. Hereinafter, the setting method will be described.

If the main magnetic pole angle θa was larger than 2π/S, each of the first magnets would face circumferentially-adjacent armature coil sections of the same phase at the same time. The polarities of magnetic fluxes generated with energization of the armature coil are different between the circumferentially-adjacent armature coil sections of the same phase. Therefore, with each of the first magnets facing the circumferentially-adjacent armature coil sections of the same phase at the same time, part of the magnetic flux of each of the first magnets would be canceled, thereby lowering the amount of the magnetic flux of each of the first magnets. As a result, the effect of increasing the torque of the rotating electric machine would be lowered. To solve this problem, according to the C1-th solution, the main magnetic pole angle θa is set to satisfy the condition of (0<θa≤2π/S), thereby having the waveform of the surface magnetic flux of the magnet section in an electrical angular range corresponding to one magnetic pole concentrated within an electrical angular range of 2π/S into a convex shape. Consequently, it becomes possible to suppress decrease in the amount of magnetic flux of the magnet section. Therefore, the condition of (0<θa≤2π/S) contributes to the effect of increasing the torque of the rotating electric machine.

On the other hand, the waveform of the surface magnetic flux of the magnet section includes a fundamental component (or first-order component) and harmonic components. Moreover, the main harmonic components are a third-order harmonic component and a fifth-order harmonic component. When 0<θa<2π/3, in an electrical angular range of 0°-180° where the polarity of the fundamental component is a first polarity (e.g., N), the total value of the third-order harmonic component of the first polarity is larger than the total value of the third-order harmonic component of a second polarity (e.g., S) different from the first polarity. As a result, the effective value of the amount of magnetic flux of the magnet section in the electrical angular range of 0°-180° is increased. Moreover, when 0<θa<2π/3, in an electrical angular range of 180°-360° where the polarity of the fundamental component is the second polarity, the total value of the third-order harmonic component of the second polarity is larger than the total value of the third-order harmonic component of the first polarity. As a result, the effective value of the amount of magnetic flux of the magnet section in the electrical angular range of 180°-360° is also increased.

By increasing the effective value of the amount of magnetic flux in one electrical angular cycle of 0°-360° as above, it becomes possible to increase the torque of the rotating electric machine. Therefore, the condition of (0<θa<2π/3) contributes to the effect of increasing the torque of the rotating electric machine.

On the other hand, when 2π/5<θa<4π/5, in an electrical angular range of 0°-180° where the polarity of the fundamental component is the first polarity, the total value of the fifth-order harmonic component of the first polarity is larger than the total value of the fifth-order harmonic component of the second polarity different from the first polarity. As a result, the effective value of the amount of magnetic flux of the magnet section in the electrical angular range of 0°-180° is increased. Moreover, when 2π/5<θa<4π/5, in an electrical angular range of 180°-360° where the polarity of the fundamental component is the second polarity, the total value of the fifth-order harmonic component of the second polarity is larger than the total value of the fifth-order harmonic component of the first polarity. As a result, the effective value of the amount of magnetic flux of the magnet section in the electrical angular range of 180°-360° is also increased. Therefore, the condition of (2π/5<θa<4π/5) contributes to the effect of increasing the torque of the rotating electric machine.

The C1-th solution satisfies all of the condition of (0<θa<2π/3) under which the third-order harmonic component contributes to the torque-increasing effect, the condition of (2π/5<θa<4π/5) under which the fifth-order harmonic component contributes to the torque-increasing effect and the condition of (0<θa≤2π/S) contributing to the torque-increasing effect. That is, in the C1-th solution, it is specified that: 2π/5<θa<2π/3; and 0<θa≤2π/S. Therefore, according to the C1-th solution, it becomes possible to further increase the torque of the rotating electric machine.

Furthermore, according to the C1-th solution, the armature includes neither teeth nor configuration corresponding to teeth. Conventionally, armatures have been known which have: teeth radially extending from a yoke portion at predetermined intervals; slots each being formed between one circumferentially-adjacent pair of the teeth; and an armature coil received in the slots. In these armatures, most of the magnet magnetic flux of the magnet section flows to the yoke portion via the teeth. Consequently, the waveform of the magnet magnetic flux actually crossing the armature coil may be considerably distorted with respect to the waveform of the magnet magnetic flux of the magnet section for achieving high torque. As a result, the effect of increasing the torque of the rotating electric machine may be lowered.

In this regard, according to the C1-th solution, the armature includes neither teeth nor configuration corresponding to teeth. Consequently, it becomes possible to make the waveform of the magnet magnetic flux actually crossing the armature coil approximate to the waveform of the magnet magnetic flux of the magnet section for achieving high torque. As a result, it becomes possible to improve the torque-increasing effect achieved by the harmonic components of the magnet magnetic flux.

According to a C2-th solution, there is provided a rotating electric machine comprising:

a field system including a magnet section having a plurality of magnetic poles whose polarities alternate in a circumferential direction; and an armature including a multi-phase armature coil, wherein either of the field system and the armature is configured as a rotor, the magnet section includes first magnets that each correspond to one of the magnetic poles of the magnet section and are arranged at predetermined intervals in the circumferential direction, and second magnets each of which is arranged between one circumferentially-adjacent pair of the first magnets to extend across a q-axis, each of the first magnets is oriented to form a magnet magnetic path parallel to a d-axis, each of the second magnets is oriented to form a magnet magnetic path perpendicular to the q-axis, $0<\theta a \leq 2\pi/S$ and $2\pi/5 < \theta a < 2\pi/3$, where S is the number of phases of the armature coil and $\theta a$ is a main magnetic pole angle which is defined, for each of the first magnets, as an angle between a straight line extending through one of two q-axis-side ends of the first magnet in the circumferential direction and an axis of the rotor and a straight line extending through the other of the two q-axis-side ends of the first magnet in the circumferential direction and the axis of the rotor, the armature coil has electrical conductor sections opposed to the field system and arranged at predetermined intervals in the circumferential direction, in the armature, there are provided inter-conductor members between the electrical conductor sections in the circumferential direction or no inter-conductor members are provided between the electrical conductor sections in the circumferential direction, and the inter-conductor members are formed of a magnetic material satisfying the following relationship or formed of a non-magnetic material, $$Wt \times Bs \leq Wm \times Br$$

where Wt is a circumferential width of the inter-conductor members in each magnetic pole, Bs is a saturation flux density of the inter-conductor members, Wm is a circumferential width of the magnet section in each magnetic pole and Br is a residual flux density of the magnet section.

The C2-th solution differs from the C1-th solution only in the configuration of the magnet section. According to the C2-th solution, it is possible to achieve advantageous effects similar to the advantageous effects of the C1-th solution.

According to a C3-th solution, in the C1-th or the C2-th solution, the radial thickness of the electrical conductor sections is smaller than the circumferential width of the electrical conductor sections per phase in each magnetic pole.

According to the C3-th solution, it becomes possible to suppress eddy current loss in the electrical conductor sections while improving the effect of increasing the torque of the rotating electric machine.

According to a C4-th solution, in any one of the C1-th to the C3-th solutions, the first and second magnets have an intrinsic coercive force higher than or equal to 400 [kA/m] and a residual flux density higher than or equal to 1.0 [T].

According to the C4-th solution, it becomes possible to further improve the effect of increasing the torque of the rotating electric machine.

There are also known rotating electric machines which will be described below. For example, as disclosed in Patent Document 3 (i.e., Japanese Patent Application Publication No. JP 2017-099071 A), there is known a technique of controlling, by a polar anisotropic orientation, the surface magnetic flux waveform of magnets to be a sine waveform; the magnets constitute a field system of a rotating electric machine.

In an electrical angular range corresponding to one magnetic pole, there may be provided only one of the magnets constituting the field system. In this case, a special orientation technique is needed to control the surface magnetic flux waveform of each magnet to be a sine waveform. Moreover, it tends to be difficult to improve the residual flux density and coercive force of the magnets to be higher than those of magnets commercially available today (e.g., neodymium magnets). As a result, it may become impossible to increase the torque of the rotating electric machine even by controlling an electric power converter that is electrically connected with an armature coil for energization of the armature coil; the armature coil constitutes an armature of the rotating electric machine.

The present disclosure has been made in view of the above problems. It is, therefore, an object of the present disclosure to provide a rotating electric machine capable of increasing the torque thereof without using, as far as possible, any special orientation technique.

According to a D1-th solution, there is provided a rotating electric machine comprising:

a field system including a magnet section having a plurality of magnetic poles whose polarities alternate in a circumferential direction;

an armature including a multi-phase armature coil;

an electric power converter electrically connected with the armature coil; and a controller configured to control the electric power converter for energization of the armature coil, wherein either of the field system and the armature is configured as a rotor, the magnet section includes first magnets that each correspond to one of the magnetic poles of the magnet section and are arranged at predetermined intervals in the circumferential direction, and second magnets each of which is arranged between one circumferentially-adjacent pair of the first magnets to extend across a q-axis, each of the first magnets is oriented to form a magnet magnetic path such that the direction of an easy axis of magnetization is parallel to or near parallel to a d-axis on the d-axis side and perpendicular to or near perpendicular to the q-axis on the q-axis side, surfaces of the second magnets facing the first magnets constitute magnetic flux acting surfaces through which magnetic flux flows into or out of the second magnets, and each of the second magnets is oriented to form a magnet magnetic path that is convex toward an opposite side to the armature.

According to the D1-th solution, the magnets provided in an electrical angular range corresponding to one magnetic pole are configured with the first and second magnets. With this configuration, it becomes possible to make, without using any special orientation technique as far as possible, the waveform of the surface magnetic flux of the magnets approximate to a sine wave in comparison with a configuration where only one magnet is provided in an electrical angular range corresponding to one magnetic pole. Consequently, according to the D1-th solution, it becomes possible to increase the torque of the rotating electric machine without using any special orientation technique, as far as possible.

Moreover, according to the D1-th solution, it becomes possible to lengthen the magnet magnetic paths in the magnets in comparison with a configuration where each of the first magnets is oriented to form a magnet magnetic path parallel to the d-axis and each of the second magnets is oriented to form a magnet magnetic path perpendicular to the q-axis. As a result, it becomes possible to increase the amount of magnetic flux of the magnet section, thereby intensifying the magnet magnetic flux on the d-axis. Consequently, it becomes possible to further improve the effect of increasing the torque of the rotating electric machine; it also becomes possible to make it difficult for the magnets to become demagnetized.

According to a D2-th solution, there is provided a rotating electric machine comprising:

a field system including a magnet section having a plurality of magnetic poles whose polarities alternate in a circumferential direction;

an armature including a multi-phase armature coil;

an electric power converter electrically connected with the armature coil; and a controller configured to control the electric power converter for energization of the armature coil, wherein either of the field system and the armature is configured as a rotor, the magnet section includes first magnets that each correspond to one of the magnetic poles of the magnet section and are arranged at predetermined intervals in the circumferential direction, and second magnets each of which is arranged between one circumferentially-adjacent pair of the first magnets to extend across a q-axis, each of the first magnets is oriented to form a magnet magnetic path parallel to a d-axis, and each of the second magnets is oriented to form a magnet magnetic path perpendicular to the q-axis.

According to the D2-th solution, the magnets provided in an electrical angular range corresponding to one magnetic pole are configured with the first and second magnets. With this configuration, it becomes possible to make, with a simpler orientation technique, the waveform of the surface magnetic flux of the magnets approximate to a sine wave in comparison with a configuration where only one magnet is provided in an electrical angular range corresponding to one magnetic pole. Consequently, according to the D2-th solution, it becomes possible to increase the torque of the rotating electric machine without using any special orientation technique, as far as possible.

According to a D3-th solution, in the D1-th or the D2-th solution, the following conditions are further satisfied: $0<\theta a \leq 2\pi/S$; and $0<\theta a \leq 2\pi/3$, where S is the number of phases of the armature coil and $\theta a$ is a main magnetic pole angle which is defined, for each of the first magnets, as an angle between a straight line extending through one of two q-axis-side ends of the first magnet in the circumferential direction and an axis of the rotor and a straight line extending through the other of the two q-axis-side ends of the first magnet in the circumferential direction and the axis of the rotor.

If the main magnetic pole angle $\theta a$ was larger than $2\pi/S$, each of the first magnets would face circumferentially-adjacent armature coil sections of the same phase at the same time. The polarities of magnetic fluxes generated with energization of the armature coil are different between the circumferentially-adjacent armature coil sections of the same phase. Therefore, with each of the first magnets facing the circumferentially-adjacent armature coil sections of the same phase at the same time, part of the magnetic flux of each of the first magnets would be canceled, thereby lowering the amount of the magnetic flux of each of the first magnets. As a result, the effect of increasing the torque of the rotating electric machine would be lowered. To solve this problem, according to the D3-th solution, the main magnetic pole angle $\theta a$ is set to satisfy the condition of $(0<\theta a \leq 2\pi/S)$, thereby having the waveform of the surface magnetic flux of the magnet section in an electrical angular range corresponding to one magnetic pole concentrated within an electrical angular range of $2\pi/S$ into a convex shape. Consequently, it becomes possible to suppress decrease in the amount of magnetic flux of the magnet section. Therefore, the condition of $(0<\theta a \leq 2\pi/S)$ contributes to the effect of increasing the torque of the rotating electric machine.

On the other hand, the waveform of the surface magnetic flux of the magnet section includes a fundamental component (or first-order component) and harmonic components. Moreover, the main harmonic components are a third-order harmonic component and a fifth-order harmonic component. When $0<\theta a<2\pi/3$, in an electrical angular range of 0°-180° where the polarity of the fundamental component is a first polarity (e.g., N), the total value of the third-order harmonic component of the first polarity is larger than the total value of the third-order harmonic component of a second polarity (e.g., S) different from the first polarity. As a result, the effective value of the amount of magnetic flux of the magnet section in the electrical angular range of 0°-180° is increased. Moreover, when $0<\theta a \leq 2\pi/3$, in an electrical angular range of 180°-360° where the polarity of the fundamental component is the second polarity, the total value of the third-order harmonic component of the second polarity is larger than the total value of the third-order harmonic component of the first polarity. As a result, the effective value of the amount of magnetic flux of the magnet section in the electrical angular range of 180°-360° is also increased. By increasing the effective value of the amount of magnetic flux in one electrical angular cycle of 0°-360° as above, it becomes possible to increase the torque of the rotating electric machine. Therefore, the condition of $(0<\theta a<2\pi/3)$ contributes to the effect of increasing the torque of the rotating electric machine.

According to the above-described D3-th solution, satisfying both the condition of $(0<\theta a\leq 2\pi/S)$ and the condition of $(0<\theta a\leq 2\pi/3)$, it becomes possible to improve the effect of increasing the torque of the rotating electric machine.

According to a D4-th solution, in the D1-th or the D2-th solution, the following condition is further satisfied: $0<\theta a<2\pi/5$.

When $0<\theta a<2\pi/5$, in an electrical angular range of 0°-180° where the polarity of the fundamental component is a first polarity, the total value of the fifth-order harmonic component of a second polarity different from the first polarity is larger than the total value of the fifth-order harmonic component of the first polarity. As a result, the effective value of the amount of magnetic flux of the magnet section in the electrical angular range of 0°-180° is lowered. Moreover, when $0<\theta a<2\pi/5$, in an electrical angular range of 180°-360° where the polarity of the fundamental component is the second polarity, the total value of the fifth-order harmonic component of the first polarity different from the second polarity is larger than the total value of the fifth-order harmonic component of the second polarity. As a result, the effective value of the amount of magnetic flux of the magnet section in the electrical angular range of 180°-360° is also lowered.

By lowering the effective value of the amount of magnetic flux in one electrical angular cycle of 0°-360° as above, it becomes possible to achieve the field-weakening effect, thereby lowering the counterelectromotive force generated in the armature coil with rotation of the rotor. As a result, it becomes possible to increase the maximum rotational speed of the rotor. Therefore, the condition of $(0<\theta a<2\pi/5)$ contributes to high-speed rotation of the rotating electric machine.

Moreover, according to the D4-th solution, of the condition of $(0<\theta a<2\pi/3)$ under which the third-order harmonic component contributes to the torque-increasing effect, the condition of $(0<\theta a<2\pi/5)$ is satisfied. Consequently, it becomes possible to achieve the effect of increasing the torque of the rotating electric machine as well.

According to the above-described D4-th solution, it becomes possible to achieve high torque of the rotating electric machine while realizing high-speed rotation of the same.

According to a D5-th solution, in the D4-th solution, the following conditions are further satisfied: $0<\theta a\leq 2\pi/S$; and $0<\theta a<2\pi/5$.

According to the D5-th solution, the condition of $(0<\theta a<2\pi/m)$ contributing to the torque-increasing effect is satisfied. Therefore, it becomes possible to further increase the torque of the rotating electric machine.

According to a D6-th solution, in the D1-th solution, the following conditions are further satisfied: $0<\theta a\leq 2\pi/S$; and $2\pi/5<\theta a<2\pi/3$.

When $2\pi/5<\theta a<4\pi/5$, in an electrical angular range of 0°-180° where the polarity of the fundamental component is a first polarity, the total value of the fifth-order harmonic component of the first polarity is larger than the total value of the fifth-order harmonic component of a second polarity different from the first polarity. As a result, the effective value of the amount of magnetic flux of the magnet section in the electrical angular range of 0°-180° is increased. Moreover, when $2\pi/5<\theta a<4\pi/5$, in an electrical angular range of 180°-360° where the polarity of the fundamental component is the second polarity, the total value of the fifth-order harmonic component of the second polarity is larger than the total value of the fifth-order harmonic component of the first polarity. As a result, the effective value of the amount of magnetic flux of the magnet section in the electrical angular range of 180°-360° is also increased. Therefore, the condition of $(2\pi/5<\theta a<4\pi/5)$ contributes to the effect of increasing the torque of the rotating electric machine.

According to the D6-th solution, the condition of $(2\pi/5<\theta a<2\pi/3)$ is satisfied so as to satisfy both the condition of $(0<\theta a<2\pi/3)$ under which the third-order harmonic component contributes to the torque-increasing effect and the condition of $(2\pi/5<\theta a<4\pi/5)$ under which the fifth-order harmonic component contributes to the torque-increasing effect. Therefore, it becomes possible to further increase the torque of the rotating electric machine.

According to a D7-th solution, in the D1-th solution, the following conditions are further satisfied: $0<\theta a\leq 2\pi/S$; and $\theta a=2\pi/3$.

When $2\pi/5<\theta a<4\pi/5$, the fifth-order harmonic component contributes to the torque-increasing effect. Therefore, according to the D7-th solution, with the main magnetic pole angle θa being equal to $2\pi/3$ in this range and satisfying the condition of $(0<\theta a\leq 2\pi/S)$ contributing to the torque-increasing effect, it becomes possible to further increase the torque of the rotating electric machine.

According to a D8-th solution, in the D1-th solution, the following condition is further satisfied: $2\pi/3<\theta a<4\pi/5$.

When $2\pi/5<\theta a<4\pi/5$, the fifth-order harmonic component contributes to the torque-increasing effect. On the other hand, when $2\pi/3<\theta a<\pi$, the third-order harmonic component contributes to high-speed rotation. Therefore, according to the D8-th solution, with the main magnetic pole angle θa set to satisfy both the conditions, it becomes possible to increase the torque of the rotating electric machine while realizing high-speed rotation of the same.

According to a D9-th solution, in the D1-th solution, the following conditions are further satisfied: $0<\theta a\leq 2\pi/S$; and $\theta a=2\pi/5$.

When $0<\theta a<2\pi/3$, the third-order harmonic component contributes to the torque-increasing effect. Therefore, according to the D9-th solution, with the main magnetic pole angle θa being equal to $2\pi/5$ in this range and satisfying the condition of $(0<\theta a\leq 2\pi/S)$ contributing to the torque-increasing effect, it becomes possible to further increase the torque of the rotating electric machine.

According to a D10-th solution, in the D1-th solution, the following condition is further satisfied: $\theta a=4\pi/5$.

According to the D10-th solution, the main magnetic pole angle θa is set to $4\pi/5$ in the range of $(2\pi/3<\theta a<\pi)$ where the third-order harmonic component contributes to high-speed rotation. Therefore, it becomes possible to realize high-speed rotation of the rotating electric machine.

According to a D11-th solution, in the D1-th solution, the following condition is further satisfied: $4\pi/5<\theta a<\pi$.

According to the D11-th solution, the condition of $(4\pi/5<\theta a<\pi)$ is satisfied so as to satisfy both the condition of $(2\pi/3<\theta a<\pi)$ under which the third-order harmonic component contributes to high-speed rotation and the condition of $(4\pi/5<\theta a<\pi)$ under which the fifth-order harmonic component contributes to high-speed rotation. Therefore, it becomes possible to more reliably realize high-speed rotation.

According to a D12-th solution, in any one of the D3-th to the D11-th solutions, the number of phases of the armature coil is equal to 3. The controller is configured to control the electric power converter for energization of the armature coil by 120° rectangular-wave energization control.

The rectangular waves whose electrical angular ranges are equal to 120° include no third-order harmonic. Therefore, the third-order harmonic component included in the magnetic flux generated upon energization of the armature coil and the third-order harmonic component included in the magnet magnetic flux of the magnet section do not affect each other. As a result, it becomes possible to suppress hindrance to high torque and/or high-speed rotation of the rotating electric machine.

According to a D13-th solution, in any one of the D3-th to the D11-th solutions, the controller is configured to control the electric power converter to supply the armature coil with an electric current which is obtained by superimposing harmonic current that is in phase with a harmonic component included in magnet magnetic flux of the magnet section on fundamental current that is in phase with a fundamental component included in the magnet magnetic flux.

According to the D13-th solution, it becomes possible to supply the armature coil with the harmonic current that is in phase with the harmonic component of the magnet magnetic flux for achieving high torque and/or realizing high-speed rotation of the rotating electric machine. Consequently, it becomes possible to further improve, with the harmonic current, the effects of increasing the torque and realizing high-speed rotation of the rotating electric machine which can be achieved by the magnet magnetic flux.

According to a D14-th solution, in any one of the D3-th to the D13-th solutions, the armature coil has electrical conductor sections opposed to the field system and arranged at predetermined intervals in the circumferential direction,
in the armature, there are provided inter-conductor members between the electrical conductor sections in the circumferential direction or no inter-conductor members are provided between the electrical conductor sections in the circumferential direction, and
the inter-conductor members are formed of a magnetic material satisfying the following relationship or formed of a non-magnetic material, $$Wt \times Bs \leq Wm \times Br$$

where Wt is a circumferential width of the inter-conductor members in each magnetic pole, Bs is a saturation flux density of the inter-conductor members, Wm is a circumferential width of the magnet section in each magnetic pole and Br is a residual flux density of the magnet section.

Conventionally, armatures have been known which have: teeth radially extending from a yoke portion at predetermined intervals; slots each being formed between one circumferentially-adjacent pair of the teeth; and an armature coil received in the slots. In these armatures, most of the magnet magnetic flux of the magnet section flows to the yoke portion via the teeth. Consequently, the waveform of the magnet magnetic flux actually crossing the armature coil may be considerably distorted with respect to the waveform of the magnet magnetic flux of the magnet section for achieving high torque and/or realizing high-speed rotation. As a result, the effect of increasing the torque of the rotating electric machine and/or the effect of realizing high-speed rotation may be lowered.

In contrast, according to the D14-th solution, the armature includes neither teeth nor configuration corresponding to teeth. Consequently, it becomes possible to make the waveform of the magnet magnetic flux actually crossing the armature coil approximate to the waveform of the magnet magnetic flux of the magnet section for achieving high torque and/or realizing high-speed rotation. As a result, it becomes possible to improve the effect of increasing the torque of the rotating electric machine and/or the effect of realizing high-speed rotation; these effects are achieved by the harmonic components of the magnet magnetic flux.

According to a D15-th solution, in any one of the D1-th to the D14-th solutions, the armature coil has electrical conductor sections opposed to the field system and arranged at predetermined intervals in the circumferential direction. The radial thickness of the electrical conductor sections is smaller than the circumferential width of the electrical conductor sections per phase in each magnetic pole.

According to the D15-th solution, it becomes possible to suppress eddy current loss in the electrical conductor sections while improving the effect of increasing the torque of the rotating electric machine.

According to a D16-th solution, in any one of the D1-th to the D15-th solutions, the first and second magnets have an intrinsic coercive force higher than or equal to 400 [kA/m] and a residual flux density higher than or equal to 1.0 [T].

According to the D16-th solution, it becomes possible to further improve the effect of increasing the torque of the rotating electric machine.

BRIEF DESCRIPTION OF THE DRAWINGS

The above-described objects, other objects, features and beneficial advantages according to the present disclosure will become more apparent from the following detailed description with reference to the accompanying drawings.

In the accompanying drawings:

FIGS. 41(a)-14(c) are diagrams illustrating the manners of connecting electrical conductors forming an electrical conductor group in an eleventh modification;

FIG. 42 is a diagram illustrating a configuration of radially stacking four pairs of electrical conductors in the eleventh modification;

FIGS. 61(a)-61(l) are diagrams illustrating the correspondence between the main magnetic pole angle θa and the first to the ninth configurations;

FIGS. 82(a)-82(l) are diagrams illustrating the correspondence between the main magnetic pole angle θa and the first to the ninth configurations;

DESCRIPTION OF EMBODIMENTS

Figure 1:
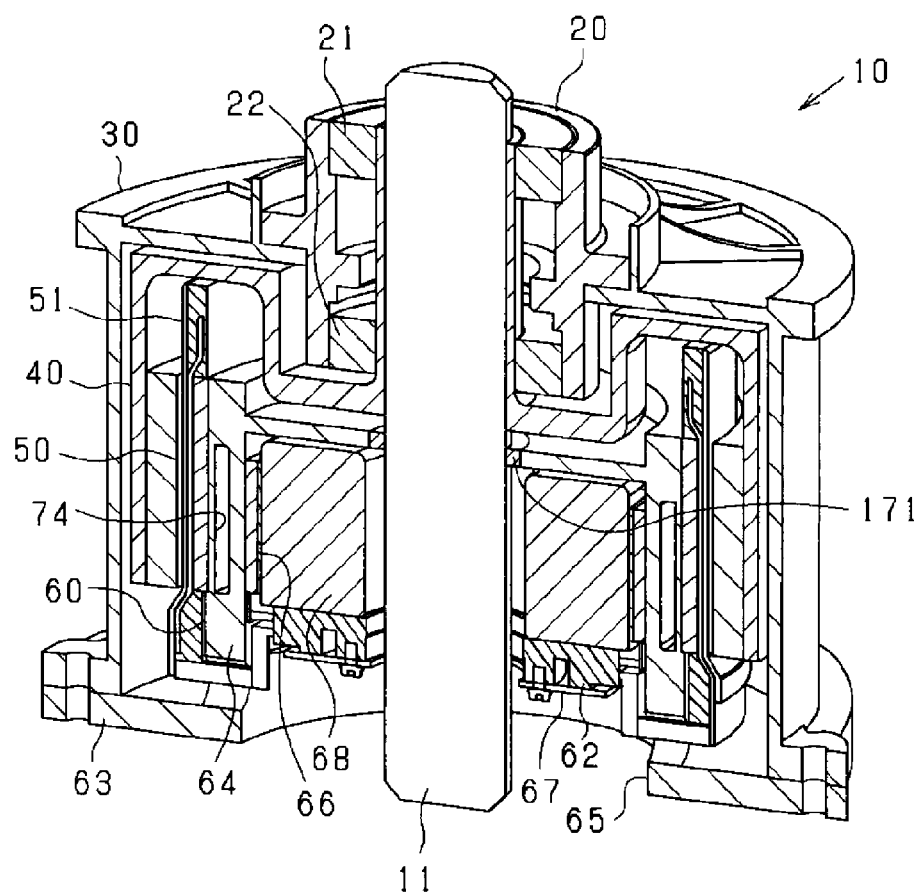
FIG. 1 is a perspective longitudinal cross-sectional view of a rotating electric machine.

Embodiments will be described with reference to the drawings. In the embodiments, parts functionally and/or structurally corresponding to each other and/or parts associated with each other will be designated by the same reference signs or by reference signs which are different in the hundreds place from each other. The corresponding parts and/or the associated parts may refer to the explanation of the other embodiments.

Rotating electric machines in the embodiments are configured to be used, for example, as vehicular power sources. However, the rotating electric machines may also be widely used for other applications, such as industrial, automotive, household, office automation and amusement applications. In addition, in the following embodiments, identical or equivalent parts will be designated by the same reference signs in the drawings, and explanation thereof will not be repeated.

First Embodiment

Figure 2:
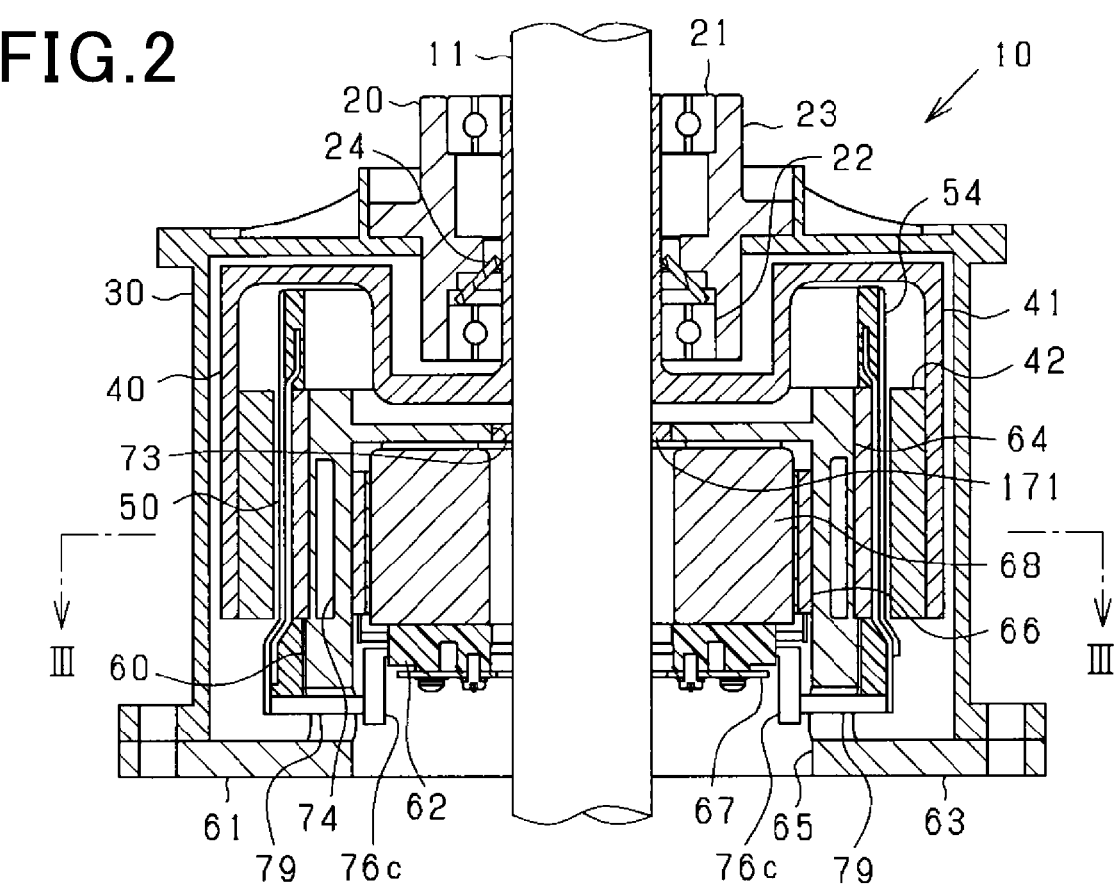
FIG. 2 is a longitudinal cross-sectional view of the rotating electric machine.
Figure 3:
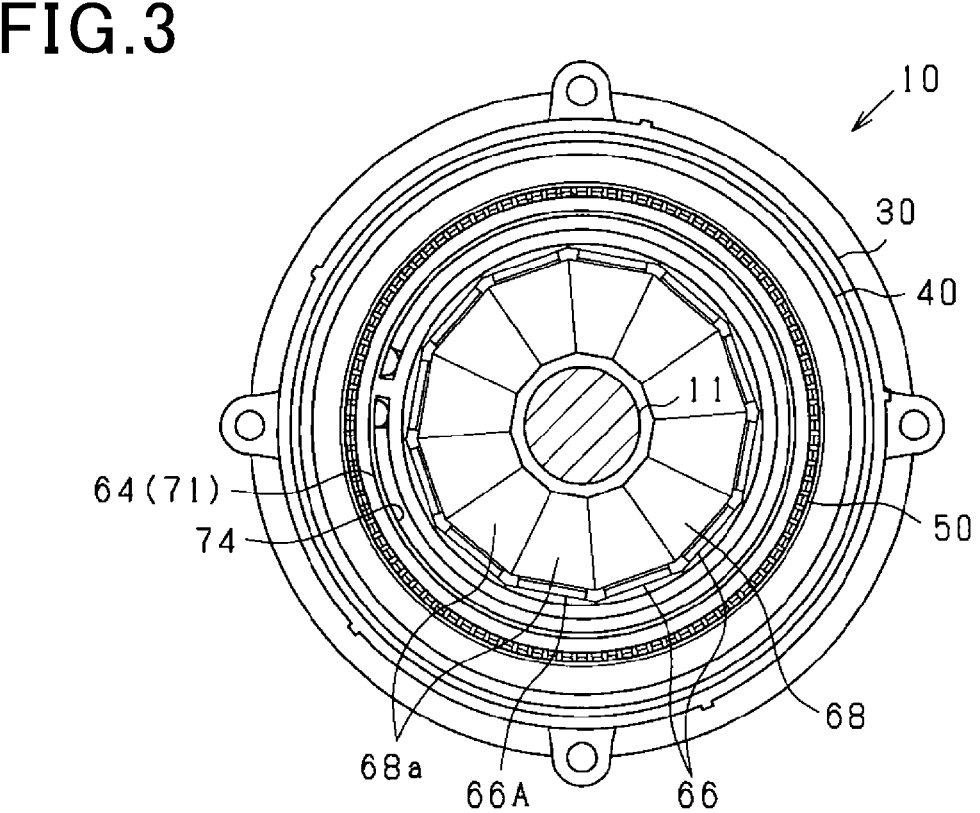
FIG. 3 is a cross-sectional view taken along the line in FIG. 2.
Figure 4:
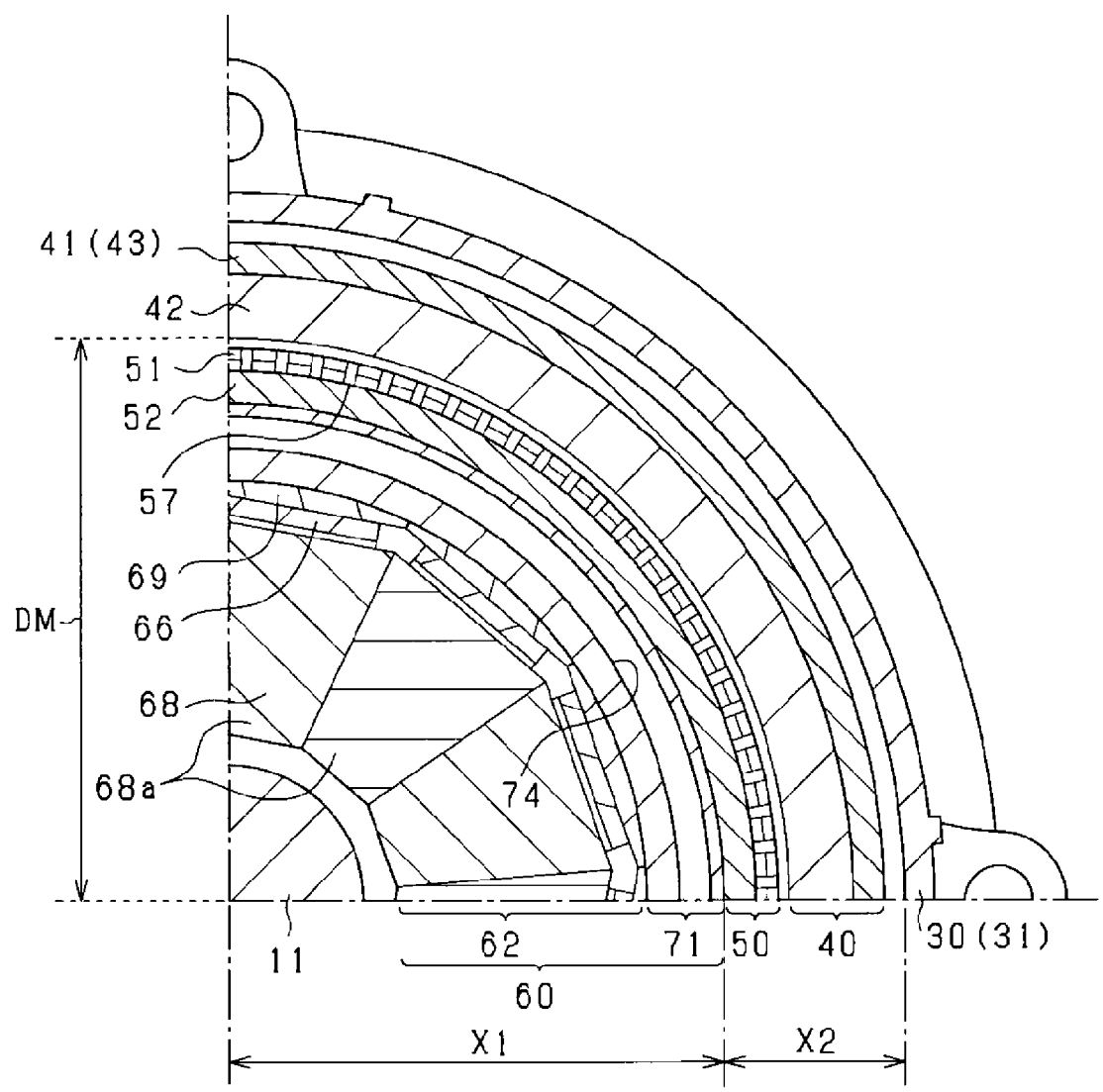
FIG. 4 is an enlarged cross-sectional view of part of FIG. 3.
Figure 5:
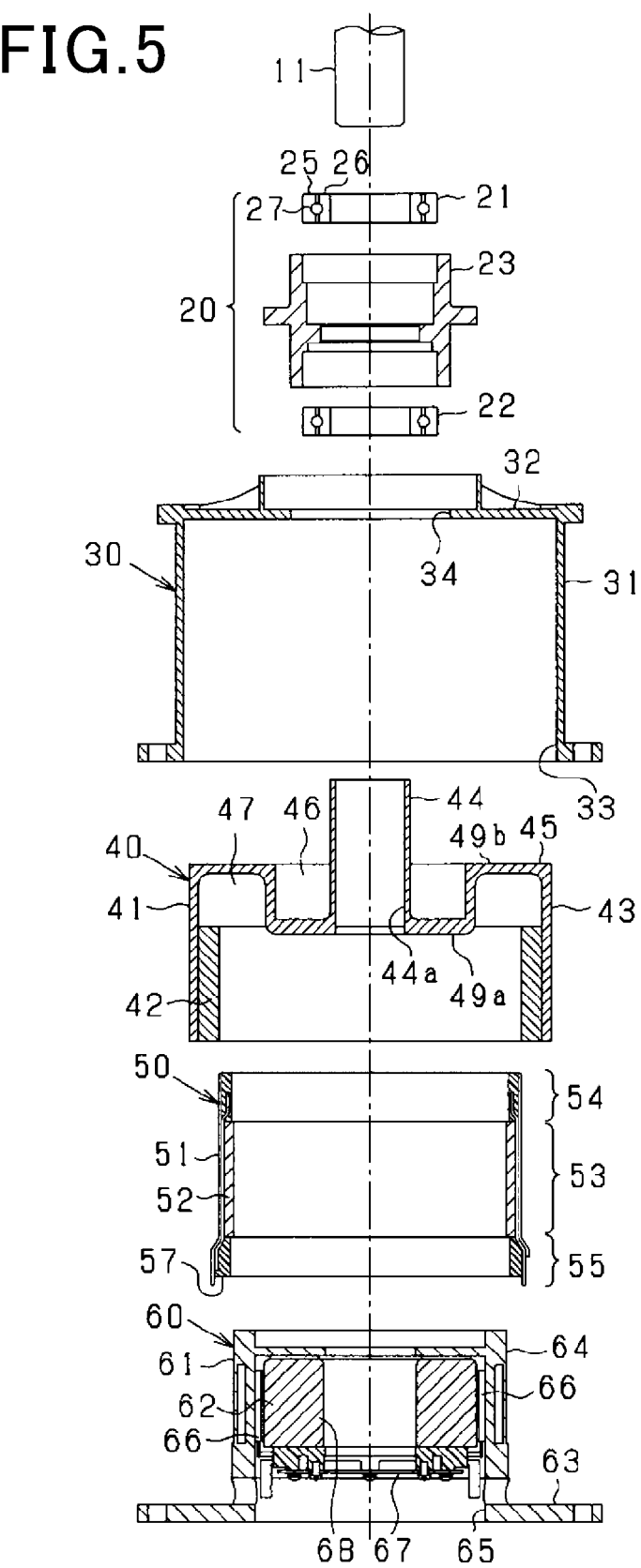
FIG. 5 is an exploded view of the rotating electric machine.

The rotating electric machine 10 according to the present embodiment is a synchronous multi-phase AC motor with an outer rotor structure (i.e., an outer rotating structure). The outline of the rotating electric machine 10 is illustrated in FIGS. 1 to 5. FIG. 1 is a perspective longitudinal cross-sectional view of the rotating electric machine 10. FIG. 2 is a longitudinal cross-sectional view along a rotating shaft 11 of the rotating electric machine 10. FIG. 3 is a traverse cross-sectional view (i.e., cross-sectional view taken along the line in FIG. 2) of the rotating electric machine 10 perpendicular to the rotating shaft 11. FIG. 4 is an enlarged cross-sectional view of part of FIG. 3. FIG. 5 is an exploded view of the rotating electric machine 10. In addition, it should be noted that in FIG. 3, for the sake of simplicity, hatching lines designating cross sections of components of the rotating electric machine 10 except for the rotating shaft 11 are omitted. In the following description, the direction in which the rotating shaft 11 extends will be referred to as the axial direction; the directions extending radially from the center of the rotating shaft 11 will be referred to as radial directions; and the direction extending along a circle centering on the rotating shaft 11 will be referred to as the circumferential direction.

The rotating electric machine 10 includes a bearing unit 20, a housing 30, a rotor 40, a stator 50 and an inverter unit 60. These members are each arranged coaxially with the rotating shaft 11 and assembled in a given sequence in the axial direction to together constitute the rotating electric machine 10. The rotating electric machine 10 of the present embodiment is configured to have the rotor 40 functioning as a "field system" and the stator 50 functioning as an "armature". That is, the rotating electric machine 10 is embodied as a rotating-field type rotating electric machine.

The bearing unit 20 includes two bearings 21 and 22 arranged away from each other in the axial direction and a holding member 23 that holds both the bearings 21 and 22. The bearings 21 and 22 are implemented by, for example, radial ball bearings each of which includes an outer ring 25, an inner ring 26 and a plurality of balls 27 disposed between the outer ring 25 and the inner ring 26. The holding member 23 is cylindrical-shaped and has both the bearings 21 and 22 assembled thereto on the radially inner side thereof. Moreover, on the radially inner side of the bearings 21 and 22, there are rotatably supported the rotating shaft 11 and the rotor 40. That is, the bearings 21 and 22 constitute a pair of bearings rotatably supporting the rotating shaft 11.

In each of the bearings 21 and 22, the balls 27 are retained by a not-shown retainer, thereby keeping the pitch between each pair of the balls 27. Moreover, each of the bearings 21 and 22 has sealing members on the upper and lower sides of the retainer in the axial direction, and has non-electrically conductive grease (i.e., non-electrically conductive urea-based grease) filled inside the sealing members. In addition, the position of the inner ring 26 is mechanically held by a spacer, and constant-pressure preloading is performed from the inner side to make it convex in the vertical direction.

The housing 30 has a circumferential wall 31 that is cylindrical in shape. The circumferential wall 31 has a first end and a second end that are opposite to each other in the axial direction. Moreover, the circumferential wall 31 has an end surface 32 at the first end and an opening 33 at the second end. The opening 33 is formed to open over the entire second end of the circumferential wall 31. The end surface 32 has a circular hole 34 formed at the center thereof. The bearing unit 20 is inserted in the hole 34 and fixed by fixtures such as screws or rivets. Inside the housing 30, i.e., in an internal space defined by the circumferential wall 31 and the end surface 32, there are received the rotor 40 and the stator 50 both of which are hollow cylindrical in shape. In the present embodiment, the rotating electric machine 10 is of an outer rotor type such that the stator 50 is arranged radially inside the cylindrical rotor 40 in the housing 30. Moreover, the rotor 40 is supported in a cantilever fashion by the rotating shaft 11 on the end surface 32 side in the axial direction.

The rotor 40 includes a hollow cylindrical magnet holder 41 and an annular magnet unit 42 provided radially inside the magnet holder 41. The magnet holder 41 is substantially cup-shaped and functions as a magnet holding member. The magnet holder 41 has a cylindrical portion 43, an attaching portion (or attachment) 44 that is also cylindrical in shape and smaller in diameter than the cylindrical portion 43, and an intermediate portion 45 connecting the cylindrical portion 43 and the attaching portion 44. On an inner circumferential surface of the cylindrical portion 43, there is mounted the magnet unit 42.

The magnet holder 41 is formed of a material having sufficient mechanical strength, such as a cold-rolled steel sheet (e.g., SPCC), forged steel or Carbon Fiber-Reinforced Plastic (CFRP).

In a through-hole 44a of the attaching portion 44, there is inserted the rotating shaft 11. The attaching portion 44 is fixed to a portion of the rotating shaft 11 which is located inside the through-hole 44a. That is, the magnet holder 41 is fixed to the rotating shaft 11 via the attaching portion 44. In addition, the attaching portion 44 may be fixed to the rotating shaft 11 by spline coupling using protrusions and recesses, key coupling, welding or crimping. Consequently, the rotor 40 rotates together with the rotating shaft 11.

To a radially outer periphery of the attaching portion 44, there are assembled both the bearings 21 and 22 of the bearing unit 20. As described above, the bearing unit 20 is fixed to the end surface 32 of the housing 30; therefore, the rotating shaft 11 and the rotor 40 are rotatably supported by the housing 30. Consequently, the rotor 40 is rotatable in the housing 30.

The attaching portion 44 is provided at only one of two opposite axial ends of the rotor 40. Therefore, the rotor 40 is supported by the rotating shaft 11 in a cantilever fashion. Moreover, the attaching portion 44 of the rotor 40 is rotatably supported by the bearings 21 and 22 of the bearing unit 20 at two different axial positions. That is, the rotor 40 is rotatably supported, at one of two opposite axial ends of the magnet holder 41, by the two bearings 21 and 22 that are located away from each other in the axial direction. Therefore, though the rotor 40 is supported by the rotating shaft 11 in the cantilever fashion, it is still possible to realize stable rotation of the rotor 40. In addition, the rotor 40 is supported by the bearings 21 and 22 at positions offset from an axially center position of the rotor 40 to one side.

In the bearing unit 20, the bearing 22 which is located closer to the center of the rotor 40 (i.e., on the lower side in the figures) and the bearing 21 which is located further from the center of the rotor 40 (i.e., on the upper side in the figures) are different in gap dimensions between the outer and inner rings 25 and 26 and the balls 27. For example, the gap dimensions in the bearing 22 which is located closer to the center of the rotor 40 are greater than the gap dimensions in the bearing 21 which is located further from the center of the rotor 40. In this case, on the closer side to the center of the rotor 40, even if deflection of the rotor 40 and/or vibration caused by imbalance due to parts tolerances act on the bearing unit 20, it is still possible to well absorb the deflection and/or the vibration. Specifically, in the bearing 22 which is located closer to the center of the rotor 40 (i.e., on the lower side in the figures), the play dimensions (or gap dimensions) are increased by preloading, thereby absorbing vibration caused by the cantilever structure. The preloading may be either fixed-position preloading or constant-pressure preloading. In the case of performing fixed-position preloading, both the outer rings 25 of the bearings 21 and 22 are joined to the holding member 23 by, for example, press-fitting or bonding. On the other hand, both the inner rings 26 of the bearings 21 and 22 are joined to the rotating shaft 11 by, for example, press-fitting or bonding. In this case, a preload can be produced by locating the outer ring 25 of the bearing 21 at a different axial position from the inner ring 26 of the bearing 21. Similarly, a preload can be produced by locating the outer ring 25 of the bearing 22 at a different axial position from the inner ring 26 of the bearing 22.

In the case of performing constant-pressure preloading, a preloading spring, such as a wave washer 24, is arranged in a region between the bearings 21 and 22 to produce a preload in the axial direction from the region toward the outer ring 25 of the bearing 22. In this case, both the inner rings 26 of the bearings 21 and 22 are joined to the rotating shaft 11 by, for example, press-fitting or bonding. The outer ring 25 of the bearing 21 or the bearing 22 is arranged with a predetermined clearance to the holding member 23. With the above configuration, a spring force is applied by the preloading spring to the outer ring 25 of the bearing 22 in a direction away from the bearing 21. Moreover, this force is transmitted via the rotating shaft 11 to the inner ring 26 of the bearing 21, pressing the inner ring 26 of the bearing 21 in the axial direction toward the bearing 22. Consequently, in each of the bearings 21 and 22, the axial positions of the outer and inner rings 25 and 26 are offset from each other, producing a preload as in the case of performing fixed-position preloading as described above.

In addition, in the case of performing constant-pressure preloading, the spring force is not necessarily applied to the outer ring 25 of the bearing 22 as shown in FIG. 2. For example, the spring force may be applied to the outer ring 25 of the bearing 21 instead. Moreover, preload can alternatively be produced in both the bearings 21 and 22 by: locating the inner ring 26 of either of the bearings 21 and 22 with a predetermined clearance to the rotating shaft 11; and joining both the outer rings 25 of the bearings 21 and 22 to the holding member 23 by, for example, press-fitting or bonding.

Furthermore, in the case of applying a force to the inner ring 26 of the bearing 21 in a direction away from the bearing 22, the force may be applied to the inner ring 26 of the bearing 22 as well in a direction away from the bearing 21. In contrast, in the case of applying a force to the inner ring 26 of the bearing 21 in a direction toward the bearing 22, the force may be applied to the inner ring 26 of the bearing 22 as well in a direction toward the bearing 21.

In addition, in the case of applying the rotating electric machine 10 to a vehicle as a vehicular power source, vibration having a component in the preload producing direction may be applied to the preload producing mechanism and/or the direction of gravity acting on the preload application target may be changed. Therefore, in the case of applying the rotating electric machine 10 to a vehicle, it is preferable to perform fixed-position preloading.

The intermediate portion 45 has both an annular inner shoulder part 49a and an annular outer shoulder part 49b. The outer shoulder part 49b is located outside the inner shoulder part 49a in the radial direction of the intermediate portion 45. Moreover, the inner shoulder part 49a and the outer shoulder part 49b are located apart from each other from each other in the axial direction of the intermediate portion 45. Consequently, the cylindrical portion 43 and the attaching portion 44 partially overlap each other in the radial direction of the intermediate portion 45. That is, the cylindrical portion 43 protrudes axially outward from a proximal end (i.e., an inner end on the lower side in the figures) of the attaching portion 44. With this configuration, it is possible to support the rotor 40 with respect to the rotating shaft 11 at a closer position to the center of gravity of the rotor 40 than in the case of configuring the intermediate portion 45 to be in the shape of a flat plate without any step. Consequently, it is possible to realize stable operation of the rotor 40.

Moreover, with the above configuration of the intermediate portion 45, there are formed both an annular bearing-receiving recess 46 and an annular coil-receiving recess 47 in the rotor 40. The bearing-receiving recess 46 is radially located on the inner side of the intermediate portion 45 to surround the attaching portion 44. The bearing-receiving recess 46 receives part of the bearing unit 20 therein. The coil-receiving recess 47 is radially located on the outer side of the intermediate portion 45 to surround the bearing-receiving recess 46. The coil-receiving recess 47 receives therein a coil end 54 of a stator coil 51 of the stator 50 which will be described later. Moreover, the bearing-receiving recess 46 and the coil-receiving recess 47 are located to be radially adjacent to each other. In other words, the bearing-receiving recess 46 and the coil-receiving recess 47 are located to have part of the bearing unit 20 and the coil end 54 of the stator coil 51 radially overlapping each other. Consequently, it becomes possible to reduce the axial length of the rotating electric machine 10.

The intermediate portion 45 is formed to project radially outward from the rotating shaft 11 side. Moreover, in the intermediate portion 45, there is formed a contact prevention portion that extends in the axial direction to prevent contact with the coil end 54 of the stator coil 51 of the stator 50. In addition, the intermediate portion 45 corresponds to a projecting portion.

The coil end 54 may be bent radially inward or radially outward, thereby reducing the axial dimension of the coil end 54 and thus the axial length of the stator 50. The direction of bending the coil end 54 may be determined in consideration of the assembling of the stator 50 to the rotor 40. Specifically, considering the fact that the stator 50 is assembled to the radially inner periphery of the rotor 40, the coil end 54 may be bent radially inward on the insertion end side to the rotor 40. Moreover, a coil end on the opposite side to the coil end 54 may be bent in an arbitrary direction; however, in terms of manufacturing, it is preferable to bend the coil end to the radially outer side where there is a space allowance.

The magnet unit 42, which serves as a magnet section, is constituted of a plurality of permanent magnets that are arranged on the radially inner side of the cylindrical portion 43 so as to have their polarities alternately changing in the circumferential direction. Consequently, the magnet unit 42 has a plurality of magnetic poles arranged in the circumferential direction. In addition, the details of the magnet unit 42 will be described later.

The stator 50 is provided radially inside the rotor 40. The stator 50 includes the stator coil 51, which is wound into a substantially cylindrical (or annular) shape, and a stator core 52 that is arranged, as a base member, radially inside the stator coil 51. The stator coil 51 is arranged to face the annular magnet unit 42 through a predetermined air gap formed therebetween. The stator coil 51 is comprised of a plurality of phase windings. Each of the phase windings is formed by connecting a plurality of electrical conductors, which are arranged in the circumferential direction, to one another at a predetermined pitch. In the present embodiment, the stator coil 51 includes both a three-phase coil comprised of U-phase, V-phase and W-phase windings and a three-phase coil comprised of X-phase, Y-phase and Z-phase windings. That is, the stator coil 51 is comprised of six phase windings.

The stator core 52 is formed by laminating magnetic steel sheets that are made of a soft-magnetic material into an annular shape. The stator core 52 is assembled to a radially inner periphery of the stator coil 51. The magnetic steel sheets are formed, for example, of silicon steel that is obtained by adding silicon by a few percent (e.g., 3%) to iron. In addition, the stator coil 51 corresponds to an armature coil and the stator core 52 corresponds to an armature core.

The stator coil 51 has a coil side part 53, which is located radially outside the stator core 52 so as to radially overlap the stator core 52, and the coil ends 54 and 55 protruding respectively from opposite axial ends of the stator core 52. The coil side part 53 radially faces both the stator core 52 and the magnet unit 42 of the rotor 40. In the state of the stator 50 having been arranged inside the rotor 40, of the coil ends 54 and 55 respectively on the opposite axial sides, the coil end 54 on the bearing unit 20 side (i.e., the upper side in the figures) is received in the coil-receiving recess 47 formed in the magnet holder 41 of the rotor 40. In addition, the details of the stator 50 will be described later.

The inverter unit 60 includes a unit base 61, which is fixed to the housing 30 by fasteners such as bolts, and a plurality of electrical components 62 assembled to the unit base 61. The unit base 61 is formed, for example, of Carbon Fiber-Reinforced Plastic (CFRP). The unit base 61 includes an end plate 63 fixed to the edge of the opening 33 of the housing 30, and a casing 64 formed integrally with the end plate 63 and extending in the axial direction. The end plate 63 has a circular opening 65 formed in a central part thereof. The casing 64 is formed to extend upward from the peripheral edge of the opening 65.

On an outer circumferential surface of the casing 64, there is assembled the stator 50. That is, the outer diameter of the casing 64 is set to be equal to or slightly smaller than the inner diameter of the stator core 52. The stator 50 and the unit base 61 are integrated into one piece by assembling the stator core 52 to the outer periphery of the casing 64. Moreover, since the unit base 61 is fixed to the housing 30, with the stator core 52 assembled to the casing 64, the stator 50 is also integrated with the housing 30 into one piece.

In addition, the stator core 52 may be assembled to the unit base 61 by, for example, bonding, shrink fitting or press-fitting. Consequently, circumferential or axial displacement of the stator core 52 relative to the unit base 61 is suppressed.

On the radially inner side of the casing 64, there is formed a receiving space for receiving the electrical components 62. In the receiving space, the electrical components 62 are arranged around the rotating shaft 11. That is, the casing 64 serves as a receiving-space forming portion. The electrical components 62 include semiconductor modules 66 for forming an inverter circuit, a control substrate 67 and a capacitor module 68.

In addition, the unit base 61 corresponds to a stator holder (or armature holder) that is provided radially inside the stator 50 and holds the stator 50. The housing 30 and the unit base 61 together constitute a motor housing of the rotating electric machine 10. In the motor housing, the holding member 23 is fixed to the housing 30 on one axial side of the rotor 40; the housing 30 and the unit base 61 are joined to each other on the other axial side of the rotor 40. For example, in an electrically-driven vehicle such as an electric vehicle, the rotating electric machine 10 is installed to the vehicle by mounting the motor housing to the vehicle side.

Figure 6:
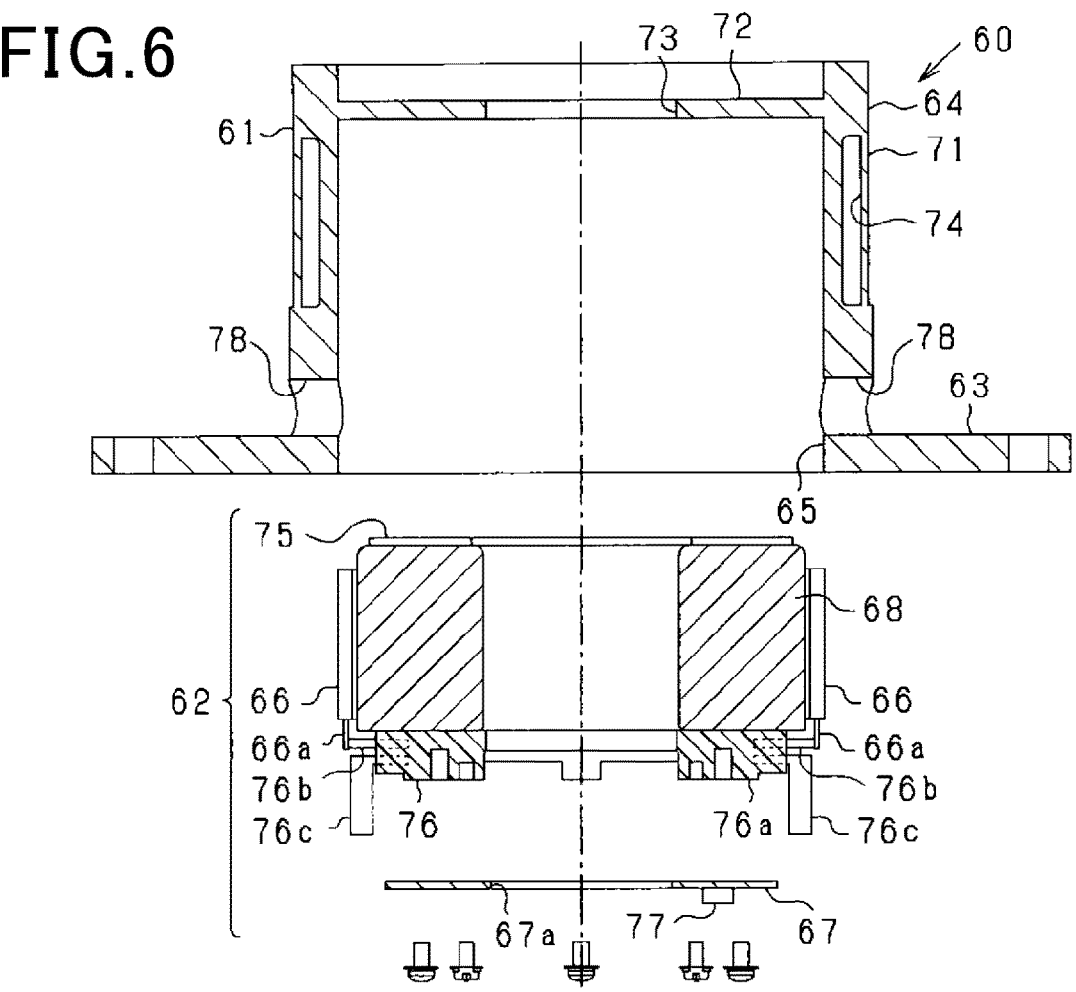
FIG. 6 is an exploded view of an inverter unit.

Hereinafter, the configuration of the inverter unit 60 will be described in detail with reference to FIG. 6, which is an exploded view of the inverter unit 60, in addition to FIGS. 1-5.

In the unit base 61, the casing 64 has a cylindrical portion 71 and an end surface 72 that is formed at one of the two opposite axial ends (i.e., the bearing unit 20-side end) of the cylindrical portion 71. At the axial end of the cylindrical portion 71 on the opposite side to the end surface 72, the cylindrical portion 71 fully opens via the opening 65 of the end plate 63. In a central part of the end surface 72, there is formed a circular hole 73 through which the rotating shaft 11 can be inserted. In the hole 73, there is provided a sealing member 171 to seal the gap between the outer circumferential surface of the rotating shaft 11 and the hole 73. The sealing member 171 may be implemented by, for example, a sliding seal formed of a resin material.

The cylindrical portion 71 of the casing 64 serves as a partition portion to partition between the rotor 40 and the stator 50 arranged on the radially outer side thereof and the electrical components 62 arranged on the radially inner side thereof. That is, the rotor 40, the stator 50 and the electrical components 62 are arranged in radial alignment with each other with the cylindrical portion 71 interposed between the rotor 40 and the stator 50 and the electrical components 62.

The electrical components 62 are electrical parts which form the inverter circuit. The electrical components 62 together perform a power running function and an electric power generation function. The power running function is a function of supplying electric current to each phase winding of the stator coil 51 in a predetermined sequence and thereby rotating the rotor 40. The electric power generation function is a function of receiving three-phase alternating current, which flows in the stator coil 51 with rotation of the rotating shaft 11, and outputting it as the generated electric power to the outside. In addition, the electrical components 62 may together perform only either one of the power running function and the electric power generation function. In the case of the rotating electric machine 10 being used as, for example, a vehicular power source, the electric power generation function may be a regenerative function, i.e., a function of outputting regenerative electric power to the outside.

Specifically, as shown in FIG. 4, the electrical components 62 include the hollow cylindrical capacitor module 68 arranged around the rotating shaft 11 and the semiconductor modules 66 arranged in circumferential alignment with each other on an outer circumferential surface of the capacitor module 68. The capacitor module 68 includes a plurality of smoothing capacitors 68a that are connected in parallel with each other. Specifically, each of the capacitors 68a is implemented by a laminated film capacitor that is formed by laminating a plurality of film capacitors. Each of the capacitors 68a has a trapezoidal cross section. The capacitor module 68 is constituted of twelve capacitors 68a that are arranged in an annular shape.

In addition, in manufacturing the capacitors 68a, a plurality of films are laminated to form a long film which has a predetermined width. Then, the long film is cut into a plurality of trapezoidal capacitor elements such that: the width direction of the long film coincides with the height direction of the trapezoidal capacitor elements; the upper bases and the lower bases of the trapezoidal capacitor elements are alternately arranged in the longitudinal direction of the long film; and all the legs of the trapezoidal capacitor elements have the same length. Thereafter, to each of the capacitor elements, electrodes are attached to form one of the capacitors 68a.

Each of the semiconductor modules 66 includes a semiconductor switching element, such as a MOSFET or an IGBT, and is substantially plate-shaped. In the present embodiment, the rotating electric machine 10 includes two three-phase coils, for each of which one inverter circuit is provided. Accordingly, a total of twelve semiconductor modules 66 are arranged in an annular shape to form a semiconductor module group 66A which is included in the electrical components 62.

The semiconductor modules 66 are sandwiched between the cylindrical portion 71 of the casing 64 and the capacitor module 68. An outer circumferential surface of the semiconductor module group 66A abuts an inner circumferential surface of the cylindrical portion 71 while an inner circumferential surface of the semiconductor module group 66A abuts an outer circumferential surface of the capacitor module 68. With this arrangement, heat generated in the semiconductor modules 66 is transmitted to the end plate 63 via the casing 64, thereby being dissipated from the end plate 63.

The semiconductor module group 66A may have a spacer 69 arranged on the outer circumferential surface thereof, i.e., arranged radially between the semiconductor modules 66 and the cylindrical portion 71. In this case, the shape of a transverse cross section of the capacitor module 68 perpendicular to the axial direction is regular dodecagonal while the inner circumferential surface of the cylindrical portion 71 is circular in cross-sectional shape. Accordingly, the spacer 69 may have an inner circumferential surface constituted of flat surfaces and an outer circumferential surface constituted of a curved surface. Moreover, the spacer 69 may be formed as one piece so as to continuously extend in an annular shape on the radially outer side of the semiconductor module group 66A. The spacer 69 may be formed of a material having high heat conductivity, for example a metal such as aluminum or a heat dissipation gel sheet. In addition, the inner circumferential surface of the cylindrical portion 71 may be modified to have the same regular dodecagonal cross-sectional shape as the capacitor module 68. In this case, each of the inner and outer circumferential surfaces of the spacer 69 would be constituted of flat surfaces.

Moreover, in the present embodiment, in the cylindrical portion 71 of the casing 64, there is formed a cooling water passage 74 through which cooling water flows. Consequently, heat generated in the semiconductor modules 66 can be dissipated to the cooling water flowing through the cooling water passage 74. That is, the casing 64 includes a water-cooling mechanism. As shown in FIGS. 3 and 4, the cooling water passage 74 is annular-shaped to surround the electrical components 62 (i.e., the semiconductor modules 66 and the capacitor module 68). More specifically, the semiconductor modules 66 are arranged along the inner circumferential surface of the cylindrical portion 71; the cooling water passage 74 is formed radially outside the semiconductor modules 66 so as to radially overlap them.

The cylindrical portion 71 has the stator 50 arranged on the radially outer side thereof and the electrical components 62 arranged on the radially inner side thereof. Therefore, both heat generated in the stator 50 and heat generated in the electrical components 62 (e.g., heat generated in the semiconductor modules 66) are transmitted to the cylindrical portion 71. Consequently, it is possible to cool both the stator 50 and the semiconductor modules 66 at the same time; thus it is possible to effectively dissipate heat generated by the heat-generating members in the rotating electric machine 10.

Moreover, at least part of the semiconductor modules 66, which constitute part or the whole of the inverter circuits for energizing the stator coil 51 and thereby driving the rotating electric machine, is arranged within a region surrounded by the stator core 52 that is located radially outside the cylindrical portion 71 of the casing 64. It is preferable that the whole of one of the semiconductor modules 66 is arranged within the region surrounded by the stator core 52. It is more preferable that the whole of each of the semiconductor modules 66 is arranged within the region surrounded by the stator core 52.

Moreover, at least part of the semiconductor modules 66 is arranged within a region surrounded by the cooling water passage 74. It is preferable that the whole of each of the semiconductor modules 66 is arranged within a region surrounded by a yoke 141.

The electrical components 62 include an insulating sheet 75 arranged on one axial end surface of the capacitor module 68 and a wiring module 76 arranged on the other axial end surface of the capacitor module 68. More specifically, the capacitor module 68 has two opposite axial end surfaces, i.e., a first axial end surface and a second axial end surface. The first axial end surface of the capacitor module 68, which is located closer to the bearing unit 20, faces the end surface 72 of the casing 64 and superposed on the end surface 72 with the insulating sheet 75 sandwiched therebetween. The second axial end surface of the capacitor module 68, which is located closer to the opening 65, has the wiring module 76 mounted thereon.

The wiring module 76 has a main body 76a, which is formed of a synthetic resin material into a discoid shape, and a plurality of busbars 76b and 76c embedded in the main body 76a. The wiring module 76 is electrically connected with the semiconductor modules 66 and the capacitor module 68 via the busbars 76b and 76c. More specifically, each of the semiconductor modules 66 has a connection pin 66a extending from an axial end surface thereof; the connection pin 66a is connected, on the radially outer side of the main body 76a, to one of the busbars 76b. On the other hand, the busbars 76c extend, on the radially outer side of the main body 76a, in the axial direction away from the capacitor module 68. To distal end portions of the busbars 76c, there are respectively connected wiring members 79 (see FIG. 2).

As described above, the capacitor module 68 has the insulating sheet 75 arranged on the first axial end surface thereof and the wiring module 76 arranged on the second axial end surface thereof. With this arrangement, there are formed heat dissipation paths of the capacitor module 68 from the first and second axial end faces of the capacitor module 68 respectively to the end surface 72 and the cylindrical portion 71. That is, there are formed both a heat dissipation path from the first axial end surface of the capacitor module 68 to the end surface 72 and a heat dissipation path from the second axial end surface of the capacitor module 68 to the cylindrical portion 71. Consequently, it becomes possible to dissipate heat generated in the capacitor module 68 via the end surfaces thereof other than the outer circumferential surface on which the semiconductor modules 66 are arranged. That is, it becomes possible to dissipate heat generated in the capacitor module 68 not only in the radial direction but also in the axial direction.

Moreover, the capacitor module 68, which is hollow cylindrical in shape, has the rotating shaft 11 arranged on the radially inner side thereof with a predetermined gap formed therebetween. Consequently, heat generated in the capacitor module 68 can also be dissipated via the hollow space formed therein. In addition, with rotation of the rotating shaft 11, air flow is created in the gap, thereby improving the cooling performance.

To the wiring module 76, there is mounted a control substrate 67 which has a discoid shape. The control substrate 67 includes a Printed Circuit Board (PCB) which has a predetermined wiring pattern formed thereon. On the PCB, there is mounted a controller 77 which is constituted of various ICs and a microcomputer. The controller 77 corresponds to a control unit. The control substrate 67 is fixed to the wiring module 76 by fixtures such as screws. In a central part of the control substrate 67, there is formed an insertion hole 67a through which the rotating shaft 11 is inserted.

The wiring module 76 has a first surface and a second surface that are opposite to each other in the axial direction, i.e., opposite to each other in the thickness direction thereof. The first surface faces the capacitor module 68. The wiring module 76 has the control substrate 67 provided on the second surface thereof. The busbars 76c of the wiring module 76 are configured to extend from one surface of the control substrate 67 to the other surface of the control substrate 67. Moreover, in the control substrate 67, there may be formed cuts to prevent interference with the busbars 76c. For example, the control substrate 67 may have the cuts formed in an outer edge portion of the discoid control substrate 67.

As described above, the electrical components 62 are received in the space surrounded by the casing 64. The housing 30, the rotor 40 and the stator 50 are arranged in layers outside the casing 64. With this arrangement, electromagnetic noise generated in the inverter circuits can be suitably shielded. More specifically, in the inverter circuits, switching control is performed on each of the semiconductor modules 66 by PWM control with a predetermined carrier frequency. Consequently, electromagnetic noise may be generated by the switching control. However, the electromagnetic noise would be suitably shielded by the housing 30, the rotor 40 and the stator 50 on the radially outer side of the electrical components 62.

Moreover, at least part of the semiconductor modules 66 is arranged within the region surrounded by the stator core 52 that is located radially outside the cylindrical portion 71 of the casing 64. With this arrangement, even if magnetic flux is generated by the semiconductor modules 66, the stator coil 51 would be less affected by the magnetic flux than in the case of the semiconductor modules 66 and the stator coil 51 being arranged without the stator core 52 interposed therebetween. Moreover, even if magnetic flux is generated by the stator coil 51, the semiconductor modules 66 would be less affected by the magnetic flux than in the aforementioned case. In addition, the above advantageous effects would be more remarkable when the whole of each of the semiconductor modules 66 is arranged in the region surrounded by the stator core 52 that is located radially outside the cylindrical portion 71 of the casing 64. Moreover, with at least part of the semiconductor modules 66 surrounded by the cooling water passage 74, it becomes difficult for heat generated in the stator coil 51 and/or the magnet unit 42 to be transmitted to the semiconductor modules 66.

In the cylindrical portion 71, there are formed through-holes 78 in the vicinity of the end plate 63. Through the through-holes 78, the wiring members 79 (see FIG. 2) are respectively inserted to electrically connect the stator 50 located outside the cylindrical portion 71 with the electrical components 62 located inside the cylindrical portion 71. As shown in FIG. 2, the wiring members 79 are respectively joined, for example by crimping or welding, to end portions of the stator coil 51 as well as to the busbars 76c of the wiring module 76. It is preferable that the wiring members 79 are implemented by, for example, busbars having joining surfaces crushed flat. The number of the through-holes 78 formed in the cylindrical portion 71 may be single or plural. In the present embodiment, two through-holes 78 are formed respectively at two different locations. Consequently, it becomes possible to easily perform wiring of coil terminals extending from the two three-phase coils. Therefore, the above formation of the through-holes 78 is suitable for making multi-phase electrical connection.

As described above, in the housing 30, as shown in FIG. 4, the rotor 40, the stator 50 and the inverter unit 60 are arranged in this order from the radially outer side to the radially inner side. More specifically, the rotor 40 and the stator 50 are arranged radially outward from the center of rotation of the rotor 40 by more than d×0.705, where d is the radius of the inner circumferential surface of the housing 30. With this arrangement, the area of a transverse cross section of a first region X1 becomes larger than the area of a transverse cross section of a second region X2. Here, the first region X1 denotes the region radially inside the inner circumferential surface of the stator 50 (i.e., the inner circumferential surface of the stator core 52) that is located radially inside the rotor 40; the second region X2 denotes the region radially extending from the inner circumferential surface of the stator 50 to the housing 30. Moreover, in a range where the magnet unit 42 of the rotor 40 and the stator coil 51 radially overlap each other, the volume of the first region X1 is larger than the volume of the second region X2.

In addition, the rotor 40 and the stator 50 together constitute a magnetic-circuit component assembly. Then, in the housing 30, the volume of the first region X1 radially inside the inner circumferential surface of the magnetic-circuit component assembly is larger than the volume of the second region X2 radially extending from the inner circumferential surface of the magnetic-circuit component assembly to the housing 30.

Next, the configurations of the rotor 40 and the stator 50 will be described in more detail.

There are known stators of rotating electric machines which are generally configured to include a stator core and a stator coil. The stator core is formed by laminating steel sheets into an annular shape. The stator core has a plurality of slots arranged in the circumferential direction. The stator coil is wound in the slots of the stator core. More specifically, the stator core has a plurality of teeth formed, at predetermined intervals, to radially extend from a yoke. Each of the slots is formed between one circumferentially-adjacent pair of the teeth. The stator coil is constituted of electrical conductors that are received in a plurality of radially-aligned layers in the slots of the stator core.

However, with the above structure of the known stators, during energization of the stator coil, with increase in the magnetomotive force of the stator coil, magnetic saturation may occur in the teeth of the stator core, causing the torque density of the rotating electric machine to be limited. More specifically, in the stator core, rotating magnetic flux, which is generated with energization of the stator coil, may concentrate on the teeth, causing the teeth to be magnetically saturated.

Moreover, there are known IPM (Interior Permanent Magnet) rotors of rotating electric machines which are generally configured to have permanent magnets arranged on the d-axis of the d-q coordinate system and a rotor core arranged on the q-axis of the d-q coordinate system. In this case, upon the stator coil in the vicinity of the d-axis being excited, exciting magnetic flux flows from the stator into the q-axis of the rotor according to Fleming's rule. Consequently, magnetic saturation may occur in a wide range in the q-axis core portions of the rotor.

Figure 7:
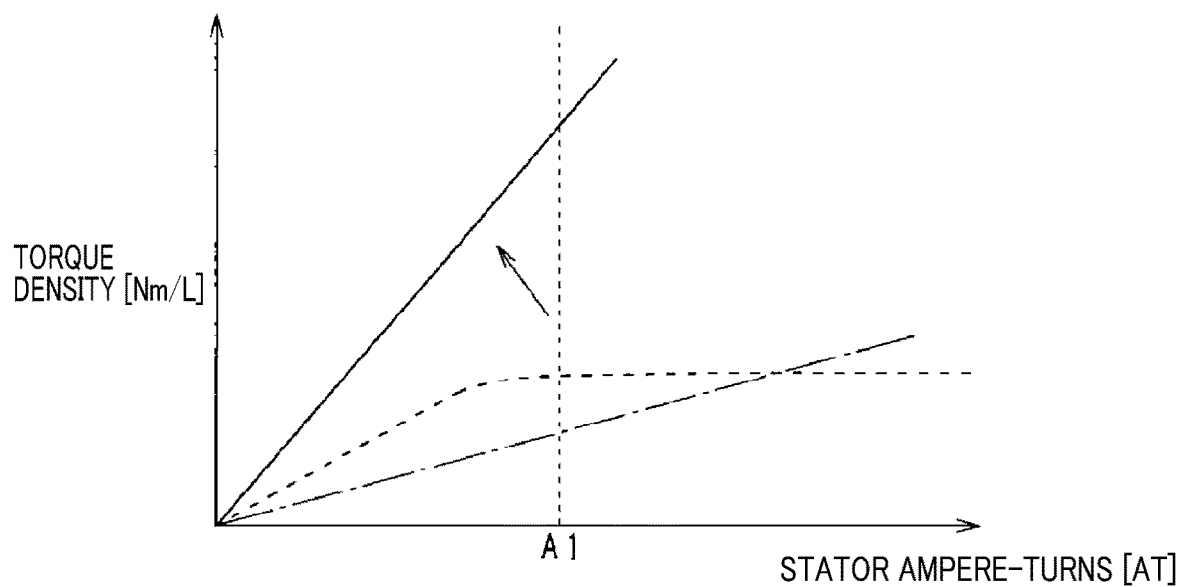
FIG. 7 is a torque diagram illustrating the relationship between the ampere-turns of a stator coil and torque density.

FIG. 7 is a torque diagram illustrating the relationship between the ampere-turns [AT], which represents the magnetomotive force of the stator coil, and the torque density [Nm/L]. A dashed line indicates characteristics of a conventional IPM rotor rotating electric machine. As shown in FIG. 7, in the conventional rotating electric machine, with increase in the magnetomotive force in the stator, magnetic saturation occurs at two locations, i.e., the teeth between the slots and the q-axis core portions, causing increase in the torque to be limited. Hence, in the conventional rotating electric machine, the design value of the ampere-turns is limited by A1.

In view of the above, in the present embodiment, to overcome the limitation due to the magnetic saturation, the following structures are employed in the rotating electric machine 10. Specifically, as a first measure, to eliminate magnetic saturation occurring in the teeth of the stator core in the stator, a slot-less structure is employed in the stator 50; moreover, to eliminate magnetic saturation occurring in the q-axis core portions of an IPM rotor, an SPM (Surface Permanent Magnet) rotor is employed. However, with the first measure, though it is possible to eliminate the above-described two locations where magnetic saturation occurs, torque may decrease in a low-electric current region (see the one-dot chain line in FIG. 7). Therefore, as a second measure, to enhance the magnetic flux of the SPM rotor and thereby suppress decrease in the torque, a polar anisotropic structure is employed in which magnet magnetic paths in the magnet unit 42 of the rotor 40 are lengthened to increase the magnetic force.

Moreover, as a third measure, to suppress decrease in the torque, a flat conductor structure is employed in which the radial thickness of the electrical conductors in the coil side part 53 of the stator coil 51 of the stator 50 is reduced. Here, with employment of the above-described polar anisotropic structure for increasing the magnetic force, higher eddy current may be generated in the stator coil 51 that faces the magnet unit 42. However, with the third measure, it is possible to suppress, by virtue of the radially-thin flat conductor structure, generation of radial eddy current in the stator coil 51. Consequently, with the above first to third structures, it becomes possible to considerably improve the torque characteristics with employment of the high-magnetic force magnets while suppressing generation of high eddy current due to the high-magnetic force magnets, as indicated a solid line in FIG. 7.

Furthermore, as a fourth measure, the magnet unit is employed in which magnetic flux density distribution approximate to a sine wave is realized using the polar anisotropic structure. Consequently, it becomes possible to improve the sine wave matching percentage with the later-described pulse control and thereby increase the torque while more effectively suppressing eddy current loss (i.e., copper loss due to eddy current) with gentler magnetic flux change than radial magnets.

Hereinafter, the sine wave matching percentage will be described. The sine wave matching percentage can be determined based on comparison between the actual waveform of the surface magnetic flux density distribution, which is measured by tracing the surfaces of the magnets using a magnetic flux probe, and a sine wave that has the same period and peak values as the actual waveform. Specifically, the sine wave matching percentage is defined as the ratio of the amplitude of the primary waveform, which is the fundamental wave of the rotating electric machine, to the amplitude of the actual waveform, i.e., the amplitude of the fundamental wave with harmonic components added thereto. With increase in the sine wave matching percentage, the waveform of the surface magnetic flux density distribution approximates the shape of the sine wave. Upon supply of electric current of the primary sine wave from an inverter to the rotating electric machine that includes the magnets with the improved sine wave matching percentage, high torque can be generated due to the waveform of the surface magnetic flux density distribution of the magnets approximate to the shape of the sine wave. In addition, instead of being actually measured, the surface magnetic flux density distribution may be estimated by, for example, an electromagnetic field analysis using Maxwell's equations.

Furthermore, as a fifth measure, the stator coil 51 is designed to have a wire conductor structure in which wires are bundled together. Consequently, with the wires connected in parallel with each other, it becomes possible to allow high electric current to flow through the electrical conductors. Moreover, since the cross-sectional area of each of the wires is small, it becomes possible to more effectively suppress, than the third measure of reducing the radial thickness of the electrical conductors, generation of eddy current in the electrical conductors that are expanded in the circumferential direction of the stator 50 due to the flat conductor structure. In addition, forming each of the electrical conductors by twisting the wires, with respect to the magnetomotive force of the electrical conductors, it becomes possible to cancel eddy currents, which are induced by magnetic flux generated according to the right-hand rule with respect to the electric current supply direction, by each other.

As above, by further taking the fourth and fifth measures, it becomes possible to employ the high-magnetic force magnets provided by the second measure while suppressing eddy current loss due to the high magnetic force and thereby increasing the torque.

Figure 8:
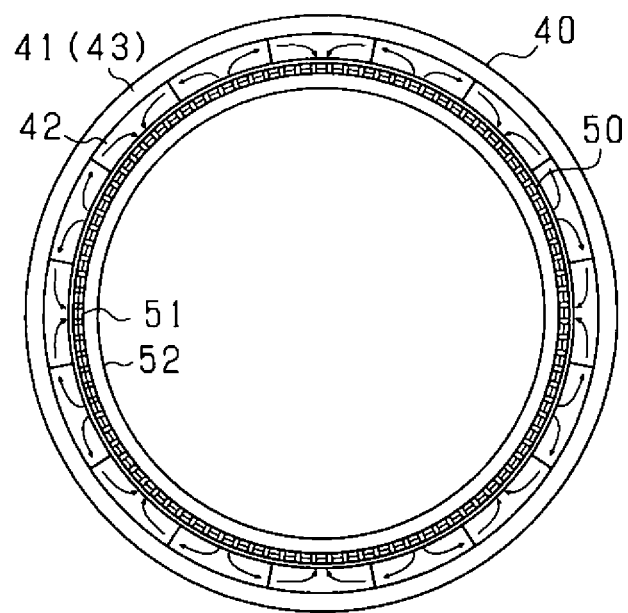
FIG. 8 is a transverse cross-sectional view of a rotor and a stator.
Figure 9:
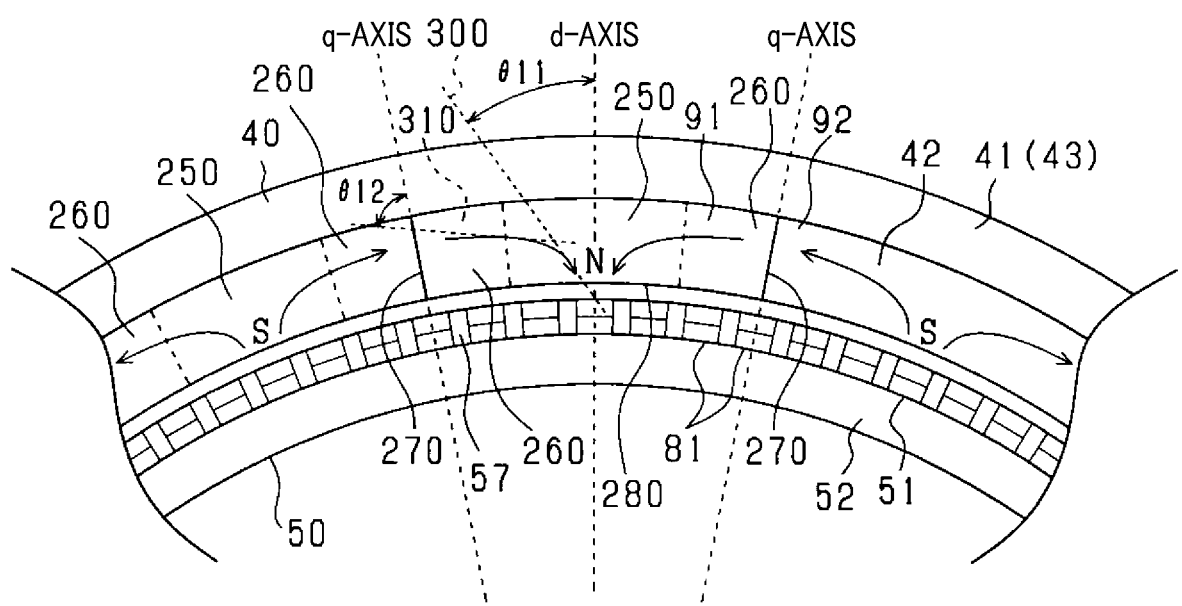
FIG. 9 is an enlarged view of part of FIG. 8.
Figure 10:
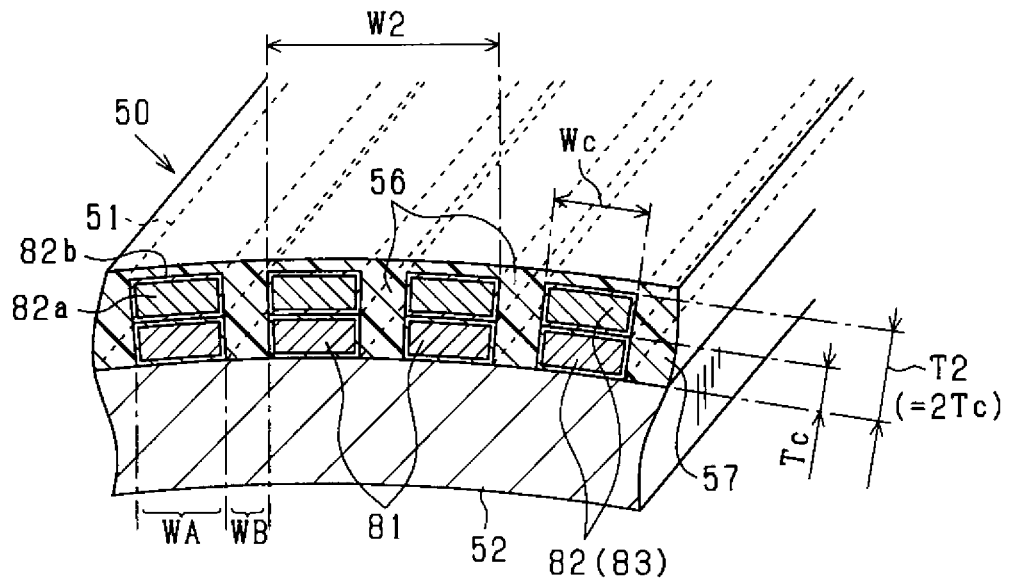
FIG. 10 is a transverse cross-sectional view of the stator.
Figure 11:
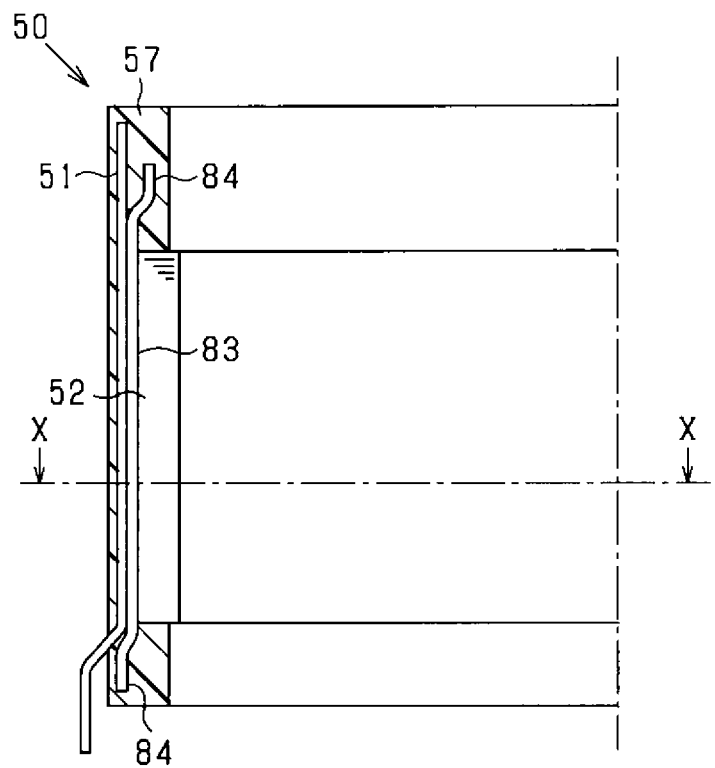
FIG. 11 is a longitudinal cross-sectional view of the stator.
Figure 12:
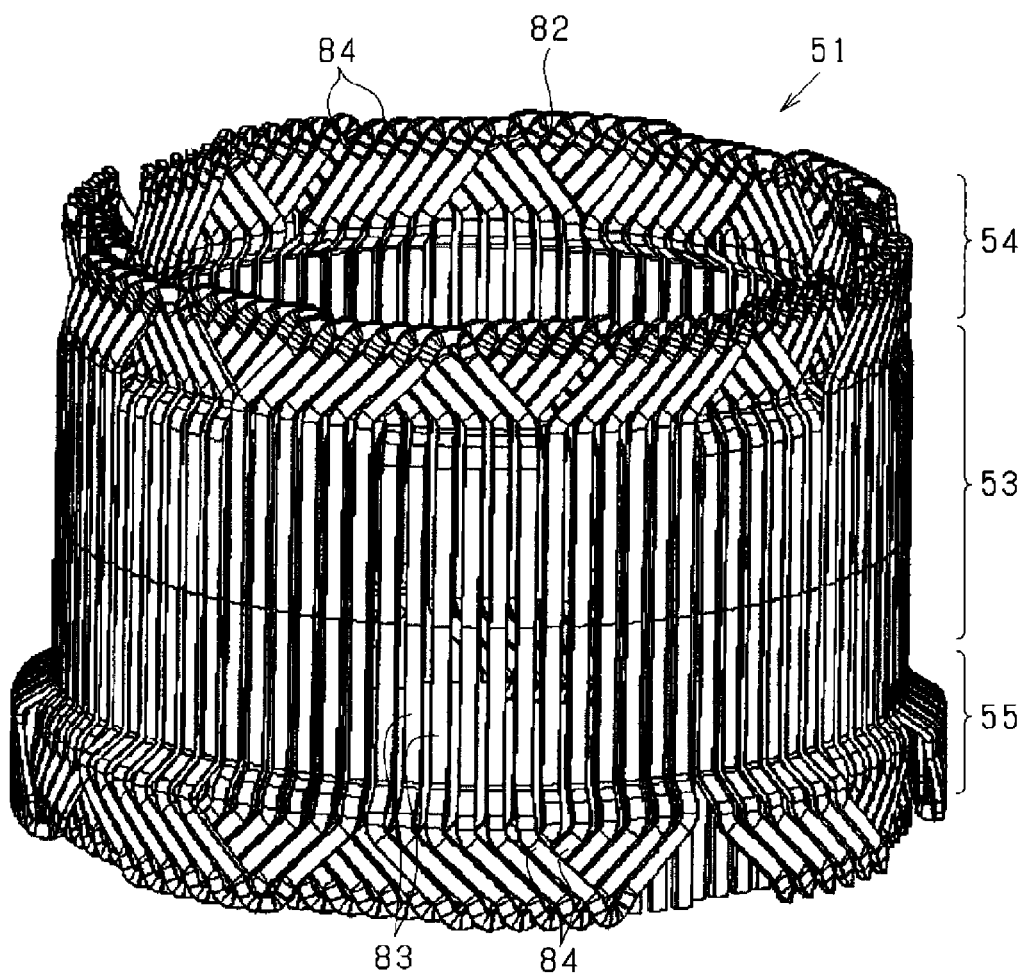
FIG. 12 is a perspective view of the stator coil.

Hereinafter, the slot-less structure of the stator 50, the flat conductor structure of the stator coil 51 and the polar anisotropic structure of the magnet unit 42 will be described in detail. First, the slot-less structure of the stator 50 and the flat conductor structure of the stator coil 51 will be described. FIG. 8 is a transverse cross-sectional view of both the rotor 40 and the stator 50. FIG. 9 is an enlarged view of part of the rotor 40 and the stator 50 shown in FIG. 8. FIG. 10 is a transverse cross-sectional view of the stator 50 which is taken along the line X-X in FIG. 11. FIG. 11 is a longitudinal cross-sectional view of the stator 50. FIG. 12 is a perspective view of the stator coil 51. In addition, in FIGS. 8 and 9, the magnetization directions of the magnets in the magnet unit 42 are indicated by arrows.

As shown in FIGS. 8-11, the stator core 52 is formed, by laminating a plurality of magnetic steel sheets in the axial direction, to have a hollow cylindrical shape with a predetermined radial thickness. The stator coil 51 is assembled to the radially outer periphery, i.e., the rotor 40-side periphery of the stator core 52. That is, the outer circumferential surface of the stator core 52 on the rotor 40 side constitutes an electrical conductor mounting part (or electrical conductor area). The outer circumferential surface of the stator core 52 is shaped as a smooth curved surface. A plurality of electrical conductor groups 81 are arranged on the outer circumferential surface of the stator core 52 at predetermined intervals in the circumferential direction. The stator core 52 functions as a back yoke to form part of a magnetic circuit for rotating the rotor 40. The stator 50 has a configuration (i.e., slot-less structure) such that between each circumferentially-adjacent pair of the electrical conductor groups 81, there is no tooth formed of a soft-magnetic material (i.e., no iron core). In the present embodiment, each of gaps 56 between the electrical conductor groups 81 is occupied by the resin material of a sealing member 57. That is, in the stator 50, inter-conductor members provided between the electrical conductor groups 81 in the circumferential direction are constituted of the sealing member 57 that is formed of a nonmagnetic material. Before the sealing by the sealing member 57, on the radially outer side of the stator core 52, the electrical conductor groups 81 are arranged at predetermined intervals in the circumferential direction with the gaps 56, which are inter-conductor regions, formed therebetween. Consequently, the stator 50 is constructed which has the slot-less structure. In other words, each of the electrical conductor groups 81 consists of two electrical conductors 82 as will be described later; the gap 56 formed between each circumferentially-adjacent pair of the electrical conductor groups 81 is occupied by only nonmagnetic materials. These nonmagnetic materials include, in addition to the resin material of the sealing member 57, nonmagnetic gas such as air and nonmagnetic liquid. In addition, the sealing member 57 will also be referred to as the inter-conductor member (or conductor-to-conductor member) hereinafter.

The configuration having teeth provided between electrical conductor groups 81 arranged in the circumferential direction is a configuration where: each of the teeth has a predetermined radial thickness and a predetermined circumferential width; and part of the magnetic circuit, i.e., magnet magnetic paths are formed between the electrical conductor groups 81. In contrast, the configuration having no teeth provided between the electrical conductor groups 81 is a configuration where the above magnetic circuit is not formed between the electrical conductor groups 81.

As shown in FIG. 10, the stator coil (or armature coil) 51 is formed to have a predetermined thickness T2 (hereinafter, to be also referred to as the first dimension) and a predetermined width W2 (hereinafter, to be also referred to as the second dimension). The thickness T2 is represented by the minimum distance between a radially outer side surface and a radially inner side surface of the stator coil 51. The width W2 is represented by the circumferential length of each part of the stator coil 51 which functions as one of the plurality of phases of the stator coil 51 (three phases in the embodiment: the three phases of U, V and W or the three phases of X, Y and Z). Specifically, in FIG. 10, one circumferentially-adjacent pair of the electrical conductor groups 81 functions as one of three phases, for example the U phase; the distance between two ends of the pair of the electrical conductor groups 81 in the circumferential direction represents the width W2. Moreover, the thickness T2 is set to be smaller than the width W2.

In addition, it is preferable that the thickness T2 is smaller than the sum of widths of two electrical conductor groups 81 present within the width W2. Moreover, in the case of the cross-sectional shape of the stator coil 51 (more specifically, the electrical conductors 82) being a perfect circle, ellipse or polygon, in a cross section of each of the electrical conductors 82 along the radial direction of the stator 50, the maximum radial length of the cross section may be designated by W12 and the maximum circumferential length of the cross section may be designated by W11.

As shown in FIGS. 10 and 11, the stator coil 51 is sealed by the sealing member 57 that is formed of a synthetic resin material that is a sealing material (or molding material). That is, the stator coil 51 is molded together with the stator core 52 by the molding material. In addition, a resin is a non-magnetic material or an equivalent of a nonmagnetic material; thereof, the saturation flux density Bs of a resin can be regarded as being equal to zero, i.e., Bs=0.

As seen from the transverse cross-sectional view of FIG. 10, the gaps 56 between the electrical conductor groups 81 are filled with the synthetic resin material forming the sealing member 57. The sealing member 57 constitutes an electrically insulating member interposed between the electrical conductor groups 81. In other words, the sealing member 57 functions as an electrically insulating member in the gaps 56. The sealing member 57 is provided, on the radially outer side of the stator core 52, in a region encompassing all the electrical conductor groups 81, i.e., in a region whose radial thickness is larger than the radial thickness of the electrical conductor groups 81.

Moreover, as seen from the longitudinal cross-sectional view of FIG. 11, the sealing member 57 is provided in regions encompassing turn portions 84 of the stator coil 51. On the radially inner side of the stator coil 51, the sealing member 57 is provided in regions encompassing at least part of axially opposite end surfaces of the stator core 52. In this case, except for end portions of the phase windings, i.e., except for connection terminals connected with the inverter circuits, the stator coil 51 is substantially entirely resin-sealed.

With the sealing member 57 provided in the regions encompassing the end surfaces of the stator core 52, it is possible to press, by the sealing member 57, the laminated steel sheets of the stator core 52 axially inward. Consequently, with the sealing member 57, it is possible to maintain the laminated state of the steel sheets. In addition, in the present embodiment, the inner circumferential surface of the stator core 52 is not resin-sealed. As an alternative, the entire stator core 52 including the inner circumferential surface thereof may by resin-sealed.

In the case of the rotating electric machine 10 being used as a vehicular power source, it is preferable that the sealing member 57 is formed of a highly heat-resistant fluorocarbon resin, epoxy resin, PPS resin, PEEK resin, LCP resin, silicon resin, PAI resin or PI resin. In terms of suppressing occurrence of cracking due to a difference in coefficient of linear expansion, it is preferable that the sealing member 57 is formed of the same material as insulating coats of the electrical conductors of the stator coil 51. That is, it is preferable that silicon resins, whose coefficients of linear expansion are generally higher than twice those of other resins, are excluded from candidates for the material of the sealing member 57. Furthermore, in electrical products having no combustion engine, such as an electrical vehicle, a PPO resin, a phenol resin or an FRP resin, which have heat resistance of about 180° C., may be used as the material forming the sealing member 57. In addition, in fields where the ambient temperature of the rotating electric machine 10 is lower than 100° C., the material for forming the sealing member 57 is not limited to the aforementioned candidates.

The torque of the rotating electric machine 10 is proportional to the amplitude of magnetic flux. In the case of a stator core having teeth, the maximum amount of magnetic flux in the stator is limited depending on the saturation flux density at the teeth. In contrast, in the case of a stator core having no teeth, the maximum amount of magnetic flux in the stator is not limited. Therefore, the slot-less structure is advantageous in terms of increasing electric current supplied to the stator coil 51 and thereby increasing the torque of the rotating electric machine 10.

In the present embodiment, the inductance of the stator 50 is lowered by employing the tooth-less structure (or slot-less structure) in the stator 50. Specifically, the inductance of a stator of a conventional rotating electric machine, which has electrical conductors received in slots partitioned by teeth, is, for example, about 1 mH. In contrast, the inductance of the stator 50 according to the present embodiment is lowered to be 5-60 µH. Consequently, in the present embodiment, it becomes possible to lower the mechanical time constant Tm through the reduction in the inductance of the stator 50 while configuring the rotating electric machine 10 to have an outer rotor structure. That is, it becomes possible to achieve both increase in the torque and reduction in the mechanical constant Tm. In addition, the mechanical time constant Tm can be calculated by the following equation:

$$Tm=(J \times L)/(Kt \times Ke)$$

where J is the inertia, L is the inductance, Kt is the torque constant and Ke is the counterelectromotive force constant. From the above equation, it is clear that the mechanical time constant Tm decreases with decrease in the inductance L.

Each of the electrical conductor groups 81 on the radially outer side of the stator core 52 is comprised of a plurality of electrical conductors 82 that each have a flat rectangular cross section and are arranged in alignment with each other in a radial direction of the stator core 52. Moreover, each of the electrical conductors 82 is oriented so that in a transverse cross section thereof, (the radial dimension<the circumferential dimension). Consequently, each of the electrical conductor groups 81 becomes thinner in the radial direction. Meanwhile, the regions of the electrical conductors are expanded flat to those regions which would be conventionally occupied by teeth, thereby realizing a flat conductor region structure. Consequently, increase in the amount of heat generated by the electrical conductors, which would otherwise be caused by the reduction in the radial dimension and thus reduction in the cross-sectional area of each of the electrical conductors, is suppressed by suppressing reduction in the cross-sectional area of each of the electrical conductors through the increase in the circumferential dimension. In addition, with a configuration of arranging a plurality of electrical conductors in circumferential alignment with each other and connecting them in parallel with each other, though the cross-sectional area of each of the electrical conductors is reduced by an amount corresponding to the thickness of insulating coats of the electrical conductors, it is still possible to achieve the same effects as described above. It should be noted that hereinafter, each of the electrical conductor groups 81 and each of the electrical conductors 82 will also be referred to as "conductive member".

In the present embodiment, with the slot-less structure of the stator 50, it becomes possible to set the conductor regions occupied by the stator coil 51 to be greater than non-conductor regions not occupied by the stator coil 51 in each turn in the circumferential direction. In addition, in a conventional rotating electric machine for a vehicle, the ratio of the conductor regions to the non-conductor regions in each turn in the circumferential direction is generally lower than or equal to 1. In contrast, in the present embodiment, the electrical conductor groups 81 are configured to have the conductor regions equal to the non-conductor regions or greater than the non-conductor regions. Specifically, as shown in FIG. 10, the circumferential width WA of each of the conductor regions occupied by the electrical conductors 82 (or, straight portions 83 to be described later) is set to be larger than the circumferential width WB of each of the inter-conductor regions between the adjacent electrical conductors 82.

In the stator coil 51, the radial thickness of the electrical conductor groups 81 is set to be smaller than the circumferential width of the electrical conductor groups 81 per phase in each magnetic pole. More specifically, each of the electrical conductor groups 81 consists of two radially-stacked electrical conductors 82. In each region corresponding to one magnetic pole, there are provided two circumferentially-adjacent electrical conductor groups 81 per phase. Then, the following relationship is satisfied: Tc×2<Wc×2, where Tc is the radial thickness of each of the electrical conductors 82 and Wc is the circumferential width of each of the electrical conductors 82. In addition, in an alternative configuration, each of the electrical conductor groups 81 consists of two radially-stacked electrical conductors 82; in each region corresponding to one magnetic pole, there is provided only one electrical conductor group 81 per phase. In this case, the following relationship is satisfied: Tc×2<Wc. That is, in the stator coil 51, for the electrical conductor units (i.e., electrical conductor groups 81) arranged at predetermined intervals in the circumferential direction, the radial thickness of each of the electrical conductor units is set to be smaller than the circumferential width of one or more electrical conductor units provided per phase in each region corresponding to one magnetic pole.

In other words, the radial thickness Tc of each of the electrical conductors 82 is preferably set to be smaller than the circumferential width Wc of each of the electrical conductors 82. Further, the radial thickness (i.e., 2 Tc) of each of the electrical conductor groups 81, which consists of two radially-stacked electrical conductors 82, is preferably set to be smaller than the circumferential width Wc of each of the electrical conductor groups 81.

The torque of the rotating electric machine 10 is approximately in inverse proportion to the radial thickness of the electrical conductor groups 81. Therefore, the torque of the rotating electric machine 10 can be increased by reducing the radial thickness of the electrical conductor groups 81 on the radially outer side of the stator core 52. This is because with reduction in the radial thickness of the electrical conductor groups 81, the distance from the magnet unit 42 of the rotor 40 to the stator core 52 (i.e., the distance across a portion containing no iron) is shortened, thereby lowering the magnetic reluctance. Consequently, it is possible to increase the magnetic flux generated by the permanent magnets and crossing the stator core 52, thereby increasing the torque.

Moreover, with reduction in the radial thickness of the electrical conductor groups 81, it becomes easier for leakage magnetic flux from the electrical conductor groups 81 to be recovered by the stator core 52. Consequently, it becomes possible to suppress the magnetic flux from leaking outside without being effectively used for improvement of the torque. That is, it becomes possible to suppress the magnetic force from being lowered due to leakage of the magnetic flux and increase the magnetic flux generated by the permanent magnets and crossing the stator core 52, thereby increasing the torque.

Each of the electrical conductors 82 is implemented by a covered electrical conductor that includes a conductor body 82a and an insulating coat 82b covering the surface of the conductor body 82a. Therefore, electrical insulation is secured between each radially-stacked pair of the electrical conductors 82 and between the electrical conductors 82 and the stator core 52. As will be described later, the conductor body 82a is constituted of a bundle of wires 86. In the case of each of the wires 86 being a coated wire, the insulating coat 82b may be constituted of the self-fusing coats of the wires 86. Otherwise, the insulating coat 82b may be constituted of an insulating member provided separately from the coats of the wires 86b. In addition, the electrical insulation of the phase windings formed of the electrical conductors 82 is secured, except for exposed portions of the phase windings for making electrical connection, by the insulating coats 82b of the electrical conductors 82. These exposed portions of the phase windings include, for example, input/output terminal portions, and neutral terminal portions when the phase windings are star-connected. In each of the electrical conductor groups 81, the radially-adjacent electrical conductors 82 are fixed to each other by the self-fused insulating coats of the electrical conductors and/or an insulating resin applied separately from the insulating coats. Consequently, it is possible to prevent electrical breakdown form occurring due to the electrical conductors 82 rubbing against each other and to suppress vibration and noise.

Figure 13:
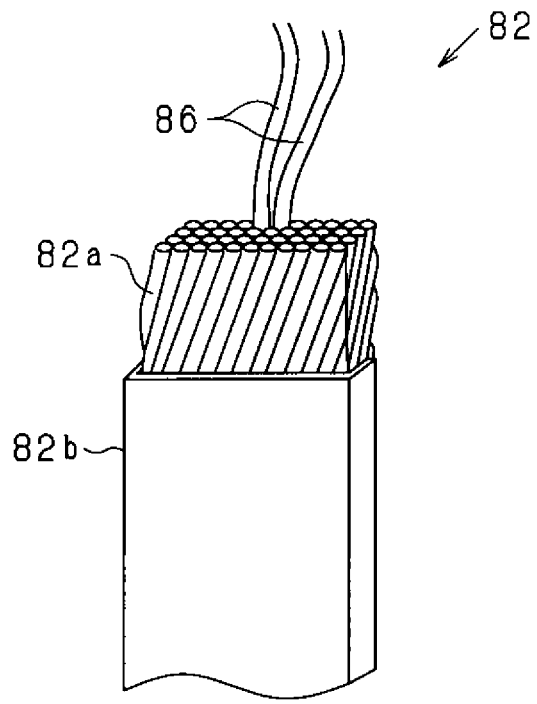
FIG. 13 is a perspective view illustrating the configuration of an electrical conductor.
Figure 14:
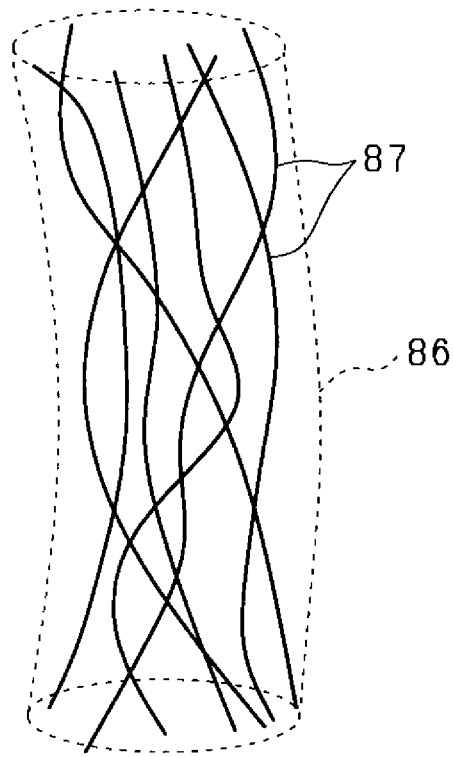
FIG. 14 is a schematic diagram illustrating the configuration of a wire.

In the present embodiment, the conductor body 82a of each of the electrical conductors 82 is constituted of a bundle of wires 86. Specifically, as shown in FIG. 13, the conductor body 82a is formed, by twisting the wires 86, into the shape of a twine. Moreover, as shown in FIG. 14, each of the wires 86 is constituted of a bundle of electrically conductive fibers 87. The fibers 87 are implemented by, for example, CNT (carbon nanotube) fibers. The CNT fibers are micro fibers which are obtained by substituting at least part of carbon with boron. The fibers 87 may alternatively be implemented by other carbon micro fibers, such as Vapor Grown Carbon Fibers (VGCF). However, it is preferable for the fibers 87 to be implemented by CNT fibers. In addition, the surface of each of the wires 86 is covered with an electrically-insulative polymer coat, such as an enamel coat. Moreover, it is preferable that the surface of each of the wires 86 is covered with an enamel coat, such as a polyimide coat or an amide-imide coat.

The electrical conductors 82 together form windings of n phases in the stator coil 51. In each of the electrical conductors 82 (more specifically, each of the conductor bodies 82a), all the wires 86 are adjacent to and in contact with one another. Moreover, in each of the electrical conductors 82, there is at least one place per phase where the wires 86 are twisted together. The electrical resistances between the twisted wires 86 are higher than the electrical resistance of each of the wires 86. Specifically, for each adjacent pair of the wires 86, a first electrical resistivity in the direction in which the wires 86 adjoin each other is higher than a second electrical resistivity in the longitudinal direction of each of the wires 86. In addition, each of the electrical conductors 82 may be constituted of a wire bundle in which the wires 86 are covered with an insulating member having extremely high first electrical resistivity. Moreover, the conductor body 82a of each of the electrical conductors 82 is constituted of the wires 86 that are twisted together.

Since the conductor body 82a is constituted of the wires 86 that are twisted together, it becomes possible to suppress generation of eddy current in each of the wires 86, thereby reducing eddy current in the conductor body 82a. Moreover, each of the wires 86 is twisted to have portions where the magnetic field application directions are opposite to each other; therefore, the counterelectromotive forces generated in these portions are canceled by each other. Consequently, it becomes possible to achieve further reduction in the eddy current. In particular, since each of the wires 86 is constituted of the electrically conductive fibers 87, it becomes possible to make each element of the wire 86 extremely thin and considerably increase the number of twists in the wire 86, thereby more effectively reducing the eddy current.

In addition, the method of insulating between the wires 86 is not limited to employment of the above electrically-insulative polymer coat. As an alternative, it may be possible to make it difficult for electric current to flow between the wires 86 by increasing the contact resistance therebetween. That is, when the resistance between the twisted wires 86 is higher than the resistance of each of the wires 86, it is possible to achieve the above effect by virtue of the electric potential difference caused by the resistance difference. For example, the contact resistance between the wires 86 may be preferably increased by: arranging the manufacturing equipment for manufacturing the wires 86 and the manufacturing equipment for manufacturing the stator 50 (or armature) of the rotating electric machine 10 to be separate from each other; and having the wires 86 oxidized during the delivery time and operation intervals.

As described above, the electrical conductors 82 each have a flat rectangular cross section and are arranged in radial alignment with each other. The shape of each of the electrical conductors 82 is maintained by: covering the surface of each of the wires 86 forming the electrical conductor 82 with a self-fusing insulating layer; and having the self-fusing insulating layers of the wires 86 fused. As an alternative, the shape of each of the electrical conductors 82 may be maintained by: twisting together the wires 86 with or without self-fusing insulating layers respectively covering the surfaces thereof; and fixing the twisted wires 86 together in a desired shape using a synthetic resin. The thickness of the insulating coat 82b of each of the electrical conductors 82 may be set to be, for example, 80-100 μm and thus larger than the thicknesses of insulating coats of generally-used electrical conductors which are 5-40 μm. In this case, it is possible to ensure electrical insulation between the electrical conductors 82 and the stator core 52 without interposing insulating paper therebetween.

It is preferable for the insulating coats 82b of the electrical conductors 82 to be configured to have higher insulating performance than the insulating layers of the wires 86 and to be capable of making inter-phase insulation. For example, in the case of the polymer insulating layers of the wires 86 having a thickness of, for example, about 5 μm, it is preferable for the insulating coats 82b of the electrical conductors 82 to have a thickness of 80-100 μm, thereby securing suitable inter-phase insulation.

Moreover, each of the electrical conductors 82 may be constituted of a bundle of wires 86 that are bundled together without being twisted. That is, each of the electrical conductors 82 may have any one of a configuration where the wires 86 are twisted over the entire length of the electrical conductor 82, a configuration where the wires 86 are twisted for only part of the entire length of the electrical conductor 82 and a configuration where the wires 86 are bundled together without being twisted over the entire length of the electrical conductor 82. To sum up, each of the electrical conductors 82 forming the electrical conductor units is constituted of a wire bundle where a plurality of wires 86 are bundled together and the electrical resistances between the bundled wires 86 are higher than the electrical resistance of each of the wires 86.

The electrical conductors 82 are bent so as to be arranged in a predetermined pattern in the circumferential direction of the stator coil 51. Consequently, each phase winding of the stator coil 51 is formed. As shown in FIG. 12, straight portions 83 of the electrical conductors 82, each of which extends straight in the axial direction, together constitute the coil side part 53 of the stator coil 51; turn portions 84 of the electrical conductors 82, each of which protrudes from the coil side part 53 toward one side in the axial direction, together constitute the coil end 54 of the stator coil 51; turn portions 84 of the electrical conductors 82, each of which protrudes from the coil side part 53 toward the other side in the axial direction, together constitute the coil end 55 of the stator coil 51. Each of the electrical conductors 82 is configured as a wave-wound continuous electrical conductor where the straight portions 83 are formed alternately with the turn portions. The straight portions 83 of the electrical conductors 82 are located to radially face the magnet unit 42. Each pair of the straight portions 83, which belong to the same phase and are spaced at a predetermined interval in the circumferential direction, are connected with each other by one of the turn portions 84 on an axially outer side of the magnet unit 42. In addition, the straight portions 83 correspond to "magnet facing portions".

In the present embodiment, the stator coil 51 is wound in a distributed winding manner into an annular shape. In the coil side part 53 of the stator coil 51, for each phase, the straight portions 83 of each of the electrical conductors 82 belonging to the phase are arranged in the circumferential direction at intervals corresponding to one pole pair of the magnet unit 42. In the coil ends 54 and 55 of the stator coil 51, for each phase, the straight portions 83 of each of the electrical conductors 82 belonging to the phase are connected with one another by the substantially V-shaped turn portions 84 of the electrical conductor 82. For each pair of the straight portions 83 corresponding to one pole pair, the directions of electric currents respectively flowing in the straight portions 83 of the pair are opposite to each other. Moreover, those pairs of the straight portions 83 which are connected by the respective turn portions 84 in the coil end 54 are different from those pairs of the straight portions 83 which are connected by the respective turn portions 84 in the coil end 55. The connection of the straight portions 83 by the turn portions 84 in the coil ends 54 and 55 is repeated in the circumferential direction, forming the stator coil 51 into the substantially hollow cylindrical shape.

More specifically, each phase winding of the stator coil 51 is formed of two pairs of the electrical conductors 82. The first three-phase coil (U, V and W phases) and the second three-phase coil (X, Y and Z phases), which together constitute the stator coil 51, are provided in two radial layers. Let S be the number of phases of the stator coil 51 (i.e., 6 in the embodiment), and let m be the number of the electrical conductors 82 per phase. Then, the number of the electrical conductors 82 per pole pair is equal to 2×S×m=2 Sm. In the present embodiment, S is equal to 6, m is equal to 4, and the rotating electric machine has 8 pole pairs (or 16 poles). Accordingly, the total number of the electrical conductors 82 arranged in the circumferential direction of the stator core 52 is equal to 6×4×8=192.

As shown in FIG. 12, in the coil side part 53 of the stator coil 51, the straight portions 83 of the electrical conductors 82 are stacked in two radially-adjacent layers. In the coil ends 54 and 55 of the stator coil 51, for each radially-stacked pair of the straight portions 83 of the electrical conductors 82, those two turn portions 84 of the electrical conductors 82 which are respectively connected with the pair of the straight portions 83 extend respectively toward opposite sides in the circumferential direction. That is, for each radially-adjacent pair of the electrical conductors 82, the orientations of the turn portions 84 of one of the pair of the electrical conductors 82 are opposite to those of the turn portions 84 of the other of the pair of the electrical conductors 82 except for end portions of the stator coil 51.

Figure 15A:
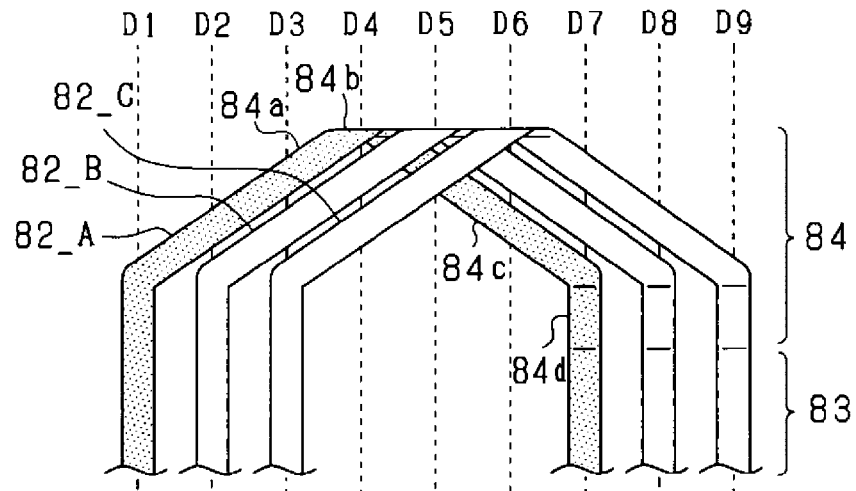
FIGS. 15(a) and 15(b) are diagrams illustrating the layout of electrical conductors at the nth layer.
Figure 15B:
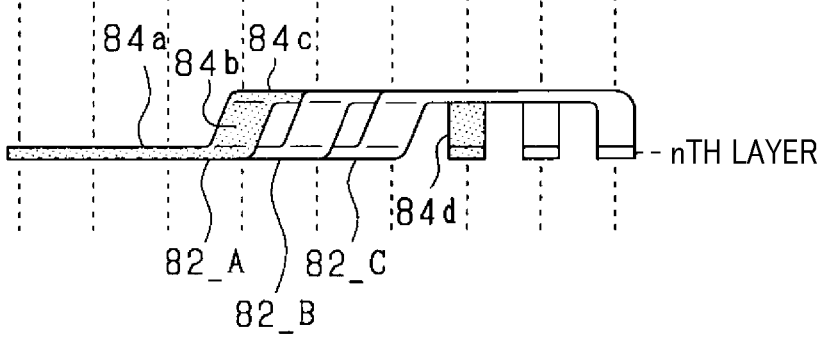

Hereinafter, the winding structure of the electrical conductors 82 forming the stator coil 51 will be described in more detail. In the present embodiment, the wave-shaped electrical conductors 82 are arranged in a plurality (e.g., two) of radially-adjacent layers. FIG. 15(a) and FIG. 15(b) together illustrate the layout of the electrical conductors 82 at the nth layer. Specifically, FIG. 15(a) shows the shapes of the electrical conductors 82 viewed from the radially outer side of the stator coil 51. FIG. 15(b) shows the shapes of the electrical conductors 82 viewed from one axial side of the stator coil 51. In FIG. 15(a) and FIG. 15(b), the positions at which the electrical conductor groups 81 are arranged are respectively designated by D1, D2, D3, . . . , and D9. Moreover, for the sake of convenience of explanation, there are illustrated only three electrical conductors 82, i.e., a first electrical conductor 82_A, a second electrical conductor 82_B and a third electrical conductor 82_C.

In each of the electrical conductors 82_A to 82_C, all the straight portions 83 are located at the nth layer, i.e., located at the same radial position. Each pair of the straight portions 83, which are circumferentially apart from each other by six positions (corresponding to 3×m pairs), is connected by one of the turn portions 84. More specifically, in each of the electrical conductors 82_A to 82_C, all of the seven straight portions 83 are arranged, on the same circle centering on the axis of the rotor 40, to be adjacent to one another in the circumferential direction of the stator coil 51. Moreover, each pair of ends of the straight portions 83 are connected by one of the turn portions 84. For example, in the first electrical conductor 82_A, two straight portions 83, which are arranged respectively at the positions D1 and D7, are connected by one turn portion 84 that has an inverted V-shape. The second electrical conductor 82_B is circumferentially offset from the first electrical conductor 82_A by one position at the same nth layer. The third electrical conductor 82_C is circumferentially offset from the second electrical conductor 82_B by one position at the same nth layer. In this case, since all the electrical conductors 82_A to 82_C are arranged at the same layer, the turn portions 84 of these electrical conductors may interfere with one another. Therefore, in the present embodiment, each of the turn portions 84 of the electrical conductors 82_A to 82_C has part thereof radially offset to form an interference prevention part.

Specifically, each of the turn portions 84 of the electrical conductors 82_A to 82_C is configured to include an oblique part 84a, an apex part 84b, an oblique part 84c and a return part 84d. The oblique part 84a circumferentially extends on the same circle (first circle). The apex part 84b extends from the oblique part 84a radially inward (i.e., upward in FIG. 15(b)) of the first circle to reach another circle (second circle). The oblique part 84c circumferentially extends on the second circle. The return part 84d returns from the second circle to the first circle. The apex part 84b, the oblique part 84c and the return part 84d together correspond to the interference prevention part. In addition, each of the turn portions 84 may alternatively be configured to have the oblique part 84c offset from the oblique part 84a radially outward.

That is, in each of the turn portions 84 of the electrical conductors 82_A to 82_C, the oblique part 84a and the oblique part 84c are located respectively on opposite sides of the apex part 84b that is circumferential centered in the turn portion 84. Moreover, the oblique part 84a and the oblique part 84c are different from each other in radial position (i.e., position in the direction perpendicular to the paper surface of FIG. 15(a); position in the vertical direction in FIG. 15(b)). For example, the turn portion 84 of the first electrical conductor 82_A first extends in the circumferential direction from the position D1 at the nth layer which is the start position, then is bent radially (e.g., radially inward) at the apex part 84b that is circumferentially centered in the turn portion 84, then is further bent circumferentially to extend again in the circumferential direction, and thereafter is bent radially (e.g., radially outward) at the return part 84d to reach to the position D7 at the nth layer which is the end position.

With the above configuration, the oblique parts 84a of the electrical conductors 82_A to 82_C are arranged from the upper side in the vertical direction in the order of the first electrical conductor 82_A, the second electrical conductor 82_B and the third electrical conductor 82_C. The arrangement order of the electrical conductors 82_A to 82_C is inverted at the apex parts 84b so that the oblique parts 84c of the electrical conductors 82_A to 82_C are arranged from the upper side in the vertical direction in the order of the third electrical conductor 82_C, the second electrical conductor 82_B and the first electrical conductor 82_A. Consequently, it becomes possible to arrange the electrical conductors 82_A to 82_C in the circumferential direction without causing interference therebetween.

Moreover, each of the electrical conductor groups 81 consists of a plurality of radially-stacked electrical conductors 82. For each of the electrical conductor groups 81, the turn portions 84 of the electrical conductors 82 of the group may be arranged more radially apart from each other than the straight portions 83 of the electrical conductors 82 are. Furthermore, in the case of the electrical conductors 82 of the same group being bent to the same radial side at the boundaries between the straight portions 83 and the turn portions 84, it is necessary to prevent electrical insulation from being degraded due to interference between the radially-adjacent electrical conductors 82.

Figure 16:
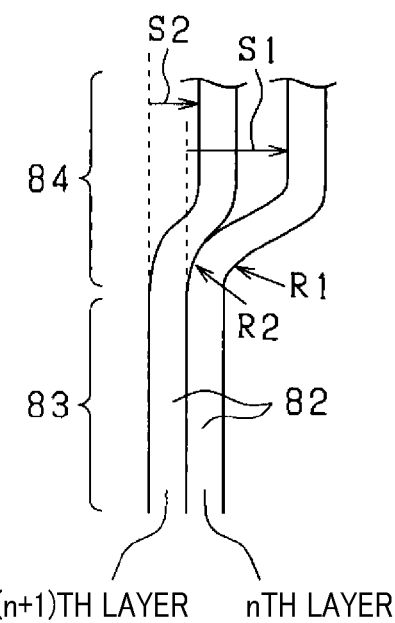
FIG. 16 is a side view illustrating electrical conductors at the nth layer and the (n+1)th layer.

For example, at the positions D7-D9 in FIG. 15(a) and FIG. 15(b), the radially-stacked electrical conductors 82 are bent radially at the return parts 84d of the respective turn portions 84 thereof. In this case, as shown in FIG. 16, the radius of curvature of the bend of the nth-layer electrical conductor 82 may be set to be different from the radius of curvature of the bend of the (n+1)th-layer electrical conductor 82. More specifically, the radius of curvature R1 of the radially inner (i.e., the nth layer) electrical conductor 82 may be set to be smaller than the radius of curvature R2 of the radially outer (i.e., the (n+1)th layer) electrical conductor 82.

Moreover, the amount of radial shift of the nth-layer electrical conductor 82 may be set to be different from the amount of radial shift of the (n+1)th-layer electrical conductor 82. More specifically, the amount of radial shift S1 of the radially inner (i.e., the nth layer) electrical conductor 82 may be set to be larger than the amount of radial shift S2 of the radially outer (i.e., the (n+1)th layer) electrical conductor 82.

With the above configuration, even with the radially-stacked electrical conductors 82 bent in the same direction, it is still possible to reliably prevent interference between the electrical conductors 82. Consequently, it is possible to ensure high insulation properties.

Next, the structure of the magnet unit 42 of the rotor 40 will be described in detail. In the present embodiment, the magnet unit 42 is constituted of permanent magnets whose residual flux density Br is higher than or equal to 1.0 [T] and intrinsic coercive force Hcj is higher than or equal to 400 [kA/m]. More particularly, in the present embodiment, the permanent magnets are implemented by sintered magnets that are obtained by shaping and solidifying a granular magnetic material by sintering. The intrinsic coercive force Hcj of the permanent magnets on the J-H curve is higher than or equal to 400 [kA/m], and the residual flux density Br of the permanent magnets is higher than or equal to 1.0 [T]. When 5000-10000[AT] is applied by interphase excitation, if the magnetic length of one pole pair, i.e., the magnetic length of one N pole and one S pole, in other words, the length of a magnetic flux flow path extending between one pair of N and S poles through the inside of the employed permanent magnets is equal to 25 [mm], Hcj is equal to 10000 [A] and thus the permanent magnets are not demagnetized.

In other words, the magnet unit 42 is configured so that: the saturation flux density Js is higher than or equal to 1.2 [T]; the grain size is smaller than or equal to 10 [μm]; and Js×α is higher than or equal to 1.0 [T], where a is the orientation ratio.

Hereinafter, supplemental explanation will be given of the magnet unit 42. The magnet unit 42 (i.e., magnets) is characterized in that 2.15 [T]≥Js≥1.2 [T]. In other words, as the magnets of the magnet unit 42, NdFe11TiN magnets, Nd2Fe14B magnets, Sm2Fe17N3 magnets or L10-type FeNi magnets may be employed. In addition, SmCo5 magnets which are generally called samarium-cobalt magnets, FePt magnets, Dy2Fe14B magnets and CoPt magnets cannot employed as the magnets of the magnet unit 42. On the other hand, magnets, which are formed of the same-type compounds, such as Dy2Fe14B and Nd2Fe14B, to have high coercive force of dysprosium that is a heavy rare-earth element while only slightly losing high Js characteristics of neodymium, may satisfy 2.15 [T]≥Js≥1.2 [T]. In this case, these magnets may be employed as the magnets of the magnet unit 42. In addition, these magnets may be referred to, for example, as [Nd1−xDyx]2Fe14B magnets. Furthermore, the magnets of the magnet unit 42 may be formed of two or more types of materials having different compositions, such as FeNi plus Sm2Fe17N3. For example, magnets, which are formed by adding a small amount of Dy2Fe14B whose Js is lower than 1 [T] to Nd2Fe14B whose Js is equal to 1.6 [T] to improve the coercive force, may be employed as the magnets of the magnet unit 42.

Moreover, in the case of the rotating electric machine being operated at a temperature outside the temperature range of human activities, such as a temperature higher than or equal to 60° C. exceeding the temperature of a desert, or being used as an electric motor in a vehicle where the temperature reaches 80° C. in summer, it is preferable for the magnets of the magnet unit 42 to contain a component having a low temperature coefficient, such as FeNi or Sm2Fe17N3. This is because when the rotating electric machine is operated in a temperature range from about −40° C. (within the temperature range of human activities in Northern Europe) to 60° C. or higher (exceeding the temperature of a desert) or to the heatproof temperature of coil enamel coats (e.g., 180-240° C.), the motor characteristics of the rotating electric machine in the motor operation depends greatly on the temperature coefficient of the magnets of the magnet unit 42; consequently, it becomes difficult to ensure optimal control with the same motor driver. The temperature coefficients of L10-type FeNi and Sm2Fe17N3 are lower than half the temperature coefficient of Nd2Fe14B. Therefore, forming the magnets of the magnet unit 42 with L10-type FeNi or Sm2Fe17N3, it is possible to effectively reduce the burden on the motor driver.

The magnet unit 42 is also characterized in that the grain size in a fine powder state before orientation is smaller than or equal to 10 μm and larger than or equal to the single-domain grain size. In general, the coercive force of magnets can be increased by reducing the size of the grains of the powder to the order of several hundred nanometers. Therefore, in recent years, powders have been used whose grains are reduced in size as small as possible. However, if the grain size was too small, the BH product of the magnets would be lowered due to, for example, oxidization. Therefore, it is preferable that the grain size is larger than or equal to the single-domain grain size. That is, to increase the coercive force, the grains of the powder may be reduced in size preferably to the extent that the grain size is not smaller than the single-domain grain size. In addition, the term "grain size" used hereinafter denotes the grain size in a fine powder state in an orientation step of the magnet manufacturing process.

Furthermore, each of first magnets 91 and second magnets 92 of the magnet unit 42 is implemented by a sintered magnet that is formed by sintering, i.e., heating and consolidating magnetic powder. The sintering is performed so as to satisfy the conditions that: the saturation magnetization Js of the magnet unit 42 is higher than or equal to 1.2 T; the grain size of the first and second magnets 91 and 92 is smaller than or equal to 10 μm; and Js×α is higher than or equal to 1.0 T (Tesla), where a is the orientation ratio. Moreover, each of the first and second magnets 91 and 92 is sintered so as to satisfy the following conditions as well. In the orientation step of the magnet manufacturing process, orientation is performed on the first and second magnets 91 and 92. Consequently, the first and second magnets 91 and 92 have the orientation ratio unlike the magnetic force direction defined by a magnetization step for isotropic magnets. In the present embodiment, the orientation ratio of the first and second magnets 91 and 92 is set to be so high as to satisfy Jr≥Js×α≥1.0 [T] with the saturation magnetization Js of the magnet unit 42 being higher than or equal to 1.2 [T]. For example, in the case of each of the first and second magnets 91 and 92 having six easy axes of magnetization, if five of the six easy axes are oriented in the same direction A10 and the remaining one is oriented in a direction B10 that is inclined by 90 degrees to the direction A10, then α=⅚. Otherwise, if the remaining easy axis is oriented in a direction B10 that is inclined by 45 degrees to the direction A10, then the component of the remaining easy axis in the direction A10 is equal to cos 45°=0.707 and thus α=(5+0.707)/6. As described previously, in the present embodiment, the first and second magnets 91 and 92 are formed by sintering. However, provided that the above conditions are satisfied, the first and second magnets 91 and 92 may alternatively be formed by other methods, such as a method of forming MQ3 magnets.

In the present embodiment, permanent magnets are employed whose easy axes of magnetization are controlled by orientation. Consequently, it becomes possible to increase the magnetic circuit length inside the magnets in comparison with the magnetic circuit length inside conventional linearly-oriented magnets of 1.0 [T] or higher. That is, it becomes possible to achieve the same magnetic circuit length per pole pair with a smaller volume of the magnets in comparison with conventional linearly-oriented magnets. Moreover, even if the permanent magnets are subjected to a severe high-temperature condition, it is still possible to maintain the reversible demagnetization range. Furthermore, the inventor of the present application has found a configuration with which it is possible to realize characteristics approximate to those of polar anisotropic magnets using conventional magnets.

In addition, an easy axis of magnetization denotes a crystal orientation in a magnet along which it is easy for the magnet to be magnetized. The orientation of easy axes of magnetization in a magnet is represented by the direction in which the orientation ratio is higher than or equal to 50%; the orientation ratio indicates the degree of alignment of the easy axes of magnetization. Otherwise, the orientation of easy axes of magnetization in a magnet is the direction which represents the average orientation of the magnet.

As shown in FIGS. 8 and 9, the magnet unit 42 is annular-shaped and arranged on the inner side of the magnet holder 41 (more specifically, on the radially inner side of the cylindrical portion 43). The magnet unit 42 is constituted of the first and second magnets 91 and 92 each of which is a polar anisotropic magnet. The polarity of the first magnets 91 is different from the polarity of the second magnets 92. The first magnets 91 are arranged alternately with the second magnets 92 in the circumferential direction. The first magnets 91 form N poles in the vicinity of the stator coil 51 while the second magnets 92 form S poles in the vicinity of the stator coil 51. The first and second magnets 91 and 92 are permanent magnets constituted of rare-earth magnets such as neodymium magnets.

As shown in FIG. 9, in each of the first and second magnets 91 and 92, the magnetization direction extends in an arc shape between the d-axis (i.e., direct-axis) and the q-axis (i.e., quadrature-axis) in the well-known d-q coordinate system. The d-axis represents the center of the magnetic pole while the q-axis represents the boundary between one pair of N and S poles (in other words, the magnetic flux density is 0 T on the q-axis). Moreover, in each of the first and second magnets 91 and 92, on the d-axis, the magnetization direction becomes coincident with a radial direction of the annular magnet unit 42; on the q-axis, the magnetization direction becomes coincident with the circumferential direction of the annular magnet unit 42. More specifically, as shown in FIG. 9, each of the first and second magnets 91 and 92 is configured to have a first part 250 and two second parts 260 located respectively on opposite sides of the first part 250 in the circumferential direction of the magnet unit 42. That is, the first portion 250 is located closer than the second parts 260 to the d-axis; the second portions 260 are located closer than the first part 250 to the q-axis. The magnet unit 42 is configured so that the direction of the easy axis of magnetization 300 of the first part 250 is more parallel than the direction of the easy axis of magnetization 310 of each of the second parts 260 to the d-axis. In other words, the magnet unit 42 is configured so that the angle θ11 between the d-axis and the easy axis of magnetization 300 of the first part 250 is smaller than the angle θ12 between the q-axis and the easy axis of magnetization 310 of each of the second parts 260.

More specifically, the angle θ11 is the angle between the d-axis and the easy axis of magnetization 300 with the direction from the stator 50 (or armature) toward the magnet unit 42 along the d-axis being defined as positive. The angle θ12 is the angle between the q-axis and the easy axis of magnetization 310 with the direction from the stator 50 toward the magnet unit 42 along the q-axis being defined as positive. In the present embodiment, both the angle θ11 and the angle θ12 are smaller than 90°. Here, each of the easy axes of magnetization 300 and 310 is defined as follows. In each of the parts of the magnets 91 and 92, in the case of one easy axis of magnetization being oriented in the direction A11 and another easy axis of magnetization being oriented in the direction B11, the absolute value of the cosine of an angle θ between the direction A11 and the direction B11 (i.e., |cos θ|) is defined as the easy axis of magnetization 300 or 310.

That is, in each of the first and second magnets 91 and 92, the direction of the easy axis of magnetization on the d-axis side (or in the d-axis-side part) is different from the direction of the easy axis of magnetization on the q-axis side (or in the q-axis-side parts). On the d-axis side, the direction of the easy axis of magnetization is close to a direction parallel the d-axis. In contrast, on the q-axis side, the direction of the easy axis of magnetization is close to a direction perpendicular to the q-axis. Consequently, arc-shaped magnetic paths are formed in the magnet along the direction of the easy axis of magnetization. In addition, in each of the first and second magnets 91 and 92, on the d-axis side, the easy axis of magnetization may be oriented to be parallel to the d-axis; on the q-axis side, the easy axis of magnetization may be oriented to be perpendicular to the q-axis.

Moreover, in each of the magnets 91 and 92, a stator-side peripheral surface 280 on the stator 50 side (i.e., lower side in FIG. 9) and end surfaces 270 on the q-axis side in the circumferential direction constitute magnetic flux acting surfaces through which magnetic flux flows into or out of the magnet. The magnetic paths are formed in the magnet to connect the magnetic flux acting surfaces (i.e., the stator-side peripheral surface 280 and the q-axis-side end surfaces 270) of the magnet.

Figure 17:
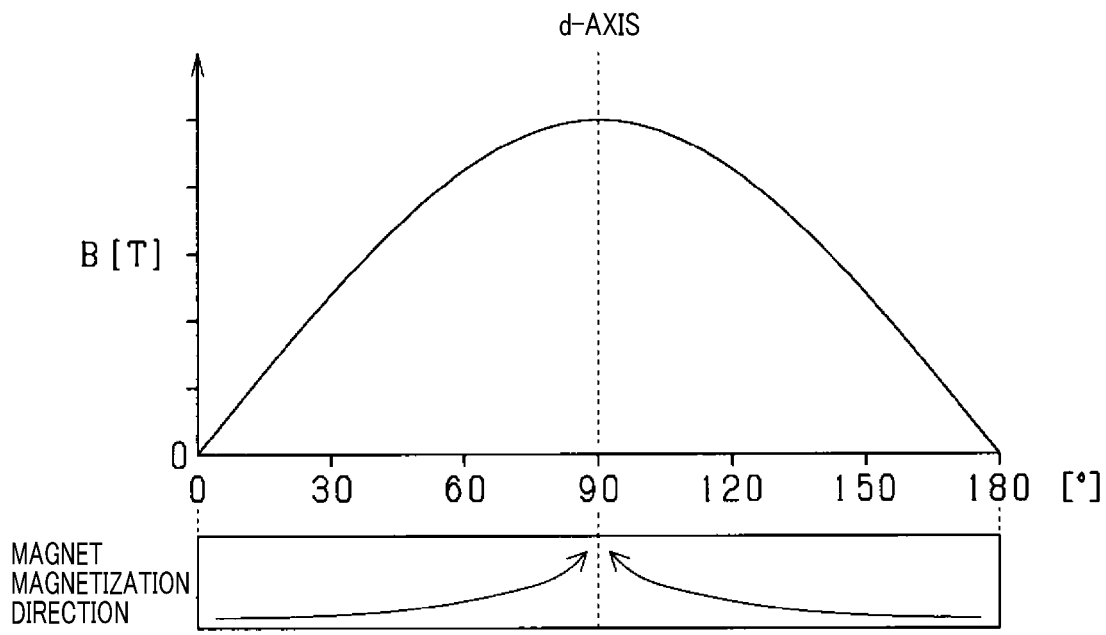
FIG. 17 is a diagram illustrating the relationship between electrical angle and magnetic flux density in magnets of an embodiment.
Figure 18:
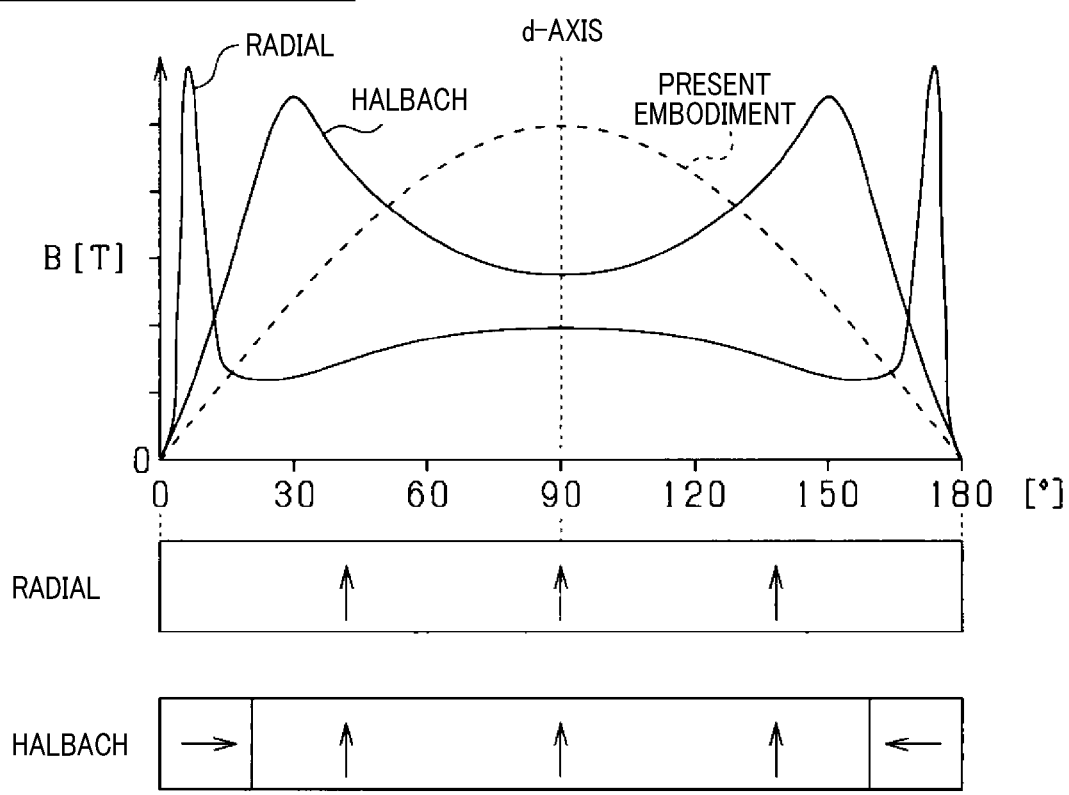
FIG. 18 is a diagram illustrating the relationship between electrical angle and magnetic flux density in magnets of comparative examples.

In the magnet unit 42, magnetic flux flows along the arc-shaped magnetic paths between the adjacent N and S poles, i.e., between the adjacent magnets 91 and 92. Therefore, the magnet magnetic paths are lengthened in comparison with the case of employing, for example, radial anisotropic magnets. Consequently, as shown in FIG. 17, the magnetic flux density distribution becomes approximate to a sine wave. As a result, as shown in FIG. 18, unlike the magnetic flux density distribution in a comparative example where radial anisotropic magnets are employed, it becomes possible to concentrate magnetic flux on the magnetic pole center side, thereby increasing the torque of the rotating electric machine 10. Moreover, it can be seen that the magnetic flux density distribution in the magnet unit 42 according to the present embodiment is also different from the magnetic flux density distribution in a comparison example where magnets are arranged in a conventional Halbach array. In addition, in each of FIGS. 17 and 18, the horizontal axis represents electrical angle and the vertical axis represents magnetic flux density; 90° on the horizontal axis represents the d-axis (i.e., the magnetic pole center) and 0° and 180° on the horizontal axis represent the q-axis.

Accordingly, with the configuration of the magnets 91 and 92 according to the present embodiment, the magnet magnetic flux on the d-axis is intensified and the magnetic flux change in the vicinity of the q-axis is suppressed. Consequently, it becomes possible to suitably realize the magnets 91 and 92 where the surface magnetic flux gradually changes from the q-axis to the d-axis in each magnetic pole.

The sine wave matching percentage of the magnetic flux density distribution may be, for example, 40% or higher. In this case, it is possible to reliably increase the amount of magnetic flux at the central portion of the waveform in comparison with the case of employing radial-oriented magnets and the case of employing parallel-oriented magnets. In the case of employing radial-oriented magnets, the sine wave matching percentage is about 30%. Moreover, setting the sine wave matching percentage to be higher than or equal to 60%, it is possible to reliably increase the amount of magnetic flux at the central portion of the waveform in comparison with the case of employing magnets arranged in a magnetic flux concentration array such as a Halbach array.

As shown in FIG. 18, in the comparative example where radial anisotropic magnets are employed, the magnetic flux density changes sharply in the vicinity of the q-axis. The sharp change in the magnetic flux density causes the amount of eddy current generated in the stator coil 51 to increase. Moreover, the magnetic flux on the stator coil 51 side also changes sharply. In contrast, in the present embodiment, the waveform of the magnetic flux density distribution is approximate to a sine wave. Consequently, the change in the magnetic flux density in the vicinity of the q-axis is gentler than in the comparative example where radial anisotropic magnets are employed. As a result, it becomes possible to suppress generation of eddy current.

In the magnet unit 42, in each of the magnets 91 and 92, in the vicinity of the d-axis (i.e., the magnetic pole center), magnetic flux is generated in a direction perpendicular to the magnetic flux acting surface 280 on the stator 50 side. The generated magnetic flux flows along the arc-shaped magnetic paths that extend away from the d-axis as they extend away from the magnetic flux acting surface 280 on the stator 50 side. Moreover, the closer the direction of the magnetic flux is to a direction perpendicular to the magnetic flux acting surface 280 on the stator 50 side, the stronger the magnetic flux is. In this regard, in the rotating electric machine 10 according to the present embodiment, the radial thickness of the electrical conductor groups 81 is reduced as described previously. Consequently, the radial center position of the electrical conductor groups 81 becomes closer to the magnetic flux acting surfaces of the magnet unit 42, thereby allowing the stator 50 to receive the stronger magnet magnetic flux from the rotor 40.

Furthermore, the stator 50 has the hollow cylindrical stator core 52 arranged on the radially inner side of the stator coil 51, i.e., on the opposite side of the stator coil 51 to the rotor 40. Therefore, the magnetic flux flowing out from the magnetic flux acting surfaces of the magnets 91 and 92 is attracted by the stator core 52 to circulate through the stator core 52 that constitutes part of the magnetic circuit. Consequently, it becomes possible to optimize the direction and paths of the magnet magnetic flux.

Next, a method of manufacturing the rotating electric machine 10, more particularly a process of assembling the bearing unit 20, the housing 30, the rotor 40, the stator 50 and the inverter unit 60 will be described with reference to FIG. 5. In addition, the inverter 60 includes the unit base 61 and the electrical components 62 as shown in FIG. 6. Therefore, the assembling process includes a step of assembling the unit base 61 and the electrical components 62. In the following explanation, the assembly of the stator 50 and the inverter unit 60 will be referred to as the first unit while the assembly of the bearing unit 20, the housing 30 and the rotor 40 will be referred to as the second unit.

The manufacturing method according to the present embodiment includes:
a first step of mounting the electrical components 62 to the radially inner periphery of the unit base 61;
a second step of mounting the unit base 61 to the radially inner periphery of the stator 50, thereby forming the first unit;
a third step of inserting the attaching portion 44 of the rotor 40 into the bearing unit 20 that has been assembled to the housing 30, thereby forming the second unit;
a fourth step of mounting the first unit to the radially inner periphery of the second unit; and
a fifth step of fastening the housing 30 and the unit base 61 to each other, wherein these steps are performed in the sequence of the first step→the second step→the third step→the fourth step→the fifth step.

With the above manufacturing method, the bearing unit 20, the housing 30, the rotor 40, the stator 50 and the inverter unit 60 are first assembled into a plurality of subassemblies and then the subassemblies are further assembled together to form the rotating electric machine 10. Consequently, it becomes possible to realize ease of handling and complete inspection for each unit, thereby making it possible build a suitable assembly line. As a result, it becomes possible to easily cope with multi-product production.

In the first step, a heat conducting member with high heat conductivity may be attached, for example by coating or bonding, to the radially inner periphery of the unit base 61 or the radially outer periphery of the electrical components 62. Then, the electrical components 62 may be mounted to the unit base 61 so that the heat conducting member is interposed between the radially inner periphery of the unit base 61 and the radially outer periphery of the electrical components 62. Consequently, with the heat conducting member, it is possible to more effectively transfer heat generated in the semiconductor modules 66 to the unit base 61.

In the third step, the insertion of the rotor 40 may be performed keeping coaxiality between the housing 30 and the rotor 40. Specifically, a jig may be used to position the outer circumferential surface of the rotor 40 (i.e., the outer circumferential surface of the magnet holder 41) or the inner circumferential surface of the rotor 40 (or the inner circumferential surface of the magnet unit 42) with respect to, for example, the inner circumferential surface of the housing 30. Then, the assembling of the housing 30 and the rotor 40 may be performed with either of the housing 30 and the rotor 40 sliding along the jig. Consequently, it is possible to assemble the heavy-weight components without imposing unbalanced load on the bearing unit 20. As a result, it is possible to ensure reliability of the bearing unit 20.

In the fourth step, the assembling of the first and second units may be performed keeping coaxiality between them. Specifically, a jig may be used to position the inner circumferential surface of the unit base 61 with respect to the inner circumferential surface of the attaching portion 44 of the rotor 40. Then, the assembling of the first and second units may be performed with either of them sliding along the jig. Consequently, it is possible to perform the assembling of the first and second units without causing interference between the rotor 40 and the stator 50 that are arranged with the minute air gap formed therebetween. As a result, it is possible to prevent detects, such as damage to the stator coil 51 or to the permanent magnets, from occurring during the assembling of the first and second units.

Alternatively, the above steps may be performed in the sequence of the second step→the third step→the fourth step→the fifth step→the first step. In this case, the delicate electrical components 62 are assembled to the other components of the rotating electric machine 10 in the final step.

Consequently, it is possible to minimize stress induced in the electrical components 62 during the assembly process.

Figure 19:
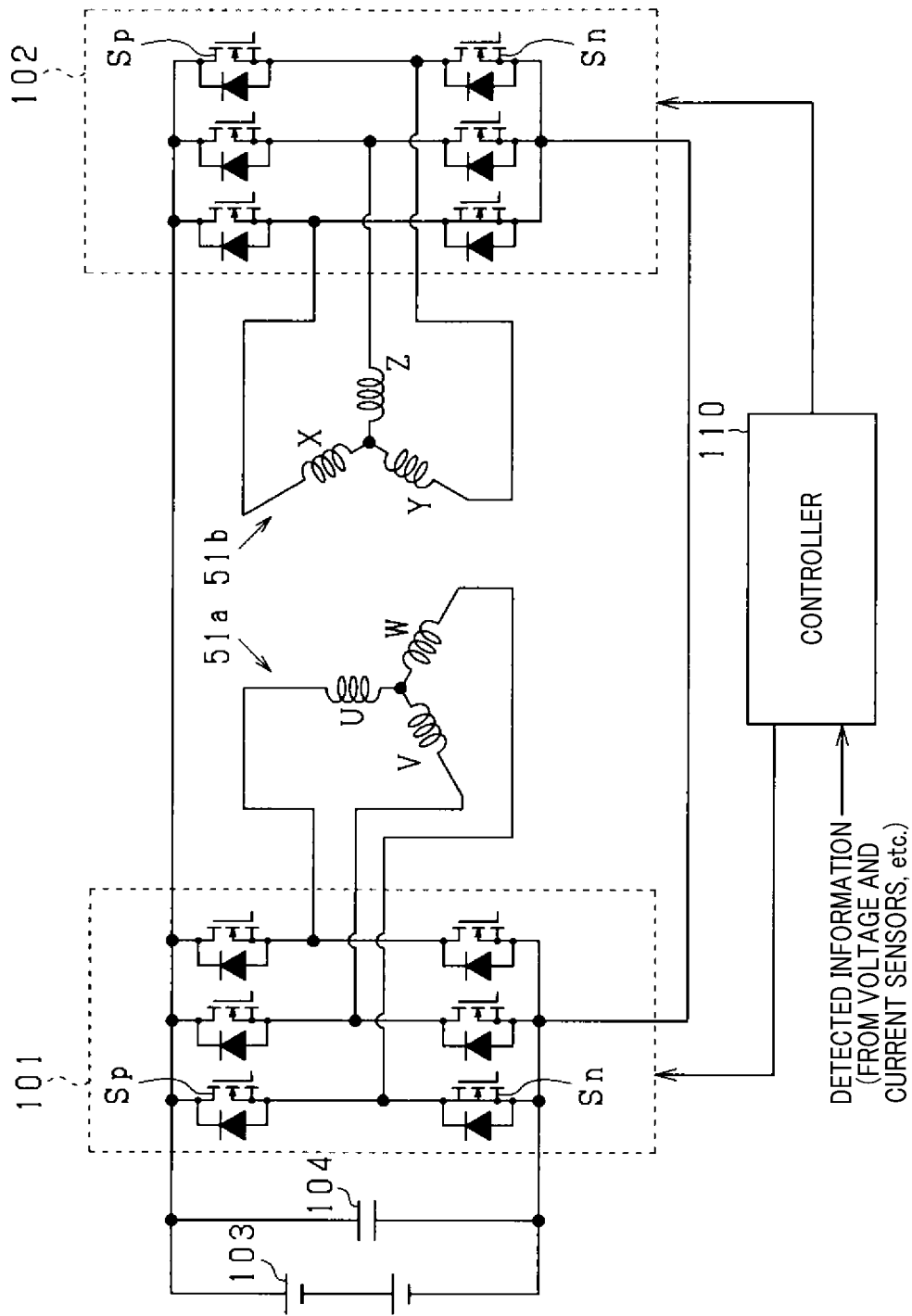
FIG. 19 is an electric circuit diagram of a control system of the rotating electric machine.
Figure 20:
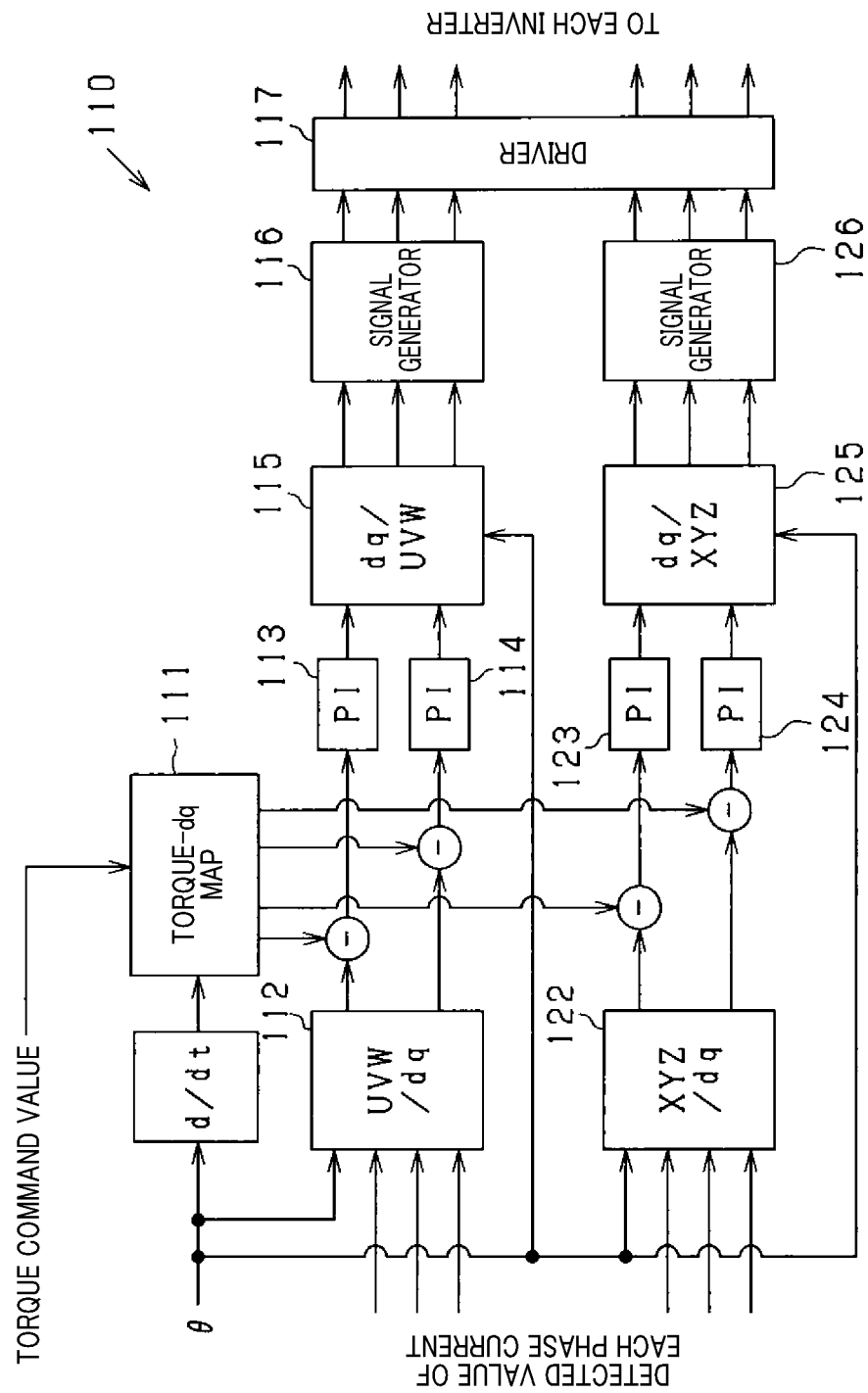
FIG. 20 is a functional block diagram illustrating a current feedback control process performed by a controller.

Next, the configuration of a control system for controlling the rotating electric machine 10 will be described. FIG. 19 is an electric circuit diagram of the control system of the rotating electric machine 10. FIG. 20 is a functional block diagram illustrating a current feedback control process performed by a controller 110 of the control system.

As shown in FIG. 19, the stator coil 51 is comprised of a pair of three-phase coils 51a and 51b. Moreover, the three-phase coil 51a is comprised of the U-phase, V-phase and W-phase windings and the three-phase coil 51b is comprised of the X-phase, Y-phase and Z-phase windings. In the control system, there are provided, as electric power converters, a first inverter 101 and a second inverter 102 respectively for the three-phase coils 51a and 51b. In each of the inverters 101 and 102, there is formed a full bridge circuit having a plurality of pairs of upper and lower arms. The number of pairs of the upper and lower arms in each of the inverters 101 and 102 is equal to the number of the phase windings of each of the three-phase coils 51a and 51b. Each of the upper and lower arms has a switch (or semiconductor switching element) provided therein. Electric current supplied to each phase winding of the stator coil 51 is regulated by turning on/off the switch of each of the upper and lower arms.

A DC power supply 103 and a smoothing capacitor 104 are connected in parallel to each of the inverters 101 and 102. The DC power supply 103 is implemented by, for example, an assembled battery that is obtained by connecting a plurality of battery cells in series with each other. In addition, each of the switches of the inverters 101 and 102 corresponds to one of the semiconductor modules 66 shown in FIG. 1. The smoothing capacitor 104 corresponds to the capacitor module 68 shown in FIG. 1.

The controller 110 includes a microcomputer which is configured with a CPU and various memories. Based on various types of detected information on the rotating electric machine 10 and power running drive and electric power generation requests, the controller 110 performs energization control by turning on and off the switches of the 101 and 102. The controller 110 corresponds to the controller 77 shown in FIG. 6. The detected information on the rotating electric machine 10 includes, for example, a rotation angle (or electrical angle information) of the rotor 40 detected by an angle detector such as a resolver, a power supply voltage (or inverter input voltage) detected by a voltage sensor, and phase currents detected by respective current sensors. The controller 110 generates and outputs operation signals for operating the switches of the inverters 101 and 102. In addition, in the case of the rotating electric machine 10 being used as a vehicular power source, the power generation request may be a regenerative drive request.

The first inverter 101 includes, for each of the U, V and W phases, one serially-connected unit consisting of an upper-arm switch Sp and a lower-arm switch Sn. A high potential-side terminal of the upper-arm switch Sp is connected to a positive terminal of the DC power supply 103. A low potential-side terminal of the lower-arm switch Sn is connected to a negative terminal of the DC power supply 103 (or ground). To an intermediate junction point between the upper-arm switch Sp and the lower-arm switch Sn, there is connected a first end of a corresponding one of the U-phase, V-phase and W-phase windings. The U-phase, V-phase and W-phase windings are star-connected (or Y-connected) to define a neutral point therebetween, at which second ends of these phase windings are connected with each other.

The second inverter 102 has a similar configuration to the first inverter 101. Specifically, the second inverter 102 includes, for each of the X, Y and Z phases, one serially-connected unit consisting of an upper-arm switch Sp and a lower-arm switch Sn. A high potential-side terminal of the upper-arm switch Sp is connected to the positive terminal of the DC power supply 103. A low potential-side terminal of the lower-arm switch Sn is connected to the negative terminal of the DC power supply 103 (or ground). To an intermediate junction point between the upper-arm switch Sp and the lower-arm switch Sn, there is connected a first end of a corresponding one of the X-phase, Y-phase and Z-phase windings. The X-phase, Y-phase and Z-phase windings are star-connected (or Y-connected) to define a neutral point therebetween, at which second ends of these phase windings are connected with each other.

FIG. 20 shows both the current feedback control process for controlling the U-phase, V-phase and W-phase currents and the current feedback control process for controlling the X-phase, Y-phase and Z-phase currents. First, the current feedback control process for the U-phase, V-phase and W-phase currents will be described.

In FIG. 20, a current command value setter 111 is configured to set, using a torque-dq map, both a d-axis current command value and a q-axis current command value on the basis of a power running torque command value or an electric power generation torque command value to the rotating electric machine 10 and an electrical angular speed ω obtained by differentiating the electrical angle θ with respect to time. In addition, the current command value setter 111 is provided for both control of the U-phase, V-phase and W-phase currents and control of the X-phase, Y-phase and Z-phase currents. In the case of the rotating electric machine 10 being used as a vehicular power source, the electric power generation torque command value is a regenerative torque command value.

A dq converter 112 is configured to convert current detected values (three phase currents), which are detected by the current sensors provided for respective phases, into d-axis current and q-axis current which are current components in a Cartesian two-dimensional rotating coordinate system whose d-axis indicates a field direction (or direction of an axis of a magnetic field).

A d-axis current feedback controller 113 is configured to calculate a d-axis command voltage as a manipulated variable for feedback-controlling the d-axis current to the d-axis current command value. A q-axis current feedback controller 114 is configured to calculate a q-axis command voltage as a manipulated variable for feedback-controlling the q-axis current to the q-axis current command value. These feedback controllers 113 and 114 are configured to calculate, using a PI feedback method, the command voltages on the basis of the differences of the d-axis current and the q-axis current from the respective current command values.

A three-phase converter 115 is configured to covert the d-axis and q-axis command voltages into U-phase, V-phase and W-phase command voltages. In addition, the above units 111-115 together correspond to a feedback controller for performing feedback control of fundamental currents by a dq conversion method. The U-phase, V-phase and W-phase command voltages are the feedback-controlled values.

An operation signal generator 116 is configured to generate, using a well-known triangular-wave carrier comparison method, the operation signals for the first inverter 101 on the basis of the U-phase, V-phase and W-phase command voltages. Specifically, the operation signal generator 116 generates the operation signals (or duty signals) for operating the upper-arm and lower-arm switches Sp and Sn of the U, V and W phases by PWM control based on comparison in amplitude between signals, which are obtained by normalizing the U-phase, V-phase and W-phase command voltages with the power supply voltage, and a carrier signal such as a triangular-wave signal.

For the X, Y and W phases, there is provided a configuration similar to the above-described configuration provided for the U, V and W phases. Specifically, a dq converter 122 is configured to convert current detected values (three phase currents), which are detected by the current sensors provided for respective phases, into d-axis current and q-axis current which are current components in the Cartesian two-dimensional rotating coordinate system whose d-axis indicates the field direction.

A d-axis current feedback controller 123 is configured to calculate a d-axis command voltage. A q-axis current feedback controller 124 is configured to calculate a q-axis command voltage. A three-phase converter 125 is configured to covert the d-axis and q-axis command voltages into X-phase, Y-phase and Z-phase command voltages. An operation signal generator 126 is configured to generate the operation signals for the second inverter 102 on the basis of the X-phase, Y-phase and Z-phase command voltages. Specifically, the operation signal generator 126 generates the operation signals (or duty signals) for operating the upper-arm and lower-arm switches Sp and Sn of the X, Y and Z phases by PWM control based on comparison in amplitude between signals, which are obtained by normalizing the X-phase, Y-phase and Z-phase command voltages with the power supply voltage, and a carrier signal such as a triangular-wave signal.

A driver 117 is configured to turn on and off the switches Sp and Sn of the inverters 101 and 102 based on the switch operation signals generated by the operation signal generators 116 and 126.

Next, a torque feedback control process will be described. This process is performed mainly for reducing losses and thereby increasing the output of the rotating electric machine 10 in operating conditions where the output voltages of the inverters 101 and 102 become high, such as in a high-rotation region and a high-output region. The controller 110 selectively performs either one of the torque feedback control process and the current feedback control process according to the operating condition of the rotating electric machine 10.

Figure 21:
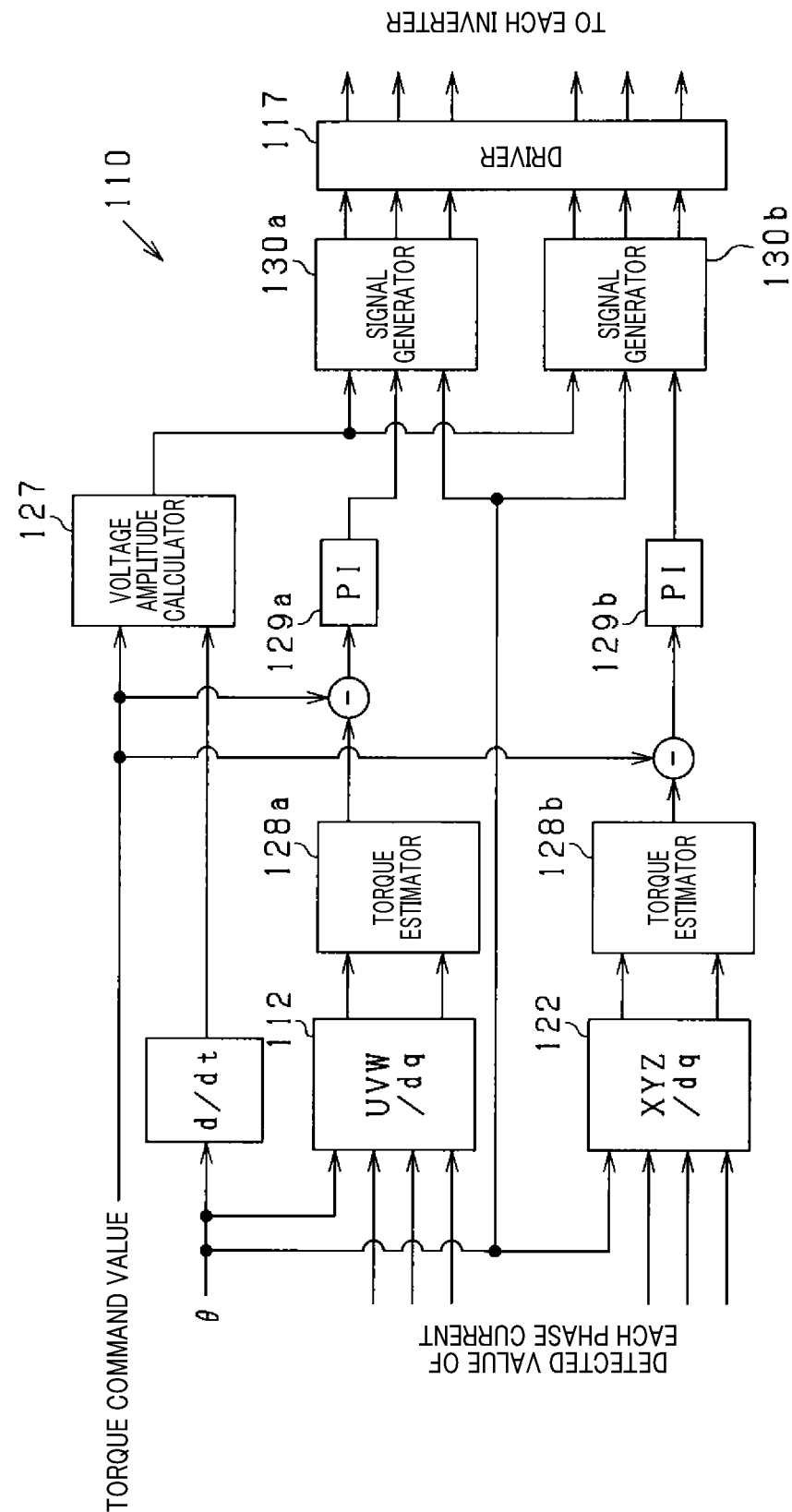
FIG. 21 is a functional block diagram illustrating a torque feedback control process performed by the controller.

FIG. 21 shows both the torque feedback control process corresponding to the U, V and W phases and the torque feedback control process corresponding to the X, Y and Z phases. In addition, in FIG. 21, functional blocks identical to those in FIG. 20 are designated by the same reference numerals as in FIG. 20 and descriptions of them will be omitted hereinafter. First, the torque feedback control process for the U, V and W phases will be described.

A voltage amplitude calculator 127 is configured to calculate a voltage amplitude command, which indicates a command value of the amplitudes of voltage vectors, on the basis of the power running torque command value or the electric power generation torque command value to the rotating electric machine 10 and the electrical angular speed ω obtained by differentiating the electrical angle θ with respect to time.

A torque estimator 128a is configured to calculate a torque estimated value corresponding to the U, V and W phases on the basis of the d-axis current and q-axis current obtained by the dq converter 112. In addition, the torque estimator 128a may calculate the voltage amplitude command on the basis of map information associating the d-axis and q-axis currents with the voltage amplitude command.

A torque feedback controller 129a is configured to calculate a voltage phase command, which indicates command values of the phases of the voltage vectors, as a manipulated variable for feedback-controlling the torque estimated value to the power running torque command value or the electric power generation torque command value. More specifically, the torque feedback controller 129a calculates, using a PI feedback method, the voltage phase command on the basis of the difference of the torque estimated value from the power running torque command value or the electric power generation torque command value.

An operation signal generator 130a is configured to generate the operation signals for the first inverter 101 on the basis of the voltage amplitude command, the voltage phase command and the electrical angle θ. Specifically, the operation signal generator 130a first calculates U-phase, V-phase and W-phase command voltages on the basis of the voltage amplitude command, the voltage phase command and the electrical angle θ. Then, the operation signal generator 130a generates the operation signals for operating the upper-arm and lower-arm switches Sp and Sn of the U, V and W phases by PWM control based on comparison in amplitude between signals, which are obtained by normalizing the calculated U-phase, V-phase and W-phase command voltages with the power supply voltage, and a carrier signal such as a triangular-wave signal.

In addition, as an alternative, the operation signal generator 130a may generate the switch operation signals on the basis of pulse pattern information, the voltage amplitude command, the voltage phase command and the electrical angle θ. The pulse pattern information is map information associating the switch operation signals with the voltage amplitude command, the voltage phase command and the electrical angle θ.

For the X, Y and W phases, there is provided a configuration similar to the above-described configuration provided for the U, V and W phases. Specifically, a torque estimator 128b is configured to calculate a torque estimated value corresponding to the X, Y and Z phases on the basis of the d-axis current and q-axis current obtained by the dq converter 122.

A torque feedback controller 129b is configured to calculate a voltage phase command as a manipulated variable for feedback-controlling the torque estimated value to the power running torque command value or the electric power generation torque command value. More specifically, the torque feedback controller 129b calculates, using a PI feedback method, the voltage phase command on the basis of the difference of the torque estimated value from the power running torque command value or the electric power generation torque command value.

An operation signal generator 130b is configured to generate the operation signals for the second inverter 102 on the basis of the voltage amplitude command, the voltage phase command and the electrical angle θ. Specifically, the operation signal generator 130b first calculates X-phase, Y-phase and Z-phase command voltages on the basis of the voltage amplitude command, the voltage phase command and the electrical angle θ. Then, the operation signal generator 130b generates the operation signals for operating the upper-arm and lower-arm switches Sp and Sn of the X, Y and Z phases by PWM control based on comparison in amplitude between signals, which are obtained by normalizing the calculated X-phase, Y-phase and Z-phase command voltages with the power supply voltage, and a carrier signal such as a triangular-wave signal. The driver 117 is configured to turn on and off the switches Sp and Sn of the inverters 101 and 102 based on the switch operation signals generated by the operation signal generators 130*a* and 130*b*.

In addition, as an alternative, the operation signal generator 130*b* may generate the switch operation signals on the basis of pulse pattern information, the voltage amplitude command, the voltage phase command and the electrical angle θ. The pulse pattern information is map information associating the switch operation signals with the voltage amplitude command, the voltage phase command and the electrical angle θ.

In the rotating electric machine 10, galvanic corrosion may occur in the bearings 21 and 22 due to generation of shaft current. For example, when energization of the stator coil 51 is switched by the switching operation, magnetic flux distortion may occur due to a slight switching-timing deviation (or unbalanced switching), causing galvanic corrosion to occur in the bearings 21 and 22 that support the rotating shaft 11. More specifically, the magnetic flux distortion, which occurs depending on the inductance of the stator 50, induces an axial electromotive force. Due to the axial electromotive force, electrical breakdown may occur in the bearings 21 and 22, allowing galvanic corrosion to progress therein.

Therefore, in the present embodiment, three galvanic corrosion countermeasures are taken which will be described hereinafter. As the first galvanic corrosion countermeasure, the inductance of the stator 50 is lowered with employment of the core-less structure and the magnet unit 42 is configured to make change in the magnet magnetic flux gentle. As the second galvanic corrosion countermeasure, the rotating shaft 11 is supported in a cantilever fashion by the bearings 21 and 22. As the third galvanic corrosion countermeasure, the annular stator coil 51 is molded, together with the stator core 52, in a molding material. Hereinafter, each of the three galvanic corrosion countermeasures will be described in more detail.

First, as the first galvanic corrosion countermeasure, the tooth-less structure is employed for the stator 50 so that no teeth are interposed between the circumferentially adjacent electrical conductor groups 81. Instead, the sealing member 57, which is formed of a nonmagnetic material, is interposed between the electrical conductor groups 81 (see FIG. 10). Consequently, it becomes possible to lower the inductance of the stator 50. Further, with reduction in the inductance of the stator 50, even if a switching-timing deviation occurs during energization of the stator coil 51, it is possible to suppress occurrence of magnetic flux distortion due to the switching-timing deviation. As a result, it is possible to suppress occurrence of galvanic corrosion in the bearings 21 and 22. In addition, the d-axis inductance is preferably lower than the q-axis inductance.

Moreover, each of the magnets 91 and 92 is configured to have the easy axis of magnetization oriented such that the direction of the easy axis of magnetization is more parallel to the d-axis on the d-axis side than on the q-axis side (see FIG. 9). Consequently, the magnet magnetic flux on the d-axis is intensified and the surface magnetic flux change (i.e., increase or decrease in the magnetic flux) from the q-axis to the d-axis becomes gentle in each magnetic pole. As a result, it becomes possible to suppress occurrence of sharp voltage change due to unbalanced switching, thereby contributing to suppression of galvanic corrosion.

As the second galvanic corrosion countermeasure, in the rotating electric machine 10, both the bearings 21 and 22 are arranged on one axial side of the axial center position of the rotor 40 (see FIG. 2). With this arrangement, it is possible to reduce the influence of galvanic corrosion in comparison with the case of bearings being arranged respectively on opposite axial sides of a rotor. More specifically, in the case of supporting a rotor by bearings arranged respectively on opposite axial sides of the rotor, with generation of high-frequency magnetic flux, a closed circuit may be formed which extends through the rotor, the stator and the bearings (i.e., the bearings arranged respectively on opposite axial sides of the rotor), causing galvanic corrosion to occur in the bearings due to shaft current. In contrast, in the present embodiment, with the rotor 40 supported in a cantilever fashion by the bearings 21 and 22, no closed circuit is formed in the rotating electric machine 10; consequently, occurrence of galvanic corrosion due to shaft current is suppressed.

Moreover, the rotating electric machine 10 has the following configuration for arranging both the bearings 21 and 22 on one axial side of the axial center position of the rotor 40. That is, in the intermediate portion 45 of the magnet holder 41 which radially projects, there is formed a contact prevention portion that extends in the axial direction to prevent contact with the stator 50 (see FIG. 2). Therefore, even if a closed circuit of shaft current is formed through the magnet holder 41, it is possible to increase the length of the closed circuit and thus the circuit resistance. Consequently, it is possible to more reliably suppress occurrence of galvanic corrosion in the bearings 21 and 22.

Furthermore, on one axial side of the rotor 40, the holding member 23 of the bearing unit 20 is fixed to the housing 30; on the other axial side of the rotor 40, the housing 30 and the unit base 61 (i.e., stator holder) are joined to each other (see FIG. 2). With this configuration, it becomes possible to suitably arrange both the bearings 21 and 22 on one side of the rotor 40 in the axial direction of the rotating shaft 11. Moreover, with this configuration, the unit base 61 is connected with the rotating shaft 11 via the housing 30. Consequently, it becomes possible to arrange the unit base 61 at a position electrically separated from the rotating shaft 11. In addition, interposing an insulating member, such as a resin member, between the unit base 61 and the housing 30, the unit base 61 and the rotating shaft 11 are further electrically separated from each other. Consequently, it is possible to more reliably suppress occurrence of galvanic corrosion in the bearings 21 and 22.

In the rotating electric machine 10 according to the present embodiment, the shaft voltage applied to the bearings 21 and 22 is lowered by the one-side arrangement of the bearings 21 and 22. Moreover, the electric potential difference between the rotor 40 and the stator 50 is reduced. Consequently, it becomes possible to reduce the electric potential difference acting on the bearings 21 and 22 without using electrically conductive grease in the bearings 21 and 22. In general, electrically conductive grease contains fine particles such as carbon, and thus may cause acoustic noise to occur. In this regard, in the present embodiment, non-electrically conductive grease is used in the bearings 21 and 22. Consequently, it becomes possible to suppress generation of acoustic noise in the bearings 21 and 22. In the case of the rotating electric machine 10 being used in, for example, an electrically-driven vehicle such as an electric vehicle, it is necessary to take countermeasures against acoustic noise. According to the present embodiment, it is possible to take suitable countermeasures against acoustic noise.

As the third galvanic corrosion countermeasure, the stator coil 51 is molded, together with the stator core 52, by a molding material, thereby suppressing displacement of the stator coil 51 in the stator 50 (see FIG. 11). In particular, in the rotating electric machine 10 according to the present embodiment, no inter-conductor members (i.e., no teeth) are interposed between the circumferentially adjacent electrical conductor groups 81 of the stator coil 51. Therefore, displacement of the stator coil 51 may occur. In this regard, molding the stator coil 51 together with the stator core 52, it becomes possible to suppress displacement of the electrical conductors forming the stator coil 51. Consequently, it becomes possible to suppress magnetic flux distortion due to displacement of the stator coil 51; thus it also becomes possible to suppress occurrence of galvanic corrosion in the bearings 21 and 22 due to magnetic flux distortion.

Moreover, the unit base 61, which serves as a housing member to fix the stator core 52, is formed of carbon fiber reinforced plastic (CFRP). Consequently, it becomes possible to suppress electric discharge to the unit base 61 in comparison the case of the unit base 61 being formed of aluminum or the like. As a result, it is possible to more reliably suppress occurrence of galvanic corrosion in the bearings 21 and 22.

In addition, as a further countermeasure for galvanic corrosion of the bearings 21 and 22, at least one of the outer and inner rings 25 and 26 of each of the bearings 21 and 22 may be formed of a ceramic material or an insulating sleeve may be provided outside the outer ring 25.

Hereinafter, other embodiments will be described focusing on the differences thereof from the first embodiment.

Second Embodiment

In the present embodiment, the polar anisotropic structure of the magnet unit 42 of the rotor 40 is modified in comparison with that described in the first embodiment. The polar anisotropic structure according to the present embodiment will be described in detail hereinafter.

Figure 22:
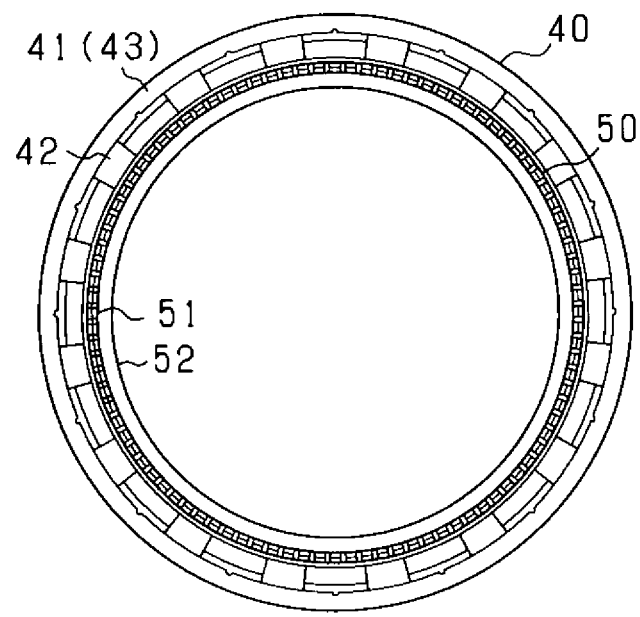
FIG. 22 is a transverse cross-sectional view of a rotor and a stator in a second embodiment.
Figure 23:
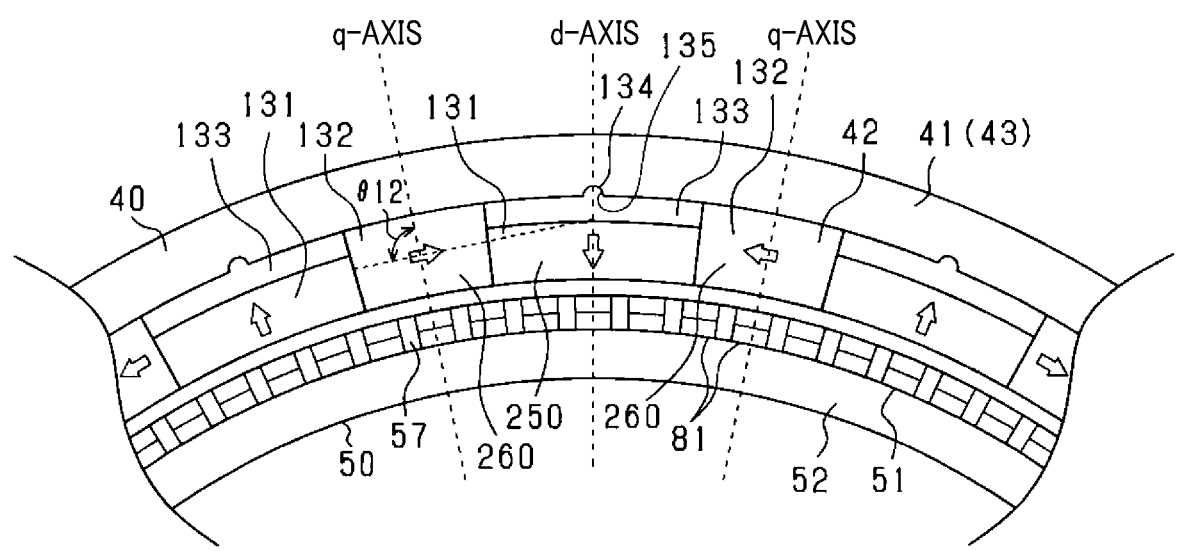
FIG. 23 is an enlarged view of part of FIG. 22.

As shown in FIGS. 22 and 23, in the present embodiment, the magnet unit 42 is configured with a magnet array called a Halbach array. Specifically, the magnet unit 42 includes first magnets 131 each having its magnetization direction (or the direction of the magnetization vector thereof) coincident with a radial direction and second magnets 132 each having its magnetization direction (or the direction of the magnetization vector thereof) coincident with the circumferential direction. The first magnets 131 are arranged at predetermined intervals in the circumferential direction. Each of the second magnets 132 is arranged between one circumferentially-adjacent pair of the first magnets 131. In addition, the first and second magnets 131 and 132 are permanent magnets constituted of rare-earth magnets such as neodymium magnets.

The first magnets 131 are arranged apart from one another in the circumferential direction so that on the side facing the stator 50 (i.e., the radially inner side), the polarities of the first magnets 131 alternate between N and S in the circumferential direction. Moreover, the second magnets 132 are arranged adjacent to the first magnets 131 in the circumferential direction so that the polarities of the second magnets 132 alternate in the circumferential direction. The cylindrical portion 43 is provided to surround the magnets 131 and 132. The cylindrical portion 43, which functions as a back core, may be formed of a soft-magnetic material. In the second embodiment, the relationship of the easy axes of magnetization of the magnet unit 42 to the d-axis and the q-axis on the d-q coordinate system is the same as in the first embodiment.

Moreover, magnetic members 133, each of which is formed a soft-magnetic material, are arranged on the radially outer side of the respective first magnets 131, on the side of the respective first magnets 131 facing the cylindrical portion 43 of the magnet holder 41. More specifically, the magnetic members 133 may be formed, for example, of a magnetic steel sheet, soft iron or green compact core material. The circumferential length of the magnetic members 133 is set to be equal to the circumferential length of the first magnets 131 (more specifically, the circumferential length of outer peripheral portions of the first magnets 131). In a state of each pair of the first magnets 131 and the magnetic members 133 being integrated into one piece, the radial thickness of the integrated piece is equal to the radial thickness of the second magnets 132. In other words, the radial thickness of the first magnets 131 is smaller than the radial thickness of the second magnets 132 by the radial thickness of the magnetic members 133. The first magnets 131, the second magnets 132 and the magnetic members 133 are fixed to one another by, for example, an adhesive. In the magnet unit 42, the radially outer side of the first magnets 131 is the opposite side to the stator 50. The magnetic members 133 are arranged on the opposite side of the first magnets 131 to the stator 50 (i.e., on the non-stator side of the first magnets 131).

On an outer peripheral portion of each of the magnetic members 133, there is formed a key 134 as a protrusion protruding radially outward, i.e., protruding toward the cylindrical portion 43 of the magnet holder 41. Moreover, in the inner circumferential surface of the cylindrical portion 43, there are formed keyways 135 as recesses for respectively receiving the keys 134 of the magnetic members 133. The protruding shape of the keys 134 conforms to the recessed shape of the keyways 135. The number of the keys 134 formed in the magnetic members 133 is equal to the number of the keyways 135 formed in the cylindrical portion 43. With engagement between the keys 134 and the keyways 135, the displacement of the first and second magnets 131 and 132 relative to the magnet holder 41 in the circumferential direction (or rotational direction) is suppressed. In addition, keys 134 and keyways 135 (i.e., protrusions and recesses) may be arbitrarily formed in the cylindrical portion 43 of the magnet holder 41 and the magnetic members 133. For example, as an alternative, each of the magnetic members 133 may have a keyway 135 formed in the outer peripheral portion thereof; on the inner circumferential surface of the cylindrical portion 43, there may be formed keys 134 to be respectively received in the keyways 135 of the magnetic members 133.

In the magnet unit 42 according to the present embodiment, with the alternate arrangement of the first magnets 131 and the second magnets 132, it becomes possible to increase the magnetic flux density in the first magnets 131. Consequently, it becomes possible to cause one-side concentration of magnetic flux to occur in the magnet unit 42, thereby intensifying magnetic flux on the side closer to the stator 50.

Moreover, with the magnetic members 133 arranged on the radially outer side, i.e., on the non-stator side of the first magnets 131, it becomes possible to suppress local magnetic saturation on the radially outer side of the first magnets 131; thus it becomes possible to suppress demagnetization of the first magnets 131 due to magnetic saturation. As a result, it becomes possible to increase the magnetic force of the magnet unit 42. That is, the magnet unit 42 according to the present embodiment can be regarded as being formed by replacing those portions of the first magnets 131 where it is easy for demagnetization to occur with the magnetic members 133.

Figure 24A:
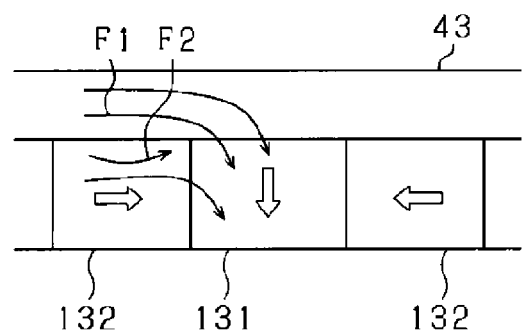
FIGS. 24(a) and 24(b) are diagrams illustrating flows of magnetic flux in magnet units.
Figure 24B:
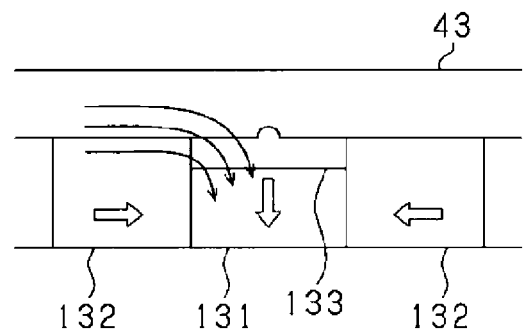

FIG. 24(*a*) and FIG. 24(*b*) illustrate flows of magnetic flux respectively in different magnet units 42. Specifically, FIG. 24(*a*) illustrates the flow of magnetic flux in a magnet unit 42 that has a conventional configuration without magnetic members 133. FIG. 24B illustrates the flow of magnetic flux in the magnet unit 42 according to the present embodiment which is configured to have the magnetic members 133. In addition, in FIG. 24(*a*) and FIG. 24(*b*), both the cylindrical portion 43 of the magnet holder 41 and the magnet unit 42 are developed to be straight in shape; the lower side corresponds to the stator side whereas the upper side corresponds to the non-stator side.

With the configuration shown in FIG. 24(*a*), the magnetic flux acting surfaces of the first magnets 131 and side surfaces of the second magnets 132 are arranged in contact with the inner circumferential surface of the cylindrical portion 43. Moreover, the magnetic flux acting surfaces of the second magnets 132 are arranged in contact with corresponding side surfaces of the first magnets 131. With the above arrangement, in the cylindrical portion 43, there is generated a resultant magnetic flux of magnetic flux F1, which flows through a magnetic path on the radially outer side of the second magnets 132 to enter the magnetic flux acting surfaces of the first magnets 131, and magnetic flux that flows substantially parallel to the cylindrical portion 43 and attracts magnetic flux F2 of the second magnets 132. Consequently, in the cylindrical portion 43, local magnetic saturation may occur in the vicinities of the contact surfaces between the first magnets 131 and the second magnets 132.

In contrast, with the configuration shown in FIG. 24(*b*), on the opposite side of the first magnets 131 to the stator 50, there are provided the magnetic members 133 between the magnetic flux acting surfaces of the first magnets 131 and the inner circumferential surface of the cylindrical portion 43, allowing magnetic flux to flow through the magnetic members 133. Consequently, it becomes possible to suppress occurrence of magnetic saturation in the cylindrical portion 43, thereby improving the resistance of the magnet unit 42 to demagnetization.

Moreover, with the configuration shown in FIG. 24(*b*), it is possible to eliminate, unlike in FIG. 24(*a*), the magnetic flux F2 which facilitates magnetic saturation. Consequently, it is possible to effectively improve the permeance of the entire magnetic circuit. Furthermore, it is possible to maintain the magnetic circuit characteristics even in a severe high-temperature condition.

In the present embodiment, the magnet magnetic paths through the inside of the magnets are lengthened in comparison with radial magnets in a conventional SPM rotor. Consequently, the magnet permanence is increased, thereby making it possible to increase the magnetic force and thus the torque. Moreover, the magnetic flux is concentrated on the center of the d-axis, thereby making it possible to increase the sine wave matching percentage. In particular, setting the electric current waveform, by PWM control, to be a sine wave or a trapezoidal wave or using 120° excitation switching ICs, it is possible to more effectively increase the torque.

In addition, in the case of the stator core 52 being formed of magnetic steel sheets, the radial thickness of the stator core 52 may be set to be larger than or equal to ½ of the radial thickness of the magnet unit 42. For example, the radial thickness of the stator core 52 may be set to be larger than or equal to ½ of the radial thickness of the first magnets 131 arranged on the magnetic pole centers in the magnet unit 42. Moreover, the radial thickness of the stator core 52 may be set to be smaller than the radial thickness of the magnet unit 42. In this case, since the magnet magnetic flux is about 1 [T] and the saturation flux density of the stator core 52 is equal to 2 [T], setting the radial thickness of the stator core 52 to be larger than or equal to ½ of the radial thickness of the magnet unit 42, it is possible to prevent magnetic flux leakage to the inner peripheral side of the stator core 52.

In magnets with a Halbach structure or a polar anisotropic structure, the magnetic paths are quasi-arc-shaped; therefore it is possible to increase magnetic flux in proportion to the thickness of those magnets which handle the circumferential magnetic flux. With such a configuration, it is considered that the magnetic flux flowing to the stator core 52 does not exceed the circumferential magnetic flux. That is, in the case of using an iron-based metal whose saturation flux density is 2 [T] with respect to the magnet magnetic flux being 1 [T], setting the thickness of the stator core 52 to be larger than or equal to half the thickness of the magnets, it is possible to suitably reduce both the size and weight of the rotating electric machine without causing magnetic saturation of the stator core 52. On the other hand, the magnet magnetic flux is generally lower than or equal to 0.9 [T] since a demagnetizing field from the stator 50 acts on the magnet magnetic flux. Therefore, setting the thickness of the stator core to be larger than or equal to half the thickness of the magnets, it is possible to suitably keep the permeability high.

Hereinafter, modifications will be described where the above-described configurations are partially modified.

First Modification

Figure 25:
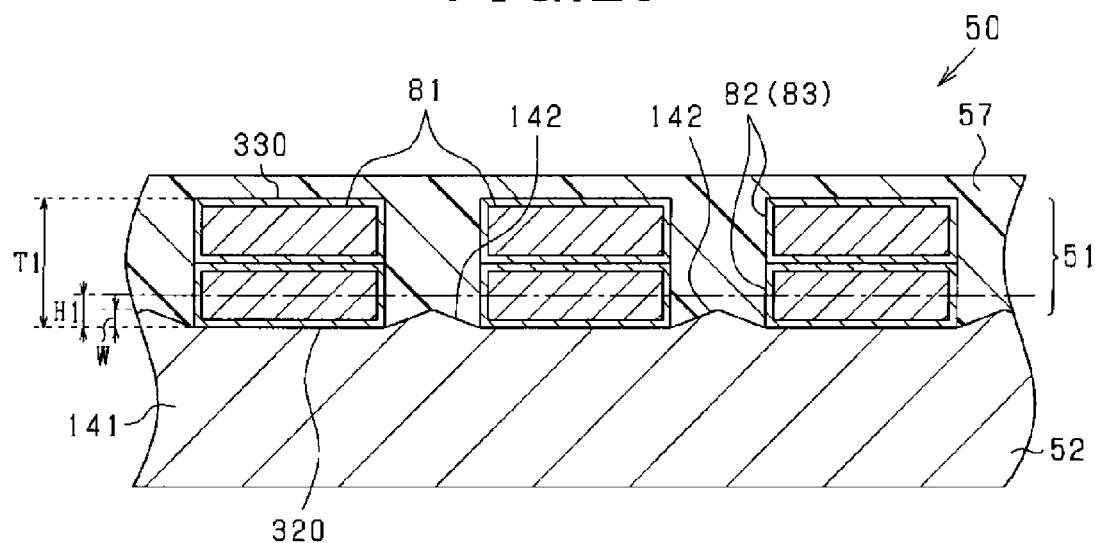
FIG. 25 is a cross-sectional view of a stator in a first modification.

In the above-described embodiments, the outer circumferential surface of the stator core 52 is configured as a smooth curved surface; on the outer circumferential surface of the stator core 52, the electrical conductor groups 81 are arranged at predetermined intervals. As an alternative, as shown in FIG. 25, the stator core 52 may include an annular yoke 141, which is located on the radially opposite side of the stator coil 51 to the rotor 40 (i.e., on the lower side of the stator coil 51 in the figure), and protrusions 142 each of which protrudes from the yoke 141 so as to be located between one circumferentially-adjacent pair of the straight portions 83. That is, the protrusions 142 are formed at predetermined intervals on the radially outer side, i.e., on the rotor 40 side of the yoke 141. The electrical conductor groups 81 forming the stator coil 51 engage with the protrusions 142 in the circumferential direction. That is, the protrusions 142 serve as positioning members for circumferential positioning the electrical conductor groups 81. In addition, the protrusions 142 also correspond to "inter-conductor members".

As shown in FIG. 25, the radial thickness of the protrusions 142 from the yoke 141, i.e., the distance W from inner side surfaces 320 of the straight portions 83, which adjoin the yoke 141, to the tops of the protrusions 142 in the radial direction of the yoke 141 is set to be smaller than ½ of the radial thickness of those of the straight portions 83 radially stacked in layers which radially adjoin the yoke 141 (i.e., smaller than H1 in the figure). In other words, the radial range corresponding to ¾ of T1 may be occupied by the nonmagnetic member (i.e., sealing member 57), where T1 is the dimension (or thickness) of the electrical conductor groups 81 (i.e., the conductive members) in the radial direction of the stator coil 51 (or the stator core 52) (twice the thickness of each of the electrical conductors 82, in other words, the minimum distance from the surfaces 320 of the electrical conductor groups 81 adjoining the stator core 52 to the surfaces 330 of the electrical conductor groups 81 facing the rotor 40). Limiting the thickness of the protrusions 142 as above, it becomes possible to prevent the protrusions 142 from functioning as teeth between the circumferentially-adjacent electrical conductor groups 81 (more specifically, the straight portions 83) and thus prevent magnetic paths from being formed by teeth. In addition, the protrusions 142 are not necessarily provided in all of the gaps formed between the circumferentially-adjacent electrical conductor groups 81. For example, as an alternative, there may be provided only one protrusion 142 which is located in the gap formed between one circumferentially-adjacent pair of the electrical conductor groups 81. As another alternative, there may be provided a plurality of protrusions 142 which are arranged at equal intervals in the circumferential direction so as to be respectively received in every predetermined number of the gaps formed between the circumferentially-adjacent electrical conductor groups 81. The shape of the protrusions 142 may be an arbitrary shape such as a rectangular or arc-like shape.

Moreover, on the outer circumferential surface of the stator core 52, the straight portions 83 may alternatively be provided in a single layer. Accordingly, in a broad sense, the radial thickness of the protrusions 142 from the yoke 141 may be set to be smaller than ½ of the radial thickness of each of the straight portions 83.

In addition, the protrusions 142 may be shaped so as to protrude from the yoke 141 within the range of an imaginary circle which centers on the axis of the rotating shaft 11 and extends through the radial center position of each of the straight portions 83 that radially adjoin the yoke 141. In other words, the protrusions 142 may be shaped so as not to protrude radially outside (i.e., to the rotor 40 side of) the imaginary circle.

With the above configuration, the radial thickness of the protrusions 142 is limited so that the protrusions 142 do not function as teeth between the circumferentially-adjacent straight portions 83. Consequently, it becomes possible to arrange the circumferentially-adjacent straight portions 83 closer to one another than in the case of providing teeth between the circumferentially-adjacent straight portions 83. As a result, it becomes possible to increase the cross-sectional area of each conductor body 82*a*, thereby reducing the amount of heat generated with energization of the stator coil 51. Moreover, since no teeth are provided in the stator 50, it is possible to prevent occurrence of magnetic saturation in the stator core 52, thereby making it possible to increase the energization current of the stator coil 51. In this case, however, it is possible to suitably cope with the problem that the amount of heat generated with energization of the stator coil 51 increases with the energization current. In addition, in the stator coil 51, each of the turn portions 84 has part thereof radially offset to form an interference prevention part. With the interference prevention parts of the turn portions 84, it becomes possible to arrange the turn portions 84 radially away from each other. Consequently, it becomes possible to improve heat dissipation at the turn portions 84. As above, it becomes possible to improve heat dissipation in the stator 50.

In addition, in the case of the yoke 141 of the stator core 52 being located away from the magnet unit 42 (i.e., the magnets 91 and 92) of the rotor 40 by a predetermined distance or more, the radial thickness of the protrusions 142 is not subjected to H1 shown in FIG. 25. Specifically, when the yoke 141 is located away from the magnet unit 42 by 2 mm or more, the radial thickness of the protrusions 142 may be set to be larger than H1. For example, when the radial thickness of each of the straight portions 83 is larger than 2 mm and each of the electrical conductor groups 81 consists of two radially-stacked electrical conductors 82, the protrusions 142 may be provided within a range from the yoke 141 to the radial center position of the straight portion 83 not adjoining the yoke 141, i.e., to the radial center position of the second electrical conductor 82 counting from the yoke 141. In this case, setting the radial thickness of the protrusions 142 to be not larger than (H1×3/2), it is possible to achieve the above-described advantageous effects by increasing the conductor cross-sectional area in the electrical conductor groups 81.

Figure 26:
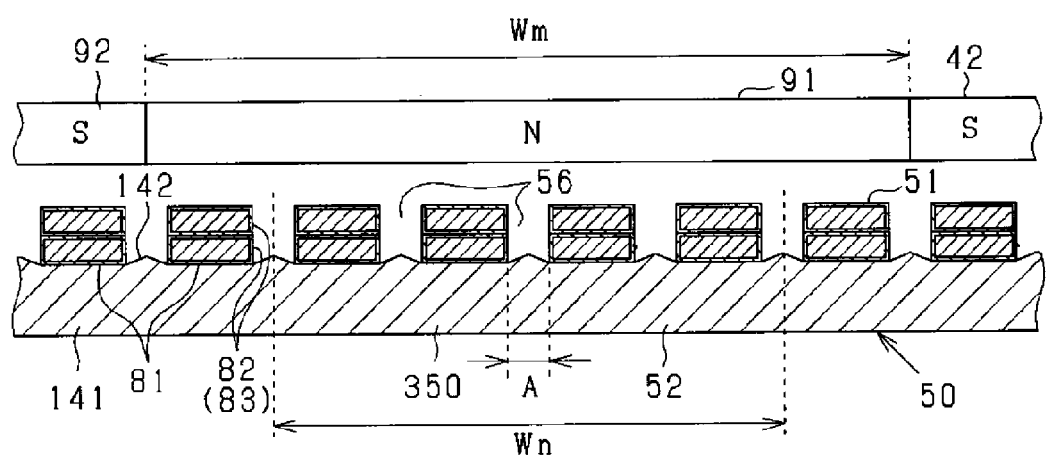
FIG. 26 is a cross-sectional view of another stator in the first modification.

Moreover, the stator core 52 may alternatively have a configuration as shown in FIG. 26. It should be noted that: the sealing resin 57 is omitted from FIG. 26; however, the sealing resin 57 may be included in the configuration shown in FIG. 26. In addition, in FIG. 26, for the sake of simplicity, both the magnet unit 42 and the stator core 52 are shown developed in a straight line.

In the configuration shown in FIG. 26, the stator 50 has, as the inter-conductor members, protrusions 142 each being formed between one circumferentially-adjacent pair of the electrical conductors 82 (i.e., the straight sections 83). The stator 50 also has a circumferentially-extending portion 350 that magnetically functions together with one magnetic pole (N or S pole) of the magnet unit 42 when the stator coil 51 is energized. The portion 350 has a circumferential length Wn. The protrusions 142 are formed of such a magnetic material as to satisfy the following relationship:

$$Wt \times Bs \leq Wm \times Br \qquad (1)$$

where Wt is the total width (i.e., the sum of circumferential widths) of the protrusions 142 present in the circumferential range of Wn, Bs is the saturation flux density of the protrusions 142, Wm is the circumferential width of each magnetic pole of the magnet unit 42 and Br is the residual flux density of the magnet unit 42.

In addition, the circumferential range Wn is set to include a plurality of circumferentially-adjacent electrical conductor groups 81 whose energization periods overlap each other. The references (or boundaries) in setting the range Wn may be preferably set to the centers of the gaps 56 formed between the electrical conductor groups 81. For example, in the configuration shown in FIG. 26, the circumferential range Wn is set to include four electrical conductor groups 81 located closest to the magnetic pole center of an N pole in the circumferential direction. The ends (start and end points) of the range Wn are respectively set to the centers of two of all the gaps 56 formed between the electrical conductor groups 81.

Moreover, in the configuration shown in FIG. 26, at each end of the range Wn, half of one protrusion 142 is included in the range Wn. Therefore, it can be considered that in the range Wn, there are included a total of four protrusions 142. Accordingly, the total width Wt of the protrusions 142 included in the range Wn can be calculated as follows: Wt=½A+A+A+A+½A=4A, where A is the width of each of the protrusions 142 (i.e., the dimension of each of the protrusions 142 in the circumferential direction of the stator 50, in other words, the interval between each adjacent pair of the electrical conductor groups 81).

Specifically, in the present embodiment, the three-phase coils of the stator coil 51 are wound in a distributed winding manner. In the stator coil 51, the number of the protrusions 142, i.e., the number of the gaps 56 formed between the electrical conductor groups 81 per magnetic pole of the magnet unit 42 is set to (number of phases×Q), where Q is the number of those of the electrical conductors 82 of each phase which are in contact with the stator core 52. In the case of the electrical conductors 82 being stacked in the radial direction of the rotor 40 to form the electrical conductor groups 81, Q is equal to the number of those electrical conductors 82 of the electrical conductor groups 81 of each phase which are located on the inner peripheral side in the electrical conductor groups 81. In this case, when the phase windings of the three-phase coils of the stator coil 51 are energized in a predetermined sequence, in each magnetic pole, the protrusions 142 corresponding to two phases are excited. Accordingly, in the range of each magnetic pole of the magnet unit 42, the total circumferential width Wt of the protrusions 142 that are excited by energization of the stator coil 51 is equal to (number of excited phases×Q×A=2×2×A), where A is the circumferential width of each of the protrusions 142 (or the circumferential width of each of the gaps 56).

Moreover, upon specifying the total width Wt as above, in the stator core 52, the protrusions 142 are formed of such a magnetic material as to satisfy the above relationship (1). In addition, the total width Wt is also equal to the circumferential width of that portion in each magnetic pole whose relative permeability may become higher than 1. Moreover, giving a margin, the total width Wt may be determined to be the circumferential width of the protrusions 142 in each magnetic pole. More specifically, since the number of the protrusions 142 per magnetic pole of the magnet unit 42 is equal to (number of phases×Q), the circumferential width (i.e., the total circumferential width Wt) of the protrusions 142 in each magnetic pole may be determined to be (number of phases×Q×A=3×2×A=6A).

In addition, the distributed winding manner is such that there is one pole pair of the stator coil 51 for each pole pair period of the magnetic poles (i.e., N and S poles). One pole pair of the stator coil 51 is constituted of two straight portions 83 where electric currents respectively flow in opposite directions and which are electrically connected with each other via one turn portion 84, and the one turn portion 84. Satisfying the above condition, a short pitch winding may be regarded as being equivalent to a full pitch winding wound in the distributed winding manner.

Next, examples of the stator coil 51 being wound in a concentrated winding manner will be illustrated. The concentrated winding manner is such that the width of each magnetic pole pair is different from the width of each pole pair of the stator coil 51. The examples include an example where three electrical conductor groups 81 are provided with respect to each magnetic pole pair, an example where three electrical conductor groups 81 are provided with respect to two magnetic pole pairs, nine electrical conductor groups 81 are provided with respect to four magnetic pole pairs, and an example where nine electrical conductor groups 81 are provided with respect to five magnetic pole pairs.

In the case of the stator coil 51 being wound in the concentrated winding manner, when the phase windings of the three-phase coils of the stator coil 51 are energized in a predetermined sequence, two of the phase windings are excited at the same time. Consequently, the protrusions 142 corresponding to the two exited phase windings are also excited. Accordingly, in the range of each magnetic pole of the magnet unit 42, the circumferential width Wt of the protrusions 142 that are excited by energization of the stator coil 51 is equal to (A×2). Moreover, upon specifying the width Wt as above, the protrusions 142 are formed of such a magnetic material as to satisfy the above relationship (1). In addition, in the case of the stator coil 51 being wound in the concentrated winding manner, the parameter A is represented by the sum of circumferential widths of the protrusions 142 in a region surrounded by the electrical conductor groups 81 of the same phase. Moreover, the parameter Wm is represented by (the entire circumference of the surface of the magnet unit 42 facing the air gap)×(number of phases) ÷(distribution number of the electrical conductor groups 81).

In the case of magnets whose BH products are higher than or equal to 20[MGOe (KJ/m$^3$)], such as neodymium magnets, samarium-cobalt magnets or ferrite magnets, Bd is higher than or equal to 1.0 [T]. In the case of iron, Br is higher than or equal to 2.0 [T]. Therefore, in the case of the rotating electric machine being configured as a high-output motor, in the stator core 52, the protrusions 142 may be formed of such a magnetic material as to satisfy the relationship of Wt<½×Wm.

Moreover, in the case of each of the electrical conductors 82 including an outer coat 182 as will be described later, the electrical conductors 82 may be arranged in the circumferential direction of the stator core 52 to have the outer coats 182 thereof in contact with one another. In this case, the parameter Wt may be considered to be equal to 0 or the sum of thicknesses of the outer coats 182 of two adjoining electrical conductors 82.

In the configurations shown in FIGS. 25 and 26, the inter-conductor members (i.e., the protrusions 142) are disproportionately small with respect to the magnet magnetic flux on the rotor 40 side. In addition, the rotor 40 is configured as a low-inductance and flat SPM rotor; thus the rotor 40 has no saliency in terms of magnetic reluctance. With these configurations, it is possible to lower the inductance of the stator 50. Further, with reduction in the inductance of the stator 50, it is possible to suppress occurrence of magnetic flux distortion due to a switching-timing deviation in the stator coil 51. As a result, it is possible suppress occurrence of galvanic corrosion in the bearings 21 and 22.

Second Modification

Figure 27:
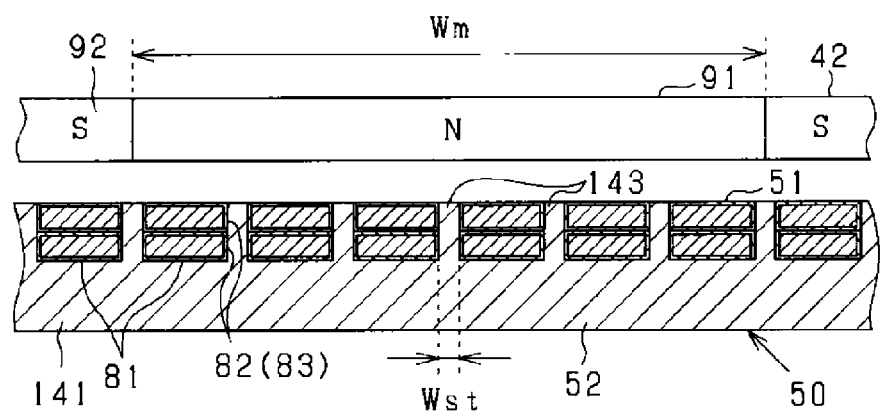
FIG. 27 is a cross-sectional view of a stator in a second modification.

The stator 50, which employs the inter-conductor members satisfying the above relationship (1), may alternatively have a configuration as shown in FIG. 27. In this configuration, tooth-shaped portions 143 are provided, as the inter-conductor members, on the outer circumferential surface (i.e., the upper surface in the figure) of the stator core 52. The tooth-shaped portions 143 each protrude from the yoke 141 and are arranged at predetermined intervals in the circumferential direction. The tooth-shaped portions 143 have a radial thickness equal to the radial thickness of the electrical conductor groups 81. Side surfaces of the tooth-shaped portions 143 are arranged to abut the electrical conductors 82 of the electrical conductor groups 81. Alternatively, there may be formed gaps between the tooth-shaped portions 143 and the electrical conductors 82 in the circumferential direction.

The tooth-shaped portions 143 are limited in circumferential width. That is, there are provided pole teeth (i.e., stator teeth) that are disproportionately thin with respect to the volume of the magnets. With this configuration, the tooth-shaped portions 143 can be reliably saturated by a magnet magnetic flux of 1.8 T or higher, thereby lowering the permeance and thus the inductance.

The magnetic flux on the magnet unit 42 side can be expressed as (Sm×Br), where Sm is the area of the stator-side magnetic flux acting surface per magnetic pole and Br is the residual flux density of the magnet unit 42. On the other hand, supposing that the tooth-shaped portions 143 corresponding to two phases are excited in each magnetic pole by energization of the stator coil 51, then the magnetic flux on the stator 50 side can be expressed as (St×m×2×Bs), where St is the area of the rotor-side surface of each tooth-shaped portion 143 and m is the number of the electrical conductors 82 per phase. In this case, the inductance can be lowered by limiting the dimensions of the tooth-shaped portions 143 so as to satisfy the following relationship:

$$St \times m \times 2 \times Bs < Sm \times Br \qquad (2)$$

In addition, in the case of the tooth-shaped portions 143 having the same axial dimension as the magnet unit 42, the above relationship (2) can be replaced with the following relationship:

$$Wst \times m \times 2 \times Bs < Wm \times Br \qquad (3)$$

where Wm is the circumferential width of the magnet unit 42 per magnetic pole and Wst is the circumferential width of each tooth-shaped portion 143.

More specifically, supposing that Bs=2 T, Br=1 T and m=2, the above relationship (3) can be reduced to the relationship of (Wst<Wm/8). In this case, the inductance can be lowered by setting the circumferential width Wst of each tooth-shaped portion 143 to be smaller than ⅛ of the circumferential width Wm of the magnet unit 42 per magnetic pole. In addition, in the case of m being equal to 1, the circumferential width Wst of each tooth-shaped portion 143 may be set to be smaller than ¼ of the circumferential width Wm of the magnet unit 42 per magnetic pole.

In addition, in the above relationship (3), (Wst×m×2) corresponds to the total circumferential width of the tooth-shaped portions 143 that are excited by energization of the stator coil 51 in the range of each magnetic pole of the magnet unit 42.

In the configuration shown in FIG. 27, the inter-conductor members (i.e., the tooth-shaped portions 143) are disproportionately small with respect to the magnet magnetic flux on the rotor 40 side as in the configurations shown in FIGS. 25 and 26. Consequently, it is possible to lower the inductance of the stator 50. Further, with reduction in the inductance of the stator 50, it is possible to suppress occurrence of magnetic flux distortion due to a switching-timing deviation in the stator coil 51. As a result, it is possible suppress occurrence of galvanic corrosion in the bearings 21 and 22.

Third Modification

Figure 28:
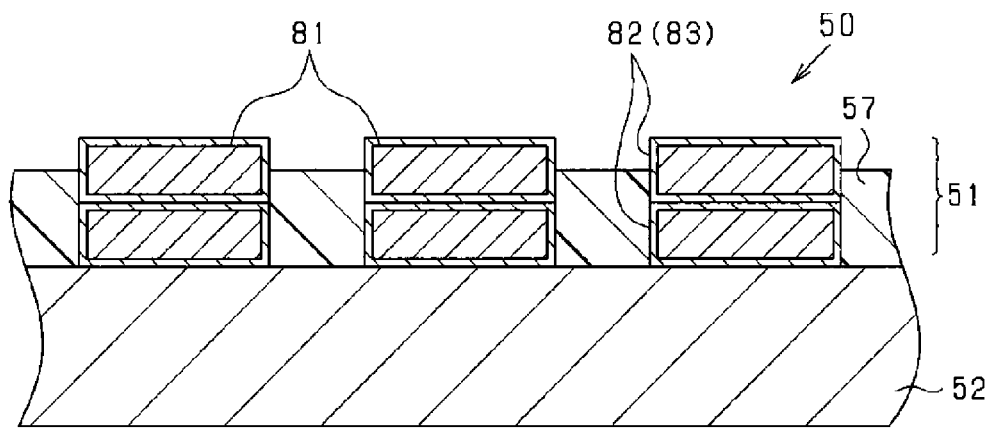
FIG. 28 is a cross-sectional view of a stator in a third modification.

In the above-described embodiments, the sealing member 57 is provided, on the radially outer side of the stator core 52, in a region covering all the electrical conductor groups 81, i.e., in a region whose radial thickness is larger than the radial thickness of each electrical conductor group 81. As an alternative, as shown in FIG. 28, the sealing member 57 may be provided so that the electrical conductors 82 are partially exposed from the sealing member 57. More specifically, those of the electrical conductors 82 which are arranged radially outermost in the electrical conductor groups 81 are partially exposed, on the radially outer side, i.e., on the rotor 40 side, from the sealing member 57. In this case, the radial thickness of the sealing member 57 may be set to be equal to or smaller than the radial thickness of each electrical conductor group 81.

Fourth Modification

Figure 29:
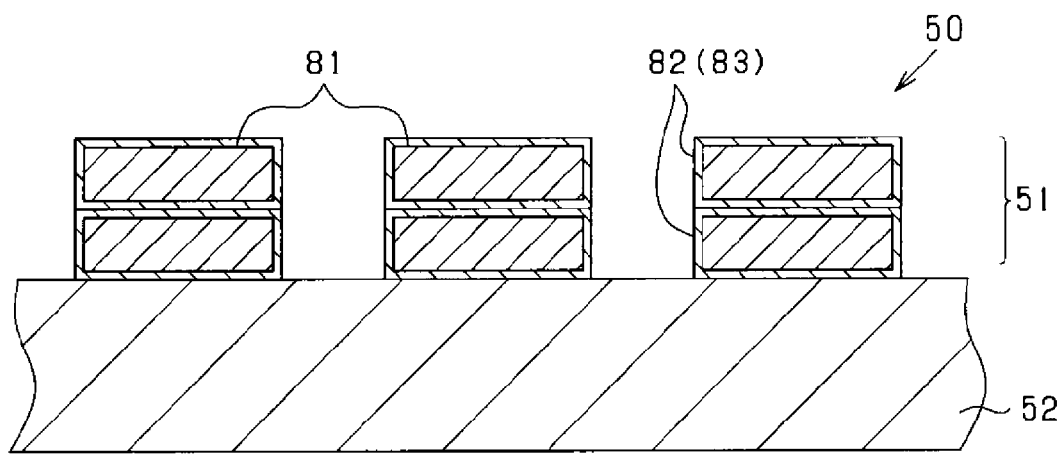
FIG. 29 is a cross-sectional view of a stator in a fourth modification.

As shown in FIG. 29, in the stator core 50, the electrical conductor groups 81 may not be sealed by any sealing member 57. That is, the stator core 50 may have no sealing member 57 employed therein to cover the stator coil 51. In this case, the gaps between the circumferentially-aligned electrical conductor groups 81 are not occupied by any inter-conductor members, remaining void. In other words, no inter-conductor members are provided between the circumferentially-aligned electrical conductor groups 81. In addition, air, which can be regarded as a nonmagnetic material or an equivalent of a nonmagnetic material satisfying Bs=0, may be filled in the gaps.

Fifth Modification

In the case of forming the inter-conductor members in the stator 50 with a nonmagnetic material, the nonmagnetic material may be implemented by a non-resin material, for example a nonmagnetic metal material such as SUS 304 which is an austenitic stainless steel.

Sixth Modification

The stator 50 may include no stator core 52. In this case, the stator 50 is configured with the stator coil 51 shown in FIG. 12. In addition, in the case of the stator 50 including no stator core 52, the stator coil 51 may be sealed with a sealing material. Alternatively, the stator 50 may include, instead of the stator core 52 formed of a soft-magnetic material, a stator coil holder that is annular in shape and formed of a nonmagnetic material such as a synthetic resin.

Seventh Modification

Figure 30:
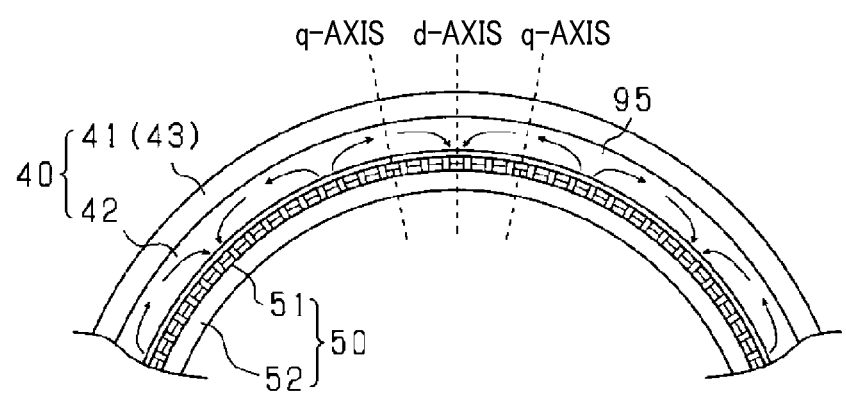
FIG. 30 is a transverse cross-sectional view of a rotor and a stator in a seventh modification.

In the first embodiment, the magnet unit 42 of the rotor 40 is configured with the plurality of magnets 91 and 92 arranged in the circumferential direction. As an alternative, the magnet unit 42 may be configured with an annular magnet which is a permanent magnet. Specifically, as shown in FIG. 30, the annular magnet 95 is fixed to the radially inner periphery of the cylindrical portion 43 of the magnet holder 41. In the annular magnet 95, there are formed a plurality of magnetic poles the polarities of which alternate between N and S in the circumferential direction. Moreover, both the d-axis and the q-axis are defined in the one-piece structured annular magnet 95. Furthermore, in the annular magnet 95, arc-shaped magnet magnetic paths are formed so as to be oriented in a radial direction at the d-axis in each of the magnetic poles and oriented in the circumferential direction at the q-axis between each adjacent pair of the magnetic poles.

In addition, in the annular magnet 95, arc-shaped magnet magnetic paths may be formed such that the easy axis of magnetization is oriented to be parallel to or near parallel to the d-axis in d-axis-side portions, and oriented to be perpendicular to or near perpendicular to the q-axis in q-axis-side portions.

Eighth Modification

In this modification, part of the structure of the magnet unit 42 is modified. Accordingly, the differences of this modification from the above-described first embodiment will be mainly described.

Figure 31:
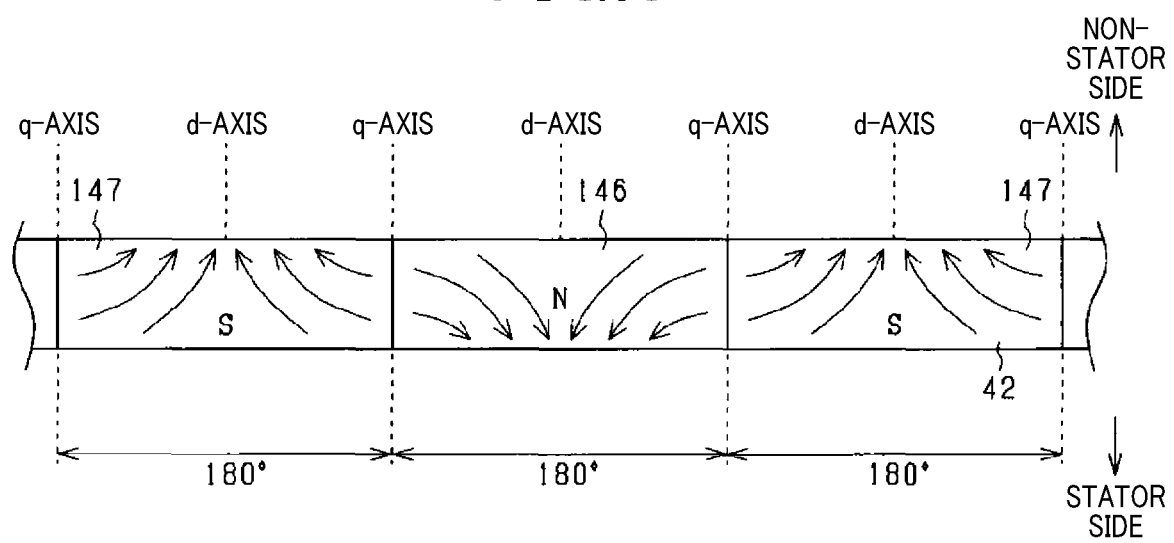
FIG. 31 is a cross-sectional view of part of a magnet unit in an eighth modification.

As shown in FIG. 31, the magnet unit 42 includes first magnets 146 and second magnets 147. The first magnets 146 are arranged at predetermined intervals in the circumferential direction and each constitute one magnetic pole. Each of the second magnets 147 is arranged between one circumferentially-adjacent pair of the first magnets 146 and constitutes one magnetic pole. The polarities (e.g., N) of the first magnets 146 are different from the polarities (e.g., S) of the second magnets 147. In addition, FIG. 31 is a developed view the magnet unit 42 along the circumferential direction.

Each of the first magnets 146 and the second magnets 147 is a permanent magnet constituted of a rare-earth magnet such as a neodymium magnet. These magnets have a residual flux density Br higher than or equal to 1.0 [T] and an intrinsic coercive force Hcj higher than or equal to 400 [kA/m].

Each of the first magnets 146 is oriented to form a magnet magnetic path such that the closer the position to the d-axis, the more the direction of the easy axis of magnetization becomes parallel to the d-axis. Each of the second magnets 147 is also oriented to form a magnet magnetic path such that the closer the position to the d-axis, the more the direction of the easy axis of magnetization becomes parallel to the d-axis. In the present embodiment, in each of the first magnets 146 and the second magnets 147, the orientation direction extends in an arc shape. The q-axis is represented by straight lines each of which extends through both the interface between one adjacent pair of the first and second magnets 146 and 147 and the axis of the rotating shaft 11.

Figure 32:
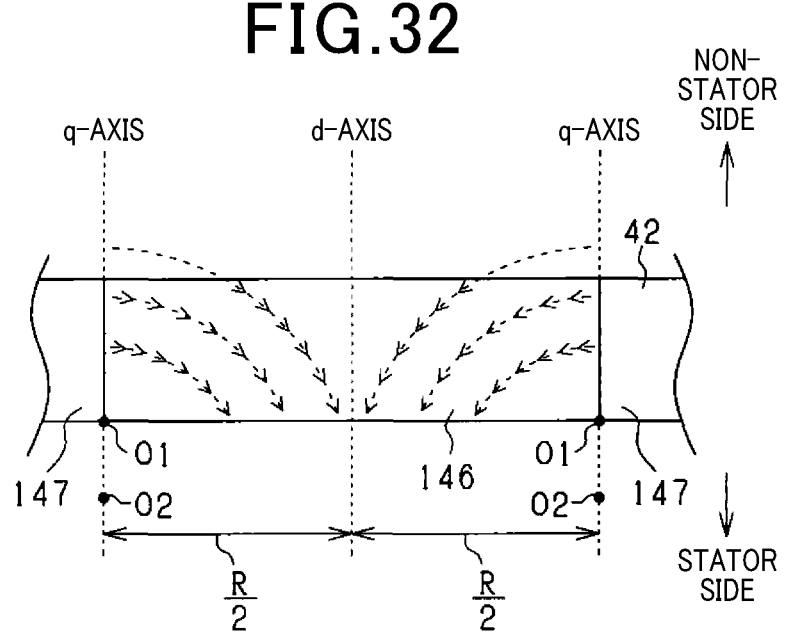
FIG. 32 is a diagram illustrating an example of a magnet orientation method.

Referring to FIG. 32, an exemplary magnet orientation method will be described. In the present embodiment, the orientation method of the first magnets 146 and the orientation method of the second magnets 147 are the same. Therefore, the orientation method will be described hereinafter by taking only the first magnets 146 as an example. FIG. 32 is a developed view of the first and second magnets 146 and 147 along the circumferential direction. In FIG. 32, R represents one magnetic pole pitch of the magnet unit 42; O1 represents first center points which denote the intersection points between the surface of the magnet unit 42 facing the stator 50 and the q-axis; and O2 represents second center points which denote points offset respectively from the first center points O1 to the stator 50 side in a direction parallel to the d-axis. In each of the first magnets 146, the orientation direction is set such that easy axes of magnetization are aligned in an arc shape along orientation circles which center on the respective second center points O2 and whose diameter is equal to R.

Figure 33:
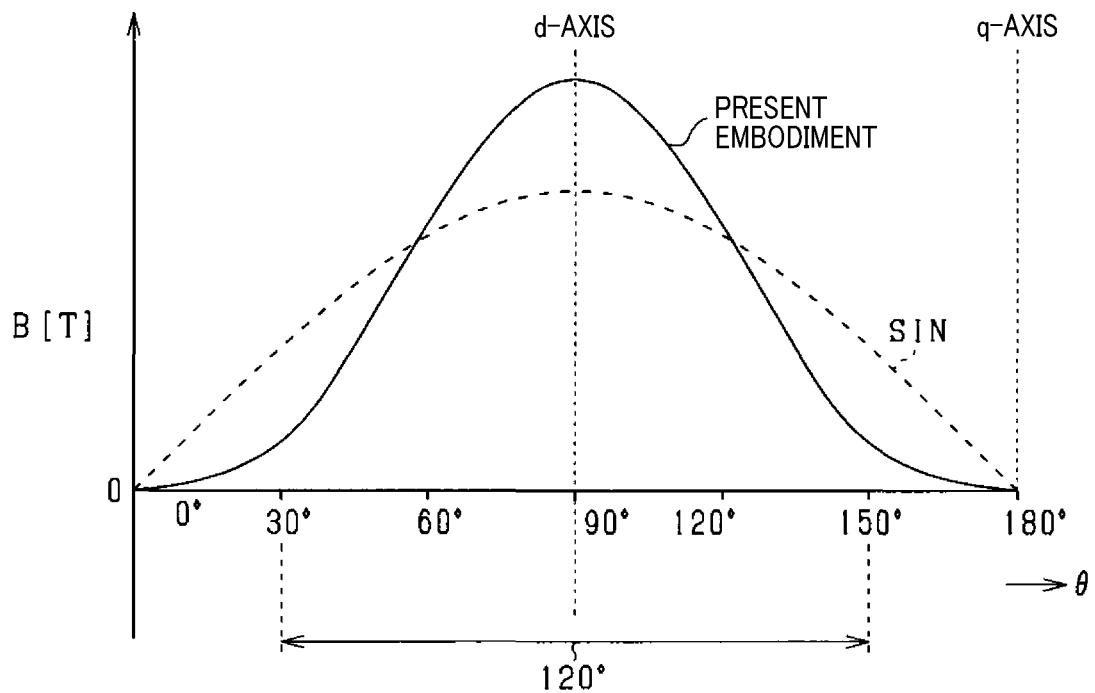
FIG. 33 is a diagram illustrating the magnetic flux density waveform of the magnet unit.

With the above configuration including the first magnets 146 and the second magnets 147, it becomes possible to make the waveform of the surface magnetic flux density of the magnet unit 42 approximate to a sine wave, as shown with a solid line in FIG. 33. As a result, it becomes possible to have the waveform of the magnetic flux density of the magnet unit 42 in an electrical angular range corresponding to one magnetic pole concentrated within an electrical angular range of 120° into a convex shape. Consequently, it becomes possible to increase the torque of the rotating electric machine 10. Moreover, it also becomes possible to make change in the magnet magnetic flux gentler, thereby reducing the eddy current loss. In addition, FIG. 33 illustrates change in the magnetic flux density B with electrical angle θ.

In addition, if the waveform of the magnetic flux density of the magnet unit 42 in the electrical angular range corresponding to one magnetic pole was distributed considerably over the electrical angular range of 120°, the torque-increasing effect would be lowered. The reason will be described hereinafter with reference to FIG. 34. In FIG. 34, MAG designates a magnetic flux-concentrated portion of the waveform of the magnetic flux density of each of the first magnets 146; and θL represents the electrical angular range of the magnetic flux-concentrated portion.

Figure 34A:
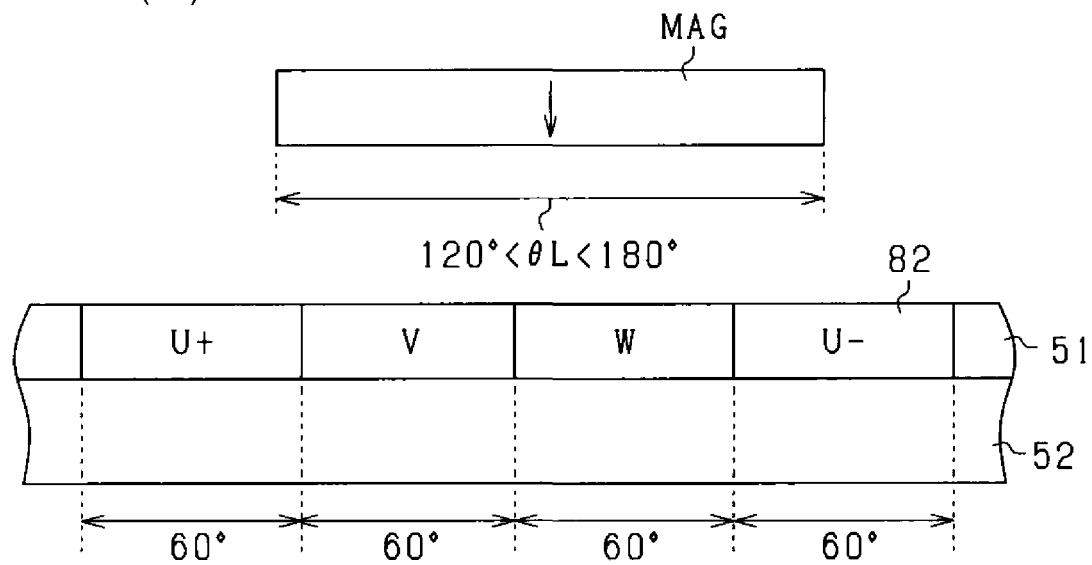
FIGS. 34(a) and 34(b) are diagrams illustrating the relationship between a magnetic flux-concentrated portion of a magnet and a stator coil.
Figure 34B:
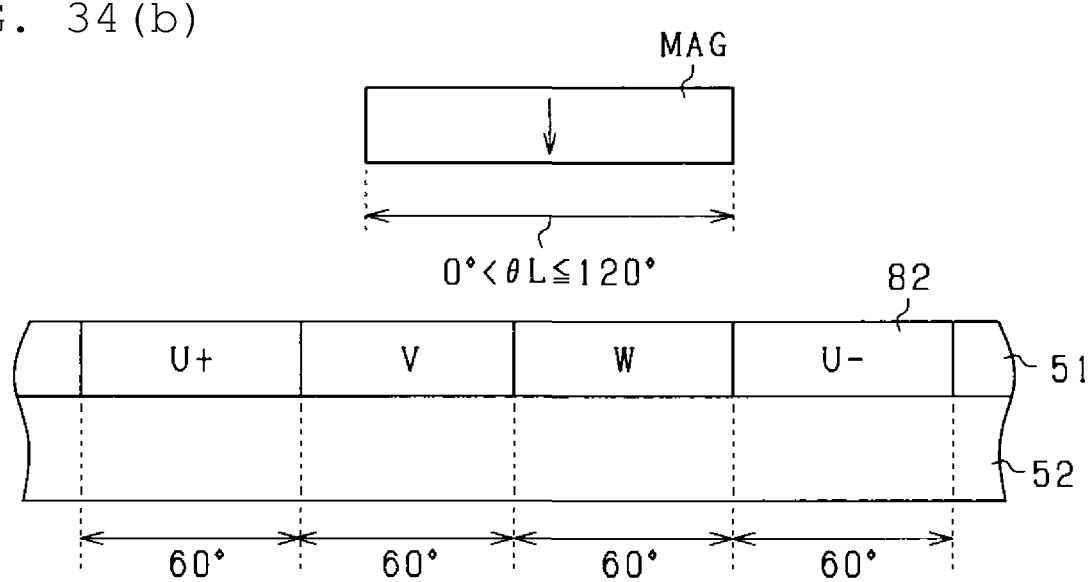

If the waveform of the magnetic flux density was distributed considerably over the electrical angular range of 120°, as shown in FIG. 34(a), the magnet magnetic flux of the magnetic flux-concentrated portion would cross the circumferentially-adjacent electrical conductors 82 of the same phase at the same time. FIG. 34(a) illustrates an example where the magnet magnetic flux crosses the circumferentially-adjacent U-phase electrical conductors 82 at the same time. The polarities of magnetic fluxes generated with energization of the electrical conductors 82 are different between the circumferentially-adjacent electrical conductors 82 of the same phase. Therefore, upon the magnet magnetic flux of the magnetic flux-concentrated portion crossing the circumferentially-adjacent electrical conductors 82 of the same phase at the same time, part of the magnetic flux of the first magnet 146 would be canceled, thereby lowering the amount of magnetic flux of the magnet unit 42. As a result, the effect of increasing the torque of the rotating electric machine 10 would be lowered. In contrast, as shown in FIG. 34(b), with the waveform of the magnetic flux density concentrated within the electrical angular range of 120°, it becomes possible to prevent the above problems from occurring. Consequently, it becomes possible to improve the effect of increasing the torque of the rotating electric machine 10.

Next, control of a controlled variable of the rotating electric machine 10 will be described with reference to FIGS. 35 and 36. In the present embodiment, the controlled variable is, for example, the torque or the rotational speed of the rotating electric machine 10. In addition, the control in the first inverter 101 and the control in the second inverter 102 are the same. Therefore, the control in the first inverter 101 will be mainly described hereinafter.

Figure 35A:
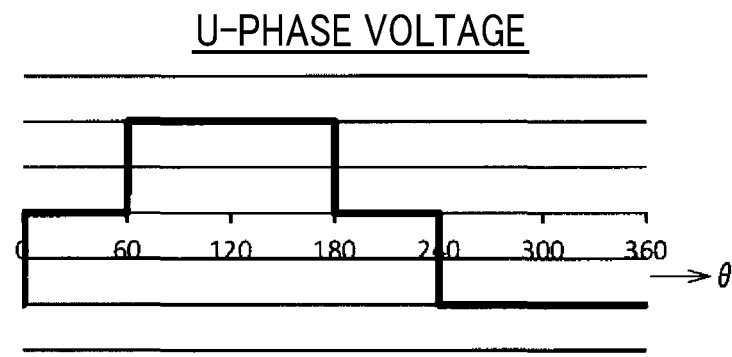
FIGS. 35(a)-35(c) are time charts illustrating 120° rectangular-wave energization control.
Figure 35B:
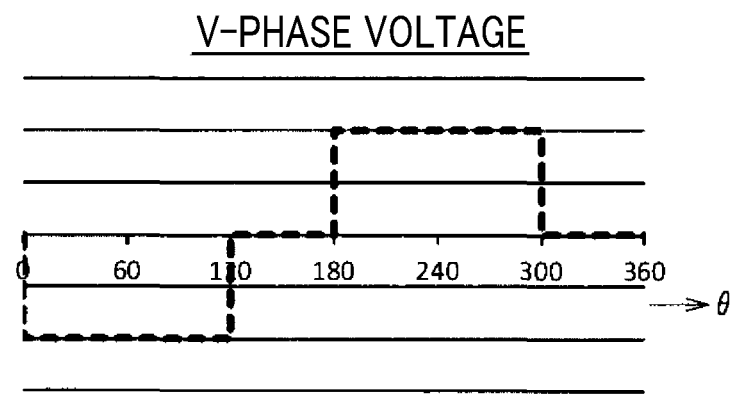
Figure 35C:
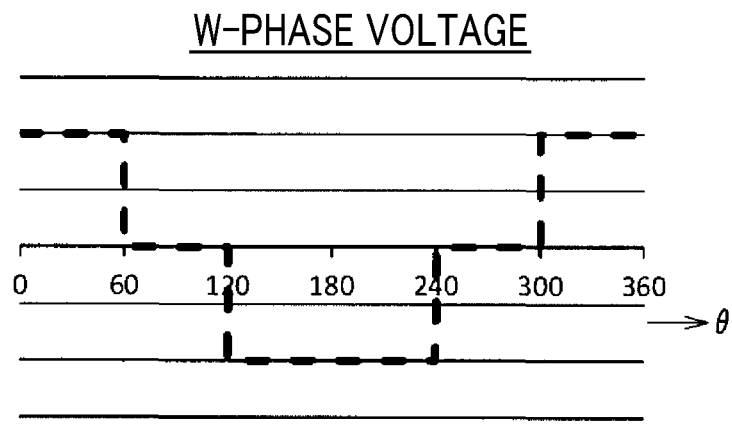

As shown in FIG. 35, the controller 110 is capable of controlling (e.g., space-vector-controlling) the first inverter 101 for energization of each phase winding of the stator coil 51 by 120° rectangular-wave energization control. Rectangular-wave voltages of the three phases are offset in phase from each other by 120° in electrical angle. By applying the rectangular-wave energization control using a rectangular wave whose electrical angular range is 120° on the basis of the configuration of having the waveform of the magnetic flux density of the magnet unit 42 in the electrical angular range corresponding to one magnetic pole concentrated within the electrical angular range of 120°, it is possible to supply sufficient electric current to the stator coil 51 within the electrical angular range where the magnet magnetic flux is concentrated. As a result, it is possible to further increase the torque of the rotating electric machine 10.

Figure 36A:
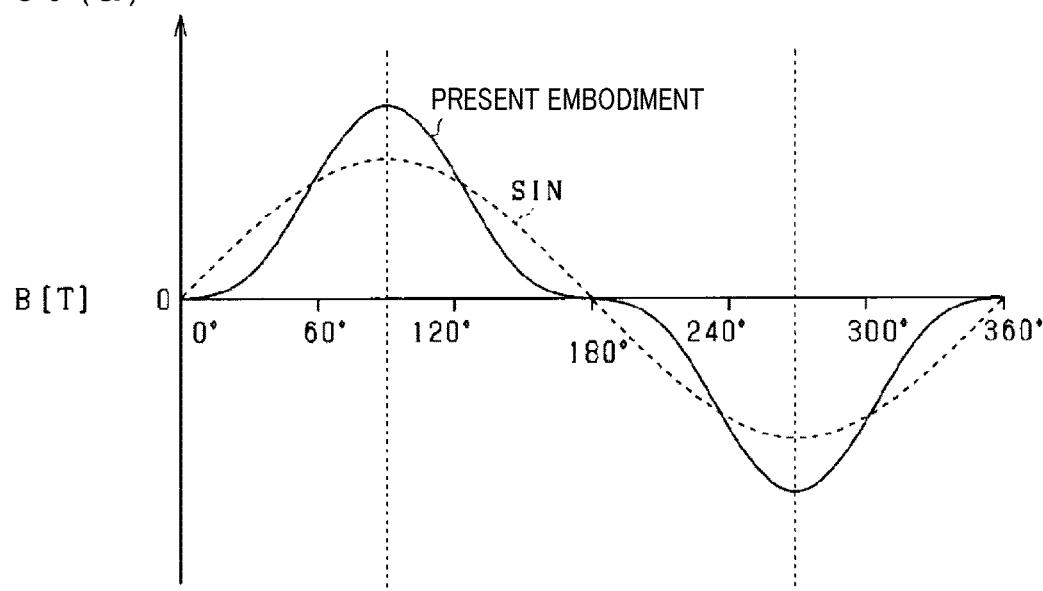
FIGS. 36(a) and 36(b) are time charts illustrating change in the magnetic flux density of the magnet unit and change in phase current.
Figure 36B:
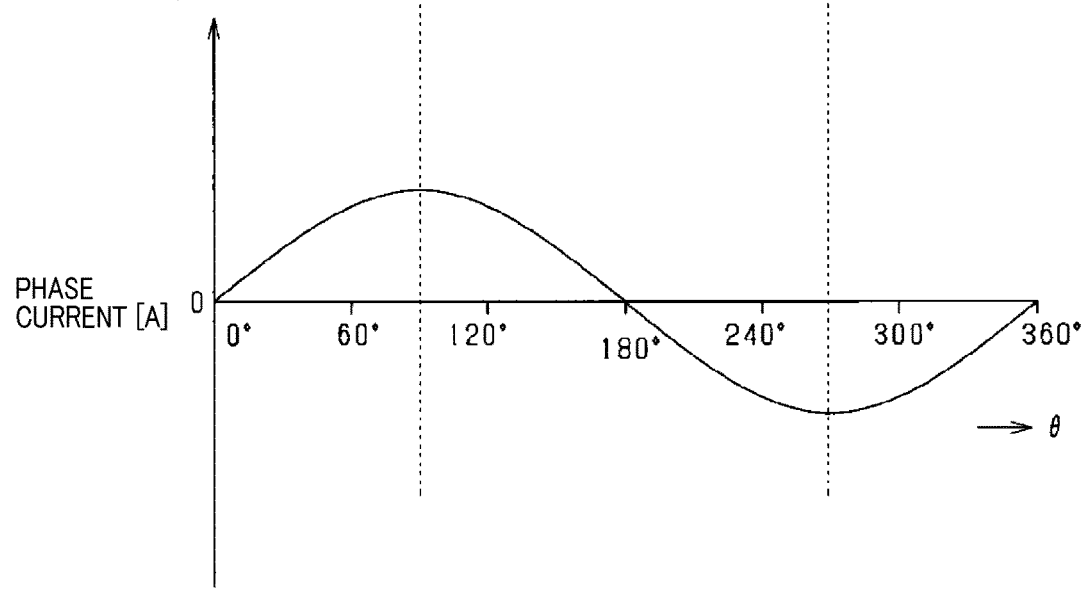

As shown in FIG. 36, the controller 110 is capable of controlling the first inverter 101 to supply the stator coil 51 with fundamental current that is in phase with the fundamental component included in the magnet magnetic flux of the magnet unit 42. FIG. 36(a) illustrates change in the magnet magnetic flux while FIG. 36(b) illustrates change in the phase current. In addition, the controller 110 may alternatively control the first inverter 101 to supply the stator coil 51 with electric current obtained by superimposing harmonic current on the fundamental current.

With the above control, it becomes possible to make timings at which the fundamental component included in the magnet magnetic flux reaches its extrema coincident with or close to timings at which the phase current supplied to the stator coil 51 reaches its extrema. Consequently, it becomes possible to further improve the torque-increasing effect realized by the magnet magnetic flux.

In the present embodiment, the slot-less structure is employed in the stator 50. Therefore, it is possible to make the waveform of the magnet magnetic flux actually crossing the stator coil 51 approximate to the waveform of the magnet magnetic flux of the magnet unit 42 for achieving high torque. As a result, it becomes possible to further improve the torque-increasing effect.

Figure 37:
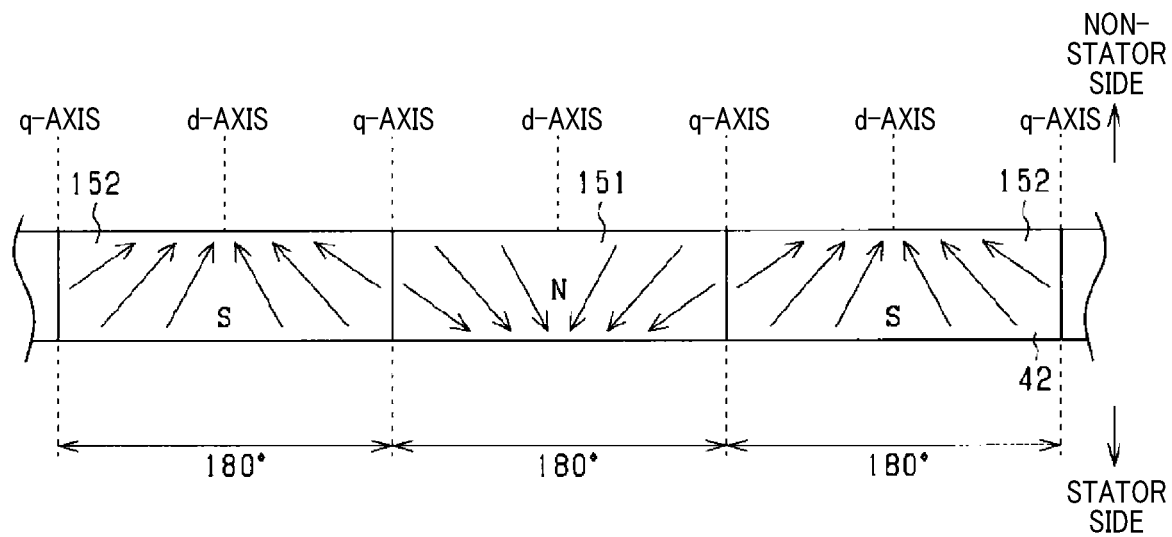
FIG. 37 is a cross-sectional view of part of another magnet unit.

In addition, as an alternative orientation method of the magnets constituting the magnet unit 42, it is possible to apply the one illustrated in FIG. 37. In FIG. 37, a first magnet 151 corresponds to the first magnet 146 shown FIG. 31; and second magnets 152 correspond to the second magnets 147 shown in FIG. 31. In FIG. 37, in each of the first and second magnets 151 and 152, the orientation directions extend straight.

Ninth Modification

In this modification, part of the structure of the magnet unit 42 is modified. Accordingly, the differences of this modification from the above-described eighth modification will be mainly described.

Figure 38:
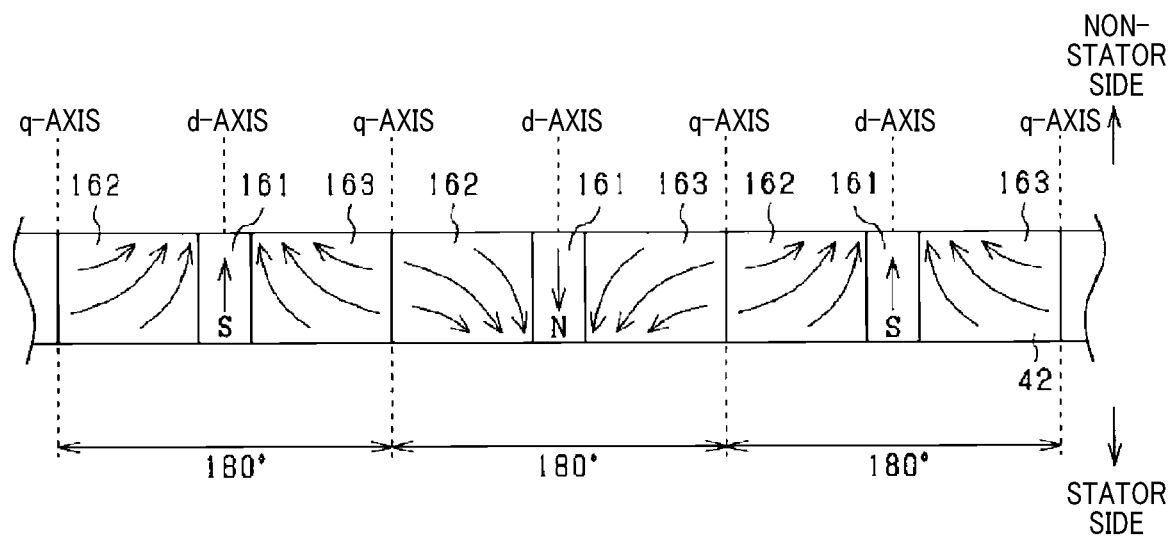
FIG. 38 is a cross-sectional view of part of a magnet unit in a ninth modification.

As shown in FIG. 38, in this modification, the magnet unit 42 includes first magnets 161, second (A) magnets 162 and second (B) magnets 163. The first magnets 161 are arranged at predetermined intervals in the circumferential direction. For each of the first magnets 161, there are arranged one of the second (A) magnets 162 and one of the second (B) magnets 163 respectively adjacent to opposite ends of the first magnet 161 in the circumferential direction. Each set of one of the first magnets 161, one of the second (A) magnets 162 and one of the second (B) magnets 163 constitutes one magnetic pole. In addition, FIG. 38 is a developed view of the magnet unit 42 along the circumferential direction.

Each of the first magnets 161, the second (A) magnets 162 and the second (B) magnets 163 is a permanent magnet constituted of a rare-earth magnet such as a neodymium magnet. These magnets have a residual flux density Br higher than or equal to 1.0 [T] and an intrinsic coercive force Hcj higher than or equal to 400 [kA/m].

Each of the first magnets 161 is configured to have an easy axis of magnetization linearly oriented such that the direction of the easy axis of magnetization is parallel to the d-axis. Each of the second (A) magnets 162 and the second (B) magnets 163 is configured to have an easy axis of magnetization oriented such that the closer the position to the d-axis in the circumferential direction, the more the direction of the easy axis of magnetization becomes parallel to the d-axis. In the present embodiment, in each of the second (A) magnets 162 and the second (B) magnets 163, the orientation directions extend in an arc shape. The q-axis is represented by straight lines each of which extends through both the interface between one adjacent pair of the second (A) magnets 162 and the second (B) magnets 163 and the axis of the rotating shaft 11.

According to the present embodiment, it is possible to achieve the same advantageous effects as the eighth modification.

In addition, as an alternative, the orientation directions may extend straight in each of the second (A) magnets 162 and the second (B) magnets 163.

Tenth Modification

In this modification, part of the control method of the controller 110 is modified. Accordingly, the differences of this modification from the above-described first embodiment will be mainly described.

Figure 39:
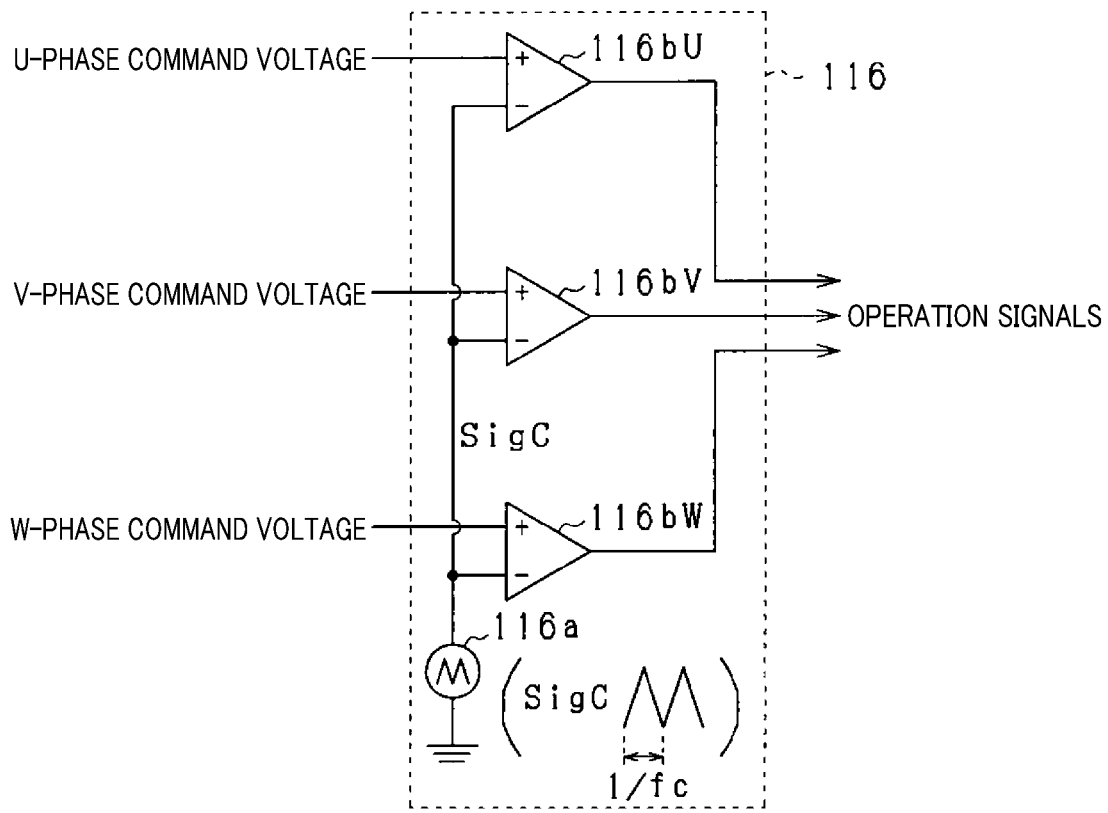
FIG. 39 is a functional block diagram illustrating part of a process performed by an operation signal generator in a tenth modification.

First, the processes performed by the operation signal generators 116 and 126 shown in FIG. 20 and the operation signal generators 130a and 130b shown in FIG. 21 will be described with reference to FIG. 39. In addition, the processes performed by the operation signal generators 116, 126, 130a and 130b are basically the same; therefore, only the process performed by the operation signal generator 116 will be described hereinafter.

The operation signal generator 116 includes a carrier signal generator 116a and U-phase, V-phase and W-phase comparators 116bU, 116bV and 116bW. In the present embodiment, the carrier signal generator 116a generates and outputs a triangular-wave signal as a carrier signal SigC.

The carrier signal SigC generated by the carrier signal generator 116a is inputted to each of the U-phase, V-phase and W-phase comparators 116bU, 116bV and 116bW. Moreover, the U-phase, V-phase and W-phase command voltages calculated by the three-phase converter 115 are respectively inputted to the U-phase, V-phase and W-phase comparators 116bU, 116bV and 116bW. The U-phase, V-phase and W-phase command voltages are each in the form of, for example, a sine wave and offset in phase from each other by 120° in electrical angle.

The U-phase, V-phase and W-phase comparators 116bU, 116bV and 116bW generate, by PWM (Pulse-Width Modulation) control based on comparison in amplitude between the U-phase, V-phase and W-phase command voltages and the carrier signal SigC, the operation signals for operating the upper-arm and lower-arm switches Sp and Sn of the U, V and W phases in the first inverter 101. More specifically, the U-phase, V-phase and W-phase comparators 116bU, 116bV and 116bW generate the operation signals for operating the switches Sp and Sn of the U, V and W phases by the PWM control based on comparison in amplitude between signals, which are obtained by normalizing the U-phase, V-phase and W-phase command voltages with the power supply voltage, and the carrier signal SigC. Then, the driver 117 turns on and off the switches Sp and Sn of the U, V and W phases in the first inverter 101 based on the operation signals generated by the U-phase, V-phase and W-phase comparators 116bU, 116bV and 116bW of the operation signal generator 116.

The controller 110 performs a process of varying the carrier frequency fc of the carrier signal SigC, i.e., varying the switching frequency of the switches Sp and Sn. Specifically, the carrier signal fc is set to be higher in a low-torque region or a high-rotation region of the rotating electric machine 10 and to be lower in a high-torque region of the rotating electric machine 10. Such a setting is performed for suppressing the controllability of electric current flowing in each phase winding from being lowered.

The inductance of the stator 50 can be lowered by employing a core-less structure for the stator 50. However, with the lowering of the inductance of the stator 50, the electrical time constant of the rotating electric machine 10 is accordingly lowered. Consequently, ripple of electric current flowing in each phase winding of the stator coil 51 may be increased and thus the controllability of the electric current may drop, causing the electric current control to diverge. Moreover, the influence of the controllability drop may become more remarkable when the electric current (e.g., the effective value of the electric current) flowing in each phasing winding is within a low-current region than when the electric current is within a high-current region. To cope with this problem, in this modification, the controller 110 varies the carrier frequency fc.

The process of varying the carrier frequency fc will be described with reference to FIG. 40. This process is repeatedly performed, as the process of the operation signal generator 116, by the controller 110 in a predetermined control cycle.

First, in step S10, the controller 110 determines whether electric current flowing in each phase winding 51a is within the low-current region. This determination is made for determining whether the current torque of the rotating electric machine 10 is within the low-torque region. In addition, this determination can be made using, for example, either of the following first and second methods.

First Method

According to the first method, a torque estimation value of the rotating electric machine 10 is first calculated on the basis of the d-axis and q-axis currents obtained by the dq converter 112. Then, a determination is made as to whether the calculated torque estimation value is lower than a torque threshold value. If the calculated torque estimation value is lower than the torque threshold value, it is determined that the electric current flowing in each phase winding 51a is within the low-current region. In contrast, if the calculated torque estimation value is higher than or equal to the torque threshold value, it is determined that the electric current flowing in each phase winding 51a is within the high-current region. In addition, the torque threshold value may be set to, for example, ½ of a starting torque (or locked torque) of the rotating electric machine 10.

Second Method

According to the second method, a determination is made as to whether the rotation angle of the rotor 40 detected by the rotation angle detector is greater than or equal to a speed threshold value. If the rotation angle of the rotor 40 is greater than or equal to the speed threshold value, it is determined that the rotational speed of the rotor 40 is within the high-rotation region, i.e., the electric current flowing in each phase winding 51a is within the low-current region. In addition, the speed threshold value may be set to, for example, the rotational speed value at which the maximum torque of the rotating electric machine 10 becomes equal to the torque threshold value.

Referring back to FIG. 40, if the determination in step S10 results in a "NO" answer, i.e., if the electric current flowing in each phase winding is within the high-current region, the process proceeds to step S11. In step S11, the controller 110 sets the carrier signal fc to a first frequency fL. Then, the process terminates.

In contrast, if the determination in step S10 results in a "YES" answer, i.e., if the electric current flowing in each phase winding is within the low-current region, the process proceeds to step S12. In step S12, the controller 110 sets the carrier signal fc to a second frequency fH that is higher than the first frequency fL. Then, the process terminates.

As described above, in the present modification, the carrier frequency fc is set to be higher when the electric current flowing in each phase winding is within the low-current region than when the electric current is within the high-current region. Accordingly, the switching frequency of the switches Sp and Sn is set to be higher when the electric current flowing in each phase winding is within the low-current region than when the electric current is within the high-current region. Consequently, when the electric current flowing in each phase winding is within the low-current region, it is possible to suppress increase in ripple of the electric current flowing in each phase winding, thereby suppressing the controllability of the electric current from being lowered.

On the other hand, when the electric current flowing in each phase winding is within the high-current region, the amplitude of the electric current is higher than when the electric current is within the low-current region. Therefore, the increase in ripple of the electric current due to the lowering of the inductance affects the controllability of the electric current less. Accordingly, it is allowed to set the carrier frequency fc to be lower when the electric current flowing in each phase winding is within the high-current region than when the electric current is within the low-current region, thereby reducing switching loss in the inverters 101 and 102.

Moreover, the following further modifications may be made in addition to the present modification.

Figure 40:
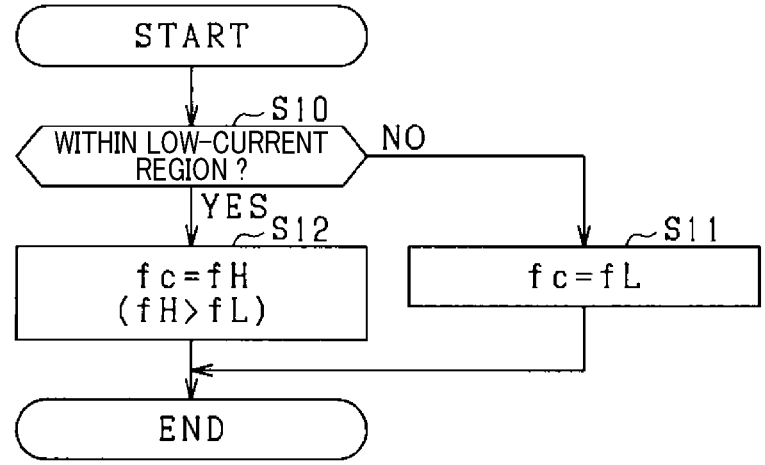
FIG. 40 is a flow chart illustrating a process of varying a carrier frequency.

(1) In the process shown in FIG. 40, in the case of the carrier frequency fc having been set to the first frequency fL, when the determination in step S10 results in a "YES" answer, the carrier frequency fc may be gradually increased from the first frequency fL to the second frequency fH.

In contrast, in the case of the carrier frequency fc having been set to the second frequency fH, when the determination in step S10 results in a "NO" answer, the carrier frequency fc may be gradually decreased from the second frequency fH to the first frequency fL.

(2) The operation signals for operating the switches may be generated by a SVM (Space Vector Modulation) control instead of the PWM control. In this case, it is also possible to apply the above-described process of varying the switching frequency.

Eleventh Modification

In the above-described embodiments, there are provided two pairs of electrical conductors per phase, which constitute the electrical conductor groups 81. Moreover, as shown in FIG. 41(a), first and second electrical conductors 88a and 88b, each of which consists of one pair of electric conductors, are connected in parallel with each other. As an alternative, as shown in FIG. 41(b), the first and second electrical conductors 88a and 88b may be connected in series with each other.

Moreover, three or more pairs of multi-layer electrical conductors may be radially stacked. For example, FIG. 42 illustrates a configuration where first, second, third and fourth electrical conductors 88a, 88b, 88c and 88d, each of which consists of one pair of electric conductors, are radially stacked. More specifically, the first, second, third and fourth electrical conductors 88a, 88b, 88c and 88d are arranged in this order from the stator core 52 side so as to be in radial alignment with each other.

Moreover, as shown in FIG. 41(c), the third and fourth electrical conductors 88c and 88d may be connected in parallel with each other to form a parallel-connected unit; further, the first and second electrical conductors 88a and 88b may be respectively connected to opposite ends of the parallel-connected unit. With the parallel connection, it is possible to lower the electric current density of the parallel-connected electrical conductors, thereby reducing heat generated in these electrical conductors during energization thereof. Furthermore, in the configuration where the hollow cylindrical stator coil is assembled to the housing (i.e., the unit base 61) which has the cooling water passage 74 formed therein, the first and second electrical conductors 88a and 88b, which are not connected in parallel, are located closer than the parallel-connected third and fourth electrical conductors 88c and 88d to the stator core 52 that abuts the unit base 61. Consequently, it becomes possible to equalize the cooling performances of the electrical conductors 88a-88d in the multi-layer conductor structure.

In addition, the radial thickness of the electrical conductor groups 81, which are constituted of the electrical conductors 88a-88d, may be set to be smaller than the circumferential width per phase in each magnetic pole.

Twelfth Modification

Figure 43:
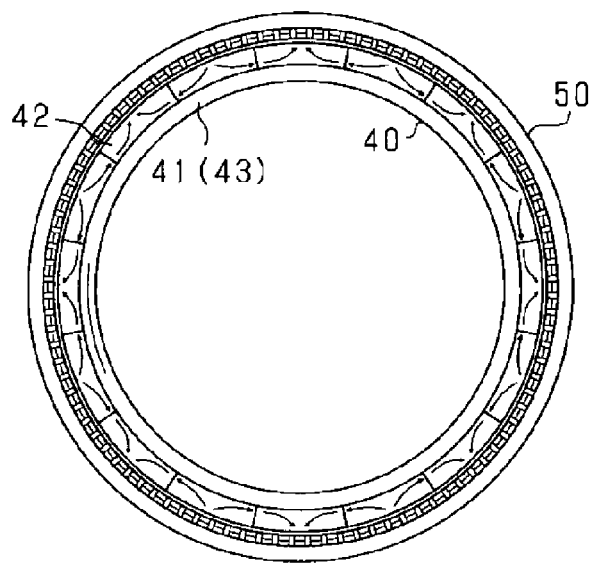
FIG. 43 is a transverse cross-sectional view of both a rotor and a stator of an inner rotor type rotating electric machine in a twelfth modification.
Figure 44:
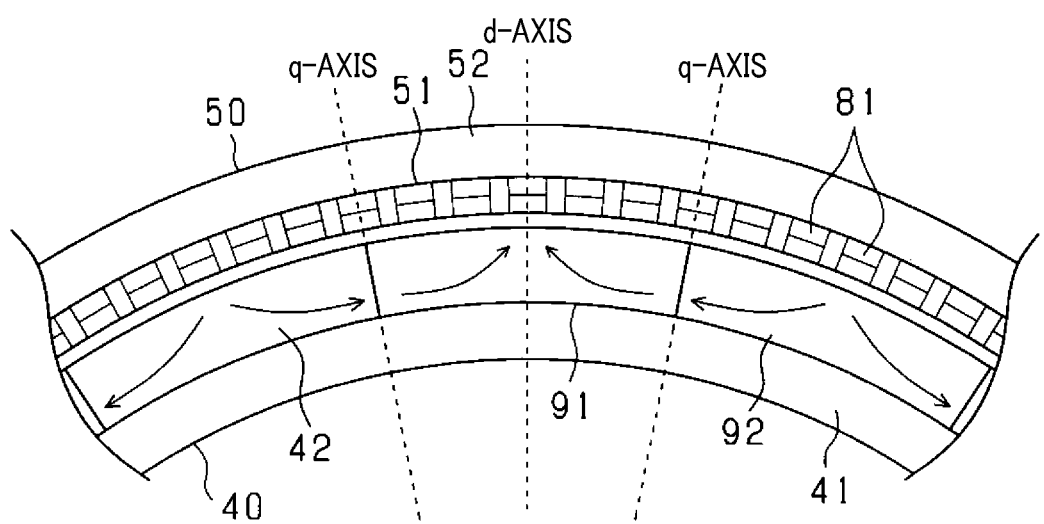
FIG. 44 is an enlarged view of part of FIG. 43.

The rotating electric machine 10 may alternatively be configured to have an inner rotor structure (i.e., inner rotating structure). In this case, in the housing 30, the rotor 40 is arranged radially inside the stator 50. Moreover, in this case, the inverter unit 60 may be provided at either or both of axial ends of the rotor 40 and the stator 50. FIG. 43 is a transverse cross-sectional view of both the rotor 40 and the stator 50. FIG. 44 is an enlarged view of part of FIG. 43.

The configuration of the inner rotor type rotating electric machine 10 shown in FIGS. 43 and 44 is identical to the configuration of the outer rotor type rotating electric machine 10 shown in FIGS. 8 and 9 except for the radial positional relationship between the rotor 40 and the stator 50. Specifically, in the inner rotor type rotating electric machine 10, the stator 50 also includes a stator coil 51 having a flat conductor structure, and a tooth-less stator core 52. The stator coil 51 is assembled to the radially inner periphery of the stator core 52. Moreover, the stator 50 may have any of the following configurations (A)-(C) as in the case of the outer rotor structure.

(A) In the stator 50, inter-conductor members are provided between the electrical conductor sections in the circumferential direction. The inter-conductor members are formed of such a magnetic material as to satisfy the following relationship: Wt×Bs≤Wm×Br, where Wt is the circumferential width of the inter-conductor members in each magnetic pole, Bs is the saturation flux density of the inter-conductor members, Wm is the circumferential width of the magnet unit in each magnetic pole and Br is the residual flux density of the magnet unit.

(B) In the stator 50, inter-conductor members are provided between the electrical conductor sections in the circumferential direction. The inter-conductor members are formed of a nonmagnetic material.

(C) In the stator 50, no inter-conductor members are provided between the electrical conductor sections in the circumferential direction.

Moreover, the configuration of the magnets 91 and 92 of the magnet unit 42 in the inner rotor type rotating electric machine is similar to that in the outer rotor type rotating electric machine. That is, the magnet unit 42 is configured with the magnets 91 and 92 each of which is oriented such that the direction of the easy axis of magnetization is more parallel to the d-axis on the d-axis side than on the q-axis side; the d-axis represents the centers of the magnetic poles while the q-axis represents the boundaries between the magnetic poles. The details of the magnetization directions in the magnets 91 and 92 are the same as described previously. In addition, the magnet unit 42 may alternatively be configured with an annular magnet 95 (see FIG. 30).

Figure 45:
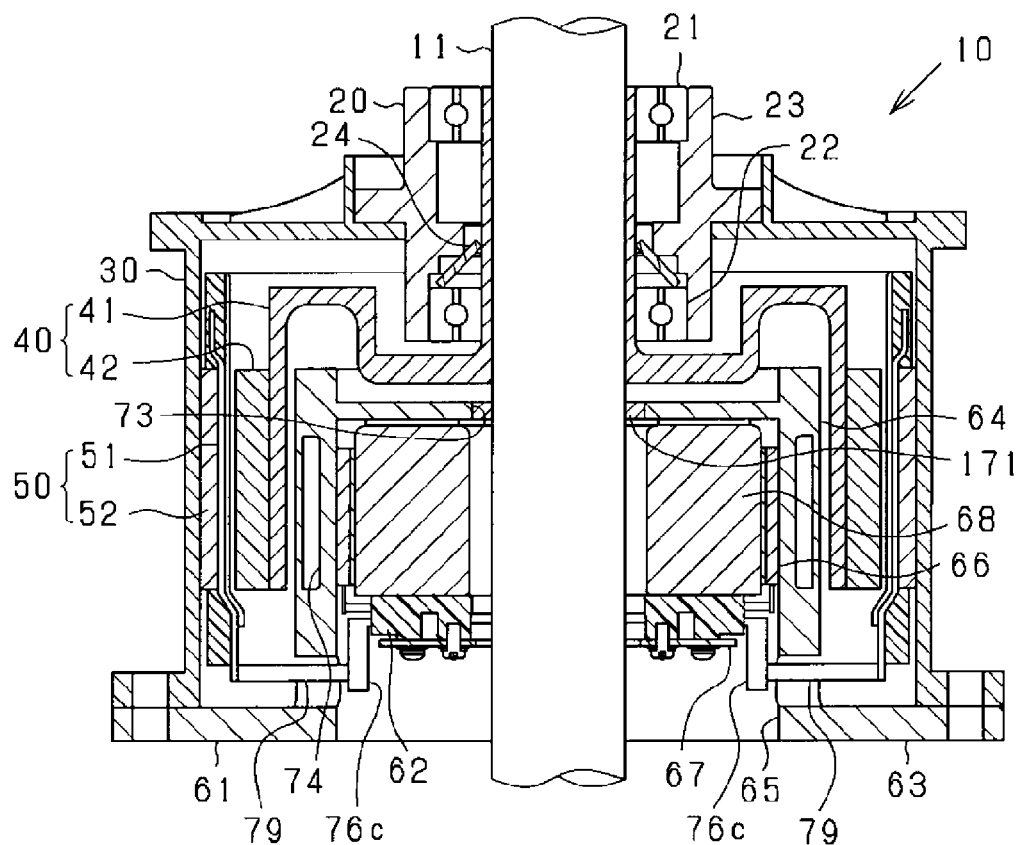
FIG. 45 is a longitudinal cross-sectional view of the inner rotor type rotating electric machine in the twelfth modification.

FIG. 45 is a longitudinal cross-sectional view of the inner rotor type rotating electric machine 10, which corresponds to FIG. 2 described above. Hereinafter, the differences of the configuration shown in FIG. 45 from the configuration shown in FIG. 2 will be briefly described. In the inner rotor type rotating electric machine 10 shown in FIG. 45, the annular stator 50 is fixed to the inner periphery of the housing 30. The rotor 40 is rotatably provided inside the stator 50 with a predetermined air gap formed therebetween. The rotor 40 is supported in a cantilever fashion via the bearings 21 and 22 that are arranged on one axial side of the axially center position of the rotor 40 as in the configuration shown in FIG. 2. The inverter unit 60 is provided inside the magnet holder 41 of the rotor 40.

Figure 46:
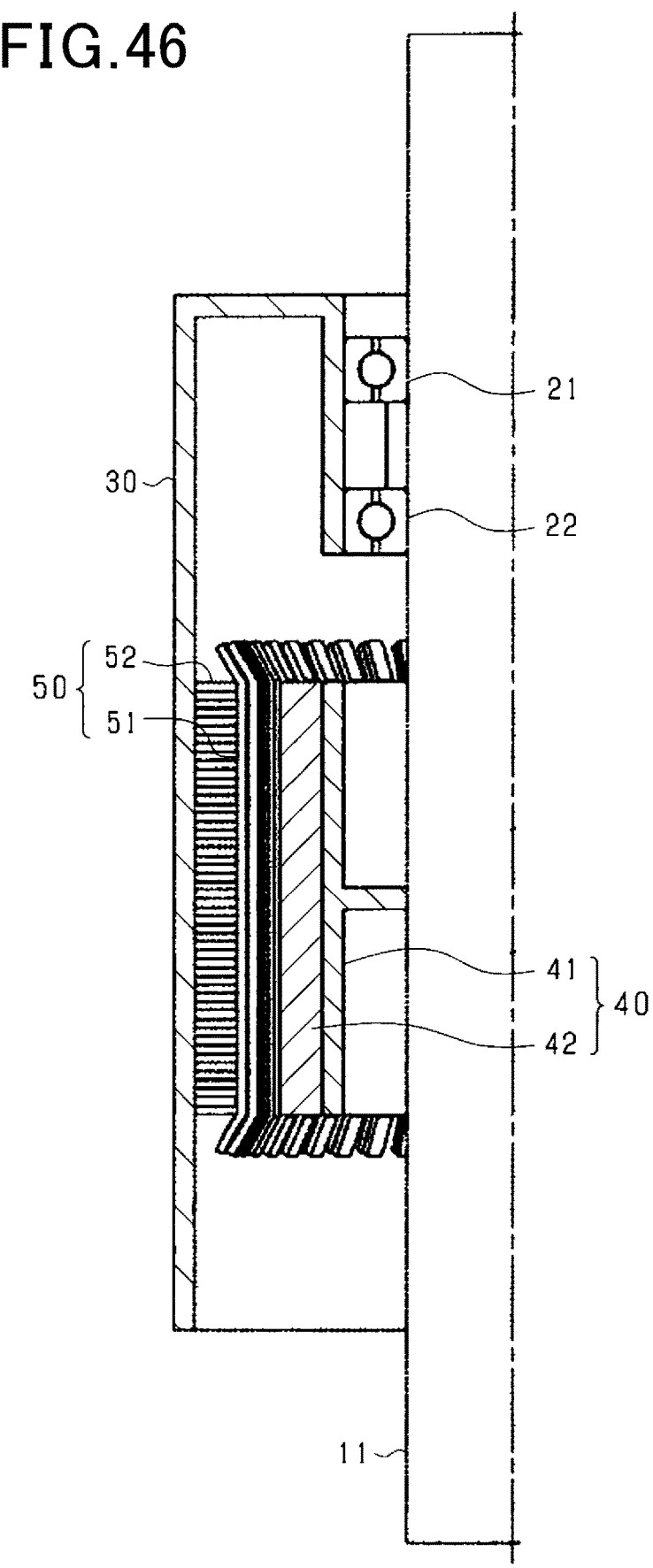
FIG. 46 is a longitudinal cross-sectional view illustrating the overall configuration of another inner rotor type rotating electric machine in the twelfth modification.

FIG. 46 shows an alternative configuration of the inner rotor type rotating electric machine 10. In this configuration, in the housing 30, the rotating shaft 11 is rotatably supported directly by the bearings 21 and 22. The rotor 40 is fixed on the rotating shaft 11. The bearings 21 and 22 are arranged on one axial side of the axially center position of the rotor 40 as in the configuration shown in FIG. 2. The rotor 40 includes the magnet holder 41 and the magnet unit 42.

The rotating electric machine 10 shown in FIG. 46 differs from the rotating electric machine 10 shown in FIG. 45 in that no inverter unit 60 is provided radially inside the rotor 40. The magnet holder 41 is located radially inside the magnet unit 42 and connected to the rotating shaft 11. The stator 50 includes the stator coil 51 and the stator core 52. The stator 50 is mounted to the housing 30.

Thirteenth Modification

Figure 47:
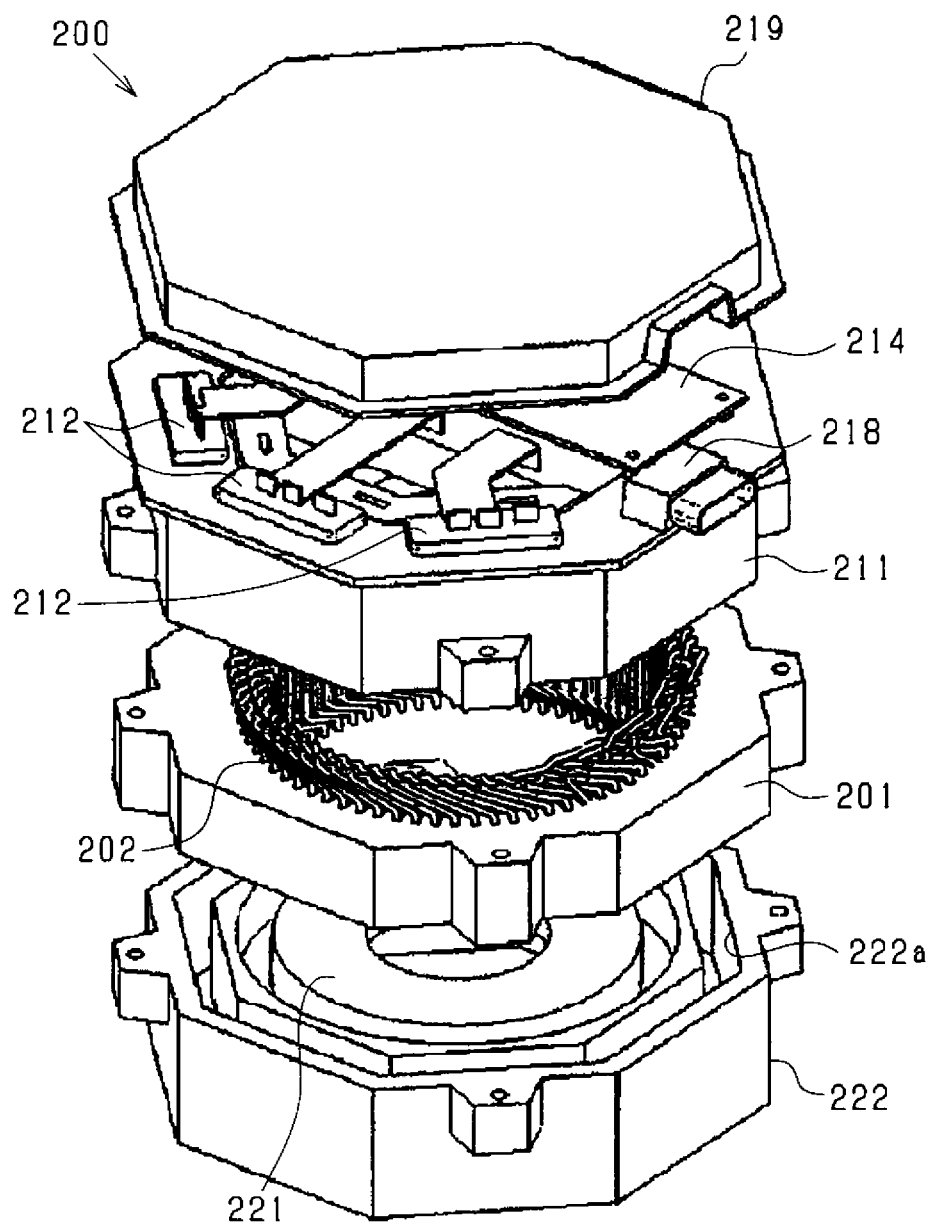
FIG. 47 is a diagram illustrating the configuration of an inner rotor type rotating electric machine in a thirteenth modification.
Figure 48:
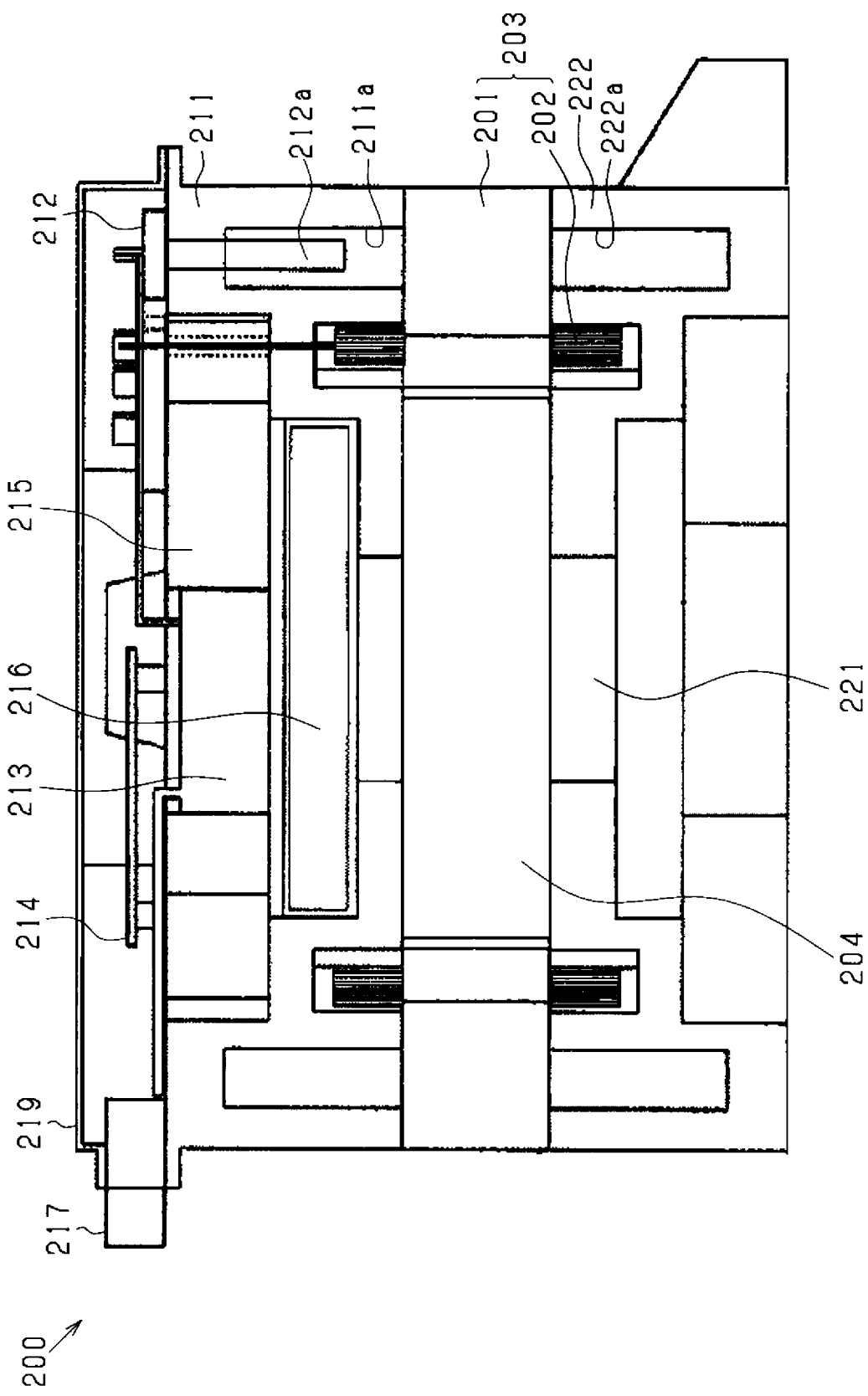
FIG. 48 is a diagram illustrating the configuration of the inner rotor type rotating electric machine in the thirteenth modification.

Another alternative configuration of an inner rotor type rotating electric machine will be described. FIG. 47 is an exploded perspective view of an inner rotor type rotating electric machine 200. FIG. 48 is a side cross-sectional view of the inner rotor type rotating electric machine 200. Hereinafter, the vertical direction denotes the vertical direction in FIGS. 47 and 48.

As shown in FIGS. 47 and 48, the rotating electric machine 200 includes a stator 203, which includes an annular stator core 201 and a multi-phase stator coil 202, and a rotor 204 that is rotatably disposed radially inside the stator core 201. The stator 203 functions as an armature while the rotor 204 functions as a field system. The stator core 201 is formed by laminating a plurality of silicon steel sheets. The stator coil 202 is mounted to the stator core 201. The rotor 204 includes, though not shown in the figures, a rotor core and a magnet unit constituted of a plurality of permanent magnets. In the rotor core, there are formed a plurality of magnet insertion holes at equal intervals in the circumferential direction. In each of the magnet insertion holes, there is inserted one of the permanent magnets. The permanent magnets are magnetized so that the magnetization directions of adjacent magnetic poles alternately change. In addition, the arrangement of the permanent magnets of the magnet unit may be the same as or similar to the Halbach array shown in FIG. 23. Alternatively, the permanent magnets of the magnet unit may have polar anisotropic characteristics as shown in FIG. 9 or FIG. 30; the polar anisotropic characteristics are such that the orientation direction (i.e., the magnetization direction) extends in an arc shape between the d-axis at the center of each of the magnetic poles and the q-axis at the boundary between each adjacent pair of the magnetic poles.

The stator 203 may have any of the following configurations (A)-(C).

(A) In the stator 203, inter-conductor members are provided between the electrical conductor sections in the circumferential direction. The inter-conductor members are formed of such a magnetic material as to satisfy the following relationship: Wt×Bs≤Wm×Br, where Wt is the circumferential width of the inter-conductor members in each magnetic pole, Bs is the saturation flux density of the inter-conductor members, Wm is the circumferential width of the magnet unit in each magnetic pole and Br is the residual flux density of the magnet unit.

(B) In the stator 203, inter-conductor members are provided between the electrical conductor sections in the circumferential direction. The inter-conductor members are formed of a nonmagnetic material.

(C) In the stator 203, no inter-conductor members are provided between the electrical conductor sections in the circumferential direction.

In the rotor 204, the magnet unit is configured with the permanent magnets where the easy axis of magnetization is oriented such that the direction of the easy axis of magnetization is more parallel to the d-axis on the d-axis side than on the q-axis side.

At one axial end of the rotating electric machine 200, there is arranged an annular inverter case 211 so that a lower end surface of the inverter case 211 abuts an upper end surface of the stator core 201. In the inverter case 211, there are provided: a plurality of power modules 212 forming an inverter circuit; a smoothing capacitor 213 for suppressing voltage/current ripple caused by switching operation of semiconductor switching elements; a control substrate 214 including a controller; current sensors 215 for detecting phase currents; and a resolver stator 216 that is a stator part of a resolver for detecting the rotational speed of the rotor 204. The power modules 212 include the respective semiconductor switching elements, which are implemented by, for example, IGBTs, and diodes.

On a peripheral portion of the inverter case 211, there are provided a power connector 217 connected to a DC circuit of a battery mounted in a vehicle, and a signal connector 218 used for exchange of various signals between the rotating electric machine 200 and a vehicle-side controller. The inverter case 211 is covered by a top cover 219. DC power from the in-vehicle battery is inputted via the power connector 217, converted into AC power by the switching of the power modules 212, and supplied to each phase winding of the stator coil 202.

On an opposite axial side of the stator core 201 to the inverter case 211, there are provided: a bearing unit 221 for rotatably supporting a rotating shaft of the rotor 204; and an annular rear case 222 that receives the bearing unit 221 therein. The bearing unit 221, which includes a pair of bearings, is arranged on one axial side of an axially center position of the rotor 204. It should be noted the bearing unit 221 may alternatively include bearings respectively arranged on opposite axial sides of the stator core 201 to rotatably support the rotating shaft. The rotating electric machine 200 is configured to be mounted to a mounting part, such as a gear case or a transmission case, of the vehicle by bolt-fastening the rear case 222 to the mounting part.

In the inverter case 211, there is formed a coolant passage 211a through which a coolant flows. The coolant passage 211a is constituted of an annular recess that is formed in the lower end surface of the inverter case 211 and closed by the upper end surface of the stator core 201. Moreover, the coolant passage 211a is formed so as to surround a coil end of the stator coil 202. In the coolant passage 211a, there are inserted module cases 212a of the power modules 212. In the rear case 222, there is formed a coolant passage 222a so as to surround another coil end of the stator coil 202. The coolant passage 222a is constituted of an annular recess that is formed in the upper end surface of the rear case 222 and closed by the lower end surface of the stator core 201.

In addition, in this modification, it is also possible employ the same magnet units as in the eighth and ninth modifications.

Fourteenth Modification

Figure 49:
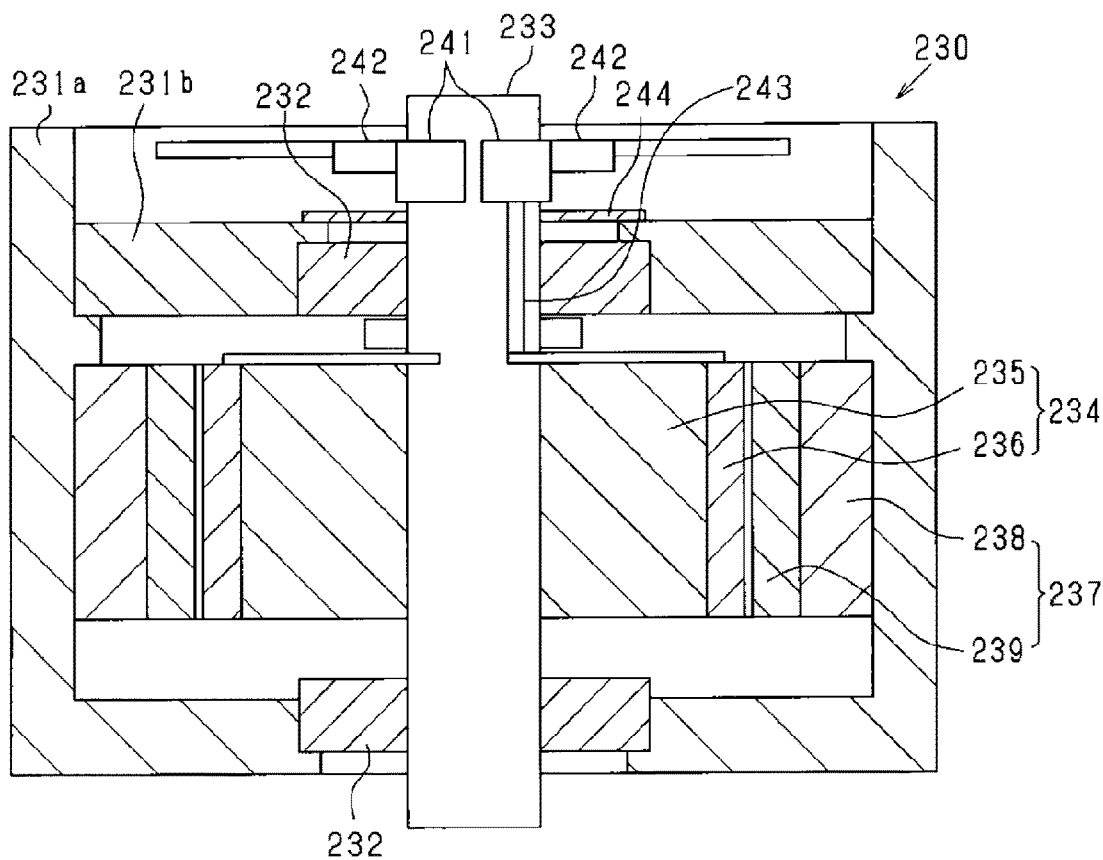
FIG. 49 is a diagram illustrating the configuration of a rotating-armature type rotating electric machine in a fourteenth modification.

In the above-described embodiments and modifications, the rotating-field type rotating electric machines are illustrated. In contrast, this modification illustrates a rotating-armature type rotating electric machine 230. FIG. 49 shows the configuration of the rotating-armature type rotating electric machine 230.

In the rotating electric machine 230 shown in FIG. 49, each of housings 231a and 231b has one bearing 232 fixed thereto. A rotating shaft 233 is rotatably supported by the bearings 232. In addition, the bearings 232 may be implemented by, for example, oil-retaining bearings that are formed by impregnating oil into a porous metal. On the rotating shaft 233, there is fixed a rotor 234 that functions as an armature. The rotor 234 includes a rotor core 235 and a multi-phase rotor coil 236 fixed to an outer periphery of the rotor core 235. In the rotor 234, the rotor core 235 has a slot-less structure and the rotor coil 236 has a flat conductor structure. That is, the rotor coil 236 has a flat structure such that each region per phase is longer in a circumferential direction than in a radial direction.

On a radially outer side of the rotor 234, there is provided a stator 237 that functions as a field system. The stator 237 has a stator core 238 fixed to the housing 231a and a magnet unit 239 fixed to an inner periphery of the stator core 238. The magnet unit 239 is configured to include a plurality of magnetic poles whose polarities alternate in the circumferential direction. Similar to the above-described magnet unit 42, the magnet unit 239 is also configured to have the easy axis of magnetization oriented such that the direction of the easy axis of magnetization is more parallel to the d-axis on the d-axis side than on the q-axis side. The magnet unit 239 includes sintered neodymium magnets whose intrinsic coercive force is higher than or equal to 400 [kA/m] and residual flux density is higher than or equal to 1.0 [T].

The rotating electric machine 230 according to the present modification is configured as a two-pole, three-coil, brushed and coreless motor. The rotor coil 236 is divided into three sub-coils, and the magnet unit 239 has two magnetic poles. In addition, brushed motors have, depending on the application, various ratios of the number of poles to the number of coils, such as 2:3, 4:10 and 4:21.

To the rotating shaft 233, there is also fixed a commutator 241. On the radially outer side of the commutator 241, there are arranged a plurality of brushes 242. The commutator 241 is electrically connected to the rotor coil 236 via electrical conductors 243 embedded in the rotating shaft 233. Consequently, DC current flows into and out of the rotor coil 236 via the commutator 241, the brushes 242 and the electrical conductors 243. The commutator 241 is circumferentially divided, according to the number of phases of the rotor coil 236, into a plurality of commutator segments. In addition, the brushes 242 may be electrically connected to a DC power supply, such as a storage battery, via electrical wiring or a terminal block.

On the rotating shaft 233, there is provided, as a sealing member, a resin washer 244 between the commutator 241 and the bearing 232. With the resin washer 244, oil seeping from the bearing 232, which is implemented by an oil-retaining bearing, is suppressed from flowing to the commutator 241 side.

In addition, in this modification, it is also possible employ the same magnet units as in the eighth and ninth modifications.

Fifteenth Modification

In the rotating electric machines 10 according to the above-described embodiments and modifications, the electrical conductors 82 forming the stator coil 51 may be configured to have a plurality of insulating coats. For example, each of the electrical conductors 82 may be formed by bundling a plurality of wires each having an insulating coat into a wire bundle and then covering the wire bundle with an outer insulating coat. In this case, the insulating coats respectively covering the wires constitute inner insulating coats with respect to the outer insulating coat covering the entire wire bundle. Moreover, it is preferable to configure the outer insulating coat to have higher insulating capability than the inner insulating coats. Specifically, the outer insulating coat may have a larger thickness than the inner insulating coats. For example, the thickness of the outer insulating coat may be set to 100 μm while the thickness of each of the inner insulating coats is set to 40 μm. Moreover, the outer insulating coat may be formed of a material having lower permittivity than the inner insulating coats. That is, the insulating capability of the outer insulating coat may be set to be higher than the insulating capability of the inner insulating coats using at least one of the above methods. In addition, each of the wires may be formed of an aggregate of a plurality of electrically conductive bodies.

Setting the insulating capability of the outer insulating coat to be higher in each of the electrical conductors 82, the rotating electric machine 10 is made to be suitable for use in a high-voltage vehicular system. Moreover, it is possible to suitably drive the rotating electric machine 10 in a low atmospheric pressure high-altitude area.

Sixteenth Modification

Figure 50:
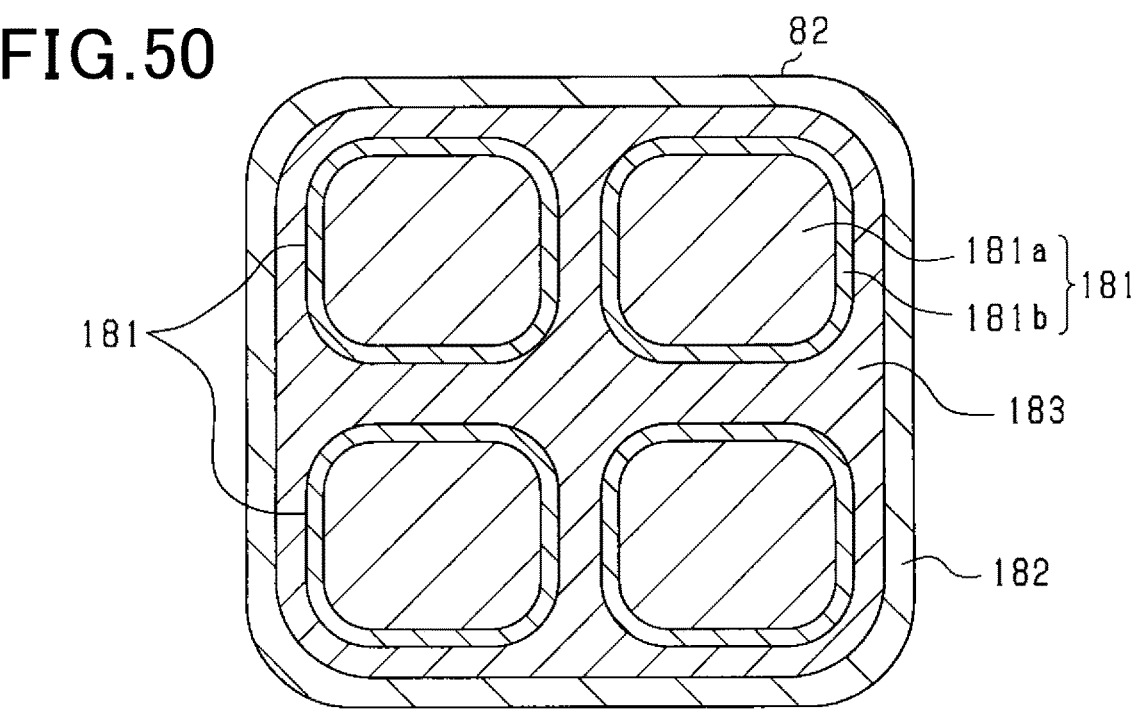
FIG. 50 is a cross-sectional view illustrating the configuration of electrical conductors in a sixteenth modification.

Electrical conductors 82, which have a plurality of insulating coats, may be configured so that an outer insulating coat and an inner insulating coat are different from each other in at least one of coefficient of linear expansion and adhesion strength. FIG. 50 shows the configuration of electrical conductors 82 according to the present modification.

As shown in FIG. 50, in this modification, each of the electrical conductors 82 includes a plurality (e.g., four) of wires 181, a resin-made outer coat 182 (i.e., outer insulating coat) covering all of the plurality of wires 181, and an intermediate layer 183 (i.e., intermediate insulating coat) filled around each of the wires 181 within the outer coat 182. Each of the wires 181 includes a wire body 181a formed of copper and a wire coat 181b (i.e., inner insulating coat) formed of an insulating material and covering the wire body 181a. In the stator coil, the inter-phase insulation is made by the outer coats 182 of the electrical conductors 82. In addition, each of the wires 181 may be formed of an aggregate of a plurality of electrically conductive bodies.

In each of the electrical conductors 82, the intermediate layer 183 has a coefficient of linear expansion higher than a coefficient of linear expansion of the wire coats 181b of the wires 181 and lower than a coefficient of linear expansion of the outer coat 182. That is, in each of the electrical conductors 82, the coefficients of linear expansion of the plurality of insulating coats increase from the inner side to the outer side. In general, the coefficient of linear expansion of the outer coat 182 is higher than the coefficient of linear expansion of the wire coats 181b. Interposing the intermediate layer 183 between the wire coats 181b and the outer coat 182 and setting the coefficient of linear expansion of the intermediate layer 183 as above, the intermediate layer 183 can function as a cushion member to prevent the wire coats 181b and the outer coat 182 from being cracked at the same time.

In each of the electrical conductors 82, the wire coat 181b is adhered to the wire body 181a in each of the wires 181 and the intermediate layer 183 is adhered to both the wire coats 181b of the wires 181 and the outer coat 182. Moreover, in each of the electrical conductors 82, the adhesion strengths decrease from the inner side to the outer side. Specifically, the adhesion strength between the wire body 181a and the wire coat 181b in each of the wires 181 is higher than both the adhesion strength between the wire coats 181b of the wires 181 and the intermediate layer 183 and the adhesion strength between the intermediate layer 83 and the outer coat 182. Further, the adhesion strength between the wire coats 181b of the wires 181 and the intermediate layer 183 is higher than or equal to the adhesion strength between the intermediate layer 183 and the outer coat 182. In addition, the adhesion strength between two insulating coats can be determined based on the tensile strength required to tear them off from each other. Setting the adhesion strengths in each of the electrical conductors 82 as above, when a temperature difference between the inner and outer sides occurs due to heating or cooling, it is possible to prevent cracking from occurring on both the inner and outer sides at the same time.

In the rotating electric machine, heat generation and temperature change occur mainly as copper loss at the wire bodies 181a of the wires 181 in each of the electrical conductors 82 and iron loss in the core. That is, these two types of losses occur at the wire bodies 181a of the wires 181 in each of the electrical conductors 82 or outside the electrical conductors 82; there is no heat source in the intermediate layers 183 of the electrical conductors 82. In this case, in each of the electrical conductors 82, with the adhesion strengths set as described above, the intermediate layer 83 can function as a cushion member to prevent the wire coats 181b of the wires 181 and the outer coat 182 from being cracked at the same time. Therefore, the rotating electric machine can be suitably used in an environment where it is required to withstand great pressure and temperature changes, such as in a vehicle.

Each of the wires 181 may be enamel-coated. In this case, each of the wires 181 has the wire coat 181b formed of a resin such as a PA, PI or PAI resin. The outer coat 182, which is provided outside the wires 181, may also be formed of a resin such as a PA, PI or PAI resin. In this case, it is preferable for the outer coat 182 to have a larger thickness than the wire coats 181b of the wires 181. Consequently, it is possible to prevent the insulating coats from being damaged due to the difference in coefficients of linear expansion. On the other hand, in terms of improving the conductor density of the rotating electric machine, it is preferable to form the outer coat 182 with a resin having lower permittivity than the PA, PI or PAI resin, such as a PPS, PEEK, fluorine, polycarbonate, silicone, epoxy, polyethylene naphthalate or LCP resin. In this case, with the smaller or same thickness of the outer coat 182 in comparison with the case of using the PA, PI or PAI resin, it is possible to improve the insulating capability of the outer coat 182, thereby improving the space factors of the electrical conductor sections. In general, the aforementioned resins have higher insulating capability than enamel-formed insulating coats. As a matter of course, the permittivity may be degraded depending on the forming state and impurities. Among the aforementioned resins, a PPS or PEEK resin, whose coefficient of linear expansion is higher than those of enamel-formed insulating coats but lower than those of other resins, is particularly suitable for forming the second-layer outer coat.

Moreover, it is preferable that the adhesion strengths between the two types of insulating coats (i.e., the intermediate insulating coat and the outer insulating coat) provided outside the wires 181 and the enamel-formed insulating coats of the wires 181 are lower than the adhesion strength between the copper wire and the enamel-formed insulating coat in each of the wires 181. Consequently, it is possible to prevent the enamel-formed insulating coats of the wires 181 and the two types of insulating coats provided outside the wires 181 from being damaged at the same time.

In the case of a stator having a water-cooled, liquid-cooled or air-cooled structure, it is basically considered that thermal stress and/or impact stress act first on the outer coat 182. However, even when the wire coats 181b of the wires 181 are formed of a different resin from the two types of insulating coats provided outside the wires 181, it is possible to have portions of the wires 181 not adhered to the two types of insulating coats, thereby reducing the aforementioned thermal stress and/or impact stress. Specifically, the outer coat 182 may be formed, using a fluorine, polycarbonate, silicone, epoxy, polyethylene naphthalate or LCP resin, outside the wires 181 with a void space provided between the wires 181 and the outer coat 182. In this case, it is preferable to bond the outer coat 182 and the wire coats 181b of the wires 181 to each other using an adhesive which has low permittivity and low coefficient of linear expansion, such as an epoxy adhesive. In this case, it is possible to enhance the mechanical strength, prevent the inner and outer insulating coasts from being damaged due to friction caused by vibration of the electrical conductor sections and prevent the outer insulating coat from being damaged due to the difference in coefficient of linear expansion between the inner and outer insulating coasts.

In addition, in the step of fixing the electrical conductors 82 which is generally performed as a final insulation step of the manufacturing process of the stator, it is preferable to use a resin having excellent formability and similar properties (e.g., permittivity, coefficient of linear expansion, etc.) to the enamel-formed insulating coats, such as an epoxy, PPS, PEEK or LCP resin.

In general, resin potting is performed using a urethane or silicone resin. However, these resins have a coefficient of linear expansion considerably different from those of the other resins used; therefore thermal stress may be induced which may shear these resins. Therefore, these resins are not suitable for applications of 60V or higher on which strict insulation regulations are internationally imposed. In this regard, performing injection molding with an epoxy, PPS, PEEK or LCP resin as the final insulation step, it is possible to satisfy the above requirements.

Seventeenth Modification

In this modification, part of the structure of the magnet unit 42 is modified. Accordingly, the differences of this modification from the above-described second embodiment will be mainly described.

Figure 51:
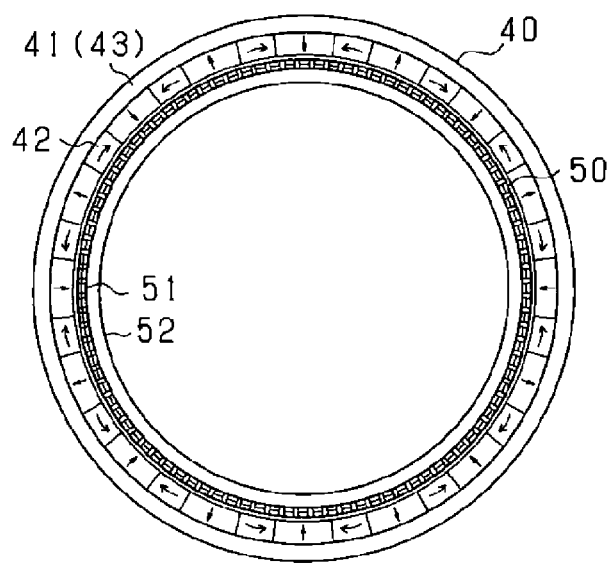
FIG. 51 is a transverse cross-sectional view of a rotor and a stator in a seventeenth modification.
Figure 52:
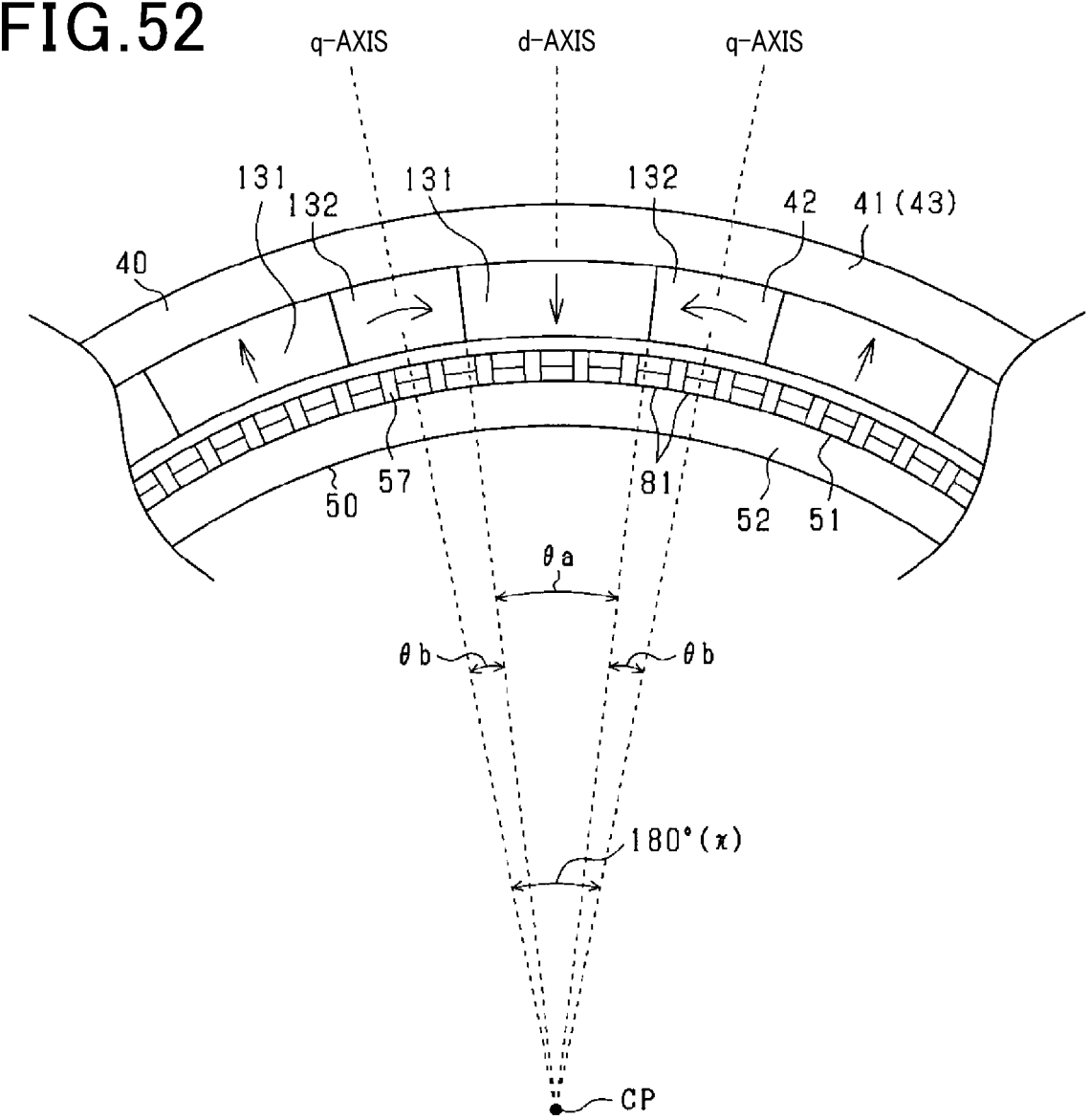
FIG. 52 is an enlarged view of part of FIG. 51.

As shown in FIGS. 51 and 52, in this modification, the magnet unit 42 does not include magnetic members 133 as shown in FIG. 23. Therefore, the radially outer peripheral surfaces of the second magnets 132 are arranged to abut the radially inner peripheral surface of the magnet holder 41.

Each of the first magnets 131 is linearly oriented (or parallel oriented) to form a magnet magnetic path parallel to the d-axis. The direction of the easy axis of magnetization is the same on the radially-opposite pair of magnetic flux acting surfaces of each of the first magnets 131.

Each of the second magnets 132 is located to extend across the q-axis. Moreover, each of the second magnets 132 is oriented to form an arc-shaped magnet magnetic path that is convex toward the opposite side to the stator 50.

With the above configuration of the magnet unit 42 including the first magnets 131 and the second magnets 132, it becomes possible to make, with a simpler orientation technique, the waveform of the surface magnetic flux density of the magnet unit 42 approximate to a sine wave in comparison with a configuration where only one magnet is provided in an electrical angular range corresponding to one magnetic pole. As a result, it becomes possible to increase the torque of the rotating electric machine 10.

Moreover, according to the present modification, it becomes possible to lengthen the magnet magnetic paths of the magnet unit 42 in comparison with the configuration shown in FIG. 23. As a result, it becomes possible to increase the amount of magnetic flux of the magnet unit 42, thereby further increasing the torque of the rotating electric machine 10. In addition, it also becomes possible to make it difficult for the first and second magnets 131 and 132 to become demagnetized.

Furthermore, according to the present modification, it becomes possible to prevent the first and second magnets 131 and 132 from being detached from the magnet holder 41. More specifically, the coefficient of linear expansion of the magnets is lower in a direction perpendicular to the direction of the easy axis of magnetization than in the direction of the easy axis of magnetization. Therefore, if the second magnets were linearly oriented in a direction perpendicular to the q-axis, with change in the temperature of the magnet unit 42, the amount of radial deformation of the second magnets would become excessively large in comparison with the amount of radial deformation of the first magnets. As a result, the second magnets might be detached from the magnet holder 41. In contrast, according to the present modification, in the second magnets 132, the direction of the easy axis of magnetization is deviated from the direction perpendicular to the q-axis in the vicinities of the surfaces of the second magnets 132 facing the first magnets 131. Consequently, it becomes possible to reduce the difference between the amount of radial deformation of the second magnets and the amount of radial deformation of the first magnets with change in the temperature of the magnet unit 42. As a result, it becomes possible to prevent the first and second magnets 131 and 132 from being detached from the magnet holder 41.

Figure 53:
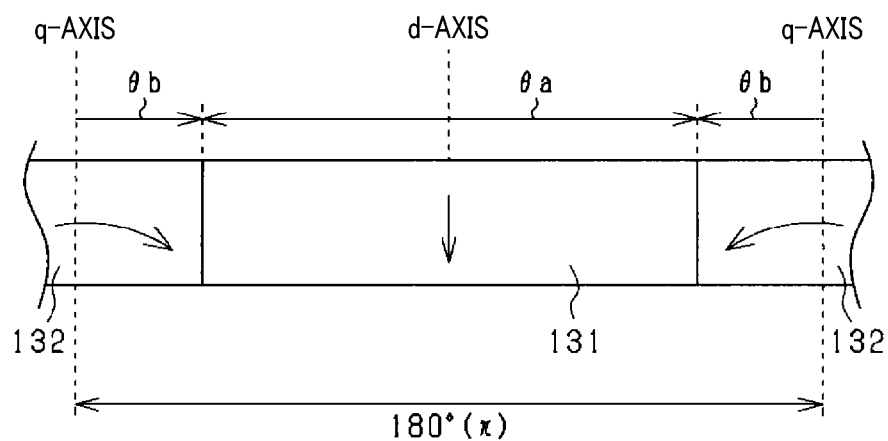
FIG. 53 is a developed view of first and second magnets along a circumferential direction.

As shown in FIGS. 52 and 53, for each of the first magnets 131, a main magnetic pole angle θa is defined, in an electrical angular range of 180° corresponding to one magnetic pole (i.e., in a half electrical angular cycle), as an angle between a straight line extending through one of the two q-axis-side ends of the first magnet 131 in the circumferential direction and the axis CP of the rotating shaft 11 and a straight line extending through the other of the two q-axis-side ends of the first magnet 131 in the circumferential direction and the axis CP of the rotating shaft 11. Moreover, an auxiliary magnetic pole angle θb is defined as ½ of the value obtained by subtracting the main magnetic pole angle θa from the 180° (i.e., π[rad]) that represents a half electrical angular cycle. Here, (2×θb) represents the electrical angular range where the second magnets 132 are present in one electrical angular cycle. In addition, FIG. 53 is a developed view of the magnet unit 42 along the circumferential direction.

The present modification is characterized by a method of setting the main magnetic pole angle θa. Hereinafter, the setting method will be described. The density B of the magnetic flux crossing the electrical conductors 82 represents the synthesis of waveforms of the main magnetic flux which are symmetric with respect to the d-axis. Therefore, the magnetic flux density B can be expressed by the following Equation (4). On the right side of Equation (4), $B_{1+n}$, $B_{3+n}$, and $B_{5+n}$ represent amplitudes of the magnetic flux density and θ represents electrical angle.

$$B = \sum_{n=0}^{\infty} \{B_{1+n}\sin(1+6n)\theta + B_{3+n}\sin(3+6n)\theta + B_{5+n}\sin(5+6n)\theta\} \quad (4)$$

Of the magnetic flux density expressed by above Equation (4), high-amplitude components are generally the low-order components up to the fifth order, i.e., the fundamental components of a progressive wave, a regressive wave and an in-phase wave. More specifically, the high-amplitude components are those components in above Equation (4) with n=0. Hereinafter, the third-order harmonic of the in-phase wave and the fifth-order harmonic of the regressive wave, which are high-amplitude and low-order harmonic components, will be described.

Figure 54:
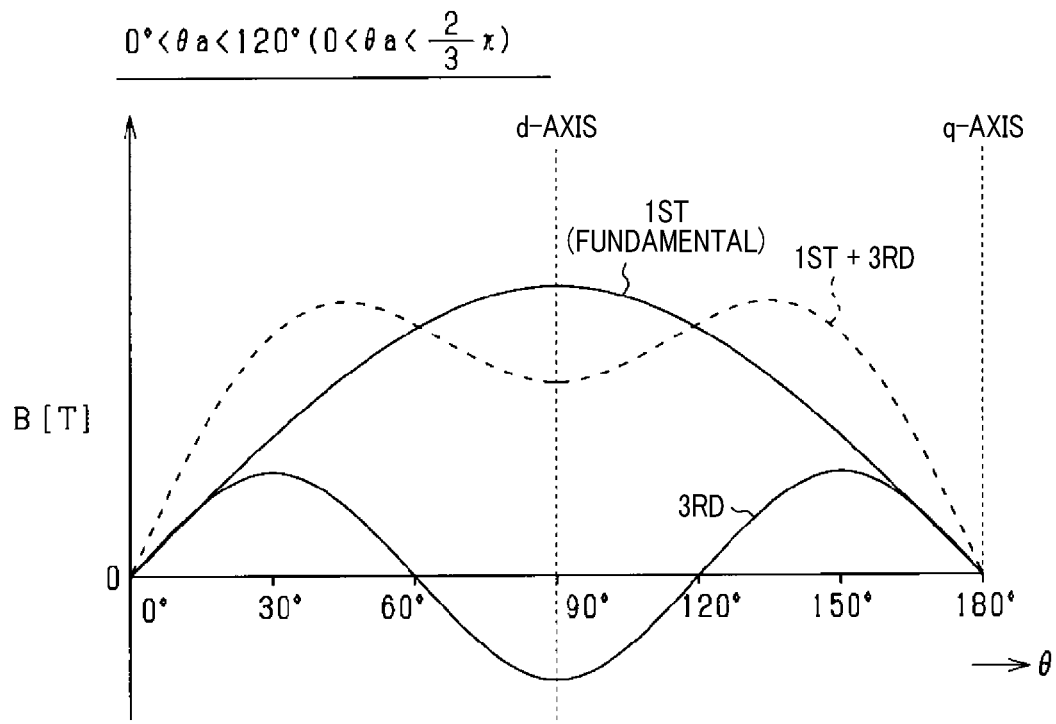
FIG. 54 is a diagram illustrating the waveforms of the first-order component and the third-order harmonic of the magnetic flux density when 0°<θa<120'.
Figure 55:
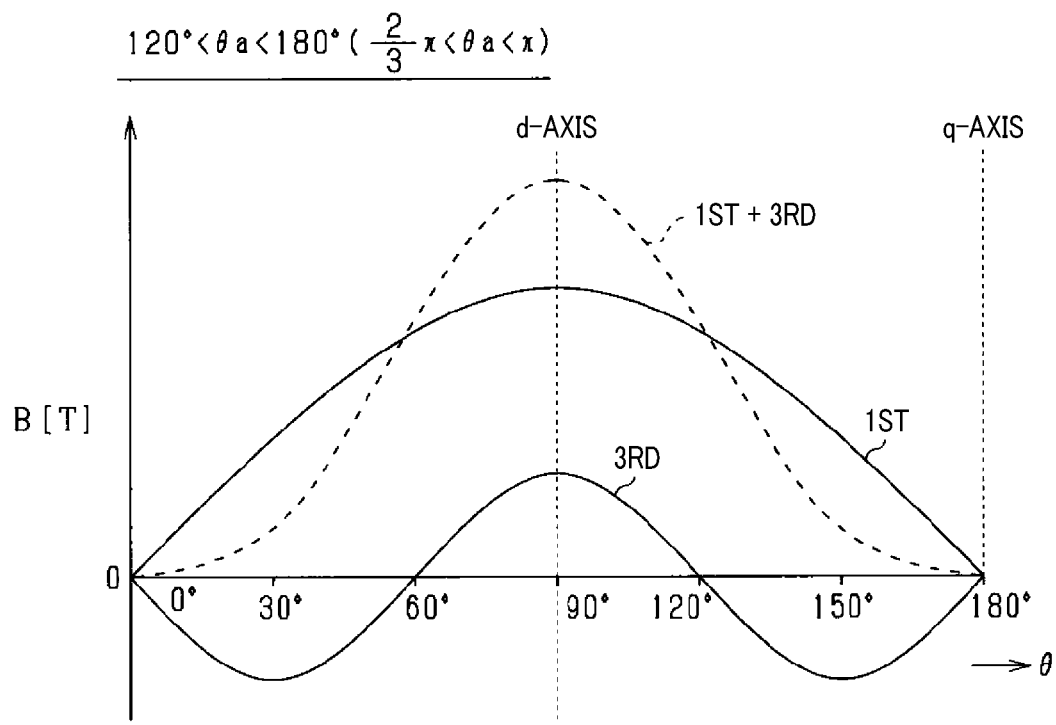
FIG. 55 is a diagram illustrating the waveforms of the first-order component and the third-order harmonic of the magnetic flux density when 120°<θa<180°.

First, referring to FIGS. 54 and 55, the third-order harmonic will be described. FIG. 54 illustrates the change of the magnetic flux density B with electrical angle θ when the main magnetic pole angle θa is set such that 0°<θa<120° (i.e., 0<θa<2π/3). FIG. 55 illustrates the change of the magnetic flux density B with electrical angle θ when the main magnetic pole angle θa is set such that 120°<θa<180° (i.e., 2π/3<θa<π). In FIGS. 54 and 55, there are shown: the fundamental component which is the first-order component of the magnetic flux density B; the third-order harmonic; and the synthetic wave of the fundamental component and the third-order harmonic. The third-order harmonic zero-crosses every 60° (i.e. every π/3), and thus is inverted in polarity every 60°.

As shown in FIG. 54, when 0°<θa<120°, in the electrical angular range of 0°-180° where the polarity of the fundamental component is N, the absolute value of the total value of the N-pole third-order harmonic is larger than the absolute value of the total value of the S-pole third-order harmonic. As a result, the effective value of the amount of magnetic flux of the magnet unit 42 in the electrical angular range of 0°-180° is increased. Moreover, when 0°<θa<120°, in the electrical angular range of 180°-360° where the polarity of the fundamental component is S, the absolute value of the total value of the S-pole third-order harmonic is larger than the absolute value of the total value of the N-pole third-order harmonic. As a result, the effective value of the amount of magnetic flux of the magnet unit 42 in the electrical angular range of 180°-360° is also increased.

By increasing the effective value of the magnetic flux density in one electrical angular cycle of 0°-360° as above, it becomes possible to increase the effective value, per cycle, of the product of the amount of magnetic flux of the magnet unit 42 and the electrical angular velocity. As a result, it becomes possible to increase the torque of the rotating electric machine 10. Therefore, the condition of (0°<θa<120°) (hereinafter, to be referred as the condition B) contributes to the effect of increasing the torque of the rotating electric machine 10.

Moreover, satisfying the condition B, it becomes possible to make the waveform of the counterelectromotive force generated in the electrical conductors 82 approximate to a trapezoidal wave, thereby lowering the peak values of the counterelectromotive force. Consequently, when low-withstand voltage elements are employed as the switches Sp and Sn of the inverters 101 and 102, the peak values of the counterelectromotive force can be made lower than or equal to the withstand voltages of the elements.

Furthermore, as shown in FIG. 54, when 0°<θa<120°, on the d-axis, the polarity of the fundamental component and the polarity of the third-order harmonic are different from each other. Therefore, as seen from the synthetic wave shown with a dashed line in FIG. 54, the peak value of the d-axis magnetic flux is lowered by the third-order harmonic. Consequently, it becomes easy for field-weakening control to be effective. This is because the magnetic flux concentrates on the q-axis, resulting in a saliency (e.g., regular saliency) in the inductance. From the above, it is clear that when 0°<θa<120°, it is possible to achieve improvement in the d-axis field-weakening capability of the core-less motor.

Next, referring to FIG. 55, explanation will be given of the case where 120°<θa<180°. In this case, the phase of the third-order harmonic is different by 60° from the phase of the third-order harmonic shown in FIG. 54. Moreover, in this case, as shown in FIG. 55, in the electrical angular range of 0°-180° where the polarity of the fundamental component is N, the absolute value of the total value of the N-pole third-order harmonic is smaller than the absolute value of the total value of the S-pole third-order harmonic. As a result, the effective value of the amount of magnetic flux of the magnet unit 42 in the electrical angular range of 0°-180° is lowered. Furthermore, when 120°<θa<180°, in the electrical angular range of 180°-360° where the polarity of the fundamental component is S, the absolute value of the total value of the S-pole third-order harmonic is smaller than the absolute value of the total value of the N-pole third-order harmonic. As a result, the effective value of the amount of magnetic flux of the magnet unit 42 in the electrical angular range of 180°-360° is also lowered.

By lowering the effective value of the magnetic flux density in one electrical angular cycle of 0°-360° as above, it becomes possible to achieve the field-weakening effect, thereby lowering the counterelectromotive force generated in the electrical conductors 82. Therefore, the condition of (120°<θa<180°) (hereinafter, to be referred as the condition A) contributes to high-speed rotation of the rotating electric machine 10.

Moreover, as shown in FIG. 55, when 120°<θa<180°, the third-order harmonic has the effect of increasing the d-axis magnetic flux. That is, it becomes possible to achieve the effect of increasing the d-axis magnetic flux in the core-less motor. At the same time, since the magnetic saturation at the q-axis is relieved in the core-less motor, it becomes possible to increase the inductance at the q-axis, resulting in an inverse saliency and thereby achieving high torque in a high-speed rotation region.

Figure 56:
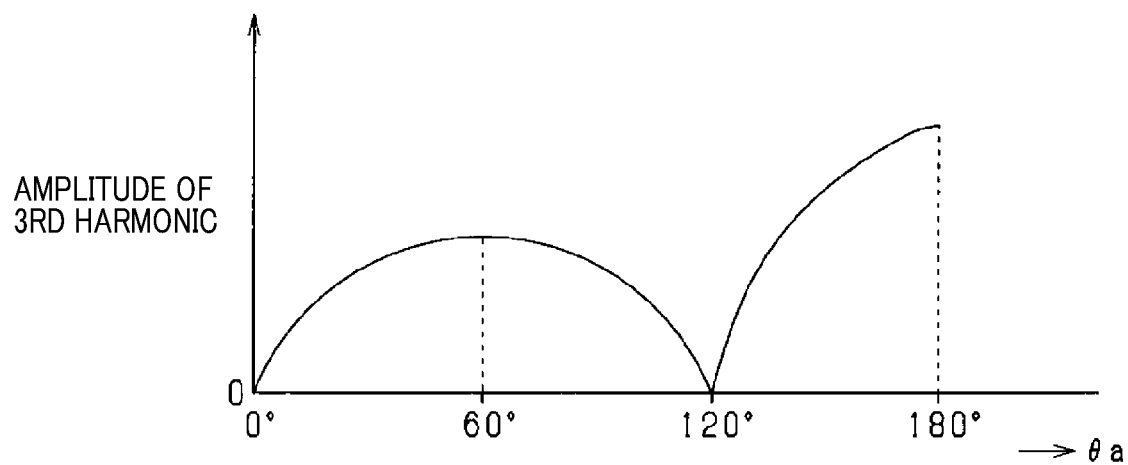
FIG. 56 is a diagram illustrating the relationship between the main magnetic pole angle θa and the amplitude of the third-order harmonic.

FIG. 56 illustrates the amplitude characteristics of the third-order harmonic with respect to the main magnetic pole angle θa.

The amplitude of the third-order harmonic has a local maximum value when the main magnetic pole angle θa is equal to 60°. Moreover, the amplitude of the third-order harmonic becomes 0 when the main magnetic pole angle θa is equal to 120°. That is, when the main magnetic pole angle θa is equal to 120°, no third-order harmonic is included in the waveform of the magnetic flux density of the magnet unit 42. Furthermore, with the main magnetic pole angle θa approaching 180°, the amplitude of the third-order harmonic increases above the local maximum value which it takes when the main magnetic pole angle θa is equal to 60°. This is because with increase in the main magnetic pole angle θa, the circumferential length of the first magnets 131 is increased, thereby increasing the volume of the first magnets 131.

Figure 57:
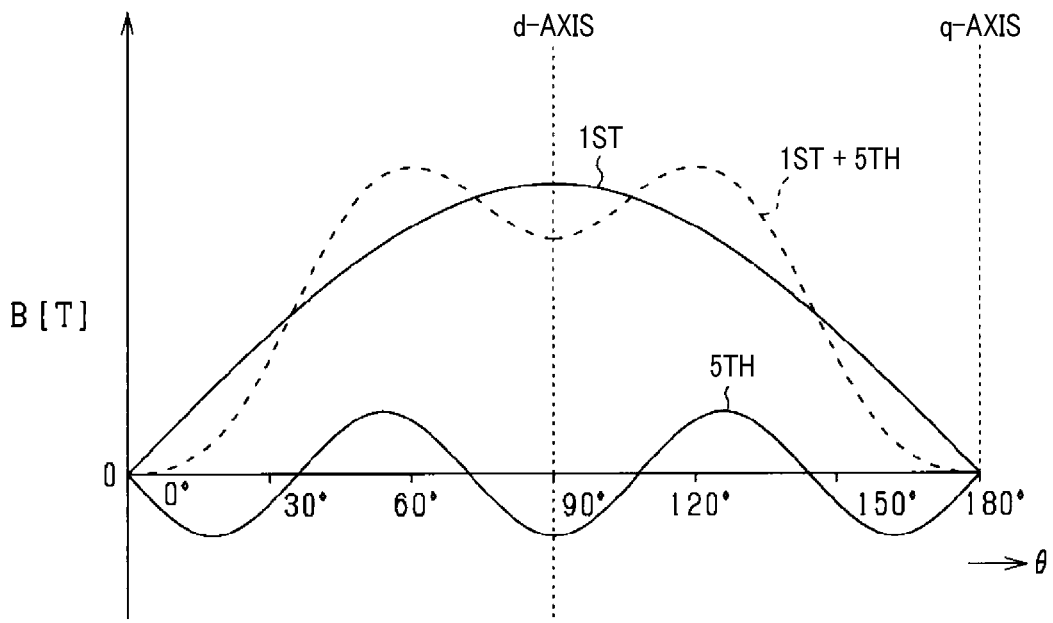
FIG. 57 is a diagram illustrating the waveforms of the first-order component and the fifth-order harmonic of the magnetic flux density when 0°<θa<72° or 144°<θa<180°.
Figure 58:
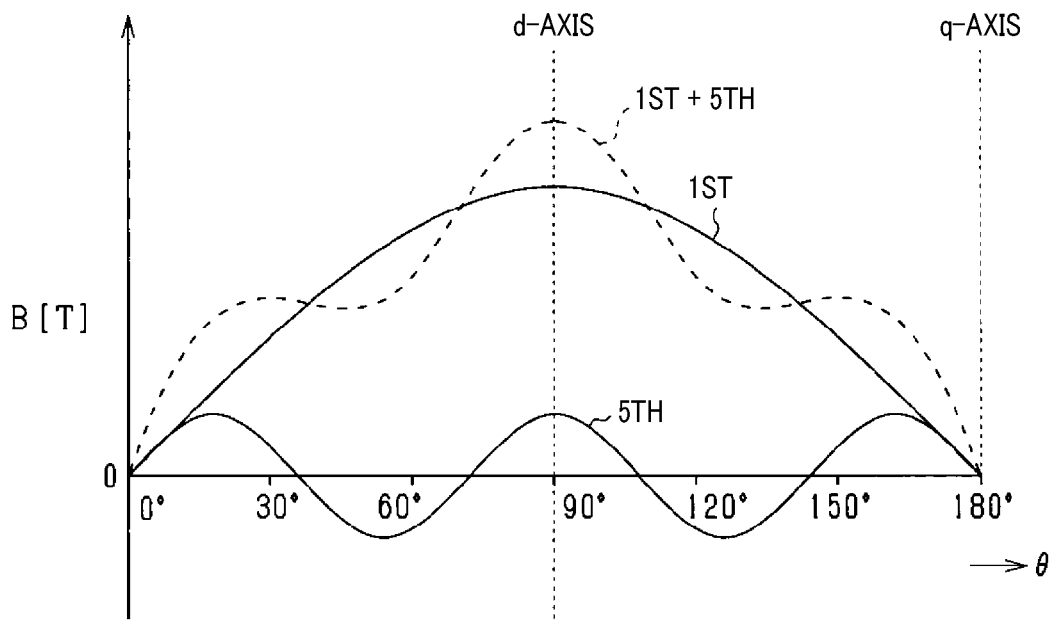
FIG. 58 is a diagram illustrating the waveforms of the first-order component and the fifth-order harmonic of the magnetic flux density when 72°<θa<144°.

Next, referring to FIGS. 57 and 58, the fifth-order harmonic will be described. FIG. 57 illustrates the change of the magnetic flux density B with electrical angle θ when the main magnetic pole angle θa is set such that 0°<θa<72° (i.e., 0<θa<2π/5) or 144°<θa<180° (i.e., 4π/5<θa<π). FIG. 58 illustrates the change of the magnetic flux density B with electrical angle θ when the main magnetic pole angle θa is set such that 72°<θa<144° (i.e., 2π/5<θa<4π/5). In FIGS. 57 and 58, there are shown the fundamental component, the fifth-order harmonic and the synthetic wave of the fundamental component and the fifth-order harmonic. The fifth-order harmonic zero-crosses every 36° (i.e. every π/5), and thus is inverted in polarity every 36°.

As shown in FIG. 57, when 0°<θa<72° or 144°<θa<180°, in the electrical angular range of 0°-180° where the polarity of the fundamental component is N, the absolute value of the total value of the N-pole fifth-order harmonic is smaller than the absolute value of the total value of the S-pole fifth-order harmonic. As a result, the effective value of the amount of magnetic flux of the magnet unit 42 in the electrical angular range of 0°-180° is lowered. Moreover, when 0°<θa<72° or 144°<θa<180°, in the electrical angular range of 180°-360° where the polarity of the fundamental component is S, the absolute value of the total value of the S-pole fifth-order harmonic is smaller than the absolute value of the total value of the N-pole fifth-order harmonic. As a result, the effective value of the amount of magnetic flux of the magnet unit 42 in the electrical angular range of 180°-360° is also lowered.

By lowering the effective value of the magnetic flux density in one electrical angular cycle of 0°-360° as above, it becomes possible to achieve the field-weakening effect, thereby lowering the counterelectromotive force generated in the electrical conductors 82. Therefore, the condition of (0°<θa<72°) or (144°<θa<180°) (hereinafter, to be referred as the condition D) contributes to high-speed rotation of the rotating electric machine 10.

Moreover, satisfying the condition D, it becomes possible to make the waveform of the counterelectromotive force generated in the electrical conductors 82 approximate to a trapezoidal wave, thereby lowering the peak values of the counterelectromotive force. Consequently, when low-withstand voltage elements are employed as the switches Sp and Sn of the inverters 101 and 102, the peak values of the counterelectromotive force can be made lower than or equal to the withstand voltages of the elements.

Furthermore, as shown in FIG. 57, when 0°<θa<72° or 144°<θa<180°, on the d-axis, the polarity of the fundamental component and the polarity of the fifth-order harmonic are different from each other. Therefore, as seen from the synthetic wave shown with a dashed line in FIG. 57, the peak value of the d-axis magnetic flux is lowered by the fifth-order harmonic. Consequently, it becomes easy for field-weakening control to be effective. That is, when 0°<θa<72° or 144°<θa<180°, it is possible to achieve improvement in the d-axis field-weakening capability of the core-less motor.

Next, referring to FIG. 58, explanation will be given of the case where 72°<θa<144°. In this case, the phase of the fifth-order harmonic is different by 36° from the phase of the fifth-order harmonic shown in FIG. 57. Moreover, in this case, as shown in FIG. 58, in the electrical angular range of 0°-180° where the polarity of the fundamental component is N, the absolute value of the total value of the N-pole fifth-order harmonic is larger than the absolute value of the total value of the S-pole fifth-order harmonic. As a result, the effective value of the amount of magnetic flux of the magnet unit 42 in the electrical angular range of 0°-180° is increased. Furthermore, when 72°<θa<144°, in the electrical angular range of 180°-360° where the polarity of the fundamental component is S, the absolute value of the total value of the S-pole fifth-order harmonic is larger than the absolute value of the total value of the N-pole fifth-order harmonic. As a result, the effective value of the amount of magnetic flux of the magnet unit 42 in the electrical angular range of 180°-360° is also lowered.

By increasing the effective value of the magnetic flux density in one electrical angular cycle of 0°-360° as above, it becomes possible to increase the effective value, per cycle, of the product of the amount of magnetic flux of the magnet unit 42 and the electrical angular velocity. As a result, it becomes possible to increase the torque of the rotating electric machine 10. Therefore, the condition of (72°<θa<144°) (hereinafter, to be referred as the condition C) contributes to the effect of increasing the torque of the rotating electric machine 10.

Moreover, as shown in FIG. 58, when 72°<θa<144°, the fifth-order harmonic has the effect of increasing the d-axis magnetic flux. That is, it becomes possible to achieve the effect of increasing the d-axis magnetic flux in the core-less motor. At the same time, since the magnetic saturation at the q-axis is relieved in the core-less motor, it becomes possible to increase the inductance at the q-axis, thereby achieving high torque in a high-speed rotation region.

Figure 59:
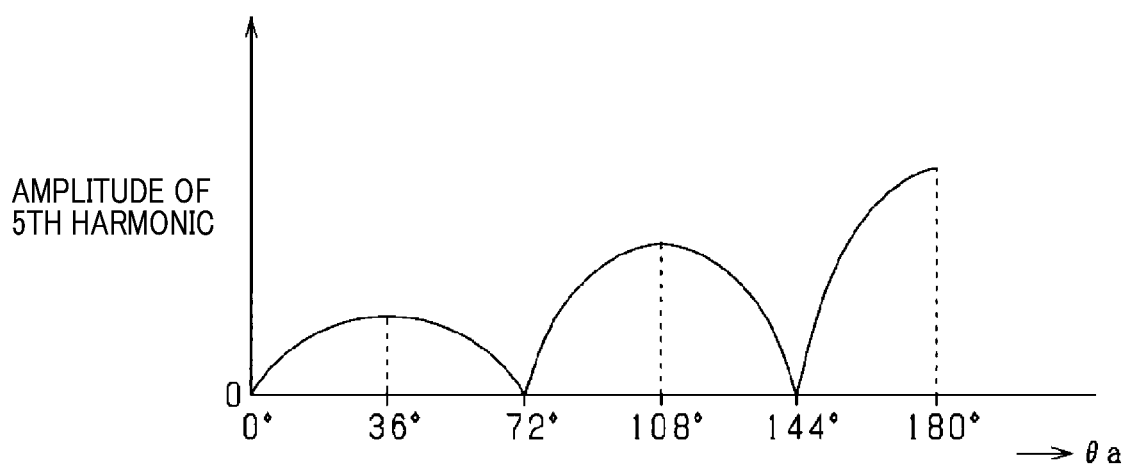
FIG. 59 is a diagram illustrating the relationship between the main magnetic pole angle θa and the amplitude of the fifth-order harmonic.

FIG. 59 illustrates the amplitude characteristics of the fifth-order harmonic with respect to the main magnetic pole angle θa.

The amplitude of the fifth-order harmonic has local maximum values when the main magnetic pole angle θa is equal to 36° and when the main magnetic pole angle θa is equal to 108°. These local maximum values of the amplitude of the fifth-order harmonic are smaller than the local maximum value of the amplitude of the third-order harmonic when the main magnetic pole angle θa is equal to 60°.

Moreover, the amplitude of the fifth-order harmonic becomes 0 when the main magnetic pole angle θa is equal to 72° and when the main magnetic pole angle θa is equal to 144°. That is, when the main magnetic pole angle θa is equal to 72° or 144°, no fifth-order harmonic is included in the waveform of the magnetic flux density of the magnet unit 42. Furthermore, with the main magnetic pole angle θa approaching 180°, the amplitude of the fifth-order harmonic increases again. The local maximum value of the amplitude of the fifth-order harmonic when the main magnetic pole angle θa is equal to 108° is larger than the local maximum value of the same when the main magnetic pole angle θa is equal to 36°; with the main magnetic pole angle θa approaching 180°, the amplitude of the fifth-order harmonic increases above the local maximum value which it takes when the main magnetic pole angle θa is equal to 108°. This is because with increase in the main magnetic pole angle θa, the circumferential length of the first magnets 131 is increased, thereby increasing the volume of the first magnets 131.

The above-described conditions A-D can be summarized as follows.

The condition A (120°<θa<180°): under which it is easy to realize high-speed rotation.

The condition B (0°<θa<120°): under which it is easy to achieve high torque.

The condition C (72°<θa<144°): under which it is easy to achieve high torque.

The condition D (0°<θa<72°, 144°<θa<180°): under which it is easy to realize high-speed rotation.

On the other hand, as a condition for achieving high torque, in the rotating electric machine 10 where two or more phases are energized at the same time, the following condition E is derived where S is the number of phases.

The condition E (0<θa≤2π/S): under which it is easy to achieve high torque.

Figure 60A:
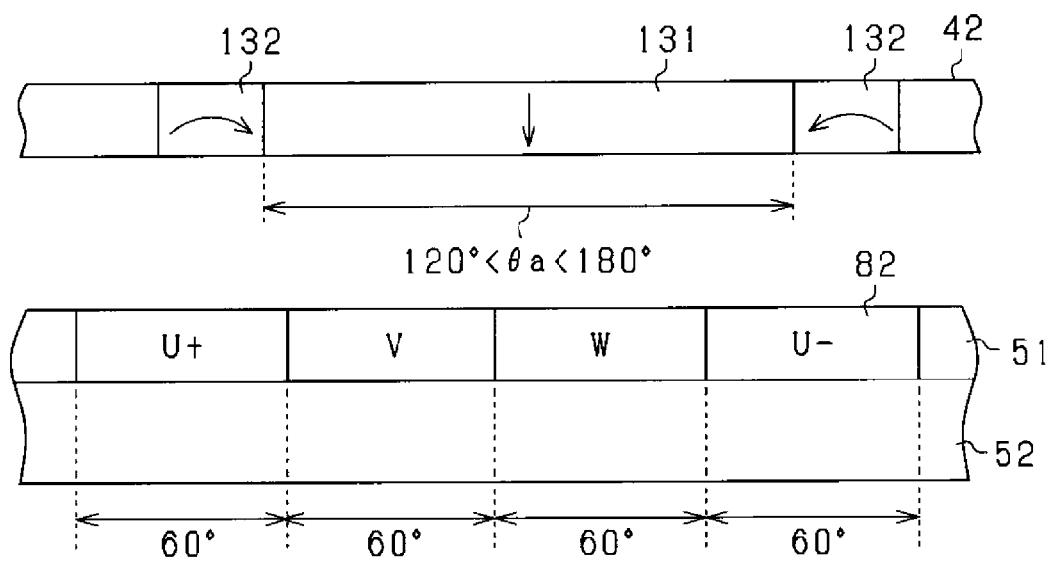
FIGS. 60(a) and 60(b) are diagrams illustrating the relationship between the range of the main magnetic pole angle θa and the stator coil 51.
Figure 60B:
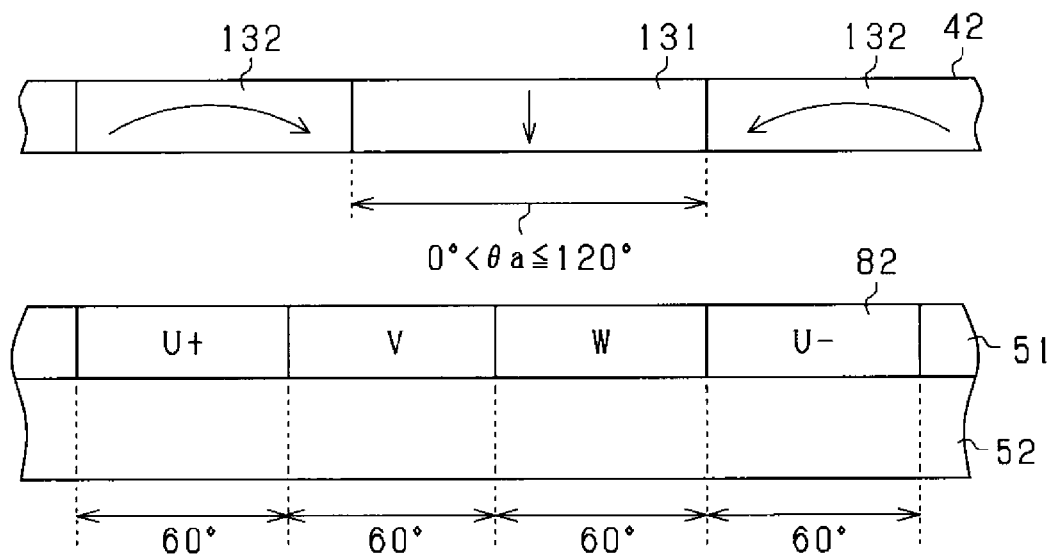

The condition E can also be expressed as (0°<θa≤360°/S). When the main magnetic pole angle θa is larger than 2π/S (i.e., 120°), as shown in FIG. 60(*a*), each of the first magnets 131 faces the circumferentially-adjacent electrical conductors 82 of the same phase at the same time. FIG. 60(*a*) illustrates an example where one of the first magnets 131 faces two circumferentially-adjacent U-phase electrical conductors 82 at the same time. The polarities of magnetic fluxes generated with energization of the electrical conductors 82 are different between the circumferentially-adjacent electrical conductors 82 of the same phase. Therefore, with each of the first magnets 131 facing the circumferentially-adjacent electrical conductors 82 of the same phase at the same time, part of the magnetic flux of each of the first magnets 131 would be canceled, thereby lowering the amount of magnetic flux of the magnet unit 42. As a result, the effect of increasing the torque of the rotating electric machine 10 would be lowered. To solve this problem, as shown in FIG. 60(*b*), the condition E is satisfied. Consequently, it becomes possible to have the waveform of the magnetic flux density of the magnet unit 42 in an electrical angular range corresponding to one magnetic pole concentrated within an electrical angular range of 120° into a convex shape, thereby improving the effect of increasing the torque of the rotating electric machine 10.

On the basis of the above-described conditions A-E, the rotating electric machine 10 can be designed to have one of the first to the ninth configurations shown in FIG. 61. Hereinafter, the first to the ninth configurations will be described.

[First Configuration]

The first configuration is a configuration which satisfies both the condition B of (0°<θa<120°) contributing to the torque-increasing effect and the condition E of (0°<θa<360°/S) contributing to the torque-increasing effect. In the present modification, S=3. Therefore, the first configuration is a configuration which satisfies (0°<θa<120°). With the first configuration, it is possible to achieve high torque of the rotating electric machine 10.

[Second Configuration]

The second configuration is a configuration which satisfies both the condition B of (0°<θa<120°) under which the third-order harmonic contributes to the torque-increasing effect and the condition D of (0°<θa<72°) contributing to high-speed rotation. That is, the second configuration is a configuration which satisfies (0°<θa<72°). With the second configuration, it is possible to achieve high torque of the rotating electric machine 10 while realizing high-speed rotation of the same.

[Third Configuration]

The third configuration is a configuration which further satisfies, compared to the second configuration, the condition E of (0°<θa≤360°/S) contributing to the torque-increasing effect in addition to the conditions B and D. That is, the third configuration is a configuration which satisfies both (0°<θa≤360°/S) and (0°<θa<72°). In the present modification, S=3. Therefore, the third configuration is a configuration which satisfies (0°<θa<72°). With the third configuration, it is possible to further increase the torque of the rotating electric machine 10.

[Fourth Configuration]

The fourth configuration is a configuration which satisfies: the condition B of (0°<θa<120°) under which the third-order harmonic contributes to the torque-increasing effect; the condition C of (72°<θa<144°) under which the fifth-order harmonic contributes to the torque-increasing effect; and the condition E of (0°<θa≤360°/S) contributing to the torque-increasing effect. That is, the fourth configuration is a configuration which satisfies both (0°<θa≤360°/S) and (72°<θa<120°). In the present modification, S=3. Therefore, the fourth configuration is a configuration which satisfies (72°<θa<120°). With the fourth configuration, it is possible to maximize the torque of the rotating electric machine 10.

[Fifth Configuration]

The fifth configuration is a configuration which satisfies both the condition E of (0°<θa≤360°/S) contributing to the torque-increasing effect and the condition of (θa=120°) within (72°<θa<144°) under which the fifth-order harmonic contributes to the torque-increasing effect. That is, the fifth configuration is a configuration which satisfies both (0°<θa≤360°/S) and (θa=120°). In the present modification, S=3. Therefore, the fifth configuration is a configuration which satisfies (θa=120°). With the fifth configuration, it is possible to further increase the torque of the rotating electric machine 10.

Moreover, in the fifth configuration, the main magnetic pole angle θa is set to 120°. In this case, the amplitude of the third-order harmonic becomes 0. In the slot-less structure, it is easy for the magnet magnetic flux of the magnet unit 42 to directly cross the electrical conductors 82; thus it is easy for eddy current loss to increase. In this regard, with the fifth configuration, since the amplitude of the third-order harmonic included in the magnet magnetic flux becomes 0, the eddy current loss can be reduced.

[Sixth Configuration]

The sixth configuration is a configuration which satisfies (120°<θa<144°), so as to satisfy both the condition C of (72°<θa<144°) under which the fifth-order harmonic contributes to the torque-increasing effect and the condition A of (120°<θa<180°) under which the third-order harmonic contributes to high-speed rotation. With the sixth configuration, it is possible to increase the torque of the rotating electric machine 10 while realizing high-speed rotation of the same.

[Seventh Configuration]

The seventh configuration is a configuration which satisfies the condition of (θa=72°) within the condition B of (0°<θa≤120°) under which the third-order harmonic contributes to the torque-increasing effect, and the condition E of (0°<θa≤360°/S) contributing to the torque-increasing effect. In the present modification, S=3. Therefore, the seventh configuration is a configuration which satisfies (θa=72°). With the seventh configuration, it is possible to further improve the effect of increasing the torque of the rotating electric machine 10.

Moreover, in the seventh configuration, the main magnetic pole angle θa is set to 72°. In this case, the amplitude of the fifth-order harmonic becomes 0. Consequently, the eddy current loss can be reduced.

[Eighth Configuration]

The eighth configuration is a configuration which satisfies the condition of (θa=144°) within the condition A of (120°<θa<180°) under which the third-order harmonic contributes to high-speed rotation. With the eighth configuration, it is possible to realize high-speed rotation of the rotating electric machine 10.

Moreover, in the eighth configuration, the main magnetic pole angle θa is set to 144°. In this case, the amplitude of the fifth-order harmonic becomes 0. Consequently, the eddy current loss can be reduced.

[Ninth Configuration]

The ninth configuration is a configuration which satisfies (144°<θa<180°), so as to satisfy both the condition A of (120°<θa<180°) under which the third-order harmonic contributes to high-speed rotation and the condition D of (144°<θa<180°) under which the fifth-order harmonic contributes to high-speed rotation. With the ninth configuration, it is possible to realize high-speed rotation of the rotating electric machine 10.

Next, control of a controlled variable of the rotating electric machine 10 will be described with reference to FIGS. 62-64. In the present embodiment, the controlled variable is, for example, the torque or the rotational speed of the rotating electric machine 10. In addition, the control in the first inverter 101 and the control in the second inverter 102 are the same. Therefore, the control in the first inverter 101 will be mainly described hereinafter.

Figure 62A:
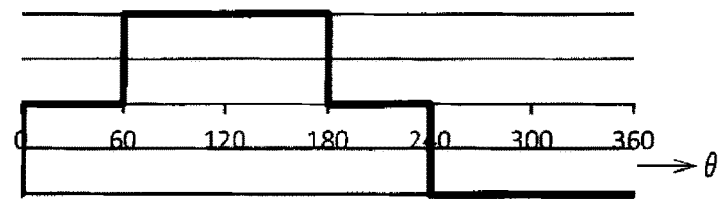
FIGS. 62(a)-62(c) are time charts illustrating 120° rectangular-wave energization control.
Figure 62B:
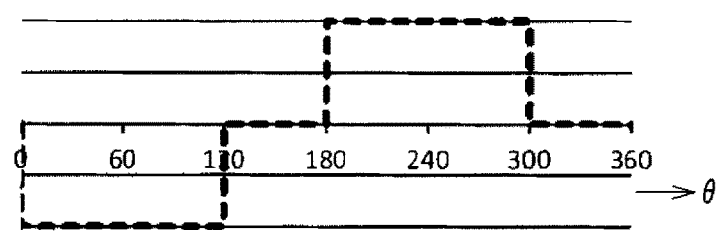
Figure 62C:
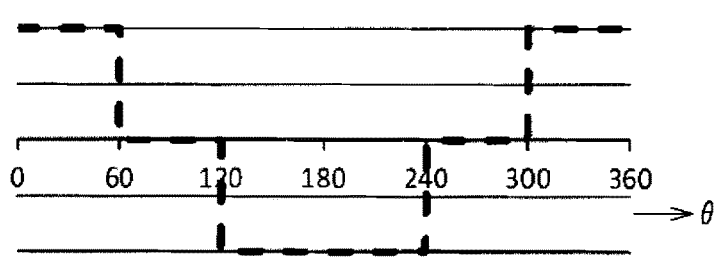
Figure 63:
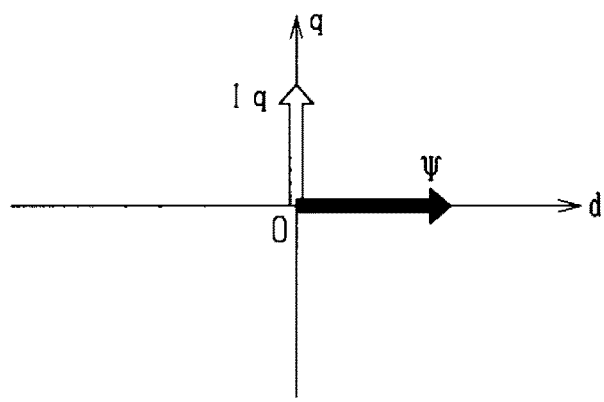
FIG. 63 is a vector diagram in a d-q coordinate system when only the q-axis current of the d-axis and q-axis currents is supplied to the armature coil.

As shown in FIG. 62, the controller 110 is capable of controlling (e.g., space-vector-controlling) the first inverter 101 for energization of each phase winding of the stator coil 51 by 120° rectangular-wave energization control. Rectangular-wave voltages of the three phases are offset in phase from each other by 120° in electrical angle. The rectangular waves whose electrical angular ranges are equal to 120° include no third-order harmonic. Therefore, the third-order harmonic included in the magnetic flux generated upon energization of the stator coil 51 and the third-order harmonic included in the magnet magnetic flux of the magnet unit 42 do not affect each other. As a result, it becomes possible to suppress hindrance to high torque and/or high-speed rotation of the rotating electric machine 10. In addition, in the case of the rotating electric machine 10 having no saliency, as shown in the d-q coordinate system of FIG. 63, the first inverter 101 may be controlled to supply only the q-axis current Iq of the d-axis and q-axis currents Id and Iq. In FIG. 63, Ψ designates the magnetic flux vector of the magnet unit 42. Otherwise, in the case of the rotating electric machine 10 having an inverse saliency, the controller 110 may control the first inverter 101 to supply the d-axis current Id so as to perform field-weakening control.

Figure 64A:
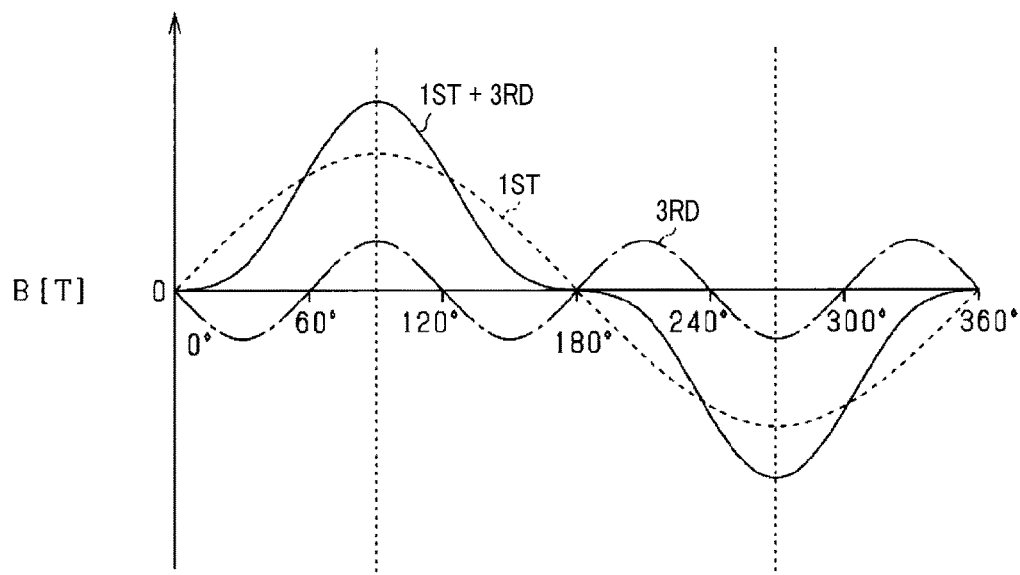
FIGS. 64(a) and 64(b) are time charts illustrating change in the magnetic flux density of the magnet section and change in phase current.
Figure 64B:
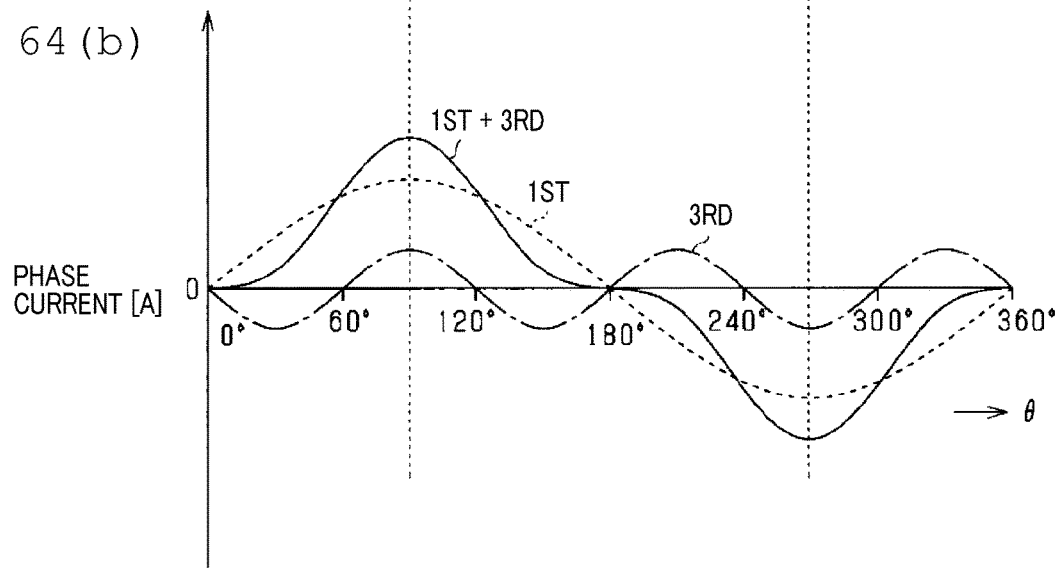

As shown in FIG. 64, the controller 110 is capable of controlling the first inverter 101 to supply an electric current, which is obtained by superimposing harmonic current that is in phase with a harmonic included in the magnet magnetic flux of the magnet unit 42 on fundamental current that is in phase with the fundamental component included in the magnet magnetic flux, as phase current to the stator coil 51. FIG. 64(a) illustrates change in the magnet magnetic flux while FIG. 64(b) illustrates change in the phase current. In addition, in FIG. 64, there are illustrated change in the magnet magnetic flux and change in the phase current when the above-described seventh configuration is employed.

In the example illustrated in FIG. 64, the electric current, which is obtained by superimposing third-order harmonic current that is in phase with the third-order harmonic of the magnet magnetic flux on the fundamental current, is supplied as the phase current to the stator coil 51. Therefore, the timings at which the synthetic wave of the fundamental component and third-order harmonic of the magnet magnetic flux reaches its extrema are coincident with the timings at which the phase current obtained by superimposing the third-order harmonic current on the fundamental current reaches its extrema. Consequently, it becomes possible to further improve, with the third-order harmonic current, the effect of increasing the torque of the rotating electric machine 10 which can be realized by the magnet magnetic flux.

In addition, the above control is not limited to the seventh configuration, but can also be applied to the first to the sixth, eighth and ninth configurations. For example, when the second configuration is employed in the rotating electric machine 10, an electric current, which is obtained by superimposing fifth-order harmonic current that is in phase with the fifth-order harmonic of the magnet magnetic flux on the fundamental current, may be supplied as the phase current to the stator coil 51. Otherwise, when, for example, the fourth configuration is employed in the rotating electric machine 10, an electric current, which is obtained by superimposing third-order and fifth-order harmonic currents that are respectively in phase with the third-order and fifth-order harmonics of the magnet magnetic flux on the fundamental current, may be supplied as the phase current to the stator coil 51.

Eighteenth Modification

In this modification, part of the structure of the magnet unit 42 is modified. Accordingly, the differences of this modification from the above-described seventeenth modification will be mainly described.

Figure 65:
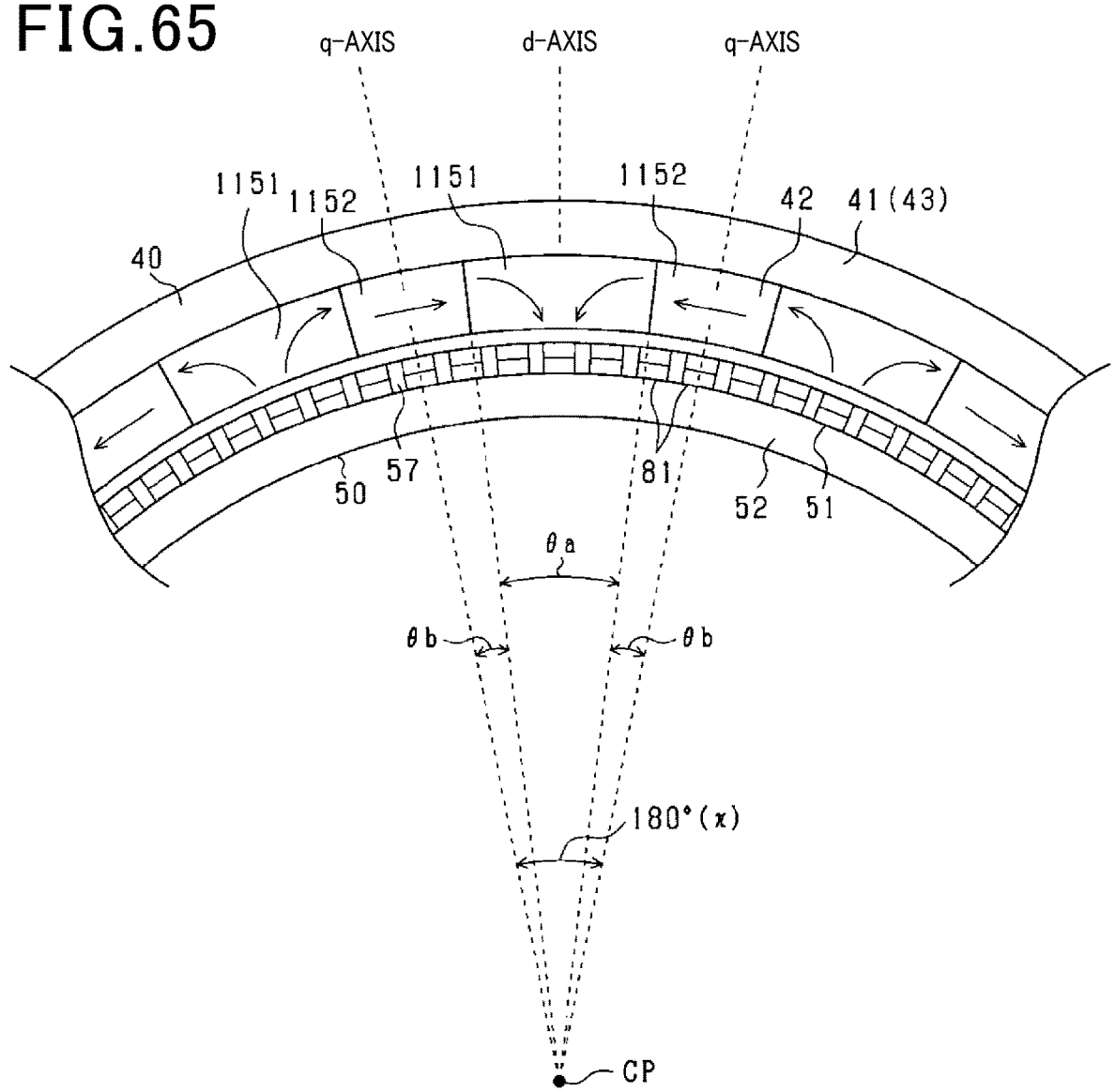
FIG. 65 is an enlarged view of part of a transverse cross section of both a rotor and a stator in an eighteenth modification.

In this modification, as shown in FIG. 65, each of the first magnets 1151 is oriented to form arc-shaped magnet magnetic paths such that the direction of the easy axis of magnetization is parallel to or near parallel to the d-axis on the d-axis side and perpendicular to or near perpendicular to the q-axis on the q-axis side. Moreover, each of the second magnets 1152 is linearly oriented to form a magnet magnetic path perpendicular to the q-axis. In addition, the direction of the easy axis of magnetization is the same on the radially-opposite pair of magnetic flux acting surfaces of each of the second magnets 1152.

Figure 66:
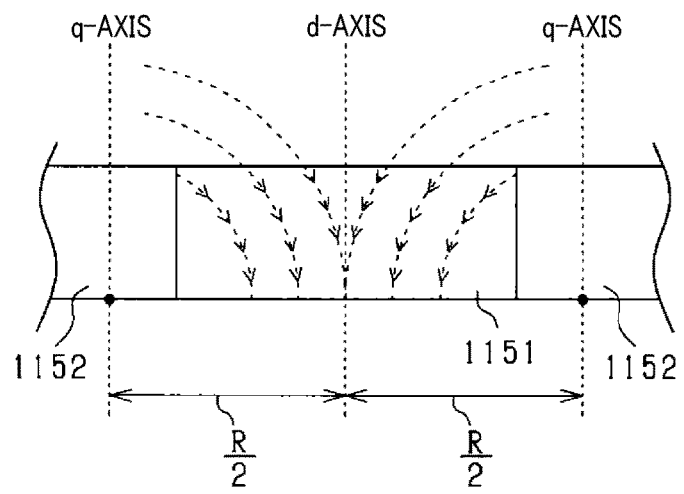
FIG. 66 is a diagram illustrating the orientation direction of each of first magnets in the eighteenth modification.

Referring to FIG. 66, an exemplary orientation method of the first magnets 1151 will be described. FIG. 66 is a developed view of the first and second magnets 1151 and 1152 along the circumferential direction. In FIG. 66, R represents one magnetic pole pitch of the magnet unit 42. The orientation direction is set such that easy axes of magnetization are aligned in an arc shape along orientation circles which center respectively on the intersection points between the surfaces of the second magnets 1152 facing the stator 50 and the q-axis and whose diameter is equal to R.

In addition, the magnet magnetic paths in the first magnets 1151 are not limited to the arc shape, but may alternatively be straight-line-shaped.

In this modification, the main magnetic pole angle θa may be defined for each of the first magnets 1151 and the auxiliary magnetic pole angle θb may be defined for each of the second magnets 1152 as in the seventeenth modification. Moreover, in this modification, the first to the ninth configurations may be employed as in the seventeenth modification.

Nineteenth Modification

In this modification, part of the structure of the magnet unit 42 is modified. Accordingly, the differences of this modification from the above-described seventeenth modification will be mainly described.

Figure 67:
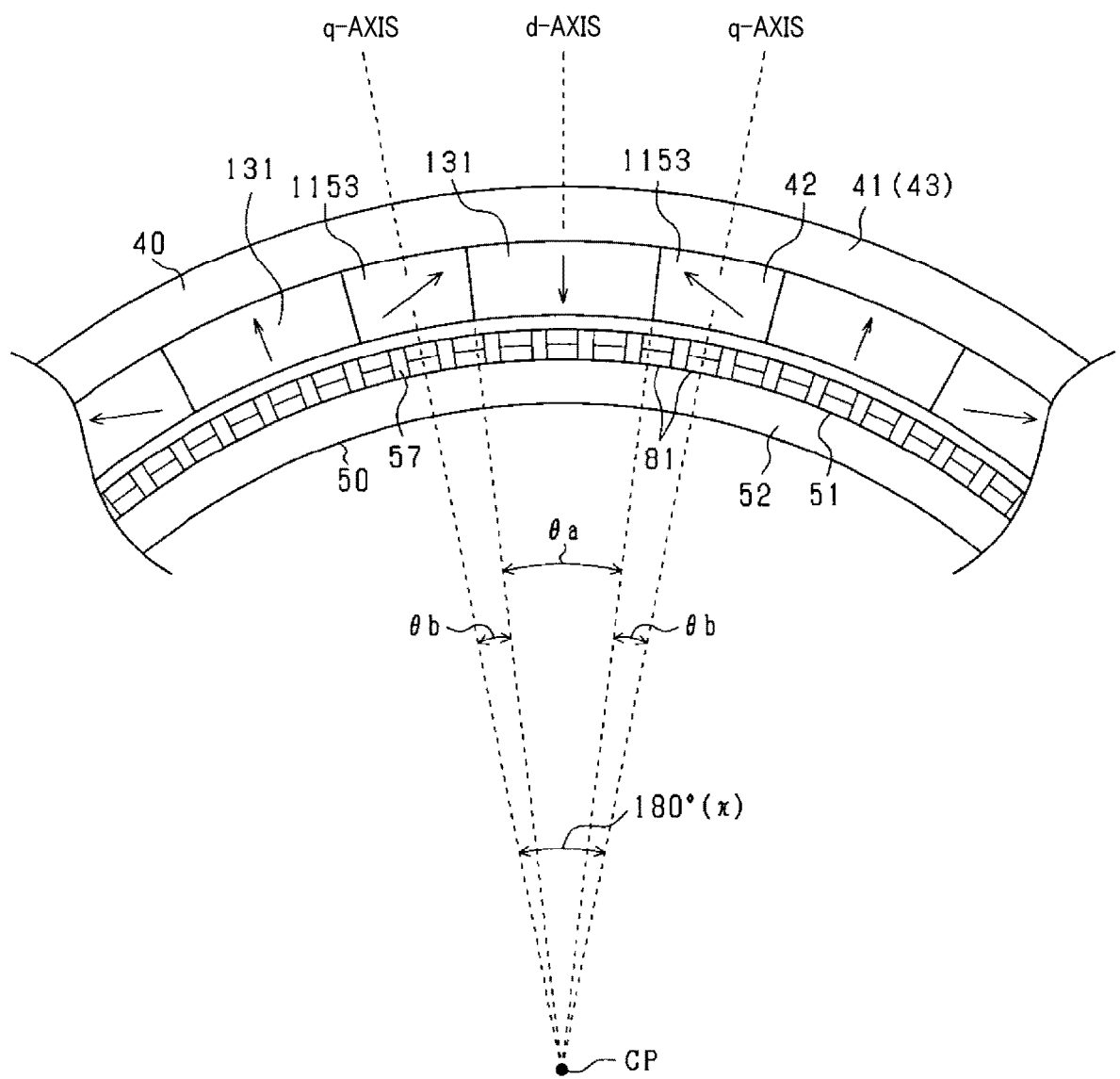
FIG. 67 is an enlarged view of part of a transverse cross section of both a rotor and a stator in a nineteenth modification.

In this modification, as shown in FIG. 67, the second magnets 1153 are arranged adjacent to the respective first magnets 131 so as to have their polarities alternating in the circumferential direction. Moreover, each of the second magnets 1153 is linearly oriented to form a magnet magnetic path deviated from a direction perpendicular to the q-axis. More specifically, the orientation direction of each of the second magnets 1153 is deviated from a direction perpendicular to the q-axis toward the non-stator 50 side. In addition, the direction of the easy axis of magnetization is the same on the circumferential-opposite pair of magnetic flux acting surfaces of each of the second magnets 1153.

In this modification, the main magnetic pole angle θa may be defined for each of the first magnets 131 and the auxiliary magnetic pole angle θb may be defined for each of the second magnets 1153 as in the seventeenth modification. Moreover, in this modification, the first to the ninth configurations may be employed as in the seventeenth modification.

Twentieth Modification

In this modification, part of the structure of the magnet unit 42 is modified. Accordingly, the differences of this modification from the above-described nineteenth modification will be mainly described.

Figure 68:
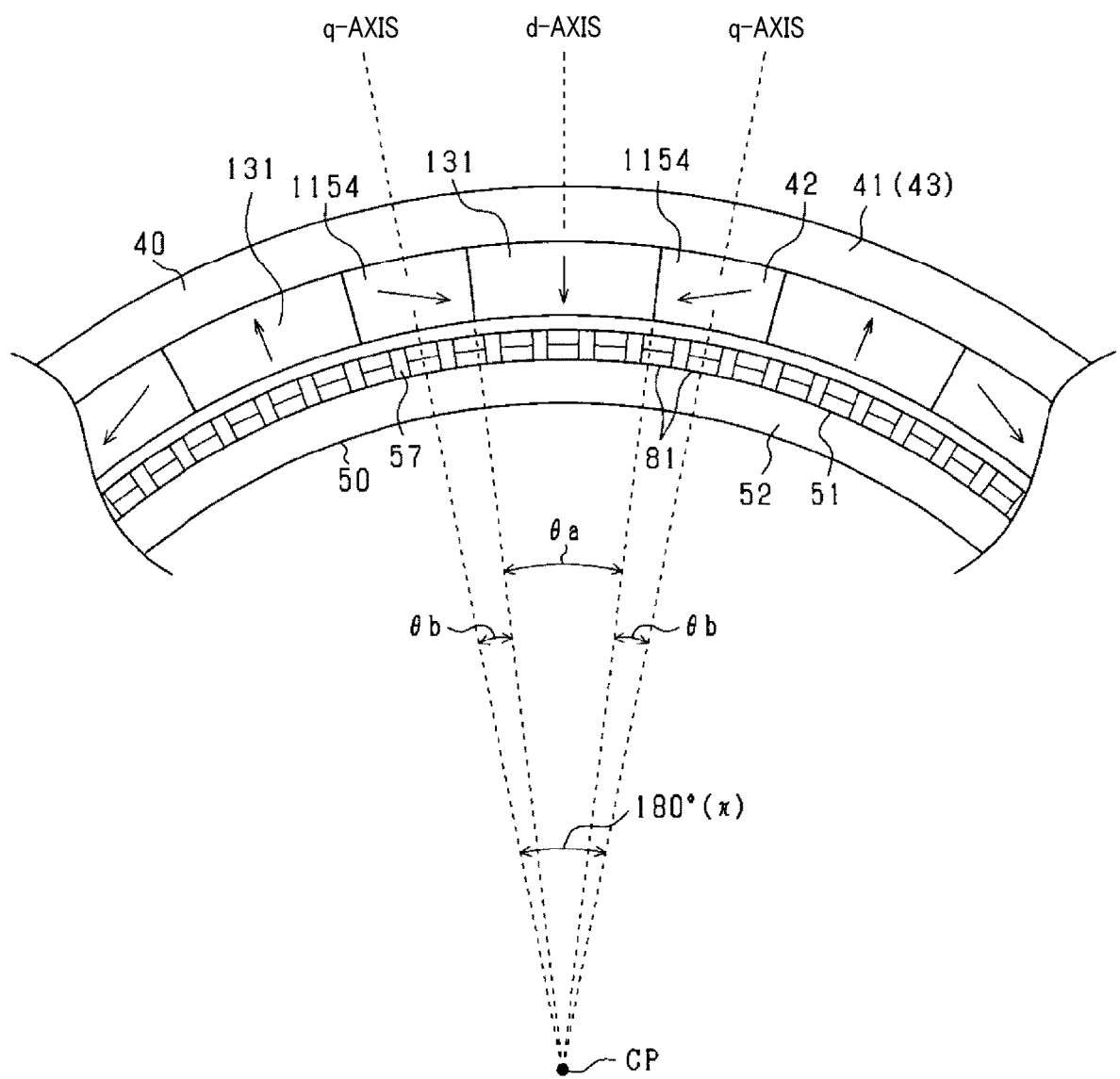
FIG. 68 is an enlarged view of part of a transverse cross section of both a rotor and a stator in a twentieth modification.

In this modification, as shown in FIG. 68, each of the second magnets 1154 is linearly oriented to form a magnet magnetic path deviated from a direction perpendicular to the q-axis. More specifically, the orientation direction of each of the second magnets 1154 is deviated from a direction perpendicular to the q-axis toward the stator 50 side.

In this modification, the main magnetic pole angle θa may be defined for each of the first magnets 131 and the auxiliary magnetic pole angle θb may be defined for each of the second magnets 1154 as in the seventeenth modification. Moreover, in this modification, the first to the ninth configurations may be employed as in the seventeenth modification.

Twenty-First Modification

In this modification, part of the structure of the magnet unit 42 is modified. Accordingly, the differences of this modification from the above-described seventeenth modification will be mainly described.

Figure 69:
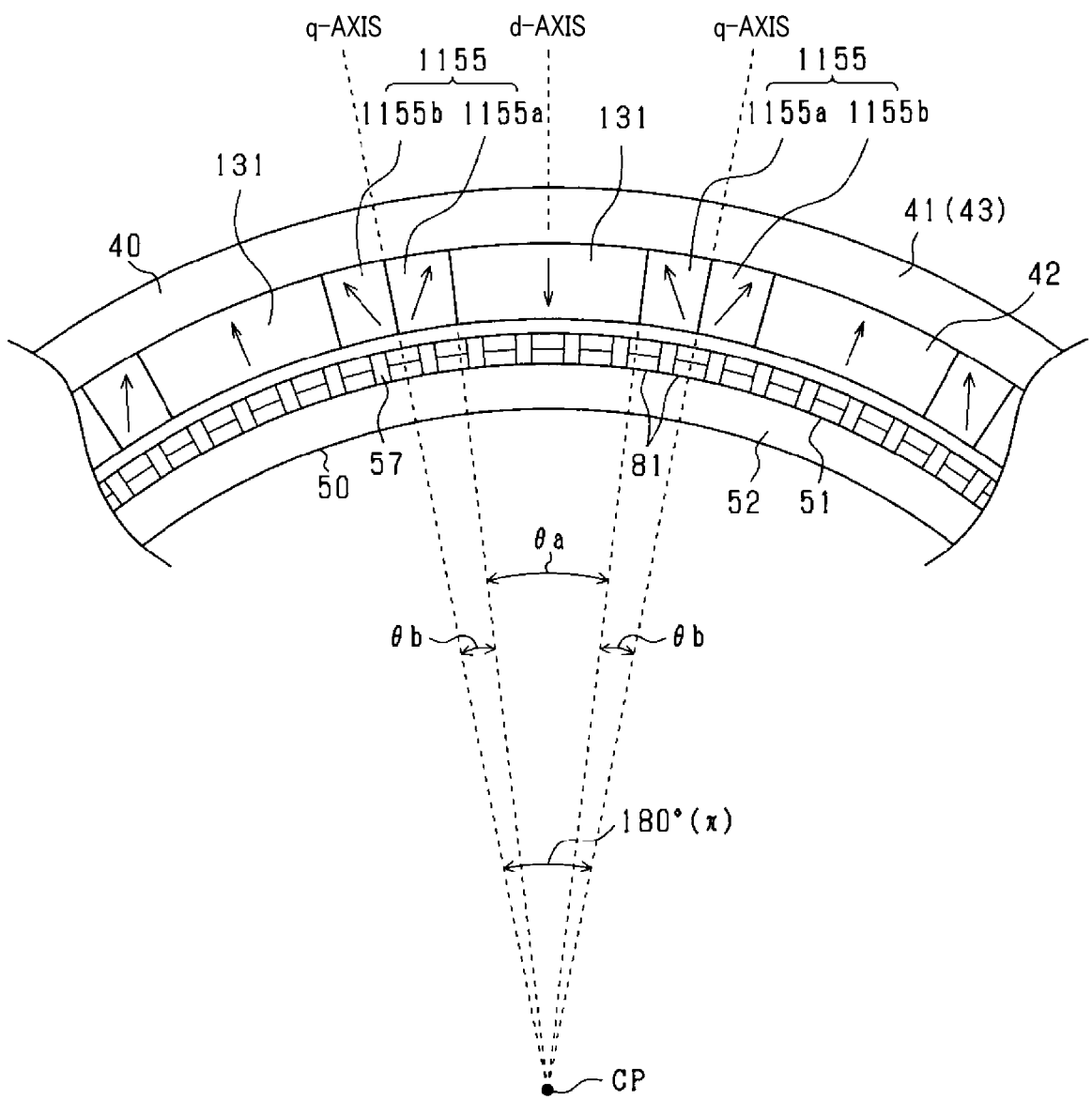
FIG. 69 is an enlarged view of part of a transverse cross section of both a rotor and a stator in a twenty-first modification.

In this modification, as shown in FIG. 69, each of the second magnets 1155 is configured with two divided magnets. Hereinafter, these magnets will be respectively referred to as the 2A-th magnet 1155a and the 2B-th magnet 1155b.

On opposite circumferential sides of each of those first magnets 131 which are oriented toward the stator 50 side, there are respectively arranged the 2A-th magnets 1155a of two second magnets 1155 adjacent to the first magnet 131. In contrast, on opposite circumferential sides of each of those first magnets 131 which are oriented toward the non-stator 50 side, there are respectively arranged the 2B-th magnets 1155b of two second magnets 1155 adjacent to the first magnet 131. The q-axis is represented by straight lines each of which extends through both the interface between the 2A-th magnet 1155a and the 2B-th magnet 1155b in one of the second magnets 1155 and the axis CP of the rotating shaft 11.

Each of the 2A-th magnet 1155a and the 2B-th magnet 1155b is linearly oriented to form a magnet magnetic path deviated from a direction perpendicular to the q-axis. More specifically, the orientation direction of the 2A-th magnet 1155a is toward the d-axis in the first magnet 131 located circumferentially adjacent to the 2A-th magnet 1155a, and deviated from the direction perpendicular to the q-axis toward the non-stator 50 side. Similarly, the orientation direction of the 2B-th magnet 1155b is toward the d-axis in the first magnet 131 located circumferentially adjacent to the 2B-th magnet 1155b, and deviated from the direction perpendicular to the q-axis toward the non-stator 50 side.

In this modification, the main magnetic pole angle θa may be defined for each of the first magnets 131 and the auxiliary magnetic pole angle θb may be defined for each of the 2A-th and 2B-th magnets 1155a and 1155b as in the seventeenth modification. Moreover, in this modification, the first to the ninth configurations may be employed as in the seventeenth modification.

Twenty-Second Modification

In this modification, part of the structure of the magnet unit 42 is modified. Accordingly, the differences of this modification from the above-described twenty-first modification will be mainly described.

Figure 70:
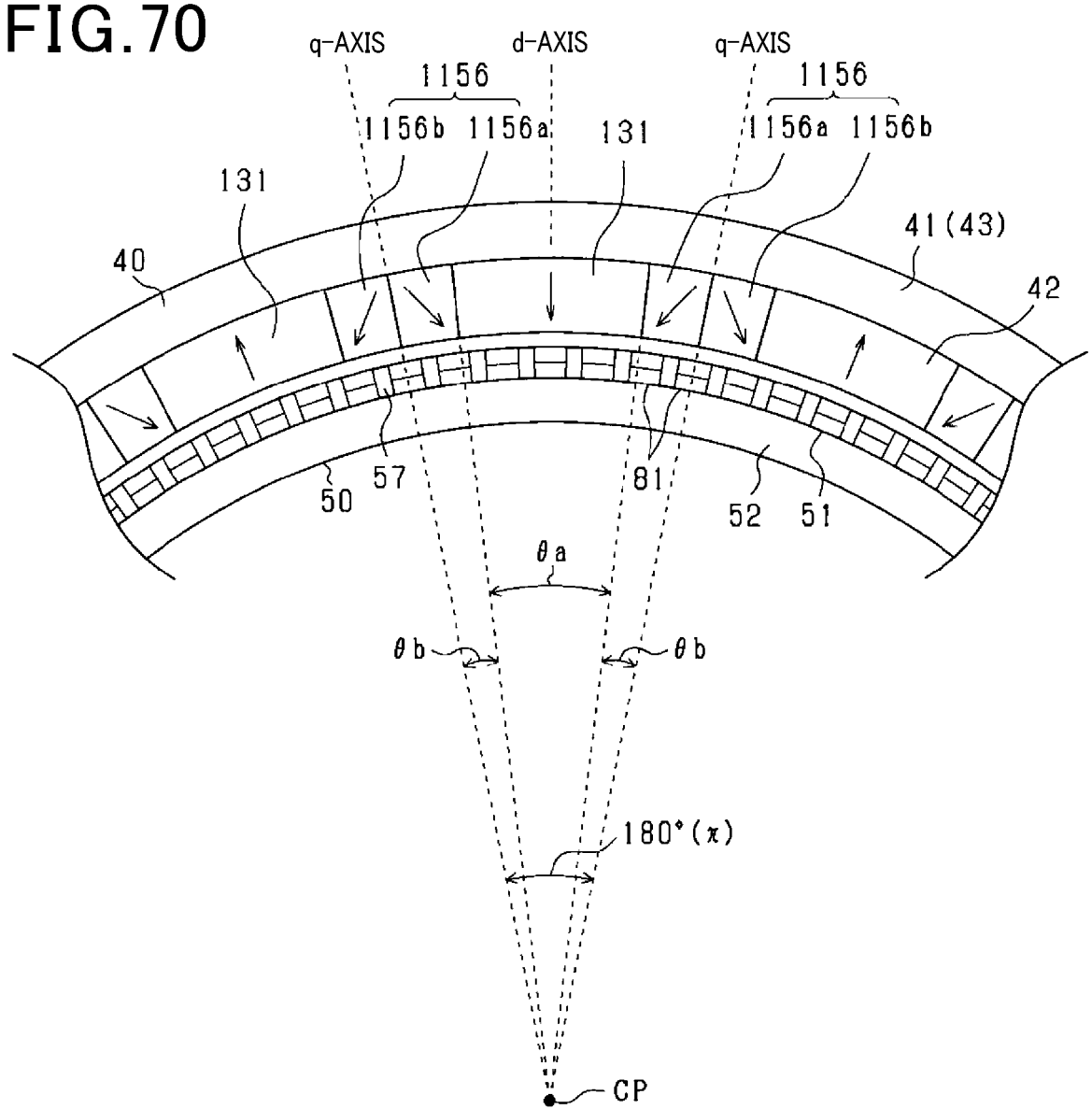
FIG. 70 an enlarged view of part of a transverse cross section of both a rotor and a stator in a twenty-second modification.

In this modification, as shown in FIG. 70, each of the second magnets 1156 is configured with a 2A-th magnet 1156a and a 2B-th magnet 1156b. The orientation direction of the 2A-th magnet 1156a is toward the d-axis in the first magnet 131 located circumferentially adjacent to the 2A-th magnet 1156a, and deviated from a direction perpendicular to the q-axis toward the stator 50 side. Similarly, the orientation direction of the 2B-th magnet 1156b is toward the d-axis in the first magnet 131 located circumferentially adjacent to the 2B-th magnet 1156b, and deviated from a direction perpendicular to the q-axis toward the stator 50 side.

In this modification, the main magnetic pole angle θa may be defined for each of the first magnets 131 and the auxiliary magnetic pole angle θb may be defined for each of the 2A-th and 2B-th magnets 1156a and 1156b as in the seventeenth modification. Moreover, in this modification, the first to the ninth configurations may be employed as in the seventeenth modification.

The configurations according to the above-described seventeenth to twenty-second modifications may be applied to the rotating electric machines shown in FIGS. 43-49. In these cases, the main magnetic pole angle θa may be defined for each of the first magnets and the auxiliary magnetic pole angle θb may be defined for each of the second magnets as in the seventeenth to the twenty-second modifications.

Moreover, in these cases, the first to the ninth configurations may be employed as in the seventeenth to the twenty-second modifications.

Twenty-Third Modification

Figure 71:
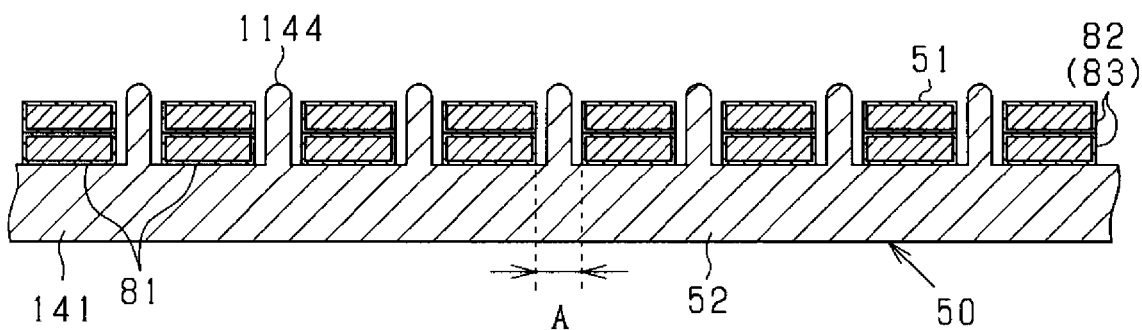
FIG. 71 is a cross-sectional view of a stator in a twenty-third modification.

In this modification, as shown in FIG. 71, the stator core 52 has arc-shaped portions 1144 each radially extending from a yoke portion 141. Each of the arc-shaped portions 1144 has its distal end radially protruding from the stator coil 51 toward the rotor 40 side and arc-shaped so as to be convex on the rotor 40 side. Similar to the yoke portion 141, the arc-shaped portions 1144 are also formed of a magnetic material. In this modification, the arc-shaped portions 1144 correspond to "inter-conductor members".

With the distal ends of the arc-shaped portions 1144 protruding from the stator coil 51 toward the rotor 40 side and arc-shaped, it becomes possible to make change in the magnet magnetic flux, which the stator coil 51 receives from the magnet unit 42, gentle. Consequently, it becomes possible to suppress eddy current loss in the stator coil 51.

In addition, in FIG. 71, there is illustrated an example where the arc-shaped portions 1144 are arranged apart from the respective electrical conductor groups 81 circumferentially adjacent the arc-shaped portions 1144. In this case, a synthetic resin as shown in FIG. 25 may be provided in the gaps between the arc-shaped portions 1144 and the electrical conductor groups 81. Moreover, as an alternative, the arc-shaped portions 1144 may be arranged in contact with the respective electrical conductor groups 81 circumferentially adjacent the arc-shaped portions 1144.

Twenty-Fourth Modification

In this modification, part of the structure of the magnet unit 42 is modified. Accordingly, the differences of this modification from the above-described second embodiment will be mainly described.

Figure 72:
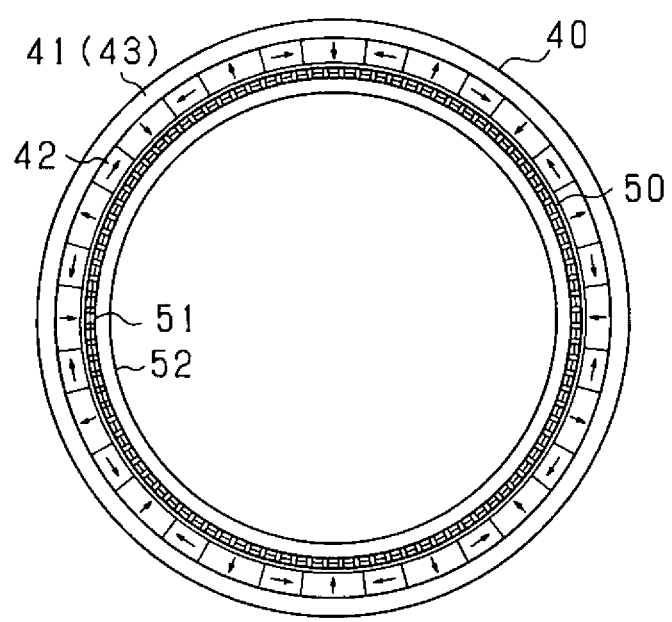
FIG. 72 is a transverse cross-sectional view of a rotor and a stator in a twenty-fourth modification.
Figure 73:
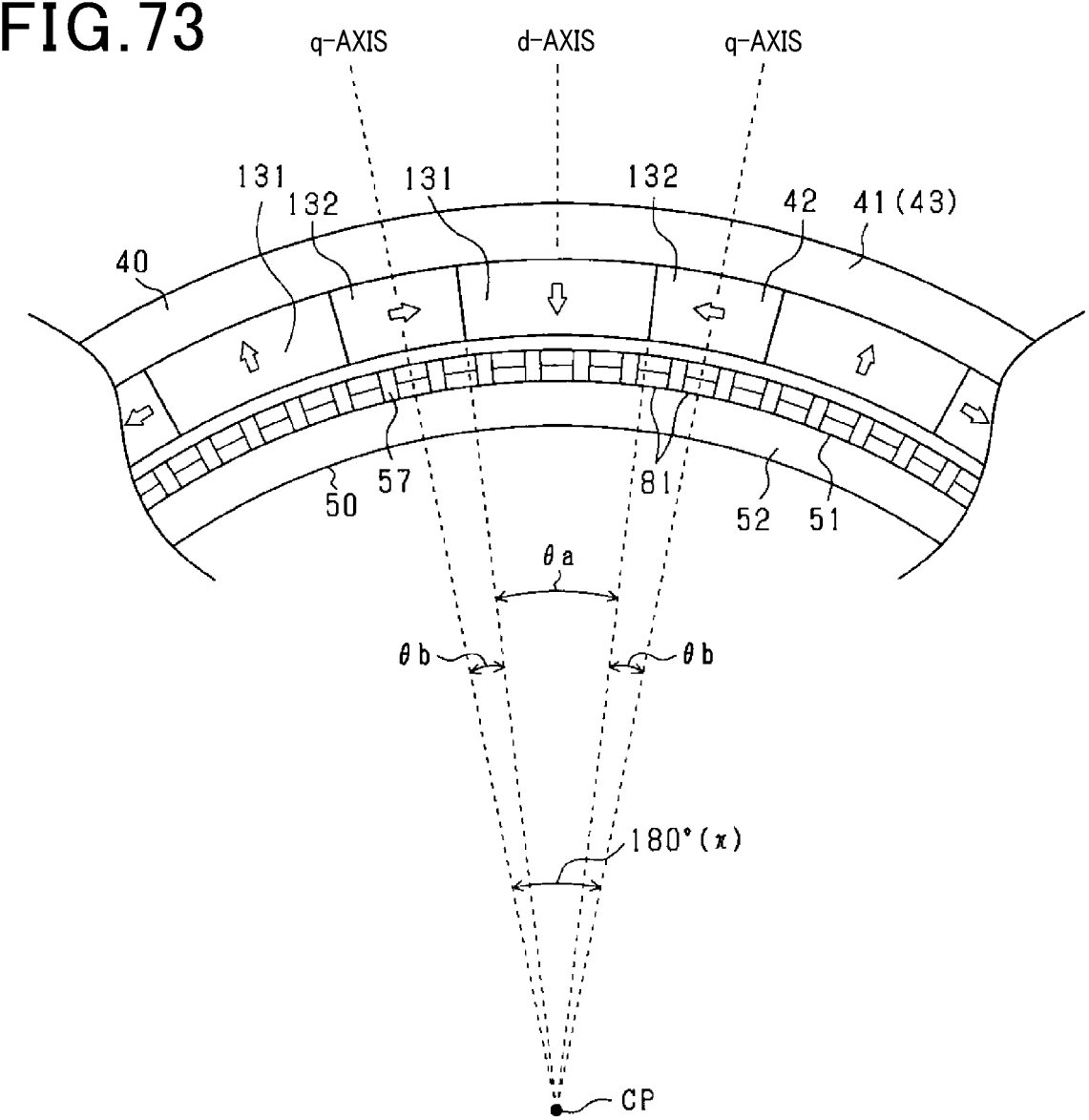
FIG. 73 is an enlarged view of part of FIG. 72.

As shown in FIGS. 72 and 73, in this modification, the magnet unit 42 does not include magnetic members 133 as shown in FIG. 23. Therefore, the radially outer peripheral surfaces of the second magnets 132 are arranged to abut the radially inner peripheral surface of the magnet holder 41.

Each of the first magnets 131 is linearly oriented (or parallel oriented) to form a magnet magnetic path parallel to the d-axis. Therefore, the direction of the easy axis of magnetization is the same on the radially-opposite pair of magnetic flux acting surfaces of each of the first magnets 131.

Each of the second magnets 132 is located to extend across the q-axis. Moreover, each of the second magnets 132 is linearly oriented to form a magnet magnetic path perpendicular to the d-axis. Therefore, the direction of the easy axis of magnetization is the same on the circumferentially-opposite pair of magnetic flux acting surfaces of each of the second magnets 132.

With the above configuration of the magnet unit 42 including the first magnets 131 and the second magnets 132, it becomes possible to make the waveform of the surface magnetic flux density of the magnet unit 42 approximate to a sine wave using the magnets oriented by a simple orientation technique, i.e., by the linear orientation. Consequently, it becomes possible to increase the torque of the rotating electric machine 10 without using any special orientation technique.

Figure 74:
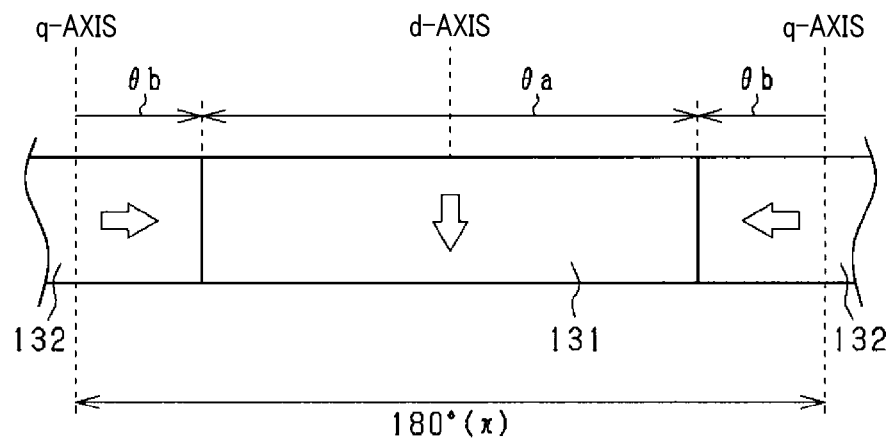
FIG. 74 is a developed view of first and second magnets along a circumferential direction.

As shown in FIGS. 73 and 74, for each of the first magnets 131, a main magnetic pole angle θa is defined, in an electrical angular range of 180° corresponding to one magnetic pole (i.e., in a half electrical angular cycle), as an angle between a straight line extending through one of the two q-axis-side ends of the first magnet 131 in the circumferential direction and the axis CP of the rotating shaft 11 and a straight line extending through the other of the two q-axis-side ends of the first magnet 131 in the circumferential direction and the axis CP of the rotating shaft 11. Moreover, an auxiliary magnetic pole angle θb is defined as ½ of the value obtained by subtracting the main magnetic pole angle θa from the 180° (i.e., π[rad]) that represents a half electrical angular cycle. Here, (2×θb) represents the electrical angular range where the second magnets 132 are present in one electrical angular cycle. In addition, FIG. 74 is a developed view of the magnet unit 42 along the circumferential direction.

The present modification is characterized by a method of setting the main magnetic pole angle θa. Hereinafter, the setting method will be described. The density B of the magnetic flux crossing the electrical conductors 82 represents the synthesis of waveforms of the main magnetic flux which are symmetric with respect to the d-axis. Therefore, the magnetic flux density B can be expressed by the following Equation (5). On the right side of Equation (5), $B_{1+n}$, $B_{3+n}$, and $B_{5+n}$ represent amplitudes of the magnetic flux density and θ represents electrical angle.

$$B = \sum_{n=0}^{\infty} \{B_{1+n}\sin(1+6n)\theta + B_{3+n}\sin(3+6n)\theta + B_{5+n}\sin(5+6n)\theta\} \quad (5)$$

Of the magnetic flux density expressed by above Equation (5), high-amplitude components are generally the low-order components up to the fifth order, i.e., the fundamental components of a progressive wave, a regressive wave and an in-phase wave. More specifically, the high-amplitude components are those components in above Equation (5) with n=0. Hereinafter, the third-order harmonic of the in-phase wave and the fifth-order harmonic of the regressive wave, which are high-amplitude and low-order harmonic components, will be described.

Figure 75:
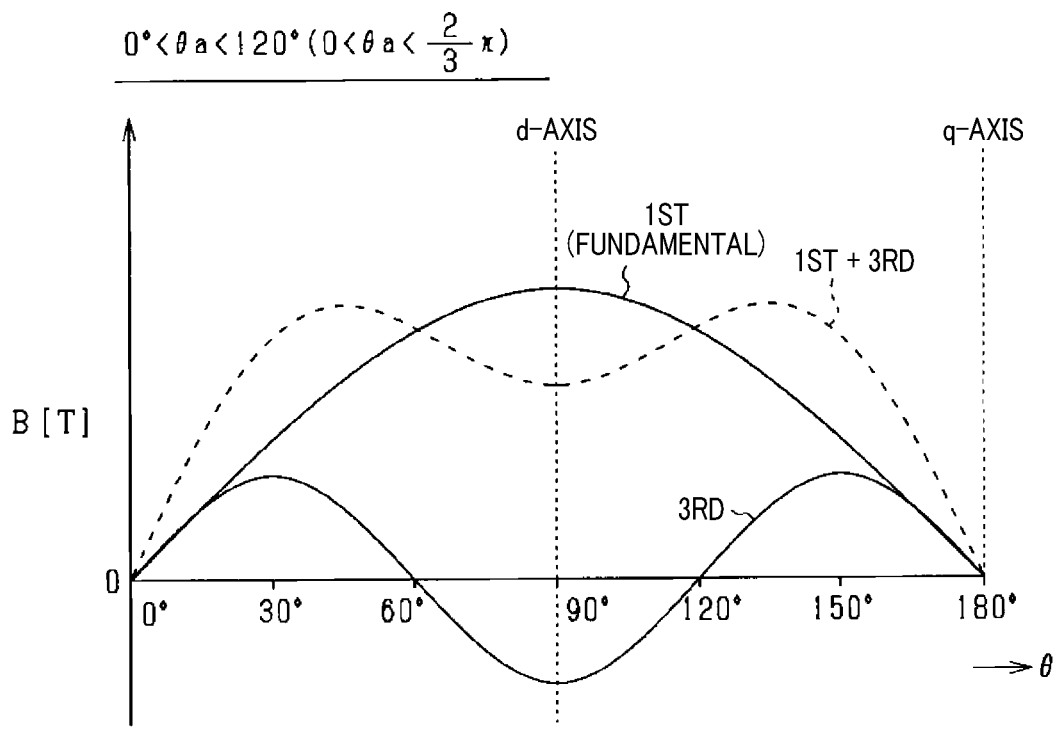
FIG. 75 is a diagram illustrating the waveforms of the first-order component and the third-order harmonic of the magnetic flux density when 0°<θa<120°.
Figure 76:
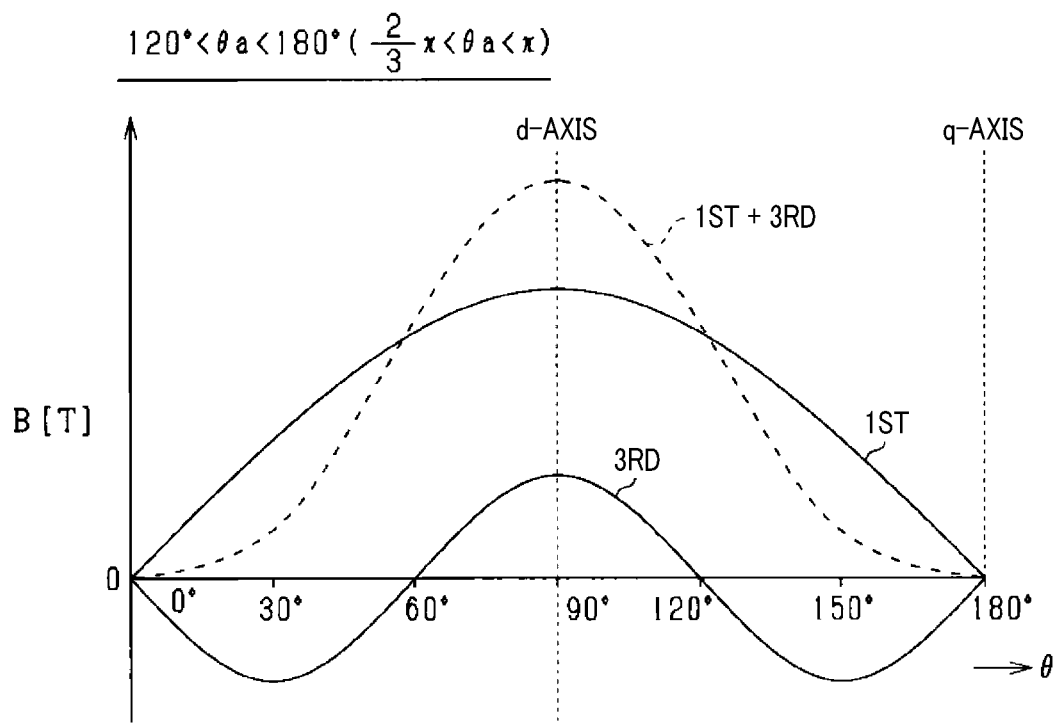
FIG. 76 is a diagram illustrating the waveforms of the first-order component and the third-order harmonic of the magnetic flux density when 120°<θa<180°.

First, referring to FIGS. 75 and 76, the third-order harmonic will be described. FIG. 75 illustrates the change of the magnetic flux density B with electrical angle θ when the main magnetic pole angle θa is set such that 0°<θa<120° (i.e., 0<θa<2π/3). FIG. 76 illustrates the change of the magnetic flux density B with electrical angle θ when the main magnetic pole angle θa is set such that 120° <θa<180° (i.e., 2π/3<θa<π). In FIGS. 75 and 76, there are shown: the fundamental component which is the first-order component of the magnetic flux density B; the third-order harmonic; and the synthetic wave of the fundamental component and the third-order harmonic. The third-order harmonic zero-crosses every 60° (i.e. every π/3), and thus is inverted in polarity every 60°.

As shown in FIG. 75, when 0°<θa<120°, in the electrical angular range of 0°-180° where the polarity of the fundamental component is N, the absolute value of the total value of the N-pole third-order harmonic is larger than the absolute value of the total value of the S-pole third-order harmonic. As a result, the effective value of the amount of magnetic flux of the magnet unit 42 in the electrical angular range of 0°-180° is increased. Moreover, when 0°<θa<120°, in the electrical angular range of 180°-360° where the polarity of the fundamental component is S, the absolute value of the total value of the S-pole third-order harmonic is larger than the absolute value of the total value of the N-pole third-order harmonic. As a result, the effective value of the amount of magnetic flux of the magnet unit 42 in the electrical angular range of 180°-360° is also increased.

By increasing the effective value of the magnetic flux density in one electrical angular cycle of 0°-360° as above, it becomes possible to increase the effective value, per cycle, of the product of the amount of magnetic flux of the magnet unit 42 and the electrical angular velocity. As a result, it becomes possible to increase the torque of the rotating electric machine 10. Therefore, the condition of (0°<θa<120°) (hereinafter, to be referred as the condition B) contributes to the effect of increasing the torque of the rotating electric machine 10.

Moreover, satisfying the condition B, it becomes possible to make the waveform of the counterelectromotive force generated in the electrical conductors 82 approximate to a trapezoidal wave, thereby lowering the peak values of the counterelectromotive force. Consequently, when low-withstand voltage elements are employed as the switches Sp and Sn of the inverters 101 and 102, the peak values of voltages applied to the elements can be made lower than or equal to the withstand voltages of the elements.

Furthermore, as shown in FIG. 75, when 0°<θa<120°, on the d-axis, the polarity of the fundamental component and the polarity of the third-order harmonic are different from each other. Therefore, as seen from the synthetic wave shown with a dashed line in FIG. 75, the peak value of the d-axis magnetic flux is lowered by the third-order harmonic. Consequently, it becomes easy for field-weakening control to be effective. This is because the magnetic flux concentrates on the q-axis, resulting in a saliency (e.g., regular saliency) in the inductance. From the above, it is clear that when 0°<θa<120°, it is possible to achieve improvement in the d-axis field-weakening capability of the core-less motor.

Next, referring to FIG. 76, explanation will be given of the case where 120°<θa<180°. In this case, the phase of the third-order harmonic is different by 60° from the phase of the third-order harmonic shown in FIG. 75. Moreover, in this case, as shown in FIG. 76, in the electrical angular range of 0°-180° where the polarity of the fundamental component is N, the absolute value of the total value of the N-pole third-order harmonic is smaller than the absolute value of the total value of the S-pole third-order harmonic. As a result, the effective value of the amount of magnetic flux of the magnet unit 42 in the electrical angular range of 0°-180° is lowered. Furthermore, when 120°<θa<180°, in the electrical angular range of 180°-360° where the polarity of the fundamental component is S, the absolute value of the total value of the S-pole third-order harmonic is smaller than the absolute value of the total value of the N-pole third-order harmonic. As a result, the effective value of the amount of magnetic flux of the magnet unit 42 in the electrical angular range of 180°-360° is also lowered.

By lowering the effective value of the magnetic flux density in one electrical angular cycle of 0°-360° as above, it becomes possible to achieve the field-weakening effect, thereby lowering the counterelectromotive force generated in the electrical conductors 82. Therefore, the condition of (120°<θa<180°) (hereinafter, to be referred as the condition A) contributes to high-speed rotation of the rotating electric machine 10.

Moreover, as shown in FIG. 76, when 120°<θa<180°, the third-order harmonic has the effect of increasing the d-axis magnetic flux. That is, it becomes possible to achieve the effect of increasing the d-axis magnetic flux in the core-less motor. At the same time, since the magnetic saturation at the q-axis is relieved in the core-less motor, it becomes possible to increase the inductance at the q-axis, resulting in an inverse saliency and thereby achieving high torque in a high-speed rotation region.

Figure 77:
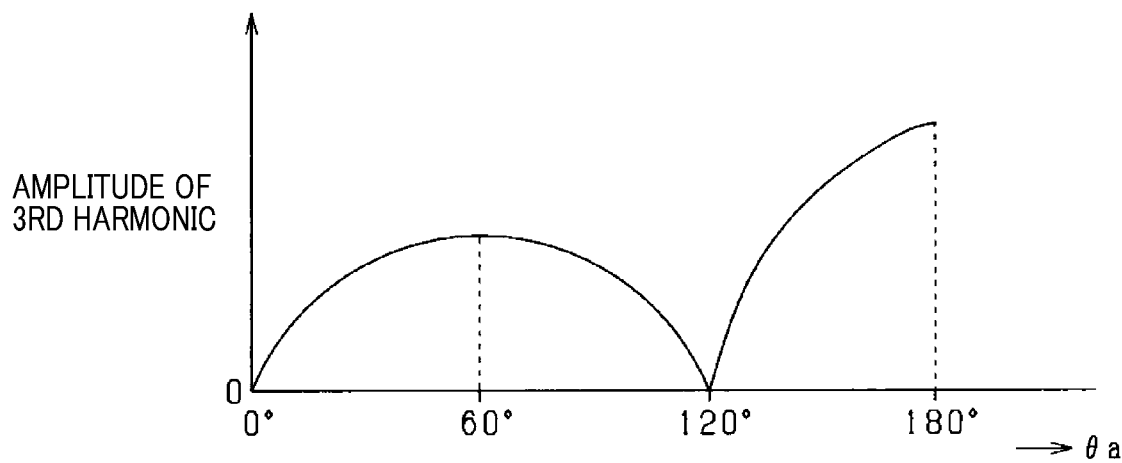
FIG. 77 is a diagram illustrating the relationship between the main magnetic pole angle θa and the amplitude of the third-order harmonic.

FIG. 77 illustrates the amplitude characteristics of the third-order harmonic with respect to the main magnetic pole angle θa.

The amplitude of the third-order harmonic has a local maximum value when the main magnetic pole angle θa is equal to 60°. Moreover, the amplitude of the third-order harmonic becomes 0 when the main magnetic pole angle θa is equal to 120°. That is, when the main magnetic pole angle θa is equal to 120°, no third-order harmonic is included in the waveform of the magnetic flux density of the magnet unit 42. Furthermore, with the main magnetic pole angle θa approaching 180°, the amplitude of the third-order harmonic increases above the local maximum value which it takes when the main magnetic pole angle θa is equal to 60°. This is because with increase in the main magnetic pole angle θa, the circumferential length of the first magnets 131 is increased, thereby increasing the volume of the first magnets 131.

Figure 78:
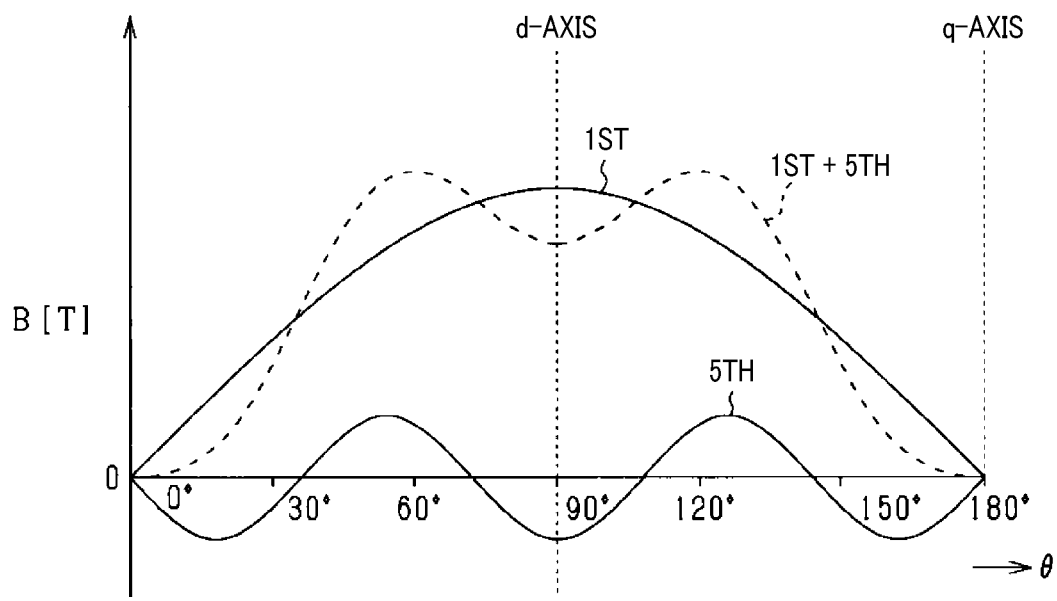
FIG. 78 is a diagram illustrating the waveforms of the first-order component and the fifth-order harmonic of the magnetic flux density when 0°<θa<72° or 144°<θa<180°.
Figure 79:
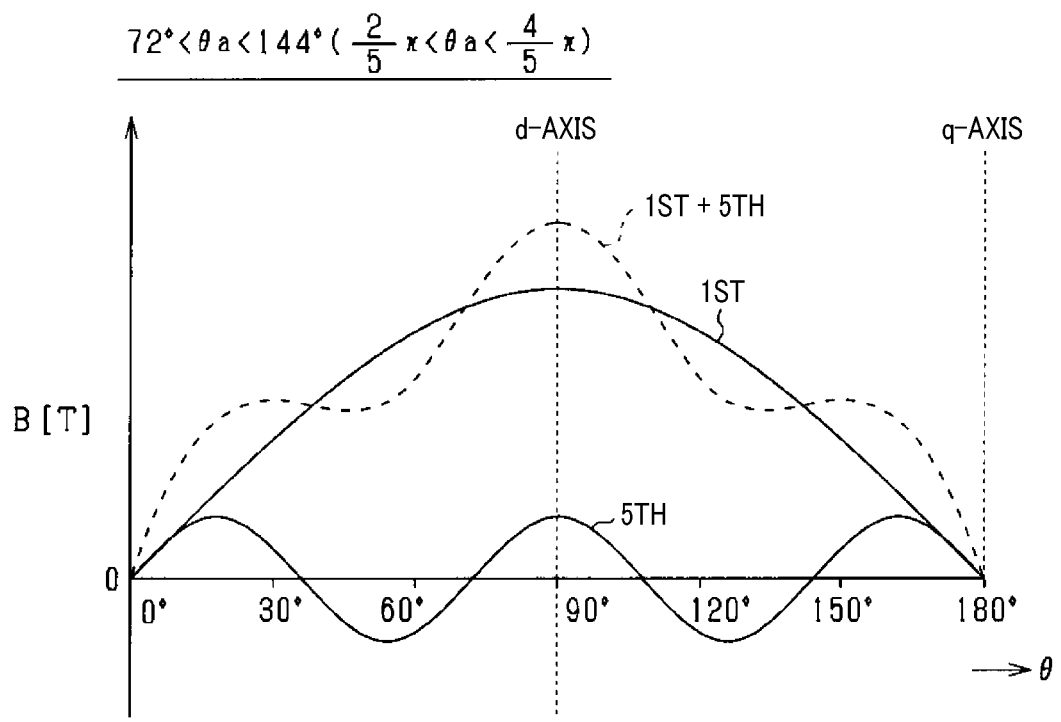
FIG. 79 is a diagram illustrating the waveforms of the first-order component and the fifth-order harmonic of the magnetic flux density when 72°<θa<144°.

Next, referring to FIGS. 78 and 79, the fifth-order harmonic will be described. FIG. 78 illustrates the change of the magnetic flux density B with electrical angle θ when the main magnetic pole angle θa is set such that 0°<θa<72° (i.e., 0<θa<2π/5) or 144°<θa<180° (i.e., 4π/5<θa<π). FIG. 79 illustrates the change of the magnetic flux density B with electrical angle θ when the main magnetic pole angle θa is set such that 72°<θa<144° (i.e., 2π/5<θa<4π/5). In FIGS. 78 and 79, there are shown the fundamental component, the fifth-order harmonic and the synthetic wave of the fundamental component and the fifth-order harmonic. The fifth-order harmonic zero-crosses every 36° (i.e. every π/5), and thus is inverted in polarity every 36°.

As shown in FIG. 78, when 0°<θa<72° or 144°<θa<180°, in the electrical angular range of 0°-180° where the polarity of the fundamental component is N, the absolute value of the total value of the N-pole fifth-order harmonic is smaller than the absolute value of the total value of the S-pole fifth-order harmonic. As a result, the effective value of the amount of magnetic flux of the magnet unit 42 in the electrical angular range of 0°-180° is lowered. Moreover, when 0°<θa<72° or 144°<θa<180°, in the electrical angular range of 180°-360° where the polarity of the fundamental component is S, the absolute value of the total value of the S-pole fifth-order harmonic is smaller than the absolute value of the total value of the N-pole fifth-order harmonic. As a result, the effective value of the amount of magnetic flux of the magnet unit 42 in the electrical angular range of 180°-360° is also lowered.

By lowering the effective value of the magnetic flux density in one electrical angular cycle of 0°-360° as above, it becomes possible to achieve the field-weakening effect, thereby lowering the counterelectromotive force generated in the electrical conductors 82. Therefore, the condition of (0°<θa<72°) or (144°<θa<180°) (hereinafter, to be referred as the condition D) contributes to high-speed rotation of the rotating electric machine 10.

Moreover, satisfying the condition D, it becomes possible to make the waveform of the counterelectromotive force generated in the electrical conductors 82 approximate to a trapezoidal wave, thereby lowering the peak values of the counterelectromotive force. Consequently, when low-withstand voltage elements are employed as the switches Sp and Sn of the inverters 101 and 102, the peak values of voltages applied to the elements can be made lower than or equal to the withstand voltages of the elements.

Furthermore, as shown in FIG. 78, when $0°<θa<72°$ or $144°<θa<180°$, on the d-axis, the polarity of the fundamental component and the polarity of the fifth-order harmonic are different from each other. Therefore, as seen from the synthetic wave shown with a dashed line in FIG. 78, the peak value of the d-axis magnetic flux is lowered by the fifth-order harmonic. Consequently, it becomes easy for field-weakening control to be effective. That is, when $0°<θa<72°$ or $144°<θa<180°$, it is possible to achieve improvement in the d-axis field-weakening capability of the core-less motor.

Next, referring to FIG. 79, explanation will be given of the case where $72°<θa<144°$. In this case, the phase of the fifth-order harmonic is different by 36° from the phase of the fifth-order harmonic shown in FIG. 78. Moreover, in this case, as shown in FIG. 79, in the electrical angular range of 0°-180° where the polarity of the fundamental component is N, the absolute value of the total value of the N-pole fifth-order harmonic is larger than the absolute value of the total value of the S-pole fifth-order harmonic. As a result, the effective value of the amount of magnetic flux of the magnet unit 42 in the electrical angular range of 0°-180° is increased. Furthermore, when $72°<θa<144°$, in the electrical angular range of 180°-360° where the polarity of the fundamental component is S, the absolute value of the total value of the S-pole fifth-order harmonic is larger than the absolute value of the total value of the N-pole fifth-order harmonic. As a result, the effective value of the amount of magnetic flux of the magnet unit 42 in the electrical angular range of 180°-360° is also lowered.

By increasing the effective value of the magnetic flux density in one electrical angular cycle of 0°-360° as above, it becomes possible to increase the effective value, per cycle, of the product of the amount of magnetic flux of the magnet unit 42 and the electrical angular velocity. As a result, it becomes possible to increase the torque of the rotating electric machine 10. Therefore, the condition of ($72°<θa<144°$ (hereinafter, to be referred as the condition C) contributes to the effect of increasing the torque of the rotating electric machine 10.

Moreover, as shown in FIG. 79, when $72°<θa<144°$, the fifth-order harmonic has the effect of increasing the d-axis magnetic flux. That is, it becomes possible to achieve the effect of increasing the d-axis magnetic flux in the core-less motor. At the same time, since the magnetic saturation at the q-axis is relieved in the core-less motor, it becomes possible to increase the inductance at the q-axis, thereby achieving high torque in a high-speed rotation region.

Figure 80:
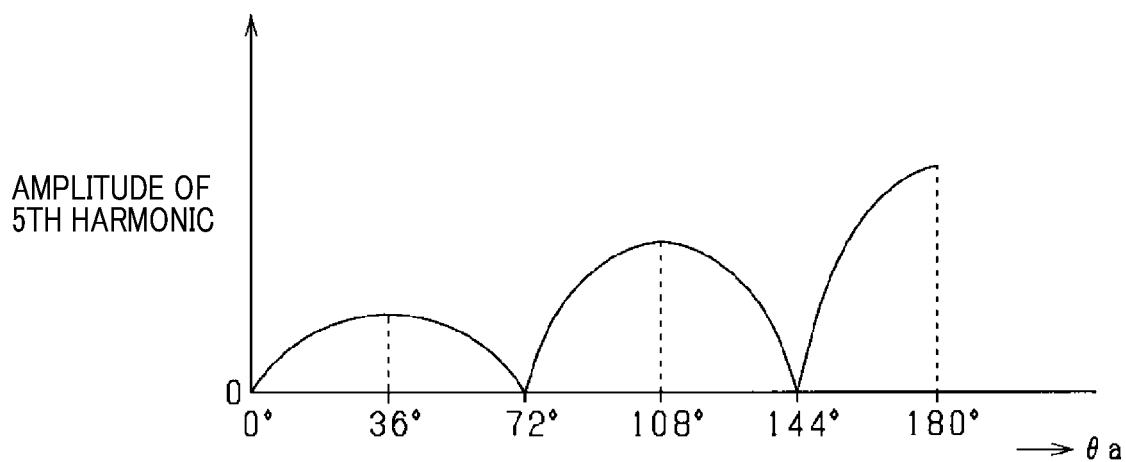
FIG. 80 is a diagram illustrating the relationship between the main magnetic pole angle θa and the amplitude of the fifth-order harmonic.

FIG. 80 illustrates the amplitude characteristics of the fifth-order harmonic with respect to the main magnetic pole angle $θa$.

The amplitude of the fifth-order harmonic has local maximum values when the main magnetic pole angle $θa$ is equal to 36° and when the main magnetic pole angle $θa$ is equal to 108°. These local maximum values of the amplitude of the fifth-order harmonic are smaller than the local maximum value of the amplitude of the third-order harmonic when the main magnetic pole angle $θa$ is equal to 60°.

Moreover, the amplitude of the fifth-order harmonic becomes 0 when the main magnetic pole angle $θa$ is equal to 72° and when the main magnetic pole angle $θa$ is equal to 144°. That is, when the main magnetic pole angle $θa$ is equal to 72° or 144°, no fifth-order harmonic is included in the waveform of the magnetic flux density of the magnet unit 42. Furthermore, with the main magnetic pole angle $θa$ approaching 180°, the amplitude of the fifth-order harmonic increases again. The local maximum value of the amplitude of the fifth-order harmonic when the main magnetic pole angle $θa$ is equal to 108° is larger than the local maximum value of the same when the main magnetic pole angle $θa$ is equal to 36°; with the main magnetic pole angle $θa$ approaching 180°, the amplitude of the fifth-order harmonic increases above the local maximum value which it takes when the main magnetic pole angle $θa$ is equal to 108°. This is because with increase in the main magnetic pole angle $θa$, the circumferential length of the first magnets 131 is increased, thereby increasing the volume of the first magnets 131.

The above-described conditions A-D can be summarized as follows.

The condition A ($120°<\underline{θa}<180°$): under which it is easy to realize high-speed rotation.

The condition B ($0°<θa<120°$): under which it is easy to achieve high torque.

The condition C ($72°<θa<144°$): under which it is easy to achieve high torque.

The condition D ($0°<θa<72°$, $144°<θa<180°$): under which it is easy to realize high-speed rotation.

On the other hand, as a condition for achieving high torque, in the rotating electric machine 10 where two or more phases are energized at the same time, the following condition E is derived where S is the number of phases.

The condition E ($0<θa≤2π/S$): under which it is easy to achieve high torque.

Figure 81A:
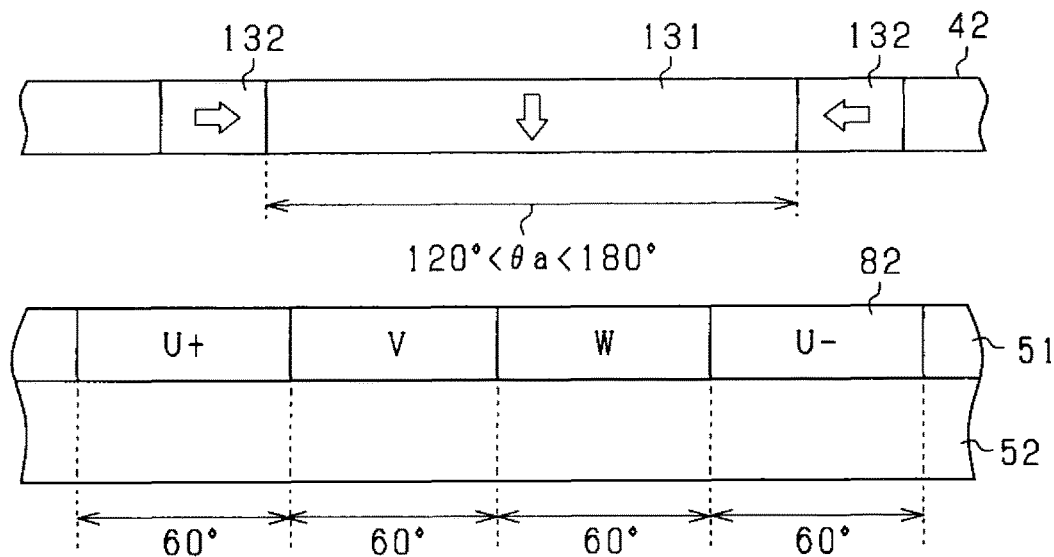
FIGS. 81(a) and 81(b) are diagrams illustrating the relationship between the range of the main magnetic pole angle θa and the stator coil 51.
Figure 81B:
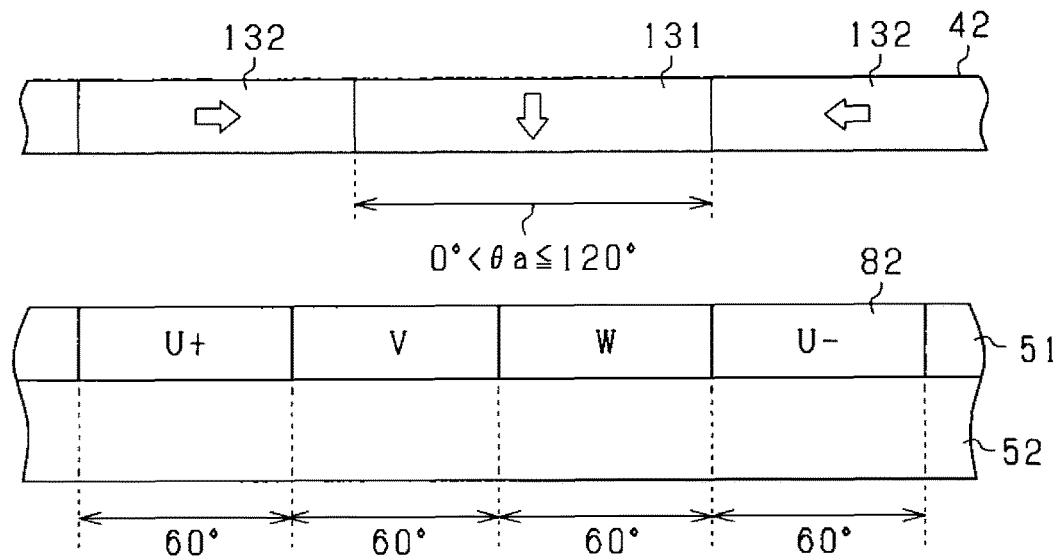

The condition E can also be expressed as ($0°<θa≤360°/S$). When the main magnetic pole angle $θa$ is larger than $2π/S$ (i.e., 120°), as shown in FIG. 81(*a*), each of the first magnets 131 faces the circumferentially-adjacent electrical conductors 82 of the same phase at the same time. FIG. 81(*a*) illustrates an example where one of the first magnets 131 faces two circumferentially-adjacent U-phase electrical conductors 82 at the same time. The polarities of magnetic fluxes generated with energization of the electrical conductors 82 are different between the circumferentially-adjacent electrical conductors 82 of the same phase. Therefore, with each of the first magnets 131 facing the circumferentially-adjacent electrical conductors 82 of the same phase at the same time, part of the magnetic flux of each of the first magnets 131 would be canceled, thereby lowering the amount of magnetic flux of the magnet unit 42. As a result, the effect of increasing the torque of the rotating electric machine 10 would be lowered. To solve this problem, as shown in FIG. 81(*b*), the condition E is satisfied. Consequently, it becomes possible to have the waveform of the magnetic flux density of the magnet unit 42 in an electrical angular range corresponding to one magnetic pole concentrated within an electrical angular range of 120° into a convex shape, thereby improving the effect of increasing the torque of the rotating electric machine 10.

On the basis of the above-described conditions A-E, the rotating electric machine 10 can be designed to have one of the first to the ninth configurations shown in FIG. 82. Hereinafter, the first to the ninth configurations will be described.

[First Configuration]

The first configuration is a configuration which satisfies both the condition B of ($0°<θa<120°$) contributing to the torque-increasing effect and the condition E of ($0°<θa≤360°/S$) contributing to the torque-increasing effect. In the present modification, S=3. Therefore, the first configuration is a configuration which satisfies ($0°<θa<120°$). With the first configuration, it is possible to achieve high torque of the rotating electric machine 10.

[Second Configuration]

The second configuration is a configuration which satisfies both the condition B of (0°<θa<120°) under which the third-order harmonic contributes to the torque-increasing effect and the condition D of (0°<θa<72°) contributing to high-speed rotation. That is, the second configuration is a configuration which satisfies (0°<θa<72°). With the second configuration, it is possible to achieve high torque of the rotating electric machine 10 while realizing high-speed rotation of the same.

[Third Configuration]

The third configuration is a configuration which further satisfies, compared to the second configuration, the condition E of (0°<θa≤360°/S) contributing to the torque-increasing effect in addition to the conditions B and D. That is, the third configuration is a configuration which satisfies both (0°<θa≤360°/S) and (0°<θa<72°). In the present modification, S=3. Therefore, the third configuration is a configuration which satisfies (0°<θa<72°). With the third configuration, it is possible to further increase the torque of the rotating electric machine 10.

[Fourth Configuration]

The fourth configuration is a configuration which satisfies: the condition B of (0°<θa<120°) under which the third-order harmonic contributes to the torque-increasing effect; the condition C of (72°<θa<144°) under which the fifth-order harmonic contributes to the torque-increasing effect; and the condition E of (0°<θa≤360°/S) contributing to the torque-increasing effect. That is, the fourth configuration is a configuration which satisfies both (0°<θa≤360°/S) and (72°<θa<120°). In the present modification, S=3. Therefore, the fourth configuration is a configuration which satisfies (72°<θa<120°). With the fourth configuration, it is possible to maximize the torque of the rotating electric machine 10.

[Fifth Configuration]

The fifth configuration is a configuration which satisfies both the condition E of (0°<θa≤360°/S) contributing to the torque-increasing effect and the condition of (θa=120°) within (72°<θa<144°) under which the fifth-order harmonic contributes to the torque-increasing effect. That is, the fifth configuration is a configuration which satisfies both (0°<θa≤360°/S) and (θa=120°). In the present modification, S=3. Therefore, the fifth configuration is a configuration which satisfies (θa=120°). With the fifth configuration, it is possible to further increase the torque of the rotating electric machine 10.

Moreover, in the fifth configuration, the main magnetic pole angle θa is set to 120°. In this case, the amplitude of the third-order harmonic becomes 0. In the slot-less structure, it is easy for the magnet magnetic flux of the magnet unit 42 to directly cross the electrical conductors 82; thus it is easy for eddy current loss to increase. In this regard, with the fifth configuration, since the amplitude of the third-order harmonic included in the magnet magnetic flux becomes 0, the eddy current loss can be reduced.

[Sixth Configuration]

The sixth configuration is a configuration which satisfies (120°<θa<144°), so as to satisfy both the condition C of (72°<θa<144°) under which the fifth-order harmonic contributes to the torque-increasing effect and the condition A of (120°<θa<180°) under which the third-order harmonic contributes to high-speed rotation. With the sixth configuration, it is possible to increase the torque of the rotating electric machine 10 while realizing high-speed rotation of the same.

[Seventh Configuration]

The seventh configuration is a configuration which satisfies the condition of (θa=72°) within the condition B of (0°<θa<120°) under which the third-order harmonic contributes to the torque-increasing effect, and the condition E of (0°<θa≤360°/S) contributing to the torque-increasing effect. In the present modification, S=3. Therefore, the seventh configuration is a configuration which satisfies (θa=72°). With the seventh configuration, it is possible to further improve the effect of increasing the torque of the rotating electric machine 10.

Moreover, in the seventh configuration, the main magnetic pole angle θa is set to 72°. In this case, the amplitude of the fifth-order harmonic becomes 0. Consequently, the eddy current loss can be reduced.

[Eighth Configuration]

The eighth configuration is a configuration which satisfies the condition of (θa=144°) within the condition A of (120°<θa<180°) under which the third-order harmonic contributes to high-speed rotation. With the eighth configuration, it is possible to realize high-speed rotation of the rotating electric machine 10.

Moreover, in the eighth configuration, the main magnetic pole angle θa is set to 144°. In this case, the amplitude of the fifth-order harmonic becomes 0. Consequently, the eddy current loss can be reduced.

[Ninth Configuration]

The ninth configuration is a configuration which satisfies (144°<θa<180°), so as to satisfy both the condition A of (120°<θa<180°) under which the third-order harmonic contributes to high-speed rotation and the condition D of (144°<θa<180°) under which the fifth-order harmonic contributes to high-speed rotation. With the ninth configuration, it is possible to realize high-speed rotation of the rotating electric machine 10.

Next, control of a controlled variable of the rotating electric machine 10 will be described with reference to FIGS. 83-85. In the present embodiment, the controlled variable is, for example, the torque or the rotational speed of the rotating electric machine 10. In addition, the control in the first inverter 101 and the control in the second inverter 102 are the same. Therefore, the control in the first inverter 101 will be mainly described hereinafter.

Figure 83A:
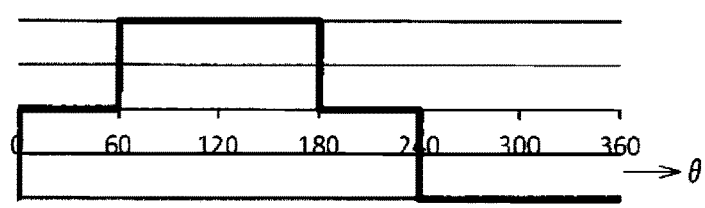
FIGS. 83(a)-83(c) are time charts illustrating 120° rectangular-wave energization control.
Figure 83B:
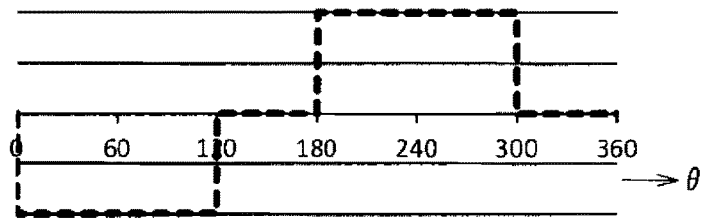
Figure 83C:
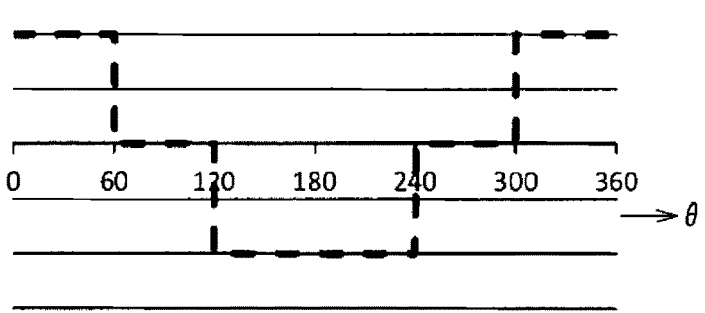
Figure 84:
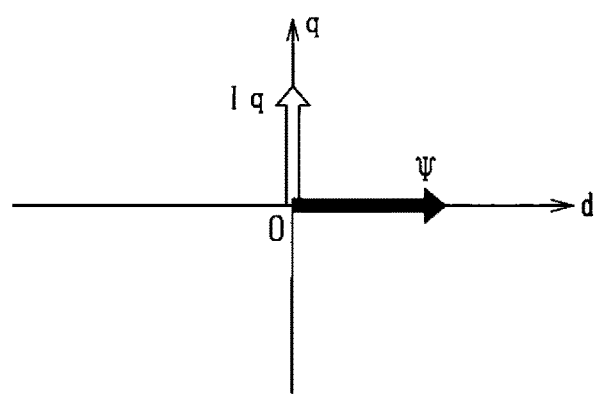
FIG. 84 is a vector diagram in a d-q coordinate system when only the q-axis current of the d-axis and q-axis currents is supplied to the armature coil.

As shown in FIG. 83, the controller 110 is capable of controlling (e.g., space-vector-controlling) the first inverter 101 for energization of each phase winding of the stator coil 51 by 120° rectangular-wave energization control. Rectangular-wave voltages of the three phases are offset in phase from each other by 120° in electrical angle. The rectangular waves whose electrical angular ranges are equal to 120° include no third-order harmonic. Therefore, the third-order harmonic included in the magnetic flux generated upon energization of the stator coil 51 and the third-order harmonic included in the magnet magnetic flux of the magnet unit 42 do not affect each other. As a result, it becomes possible to suppress hindrance to high torque and/or high-speed rotation of the rotating electric machine 10. In addition, in the case of the rotating electric machine 10 having no saliency, as shown in the d-q coordinate system of FIG. 84, the first inverter 101 may be controlled to supply only the q-axis current Iq of the d-axis and q-axis currents Id and Iq. In FIG. 84, Ψ designates the magnetic flux vector of the magnet unit 42. Otherwise, in the case of the rotating electric machine 10 having an inverse saliency, the controller 110 may control the first inverter 101 to supply the d-axis current Id so as to perform field-weakening control.

Figure 85A:
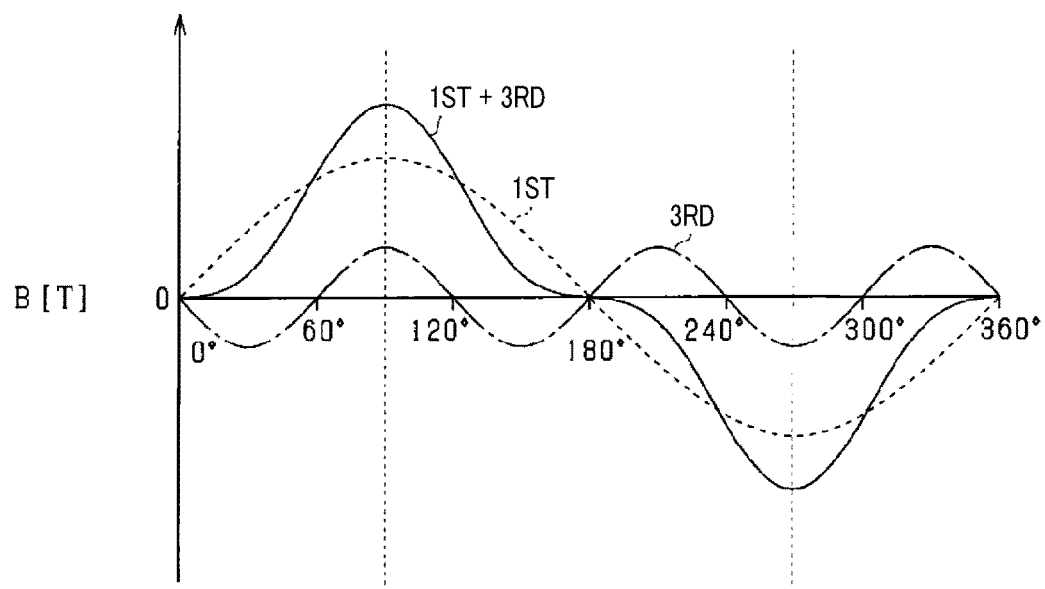
FIGS. 85(a) and 85(b) are time charts illustrating change in the magnetic flux density of the magnet section and change in phase current.
Figure 85B:
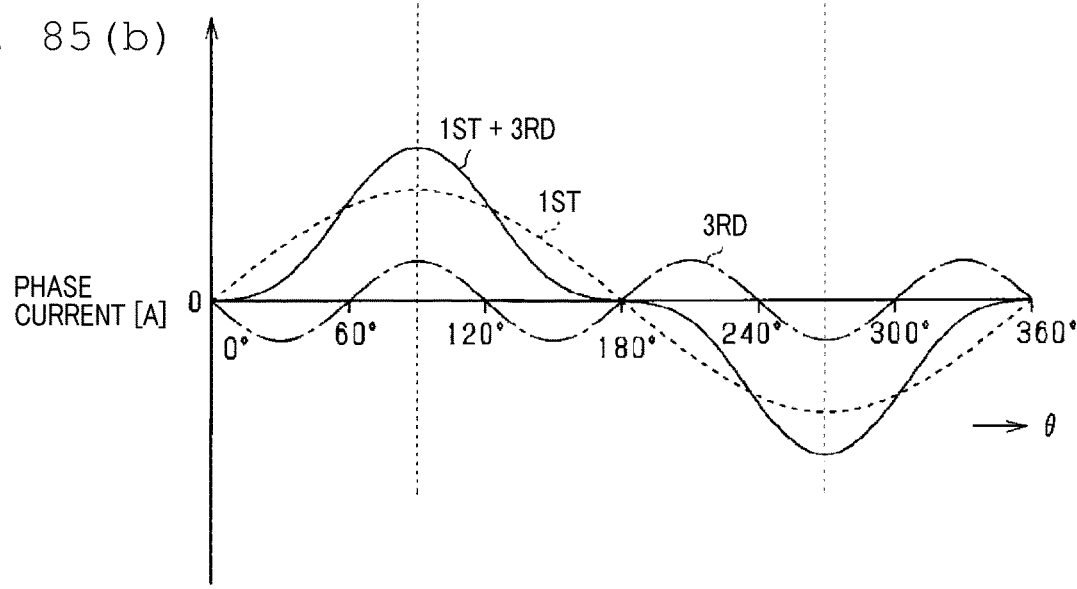

As shown in FIG. 85, the controller 110 is capable of controlling the first inverter 101 to supply an electric current, which is obtained by superimposing harmonic current that is in phase with a harmonic included in the magnet magnetic flux of the magnet unit 42 on fundamental current that is in phase with the fundamental component included in the magnet magnetic flux, as phase current to the stator coil 51. FIG. 85(*a*) illustrates change in the magnet magnetic flux while FIG. 85(*b*) illustrates change in the phase current. In addition, in FIG. 85, there are illustrated change in the magnet magnetic flux and change in the phase current when the above-described seventh configuration is employed.

In the example illustrated in FIG. 85, the electric current, which is obtained by superimposing third-order harmonic current that is in phase with the third-order harmonic of the magnet magnetic flux on the fundamental current, is supplied as the phase current to the stator coil 51. Therefore, the timings at which the synthetic wave of the fundamental component and third-order harmonic of the magnet magnetic flux reaches its extrema are coincident with the timings at which the phase current obtained by superimposing the third-order harmonic current on the fundamental current reaches its extrema. Consequently, it becomes possible to further improve, with the third-order harmonic current, the effect of increasing the torque of the rotating electric machine 10 which can be realized by the magnet magnetic flux.

In addition, the above control is not limited to the seventh configuration, but can also be applied to the first to the sixth, eighth and ninth configurations. For example, when the second configuration is employed in the rotating electric machine 10, an electric current, which is obtained by superimposing fifth-order harmonic current that is in phase with the fifth-order harmonic of the magnet magnetic flux on the fundamental current, may be supplied as the phase current to the stator coil 51. Otherwise, when, for example, the fourth configuration is employed in the rotating electric machine 10, an electric current, which is obtained by superimposing third-order and fifth-order harmonic currents that are respectively in phase with the third-order and fifth-order harmonics of the magnet magnetic flux on the fundamental current, may be supplied as the phase current to the stator coil 51.

Twenty-Fifth Modification

In this modification, part of the structure of the magnet unit 42 is modified. Accordingly, the differences of this modification from the above-described twenty-fourth modification will be mainly described.

Figure 86:
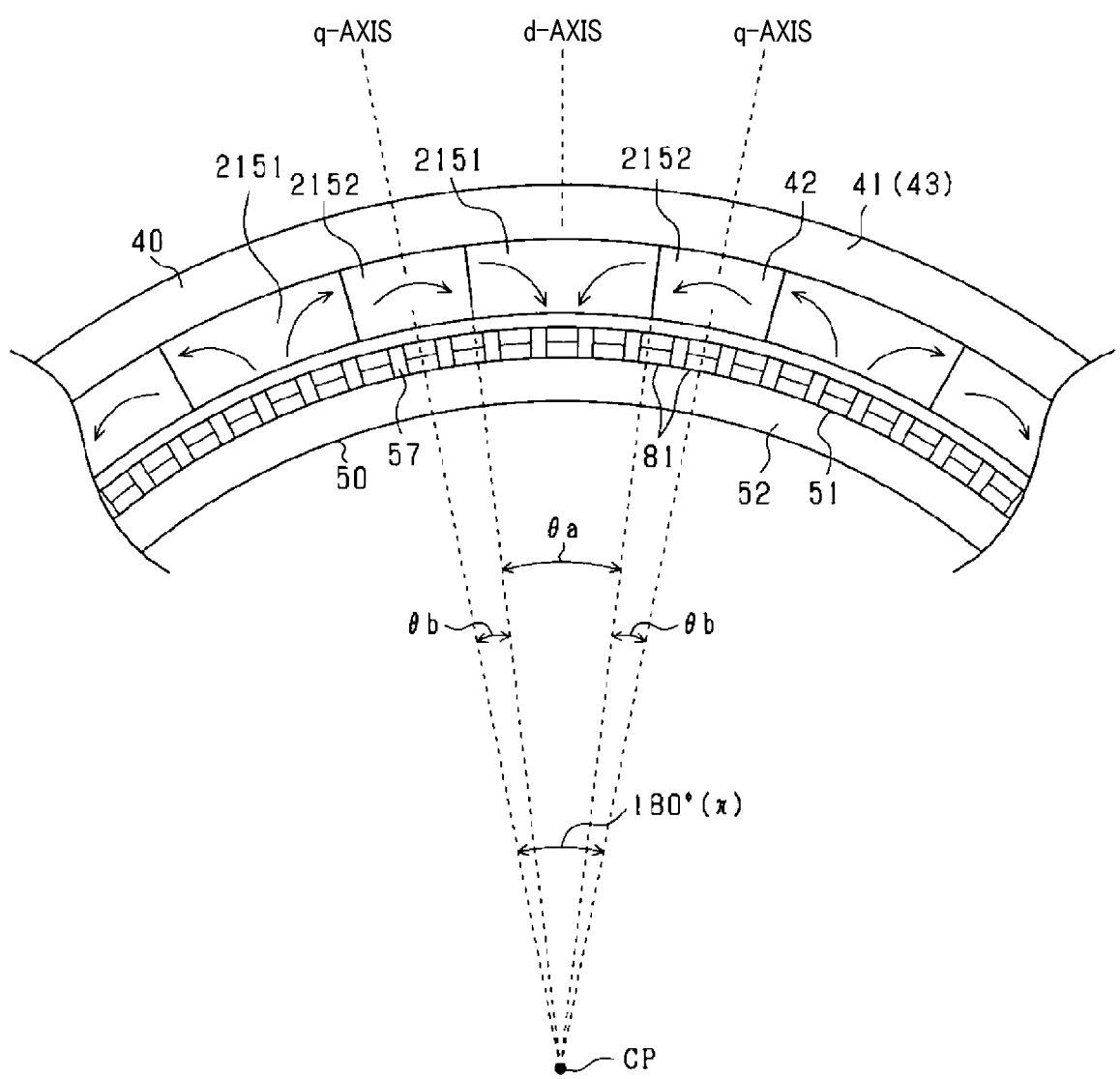
FIG. 86 is an enlarged view of part of a transverse cross section of both a rotor and a stator in a twenty-fifth modification.

In this modification, as shown in FIG. 86, each of the first magnets 2151 is oriented to form arc-shaped magnet magnetic paths such that the direction of the easy axis of magnetization is parallel to or near parallel to the d-axis on the d-axis side and perpendicular to or near perpendicular to the q-axis on the q-axis side. Moreover, the surfaces of the second magnets 2152 facing the first magnets 2151 constitute magnetic flux acting surfaces through which magnetic flux flows into or out of the second magnets 2152. Each of the second magnets 2152 is oriented to form an arc-shaped magnet magnetic path that is convex toward the opposite radial side to the stator 50. In addition, the magnet magnetic paths in the first magnets 2151 are not limited to the arc shape, but may alternatively be straight-line-shaped.

In this modification, the main magnetic pole angle θa may be defined for each of the first magnets 2151 and the auxiliary magnetic pole angle θb may be defined for each of the second magnets 2152 as in the twenty-fourth modification. Moreover, in this modification, the first to the ninth configurations may be employed as in the twenty-fourth modification.

According to the present modification as described above, it becomes possible to make, with a simpler orientation technique, the waveform of the surface magnetic flux density of the magnet unit 42 approximate to a sine wave in comparison with a configuration where only one magnet is provided in an electrical angular range corresponding to one magnetic pole. As a result, it becomes possible to increase the torque of the rotating electric machine 10.

Moreover, according to the present modification, it becomes possible to form the magnet magnetic paths of the magnet unit 42 to be longer than those of the magnet unit 42 according to the twenty-fourth modification. As a result, it becomes possible to increase the amount of magnetic flux of the magnet unit 42, thereby further increasing the torque of the rotating electric machine 10. In addition, it also becomes possible to make it difficult for the first and second magnets 2151 and 2152 to become demagnetized.

The configurations according to the above-described twenty-fourth and twenty-fifth modifications may be applied to the rotating electric machines shown in FIGS. 43-49. In these cases, the main magnetic pole angle θa may be defined for each of the first magnets and the auxiliary magnetic pole angle θb may be defined for each of the second magnets as in the twenty-fourth and twenty-fifth modifications. Moreover, in these cases, the first to the ninth configurations may be employed as in the twenty-fourth and twenty-fifth modifications.

Other modifications will be described hereinafter.

The radial distance DM from the armature-side surface of the magnet unit 42 to the axis of the rotor may be set to be greater than or equal to 50 mm. Specifically, as shown in, for example, FIG. 4, the radial distance DM from the radially inner surface of the magnet unit 42 (more specifically, the radially inner surfaces of the first and second magnets 91 and 92) to the axis of the rotor 40 may be set to be greater than or equal to 50 mm.

As slot-less rotating electric machines, small-scale rotating electric machines have been known whose outputs are from several tens of watts to several hundreds of watts and which are used for model applications. However, the inventor of the present application have found no examples where large-scale rotating electric machines for industrial applications, whose outputs generally exceed 10 kW, employ a slot-less structure. Therefore, the inventor has investigated the reasons.

Recent mainstream rotating electric machines can be classified into the following four types: brushed motors, squirrel cage induction motors, permanent magnet synchronous motors and reluctance motors.

Brushed motors are supplied with exciting current via brushes. However, in the case of large-scale brushed motors, the sizes of brushes are large and maintenance is troublesome. Therefore, with remarkable developments in semiconductor technologies, large-scale brushed motors have been replaced with brushless motors such as induction motors. On the other hand, some small-scale brushed motors employ a coreless structure due to low inertia and economic benefits.

Squirrel cage induction motors generate torque by having the magnetic field, which is created by a primary-side stator coil, received by a secondary-side rotor core and causing induced current to intensely flow to a squirrel cage-shaped electrical conductor to create a counteracting magnetic field. Therefore, configuring both the rotor and the stator to include no core is not necessarily beneficial in terms of minimization of the sizes and improvement of the efficiencies of squirrel cage induction motors.

Reluctance motors generate torque utilizing the reluctance change in a core. Therefore, in terms of basic principles, it is undesirable to eliminate the core.

Regarding permanent magnet synchronous motors, IPM (Interior Permanent Magnet) motors are the recent mainstream motors. Therefore, unless for special reasons, large-scale permanent magnet synchronous motors are IPM motors in most cases.

IPM motors can generate both magnet torque and reluctance torque. Moreover, IPM motors are operated with the ratio between the generated magnet and reluctance torques suitably adjusted by an inverter control. Therefore, IPM motors are small in size and superior in controllability.

Figure 87:
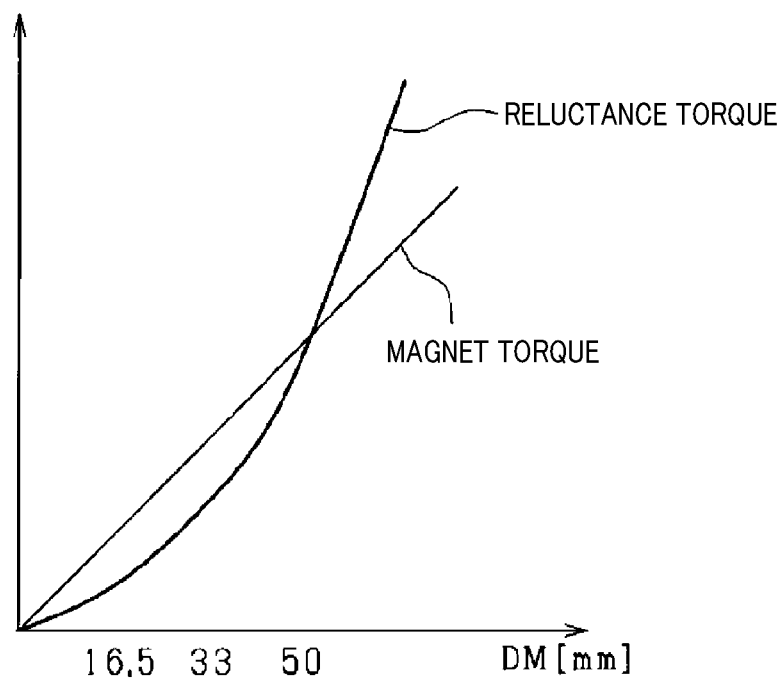
FIG. 87 is a diagram illustrating the relationships between reluctance torque, magnet torque and radial distance DM.

According to an analysis by the inventor of the present application, the relationships between magnet torque, reluctance torque and the radial distance DM from the armature-side surface of the magnet unit 42 to the axis of the rotor (i.e., the radius of the stator core in the case of the rotating electric machine being of an inner rotor type) are as shown in FIG. 87.

The magnet torque has its potential determined by the strength of the magnetic field created by the permanent magnets as shown in the following equation (eq1). In contrast, the reluctance torque has its potential determined by the amplitudes of the inductances, in particular the amplitude of the q-axis inductance as shown in the following equation (eq2).

$$\text{Magnet torque} = k \cdot \Psi \cdot Iq \quad \text{(eq1)}$$

$$\text{Reluctance torque} = k \cdot (Lq - Ld) \cdot Iq \cdot Id \quad \text{(eq2)}$$

Here, a comparison is made between the strength of the magnetic field created by the permanent magnets and the amplitudes of the inductances of the coil using the radial distance DM. The strength of the magnetic field created by the permanent magnets, i.e., the amount of magnetic flux $\Psi$, is proportional to the total surface area of the permanent magnets facing the stator. In the case of the rotor being cylindrical in shape, the total surface area is represented by the surface area of the cylinder. Strictly speaking, due to the presence of N and S poles, the amount of magnetic flux $\Psi$ is proportional to half the surface area of the cylinder. Moreover, the surface area of the cylinder is proportional to both the radius of the cylinder and the length of the cylinder. That is, with the length of the cylinder being constant, the amount of magnetic flux $\Psi$ is proportional to the radius of the cylinder.

Figure 88:
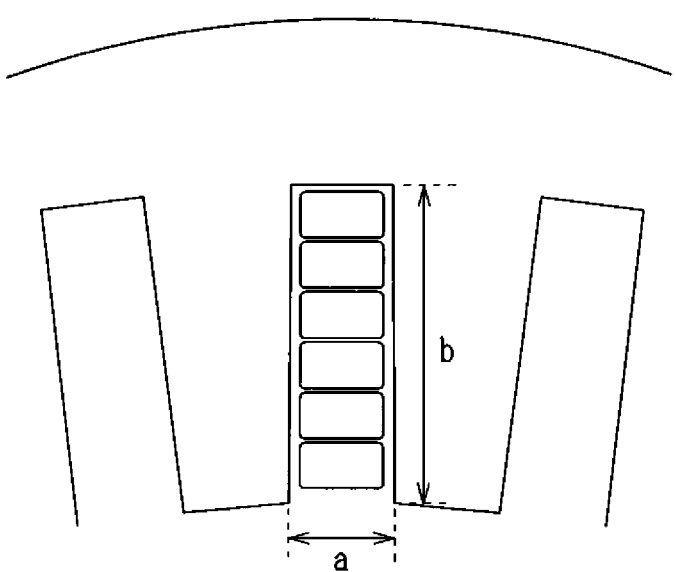
FIG. 88 is a diagram showing teeth.

On the other hand, the inductance Lq of the coil is dependent on, but less sensitive to the core shape. The inductance Lq is proportional to the square of the number of turns of the stator coil, i.e., highly dependent on the number of turns of the stator coil. Moreover, the inductance L can be determined by the following equation: $L = \mu \times N^2 \times S / \delta$, where $\mu$ is the permeability of the magnetic circuit, N is the number of turns, S is the cross-sectional area of the magnetic circuit and $\delta$ is the effective length of the magnetic circuit. The number of turns of the coil depends on the volume of the coil space. In the case of the rotating electric machine being a cylindrical motor, the number of turns depends on the coil space of the stator, i.e., depends on the slot area. As shown in FIG. 88, in the case of the slots having a substantially rectangular shape, the slot area is proportional to the product of the circumferential dimension a and the radial dimension b of each slot (i.e., a×b).

The circumferential dimension of each slot increases in proportion to the diameter of the cylinder. The radial dimension of each slot also increases in proportion to the diameter of the cylinder. Therefore, the slot area is proportional to the square of the diameter of the cylinder. Moreover, as can be seen from above (eq2), the reluctance torque is proportional to the square of the stator current. Therefore, the performance of the rotating electric machine depends on the amplitude of the stator current and thus on the slot area of the stator. As above, with the length of the cylinder being constant, the reluctance torque is proportional to the square of the diameter of the cylinder. The relationships between the magnet torque, the reluctance torque and the radial distance DM are determined based on the above observations and illustrated in FIG. 87.

As can be seen from FIG. 87, the magnet torque linearly increases with the radial distance DM while the reluctance torque quadratically increases with the radial distance DM. When the radial distance DM is relatively small, the magnet torque is dominant. However, with increase in the radial distance DM, the reluctance torque becomes dominant. The inventor of the present application has concluded that the intersection point between the magnet torque and the reluctance torque in FIG. 87 is in the vicinity of DM=50 mm under predetermined conditions. That is, in 10 kW-class electric motors where the stator core radius sufficiently exceeds 50 mm, the current mainstream technique is to utilize the reluctance torque; therefore, it is difficult to eliminate the core. This can be considered to be one of the reasons why the slot-less structure is not employed in large-scale rotating electric machines.

In the case of rotating electric machines including a stator core, magnetic saturation of the stator core is always a problem to be solved. In particular, in radial-gap type rotating electric machines, the rotating shaft has a longitudinal cross section which has one fan-shaped sector per magnetic pole. The magnetic path width decreases in a radially inward direction and the performance limit of the rotating electric machine is determined by the radially inner-side dimensions of the stator teeth forming the slots. Even when high-performance permanent magnets are employed, upon occurrence of magnetic saturation at radially inner portions of the stator teeth, it becomes impossible to sufficiently utilize the high performance of the permanent magnets. To prevent magnetic saturation from occurring at the radially inner portions of the stator teeth, it is necessary to increase the inner diameter of the stator core. However, with increase in the inner diameter of the stator core, the size of the entire rotating electric machine is increased.

For example, in a distributed-winding rotating electric machine which includes a three-phase coil, there are provided, for each magnetic pole, three to six teeth through which magnetic flux flows. However, magnetic flux tends to concentrate on those of the teeth located on the front side in the circumferential direction; i.e., magnetic flux is unevenly distributed to the three to six teeth. In this case, magnetic flux concentratedly flows to some (e.g., one or two) of the three to six teeth; with rotation of the rotor, the magnetically-saturated teeth also move in the circumferential direction, causing slot ripple to occur.

As above, in slot-less rotating electric machines where the radial distance DM is greater than or equal to 50 mm, to prevent occurrence of magnetic saturation, it is desirable to eliminate teeth. However, when teeth are eliminated, magnetic reluctance of the magnetic circuit in the rotor and the stator may increase, thereby lowering the torque of the rotating electric machine. This is because without teeth, the air gap between the rotor and the stator may increase. Therefore, there is room to increase torque in slot-less rotating electric machines where the radial distance DM is greater than or equal to 50 mm. Consequently, significant advantages can be achieved by applying the above-described torque-increasing configurations to slot-less rotating electric machines where the radial distance DM is greater than or equal to 50 mm.

In addition, the radial distance DM from the armature-side surface of the magnet unit to the axis of the rotor may be preferably set to be greater than or equal to 50 mm not only in outer rotor type rotating electric machines but also in inner rotor type rotating electric machines.

In the stator coil 51 of the rotating electric machine 10, the straight portions 83 of the electrical conductors 82 may be arranged in a single layer in the radial direction. Otherwise, in the case of arranging the straight portions 83 of the electrical conductors 82 in a plurality of layers in the radial direction, the number of the layers may be set to any arbitrary number, such as 3, 4, 5 or 6.

In the configuration shown in FIG. 2, the rotating shaft 11 protrudes to both axial sides of the rotating electric machine 10. As an alternative, the rotating shaft 11 may protrude to only one axial side of the rotating electric machine 10. For example, the rotating shaft 11 may have an end portion supported in a cantilever fashion by the bearing unit 20; the remainder of the rotating shaft 11 protrudes, on the opposite axial side of the bearing unit 20 to the inverter unit 60, axially outside the rotating electric machine 10. In this case, the rotating shaft 11 does not protrude inside the inverter unit 60. Consequently, the available internal space of the inverter unit 60, more specifically the available internal space of the cylindrical portion 71 is increased.

In the rotating electric machine 10 configured as described above, non-electrically conductive grease is used in the bearings 21 and 22. As an alternative, electrically conductive grease may be used in the bearings 21 and 22. For example, electrically conductive grease which contains metal particles or carbon particles may be used in the bearings 21 and 22.

The rotating shaft 11 may be rotatably supported by bearings provided at two locations respectively on opposite axial sides of the rotor 40. More specifically, in the configuration shown in FIG. 1, the rotating shaft 11 may alternatively be rotatably supported by bearings provided at two locations respectively on opposite axial sides of the inverter unit 60.

In the rotating electric machine 10 configured as described above, the intermediate portion 45 of the magnet holder 41 of the rotor 40 has both the annular inner shoulder part 49*a* and the annular outer shoulder part 49*b* formed therein. As an alternative, the intermediate portion 45 may be configured to have a flat surface without the shoulder parts 49*a* and 49*b* formed therein.

In the rotating electric machine 10 configured as described above, each of the electrical conductors 82 forming the stator coil 51 has its conductor body 82*a* constituted of a bundle of wires 86. As an alternative, each of the electrical conductors 82 may be configured with a single flat wire which has a rectangular cross-sectional shape. As another alternative, each of the electrical conductors 82 may be configured with a single round wire which has a circular or elliptical cross-sectional shape.

In the rotating electric machine 10 configured as described above, the inverter unit 60 is provided radially inside the stator 50. As an alternative, the inverter unit 60 may not be provided radially inside the stator 50. In this case, the internal space of the stator 50, which was occupied by the inverter unit 60, may remain as a hollow space or be occupied by a different component from the inverter unit 60.

In the case of the rotating electric machine having an outer rotor structure, there may be provided bridges between the first magnets and the second magnets in the circumferential direction. In this case, each of the bridges may have such a circumferential width as to be magnetically saturated by the magnetic flux of the first and second magnets. Moreover, in this case, (2×θb), which represents the electrical angular range where the second magnets 132 are present in one electrical angular cycle, would become smaller than the value obtained by subtracting the main magnetic pole angle θa from the 180°.

In the case of the rotating electric machine having an inner rotor structure, a ring member may be provided on the outer peripheral surface of the magnet unit 42 to prevent the magnets from flying out of the magnet unit 42.

In the rotating electric machine 10 configured as described above, the housing 30 may be omitted from the configuration of the rotating electric machine 10. In this case, both the rotor 40 and the stator 50 may be held by, for example, a wheel or other vehicle components.

The disclosure in this specification is not limited to the embodiments illustrated above. The disclosure encompasses not only the embodiments illustrated above, but also modifications of the embodiments which can be derived by one of ordinary skill in the art from the embodiments. For example, the disclosure is not limited to the combinations of components and/or elements illustrated in the embodiments. Instead, the disclosure may be implemented by various combinations. The disclosure may include additional parts which can be added to the embodiments. The disclosure encompasses components and/or elements omitted from the embodiments. The disclosure also encompasses any replacement or combination of components and/or elements between one and another of the embodiments. The disclosed technical ranges are not limited to the description of the embodiments. Instead, the disclosed technical ranges should be understood as being shown by the recitation of the claims and as encompassing all modifications within equivalent meanings and ranges to the recitation of the claims.

What is claimed is:

1. A rotating electric machine comprising:
    a field system including a magnet section having a plurality of magnetic poles whose polarities alternate in a circumferential direction; and
    an armature including a multi-phase armature coil, wherein
    either of the field system and the armature is configured as a rotor,
    the magnet section includes first magnets that each correspond to one of the magnetic poles of the magnet section and are arranged at predetermined intervals in the circumferential direction, and the magnet section also includes second magnets each of which is arranged between one circumferentially-adjacent pair of the first magnets to extend across a q-axis,
    each of the first magnets is oriented to form a magnet magnetic path parallel to a d-axis,
    surfaces of the second magnets facing the first magnets constitute magnetic flux acting surfaces through which magnetic flux flows into or out of the second magnets,
    each of the second magnets is oriented to form, at the q-axis, a magnet magnetic path deviated from a direction perpendicular to the q-axis, $0 < \theta a \leq 2\pi/S$, where S is a number of phases of the armature coil and θa is a main magnetic pole angle which is defined, for each of the first magnets, as an angle between (i) a straight line extending through one of two q-axis-side ends of the first magnet in the circumferential direction and an axis of the rotor and (ii) a straight line extending through the other of the two q-axis-side ends of the first magnet in the circumferential direction and the axis of the rotor, and either (i) $2\pi/5 < \theta a \leq 2\pi/3$, (ii) $\theta a = 2\pi/3$, or (iii) $\theta a = 2\pi/5$.

2. The rotating electric machine as set forth in claim 1, wherein each of the second magnets is oriented to form the magnet magnetic path that is convex toward an opposite side to the armature.

3. The rotating electric machine as set forth in claim 1, wherein the armature coil has electrical conductor sections opposed to the field system and arranged at predetermined intervals in the circumferential direction, in the armature, there are provided inter-conductor members between the electrical conductor sections in the circumferential direction or no inter-conductor members are provided between the electrical conductor sections in the circumferential direction, and the inter-conductor members are formed of a magnetic material satisfying the following relationship or formed of a non-magnetic material, $$Wt \times Bs \leq Wm \times Br$$

where Wt is a circumferential width of the inter-conductor members in each magnetic pole, Bs is a saturation flux density of the inter-conductor members, Wm is a circumferential width of the magnet section in each magnetic pole and Br is a residual flux density of the magnet section.

4. The rotating electric machine as set forth in claim 3, wherein each of the inter-conductor members is constituted of an arc-shaped portion that radially extends from a core of the armature, the arc-shaped portion having its distal end radially protruding from the electrical conductor sections toward the field system side and arc-shaped so as to be convex on the field system side.

5. The rotating electric machine as set forth in claim 1, wherein the armature coil has electrical conductor sections opposed to the field system and arranged at predetermined intervals in the circumferential direction, and a radial thickness of the electrical conductor sections is smaller than a circumferential width of the electrical conductor sections per phase in each magnetic pole.

6. The rotating electric machine as set forth in claim 1, wherein the first and second magnets have an intrinsic coercive force higher than or equal to 400 [kA/m] and a residual flux density higher than or equal to 1.0[T].

7. A rotating electric machine comprising:

a field system including a magnet section having a plurality of magnetic poles whose polarities alternate in a circumferential direction; and an armature including a multi-phase armature coil, wherein either of the field system and the armature is configured as a rotor, the magnet section includes first magnets that each correspond to one of the magnetic poles of the magnet section and are arranged at predetermined intervals in the circumferential direction, and the magnet section also includes second magnets each of which is arranged between one circumferentially-adjacent pair of the first magnets to extend across a q-axis, each of the first magnets is oriented to form a magnet magnetic path parallel to a d-axis, surfaces of the second magnets facing the first magnets constitute magnetic flux acting surfaces through which magnetic flux flows into or out of the second magnets, each of the second magnets is oriented to form, at the q-axis, a magnet magnetic path deviated from a direction perpendicular to the q-axis, and either (i) $2\pi/3 < \theta a \leq 4\pi/5$, (ii) $\theta a = 4\pi/5$, or (iii) $4\pi/5 < \theta a < \pi$, where θa is a main magnetic pole angle which is defined, for each of the first magnets, as an angle between (i) a straight line extending through one of two q-axis-side ends of the first magnet in the circumferential direction and an axis of the rotor and (ii) a straight line extending through the other of the two q-axis-side ends of the first magnet in the circumferential direction and the axis of the rotor.

8. The rotating electric machine as set forth in claim 7, wherein the armature coil has electrical conductor sections opposed to the field system and arranged at predetermined intervals in the circumferential direction, in the armature, there are provided inter-conductor members between the electrical conductor sections in the circumferential direction or no inter-conductor members are provided between the electrical conductor sections in the circumferential direction, and the inter-conductor members are formed of a magnetic material satisfying the following relationship or formed of a non-magnetic material, $$Wt \times Bs \leq Wm \times Br$$

where Wt is a circumferential width of the inter-conductor members in each magnetic pole, Bs is a saturation flux density of the inter-conductor members, Wm is a circumferential width of the magnet section in each magnetic pole and Br is a residual flux density of the magnet section.

9. The rotating electric machine as set forth in claim 8, wherein each of the inter-conductor members is constituted of an arc-shaped portion that radially extends from a core of the armature, the arc-shaped portion having its distal end radially protruding from the electrical conductor sections toward the field system side and arc-shaped so as to be convex on the field system side.

10. The rotating electric machine as set forth in claim 7, wherein each of the second magnets is oriented to form the magnet magnetic path that is convex toward an opposite side to the armature.

11. The rotating electric machine as set forth in claim 7, wherein the armature coil has electrical conductor sections opposed to the field system and arranged at predetermined intervals in the circumferential direction, and a radial thickness of the electrical conductor sections is smaller than a circumferential width of the electrical conductor sections per phase in each magnetic pole.

12. The rotating electric machine as set forth in claim 7, wherein the first and second magnets have an intrinsic coercive force higher than or equal to 400 [kA/m] and a residual flux density higher than or equal to 1.0[T].

* * * * *